US012619975B2

(12) United States Patent
Hamasako et al.

(10) Patent No.: US 12,619,975 B2
(45) Date of Patent: May 5, 2026

(54) GENERATION METHOD, PROGRAM AND INFORMATION PROCESSING DEVICE

(71) Applicant: LINE Financial Corporation, Seongnam-si (KR)

(72) Inventors: Ryosuke Hamasako, Tokyo (JP); Tomohiro Okada, Tokyo (JP)

(73) Assignee: LINE Financial Corporation, Seongnam-si (KR)

( * ) Notice: Subject to any disclaimer, the term of this patent is extended or adjusted under 35 U.S.C. 154(b) by 713 days.

(21) Appl. No.: 17/129,154

(22) Filed: Dec. 21, 2020

(65) Prior Publication Data

US 2021/0110383 A1     Apr. 15, 2021

Related U.S. Application Data

(63) Continuation of application No. PCT/JP2018/047865, filed on Dec. 26, 2018.

(30) Foreign Application Priority Data

Dec. 21, 2018     (JP) ................................. 2018-240337

(51) Int. Cl.
G06Q 20/36          (2012.01)
G06Q 20/20          (2012.01)
(Continued)

(52) U.S. Cl.
CPC ......... G06Q 20/3674 (2013.01); G06Q 20/20 (2013.01); G06Q 20/204 (2013.01); G06Q 20/3274 (2013.01); G06Q 20/3276 (2013.01); G06Q 20/4015 (2020.05); G06Q 30/0607 (2013.01)

(58) Field of Classification Search
CPC .............. G06Q 20/3674; G06Q 20/20; G06Q 20/3274; G06Q 20/4015; G06Q 30/0607
See application file for complete search history.

(56) References Cited

U.S. PATENT DOCUMENTS

2003/0089767 A1     5/2003   Kiyomatsu
2003/0177068 A1     9/2003   Fujimoto
(Continued)

FOREIGN PATENT DOCUMENTS

JP          2002-176671 A     6/2002
JP          2004-110799 A     4/2004
(Continued)

OTHER PUBLICATIONS

International Search Report issued Apr. 9, 2019 by the International Searching Authority in International Application No. PCT/JP2018/047864.

(Continued)

*Primary Examiner* — John W Hayes
*Assistant Examiner* — Taylor S Rak
(74) *Attorney, Agent, or Firm* — Sughrue Mion, PLLC

(57)          ABSTRACT

A method performed by an information processing device to generate code information on a payment related to an electronic money at a terminal, may be provided. The method may include: obtaining first information; and generating the code information that includes second information related to an authentication of a user of the terminal based on the first information.

17 Claims, 62 Drawing Sheets

(51) Int. Cl.
  *G06Q 20/32* (2012.01)
  *G06Q 20/40* (2012.01)
  *G06Q 30/0601* (2023.01)

(56) References Cited

U.S. PATENT DOCUMENTS

| | | | | |
|---|---|---|---|---|
| 2007/0027803 | A1* | 2/2007 | Brandes | G06Q 20/223 705/39 |
| 2008/0022399 | A1 | 1/2008 | Takano | |
| 2011/0307318 | A1 | 12/2011 | LaPorte et al. | |
| 2012/0157062 | A1* | 6/2012 | Kim | H04M 15/41 705/26.1 |
| 2012/0185931 | A1 | 7/2012 | Shimotono | |
| 2012/0209749 | A1* | 8/2012 | Hammad | G06Q 20/326 705/27.1 |
| 2013/0036048 | A1* | 2/2013 | Campos | G06Q 20/40 705/41 |
| 2014/0019358 | A1* | 1/2014 | Priebatsch | G06Q 20/3274 705/44 |
| 2014/0095385 | A1* | 4/2014 | Ainslie | G06Q 40/02 705/44 |
| 2014/0164254 | A1* | 6/2014 | Dimmick | G06Q 20/4014 705/44 |
| 2014/0324692 | A1 | 10/2014 | Yarbrough et al. | |
| 2016/0012426 | A1 | 1/2016 | Chitilian et al. | |
| 2016/0196541 | A1 | 7/2016 | Akashika | |
| 2016/0335642 | A1 | 11/2016 | Sogawa et al. | |
| 2016/0379206 | A1 | 12/2016 | Lee et al. | |
| 2017/0103382 | A1* | 4/2017 | Kim | G06Q 20/204 |
| 2017/0109752 | A1* | 4/2017 | Hubbard | H04L 63/10 |
| 2017/0169421 | A1* | 6/2017 | Kohli | G06Q 20/40145 |
| 2017/0323354 | A1 | 11/2017 | Martell | |
| 2017/0345072 | A1 | 11/2017 | Chang | |
| 2018/0114215 | A1 | 4/2018 | Cho et al. | |
| 2019/0236568 | A1 | 8/2019 | Arisada et al. | |
| 2020/0074442 | A1 | 3/2020 | Kulkarni et al. | |

FOREIGN PATENT DOCUMENTS

| | | |
|---|---|---|
| JP | 2006-163492 A | 6/2006 |
| JP | 2006-268302 A | 10/2006 |
| JP | 2006-279139 A | 10/2006 |
| JP | 2007-68016 A | 3/2007 |
| JP | 2008-27235 A | 2/2008 |
| JP | 2008-257540 A | 10/2008 |
| JP | 4192864 B2 | 12/2008 |
| JP | 2009-217489 A | 9/2009 |
| JP | 2010-108177 A | 5/2010 |
| JP | 2010-287250 A | 12/2010 |
| JP | 2011-13959 A | 1/2011 |
| JP | 2012-168611 A | 9/2012 |
| JP | 2012-216155 A | 11/2012 |
| JP | 2014-157430 A | 8/2014 |
| JP | 2017-021742 A | 1/2017 |
| JP | 2017-204109 A | 11/2017 |
| JP | 2018-505465 A | 2/2018 |
| KR | 10-2016-0043340 A | 4/2016 |
| KR | 10-1681002 B1 | 11/2016 |
| WO | 2006/109574 A1 | 10/2006 |
| WO | 2014/103543 A1 | 7/2014 |
| WO | 2015/025354 A1 | 2/2015 |
| WO | 2016/135860 A1 | 9/2016 |
| WO | 2017/029739 A1 | 2/2017 |
| WO | 2017/072589 A2 | 5/2017 |
| WO | 2018/150487 A1 | 8/2018 |

OTHER PUBLICATIONS

Written Opinion of the International Searching Authority issued Apr. 9, 2019 by the International Searching Authority in International Application No. PCT/JP2018/047864.

Office Action issued Apr. 16, 2019 by the Japanese Patent Office in Japanese Application No. 2018-240335.

Office Action issued Sep. 10, 2019 by the Japanese Patent Office in Japanese Application No. 2018-240335.

International Search Report issued by the International Searching Authority in International Application No. PCT/JP2018/047865 dated Mar. 19, 2019 [PCT/ISA/210].

Written Opinion issued by the International Searching Authority in International Application No. PCT/JP2018/047865 dated Mar. 19, 2019 [PCT/ISA/237].

Japanese Office Action issued by the Japanese Patent Office in Japanese Application No. 2018-240337 dated Mar. 12, 2019.

Communication issued Feb. 11, 2022 by the Korean Intellectual Property Office in Korean Application No. 10-2020-7031642.

Written Opinion (English Translation) issued by the International Searching Authority in International Application No. PCT/JP2018/047865 dated Mar. 19, 2019.

Office Action dated Nov. 29, 2022 issued by the Japanese Patent Office in Japanese Application No. 2018-240336.

Office Action dated Nov. 29, 2022 issued by the Japanese Patent Office in Japanese Application No. 2018-240338.

Notification of Reasons for Refusal dated Feb. 21, 2023 from the Japanese Patent Office in application No. 2019-162144.

Notification of Reasons for Refusal dated Mar. 7, 2023 from Japanese Patent Office in application No. 2020-052402.

Office Action issued Sep. 15, 2023 by the United States Patent and Trademark Office in U.S. Appl. No. 17/129,076.

Office Action issued Jun. 13, 2023 in Japanese Application No. 2018-240338.

Office Action issued Jan. 16, 2024 in Japanese Application No. 2018-240338.

Office Action issued May 6, 2024 in U.S. Appl. No. 17/129,076.

Office Action issued Sep. 11, 2024 in U.S. Appl. No. 17/129,076.

United States Office Action dated Mar. 5, 2025 in U.S. Appl. No. 17/129,076.

\* cited by examiner

Figure 1:
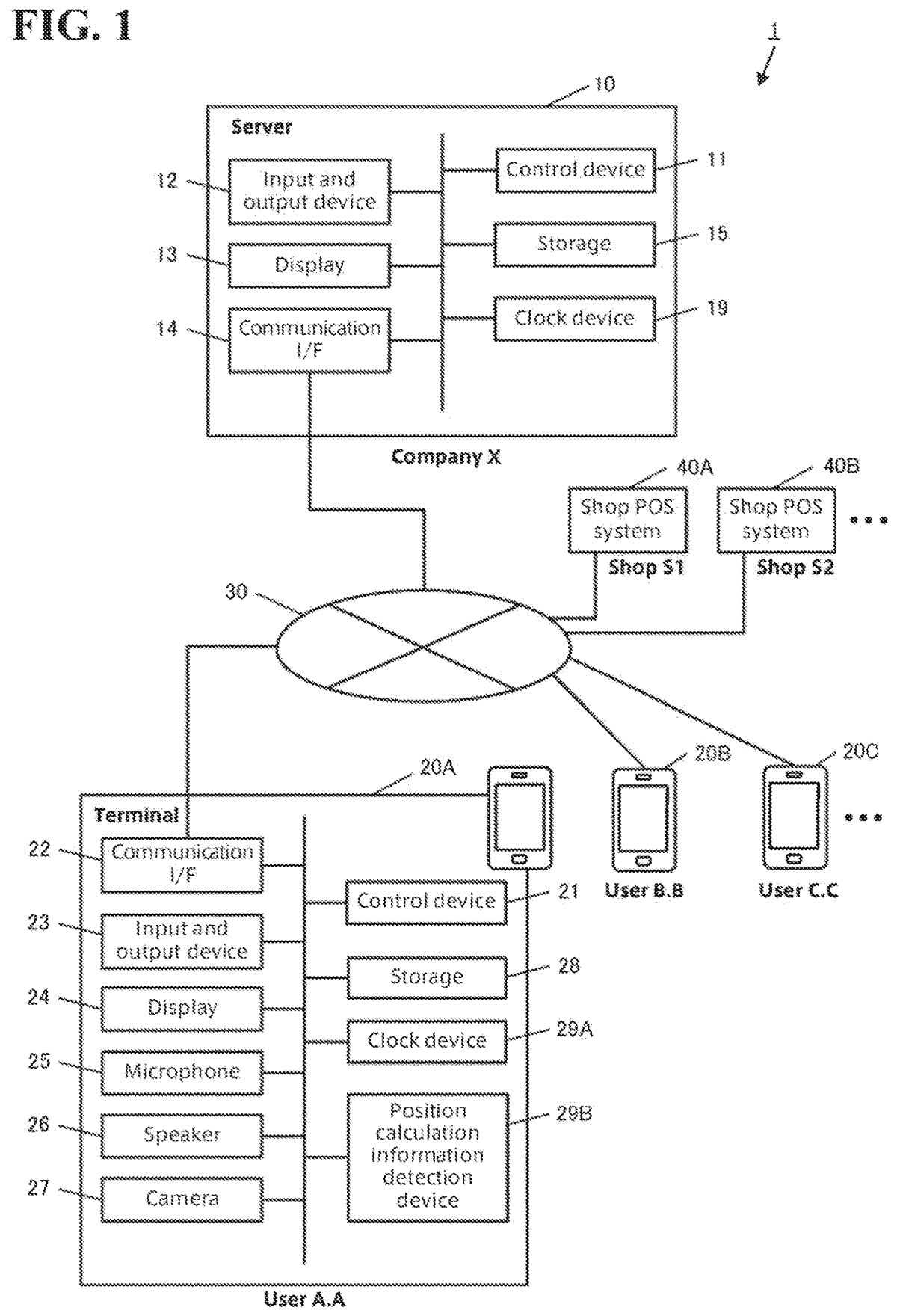

Server — 10

12 — Input and output device

11 — Control device

13 — Display

15 — Storage

14 — Communication I/F

19 — Clock device

Company X

40A — Shop POS system — Shop S1

40B — Shop POS system — Shop S2

...

30

20A

Terminal

22 — Communication I/F

21 — Control device

23 — Input and output device

28 — Storage

24 — Display

29A — Clock device

25 — Microphone

29B — Position calculation information detection device

26 — Speaker

27 — Camera

User A.A

20B — User B.B

20C — User C.C

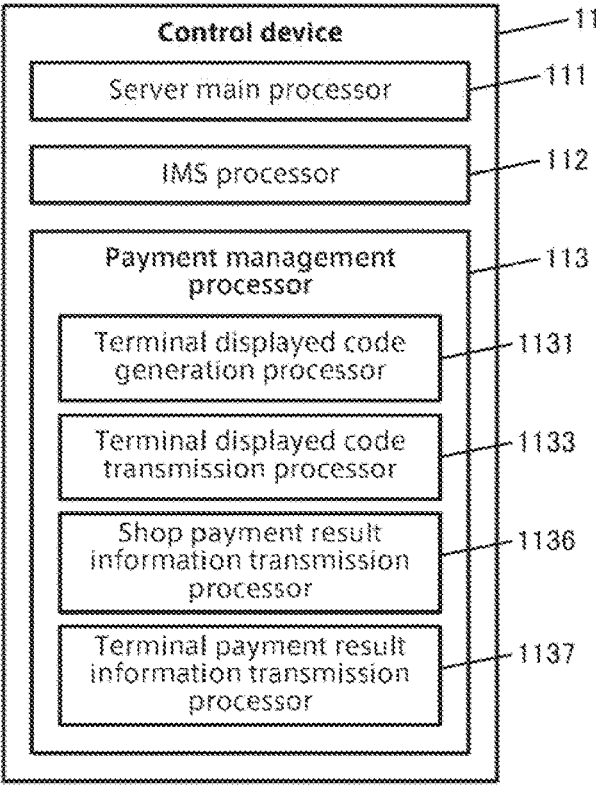

Control device — 11

Server main processor — 111

IMS processor — 112

Payment management processor — 113

Terminal displayed code generation processor — 1131

Terminal displayed code transmission processor — 1133

Shop payment result information transmission processor — 1136

Terminal payment result information transmission processor — 1137

FIG. 3B

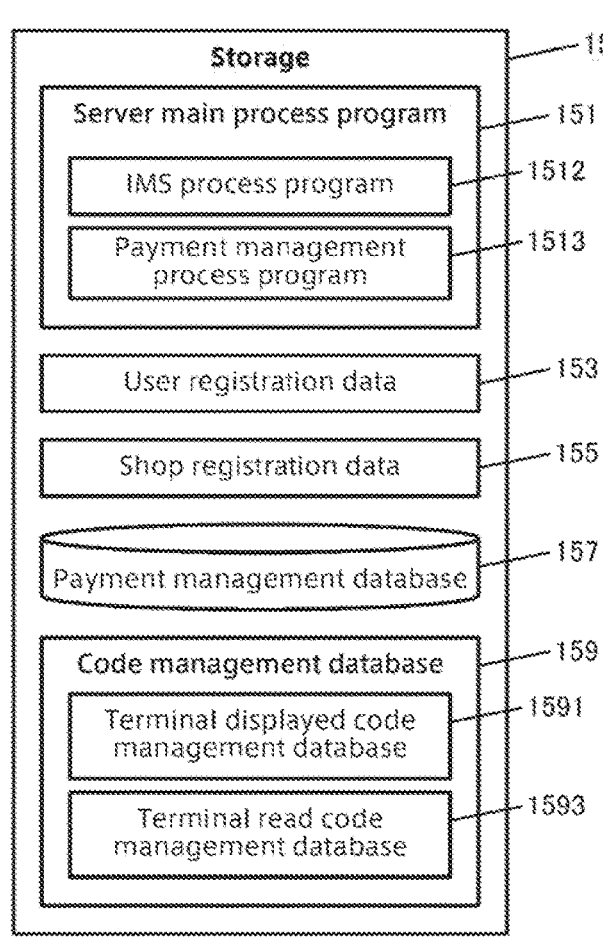

Storage — 15

Server main process program — 151

IMS process program — 1512

Payment management process program — 1513

User registration data — 153

Shop registration data — 155

Payment management database — 157

Code management database — 159

Terminal displayed code management database — 1591

Terminal read code management database — 1593

| User Name | Terminal Phone Number | Terminal Mail Address | User ID | Authentication Password | Other Registered Information |
|---|---|---|---|---|---|
| A. A | 090-XXXX-XXXX | *****@.ne.jp | U0001 | ******** | [ ··· ] |
| B. B | 090-XXXX-XXXX | ***@.ne.jp | U0002 | ********** | [ ··· ] |
| C. C | 080-XXXX-XXXX | *******@.ne.jp | U0003 | ******** | [ ··· ] |
| ··· | ··· | ··· | ··· | ··· | ··· |

| Business Category | Shop Name | Shop Position Information | Shop POS System Information | Shop ID | First Particular Business Category Flag | Second Particular Business Category Flag |
|---|---|---|---|---|---|---|
| Convenience store | Convenience store M | { ... } | { ... } | S00001 | ON | OFF |
| | Convenience store N | { ... } | { ... } | S00002 | | |
| | ... | ... | ... | ... | | |
| Supermarket | Supermarket P | { ... } | { ... } | S01001 | ON | OFF |
| | Q-mart | { ... } | { ... } | S01002 | | |
| | ... | ... | ... | ... | | |
| Pharmacy | Drug store S | { ... } | { ... } | S02001 | OFF | OFF |
| | T-drug | { ... } | { ... } | S02002 | | |
| | ... | ... | ... | ... | | |
| Bar | Bar X | { ... } | { ... } | S03001 | OFF | ON |
| | Bar Y | { ... } | { ... } | S03002 | | |
| | ... | ... | ... | ... | | |
| Department store | ... | ... | ... | ... | ... | ... |
| ... | ... | ... | ... | ... | ... | ... |

| Condition Category No. | Condition No. | Authentication Skip Condition | Allowability and Disallowability | | | Importance (Priority) | | |
|---|---|---|---|---|---|---|---|---|
| | | | Payment type: displaying terminal code | Payment type: read terminal code | | Payment type: displaying terminal code | Payment type: read terminal code | |
| SP1 (Time) | SP1-1 | Present date and time is within set time after last payment date and time | ○ | ○ | | A | B | |
| | SP1-2 | Present clock time is within a set time zone | ○ | ○ | | C | C | |
| SP2 (Shop and Location) | SP2-1 | Payment or authentication for payment is made in past at payment predeterminate shop | ○ | ○ | | A | A | |
| | SP2-2 | Payment predeterminate shop is set shop | ○ | ○ | | B | B | |
| | SP2-3 | Payment predeterminate shop is shop of first particular business category | ○ | ○ | | B | B | |
| | SP2-4 | Exceeding set time from payment date and time at second particular business category shop | ○ | ○ | | A | A | |
| SP3 (Amount of Money) | SP3-1 | Not exceeding daily upper limit set amount of money | ○ | ○ | | A | B | |
| | SP3-2 | Balance is equal to or smaller than set amount of money (or is smaller than set amount of money) and automatic charging setting is OFF | ○ | ○ | | A | B | |
| | SP3-3 | Within appropriate range for payment frequency or payment amount per a month | × | ○ | | — | C | |
| | SP3-4 | Payment predeterminate amount is equal to or smaller than set amount of money (or is smaller than set amount of money) | × | ○ | | — | A | |
| SP4 (Commodity) | SP4-1 | To-be-purchased commodity is fast-moving-consumer commodity | × | ×(○) | | — | A | |
| | SP4-2 | Purchase record of to-be-purchase product presents | × | ×(○) | | — | A | |
| SP5 (Security) | SP5-1 | Terminal is being locked or payment application is being locked | ○ | ○ | | A | B | |
| SP6 (Authentication Setting) | SP6-1 | Authentication setting at terminal is OFF or authentication setting at payment application is OFF | ○ | ○ | | A | A | |

2853

| Payment data | |
|---|---|
| User ID | U000001 |
| Authentication Password | ******** |
| Payment Application Lock Cancel Password | ******** |
| IMS Points | 500 |
| Balance | JP 25000 YEN |
| Daily Upper Limit Set Amount of Money | JP 10000 YEN |
| Automatic Charging Setting | OFF |
| Payment Record Data | |
| Authentication Skip Condition Setting | User Setting |
| Authentication Skip Condition User Setting Data | |

User Setting or Automatic Setting

FIG. 3J

Authentication skip condition user setting data

| Condition Category No. | Condition No. | Setting Type | Condition Category by Condition Category Setting Flag | Condition by Condition Setting Flag |
|---|---|---|---|---|
| SP1 | SP1-1 | Condition Category by Condition Category | ON | ON |
| | SP1-2 | | | ON |
| SP2 | SP2-1 | Condition by Condition | OFF | ON |
| | SP2-2 | | | OFF |
| | SP2-3 | | | OFF |
| | SP2-4 | | | ON |
| SP3 | SP3-1 | Condition by Condition | OFF | ON |
| | SP3-2 | | | ON |
| | SP3-3 | | | OFF |
| | SP3-4 | | | OFF |
| SP4 | SP4-1 | Condition Category by Condition Category | ON | ON |
| | SP4-2 | | | ON |
| SP5 | SP5-1 | — | — | ON |
| SP6 | SP6-1 | — | — | ON |

| Condition Category No. | Condition No. | Authentication Skip Condition | Allowability and Disallowability | | Importance (Priority) | |
|---|---|---|---|---|---|---|
| | | | Payment type: displaying terminal code | Payment type: read terminal code | Payment type: displaying terminal code | Payment type: read terminal code |
| SP1 (Time) | SP1-1 | Present date and time is within set time after last payment date and time | O | O | A | B |
| | SP1-2 | Present clock time is within a set time zone | O | O | C | C |
| SP2 (Shop and Location) | SP2-1 | Payment or authentication for payment is made in past at payment predeterminate shop | O | O | A | A |
| | SP2-2 | Payment predeterminate shop is set shop | O | O | B | B |
| | SP2-3 | Payment predeterminate shop is shop of first particular business category | O | O | B | B |
| | SP2-4 | Exceeding set time from payment date and time at second particular business category shop | O | O | A | A |
| SP3 (Amount of Money) | SP3-1 | Not exceeding daily upper limit set amount of money | O | O | A | B |
| | SP3-2 | Balance is equal to or smaller than set amount of money (or is smaller than set amount of money) and automatic charging setting is OFF | O | O | A | B |
| | SP3-3 | Within appropriate range for payment frequency or payment amount per a month | x | O | — | C |
| | SP3-4 | Payment predeterminate amount is equal to or smaller than set amount of money (or is smaller than set amount of money) | x | O | — | A |
| SP4 (Commodity) | SP4-1 | To-be-purchased commodity is fast-moving-consumer commodity | O | O | B | A |
| | SP4-2 | Purchase record of to-be-purchase product presents | O | O | B | A |
| SP5 (Security) | SP5-1 | Terminal is being locked or payment application is being locked | O | O | A | B |
| SP6 (Authentication Setting) | SP6-1 | Authentication setting at terminal is OFF or authentication setting at payment application is OFF | O | O | A | A |

1593

Terminal read code management data

| Shop ID | S00001 |
|---------|--------|

| Commodity Kind | Sales Price | Payment page URL | Authentication skip allowance or disallowance |
|----------------|-------------|------------------|------------------------------------------------|
| Boxed Food | JP 500 YEN | https://****** | Allowance |
| Beverage | JP 150 YEN | https://****** | Allowance |
| Gift Commodity | JP 2000 YEN | https://****** | Disallowance |
| ⋮ | ⋮ | ⋮ | ⋮ |

| Condition Category No. | Condition No. | Authentication Skip Condition | Allowability and Disallowability | | Importance (Priority) | |
|---|---|---|---|---|---|---|
| | | | Payment type: displaying terminal code | Payment type: read terminal code | Payment type: displaying terminal code | Payment type: read terminal code |
| SP1 (Time) | SP1-1 | Present date and time is within set time after last payment date and time | O | O | B | B |
| | SP1-2 | Present clock time is within a set time zone | O | O | C | C |
| SP2 (Shop and Location) | SP2-1 | Payment or authentication for payment is made in past at payment predeterminate shop | x | O | — | A |
| | SP2-2 | Payment predeterminate shop is set shop | x | O | — | C |
| | SP2-3 | Payment predeterminate shop is shop of first particular business category | x | O | — | B |
| | SP2-4 | Exceeding set time from payment date and time at second particular business category shop | x | O | — | A |
| | SP2-5 | The position of the payment predeterminate shop and the position of the terminal are not apart | x | O | — | A |
| SP3 (Amount of Money) | SP3-1 | Not exceeding daily upper limit set amount of money | O | O | B | B |
| | SP3-2 | Balance is equal to or smaller than set amount of money (or is smaller than set amount of money) and automatic charging setting is OFF | O | O | B | B |
| | SP3-3 | Within appropriate range for payment frequency or payment amount per a month | x | O | — | C |
| | SP3-4 | Payment predeterminate amount is equal to or smaller than set amount of money (or is smaller than set amount of money) | x | O | — | A |
| SP4 (Commodity) | SP4-1 | To-be-purchased commodity is fast-moving-consumer commodity | x | O | — | A |
| | SP4-2 | Purchase record of to-be-purchase product presents | x | O | — | A |
| SP5 (Security) | SP5-1 | Terminal is being locked or payment application is being locked | x (O) | x (O) | — | A |
| | SP5-2 | The credit score of the user of the terminal is equal to or higher than 80 points | O | O | A | A |
| SP6 (Authentication Setting) | SP6-1 | Authentication setting at terminal is OFF or authentication setting at payment application is OFF | O | O | A | A |

Money Transaction Management Data

| User ID | A. A |
|---|---|

| Balance | JP 25000 YEN |
|---|---|

| IMS Points | 500 |
|---|---|

| Daily Upper Limit Set Amount of Money | JP 10000 YEN |
|---|---|

| Automatic Charging Setting | OFF |
|---|---|

Money Receive Record Data

New ↑ / Old ↓

| Money Transfer Date and Time | Transfer-Destination User ID | Money Transfer Amount |
|---|---|---|
| 2018///: | S0002 | JP 1000 YEN |
| 2018///: | S0004 | JP 1500 YEN |
| ⋮ | ⋮ | ⋮ |

Received Money Record Data

New ↑ / Old ↓

| Money Received Date and Time | Transfer-Originator User ID | Amount of Received Money |
|---|---|---|
| 2018///: | S0015 | JP 800 YEN |
| 2018///: | S0028 | JP 3000 YEN |
| ⋮ | ⋮ | ⋮ |

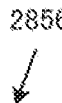

| Condition Category No. | Condition No. | Authentication Skip Condition | Importance (Priority) |
|---|---|---|---|
| SP11 (Time) | SP11-1 | Present Date and Time Within Set Time from Last Money Transfer Date and Time | B |
| | SP11-2 | Present Clock Time Within Set Time Slot | C |
| SP12 (Terminal and Location) | SP12-1 | Position of Own Terminal and Position of Home not apart | A |
| | SP12-2 | Position of Own Terminal Within Money Transfer Safe Area | A |
| | SP12-3 | Position of Own Terminal and Position of Shop Compatible With Payment Application not apart | A |
| | SP12-4 | Position of Own Terminal and Position of Terminal Transmitted Separate Check Inquiry not apart | A |
| SP13 (Amount of Money) | SP13-1 | Not Exceed Daily Upper Limit Set Amount of Money | B |
| | SP13-2 | Balance is Equal to or Smaller than Set Amount of Money (or is Smaller than Set Amount of Money), and, Automatic Charge Setting is OFF | B |
| | SP13-3 | Within Proper Range for Money Transfer Frequency or Money Transfer Amount per a Month | C |
| | SP13-4 | Money Transfer Predeterminate Amount is equal to or Smaller than Set Amount of Money (or is Smaller than Set Amount of Money) | B |
| SP14 (Money Transfer Destination Person) | SP14-1 | Money Transfer Predeterminate Destination Person is Close Friend or Relative | A |
| | SP14-2 | There is Past Money Transfer Record to Money Transfer Predeterminate Destination Person | A |
| | SP14-3 | There is Past Money Receive Record from Money Transfer Predeterminate Destination Person | A |
| SP15 (Security) | SP15-1 | Terminal is being locked, or Payment Application is being locked | B |
| SP16 (Authentication Setting) | SP16-1 | Authentication Setting at Terminal is OFF, or Authentication Setting at Payment Application is OFF | A |
| SP17 (Situation Determination) | SP17-1 | There is Terminal Simultaneously Receiving Separate Check Inquiry, and Authentication is Completed at Terminals that are equal to or greater than a Set Number | B |

| Condition Category No. | Condition No. | Authentication Skip Condition | Importance (Priority) |
|---|---|---|---|
| SP11 (Time) | SP11-1 | Present Date and Time Within Set Time from Last Money Transfer Date and Time | B |
| | SP11-2 | Present Clock Time Within Set Time Slot | C |
| SP12 (Terminal and Location) | SP12-1 | Position of Own Terminal and Position of Home not apart | A |
| | SP12-2 | Position of Own Terminal Within Money Transfer Safe Area | A |
| | SP12-3 | Position of Own Terminal and Position of Shop Compatible With Payment Application not apart | A |
| | SP12-4 | Position of Own Terminal and Position of Terminal Transmitted Separate Check Inquiry not apart | A |
| SP13 (Amount of Money) | SP13-1 | Not Exceed Daily Upper Limit Set Amount of Money | B |
| | SP13-2 | Balance is Equal to or Smaller than Set Amount of Money (or is Smaller than Set Amount of Money), and, Automatic Charge Setting is OFF | B |
| | SP13-3 | Within Proper Range for Money Transfer Frequency or Money Transfer Amount per a Month | C |
| | SP13-4 | Money Transfer Predeterminate Amount is equal to or Smaller than Set Amount of Money (or is Smaller than Set Amount of Money) | B |
| SP14 (Money Transfer Destination Person) | SP14-1 | Money Transfer Predeterminate Destination Person is Close Friend or Relative | A |
| | SP14-2 | There is Past Money Transfer Record to Money Transfer Predeterminate Destination Person | A |
| | SP14-3 | There is Past Money Receive Record from Money Transfer Predeterminate Destination Person | A |
| SP15 (Security) | SP15-1 | Terminal is being locked, or Payment Application is being locked | B |
| | SP15-2 | The credit score of the user of the terminal is equal to or higher than 80 points | A |
| SP16 (Authentication Setting) | SP16-1 | Authentication Setting at Terminal is OFF, or Authentication Setting at Payment Application is OFF | A |
| SP17 (Situation Determination) | SP17-1 | There is Terminal Simultaneously Receiving Separate Check Inquiry, and Authentication is Completed at Terminals that are equal to or greater than a Set Number | B |

GENERATION METHOD, PROGRAM AND INFORMATION PROCESSING DEVICE

CROSS-REFERENCE TO RELATED APPLICATIONS

This application is a continuation of International Application No. PCT/JP2018/047865 filed on Dec. 26, 2018, which claims priority from Japanese Patent Application No. 2018-240337, filed on Dec. 21, 2018, in the Japanese Patent Office, the disclosures of which are incorporated herein by reference in their entireties.

BACKGROUND

1. Field

Apparatuses, methods, and systems consistent with example embodiments relate to a generation method, a program and an information processing device.

2. Description of Related Art

Electronic payment services using a terminal like a mobile phone are becoming popular. In providing electronic payment services, an authentication scheme may be used in which security data that is input to a terminal is authenticated based on security data stored in the terminal in advance. However, this scheme may be inconvenient in some cases for an authentication of the user of the terminal in processing a payment by electronic money or digital money.

SUMMARY

According to an aspect of an example embodiment, there is provided a method performed by an information processing device to generate code information on a payment related to an electronic money at a terminal, the method including: obtaining first information; and generating the code information that includes second information related to an authentication of a user of the terminal based on the first information.

The code information may include third information to be read by a code reader of the terminal.

The third information to be read by the code reader may be different from the second information related to the authentication of the user of the terminal.

The third information may include location information related to a location.

The location information may include shop information related to a shop at which the payment is tendered.

When the shop is a designated shop stored in the information processing device, the code information included the second information related to the authentication of the user may be generated.

The third information which is different from the second information related to the authentication, may include commodity information on a commodity.

The commodity information may include fourth information related to the commodity having a value that is equal to or smaller than a set amount of money.

The commodity may be one of a plurality of commodities, and wherein the commodity information may include cost information related to a total amount of money for the plurality of commodities to be purchased by the user of the terminal by the electronic money.

The third information may include request information to request generation of the second information related to the authentication of the user of the terminal.

The request information may be requested by a server of a shop at which the payment is to be tendered.

The second information related to the authentication of the user of the terminal may include skip information to cause the terminal to skip the authentication of the user of the terminal.

The skip information may include fourth information indicating that the authentication of the user of the terminal is skipped by the terminal based on obtaining the skip information by the terminal.

The second information related to the authentication of the user of the terminal may include fifth information utilized by the terminal to skip the authentication of the user of the terminal.

The second information on the authentication of the user of the terminal may include commodity information related to a commodity to be purchased by the user of the terminal by the electronic money.

The commodity information may include an amount of money for the commodity.

The second information related to the authentication of the user of the terminal may include location information related to a location The location information may include shop information related to a shop at which a commodity is to be purchased.

The information processing device may be the terminal, and the code information may be generated by the terminal.

The second information related to the authentication of the user of the terminal may include authentication confirmation information indicating that the user of the terminal is authenticated by the terminal.

The code information may include third information that is different from the second information related to the authentication of the user of the terminal.

The third information may include sixth information related to the electronic money.

The third information which is different from the second information related to the authentication of the user may include location information related to a location.

The third information which is different from the second information related to the authentication of the user may include commodity information related to a commodity.

The third information which is different from the second information related to the authentication may include setting information on a setting for the terminal or for an application stored in the terminal.

The second information related to the authentication of the user of the terminal may be obtained by a server configured to manage the payment by the electronic money.

The server may be configured to transmit, to the terminal, payment information indicating that the payment is made based on the second information related to the authentication, without transmitting, to the terminal, information related to executing the authentication by the terminal based on the second information.

According to an aspect of another example embodiment, there is provided a non-transitory computer readable storage medium storing program instructions that are executable by a processor of an information processing device to perform a method to generate code information on a payment by an electronic money at a terminal, the method including: obtaining first information; and generating the code information that includes second information related to an authentication of a user of the terminal based on the first information.

According to an aspect of another example embodiment, there is provided an information processing device config- ured to generate code information on a payment by an electronic money at a terminal, the information processing device including: a memory configured to store one or more computer-readable instructions; and a processor configured to: obtain first information; and generate the code informa- tion that includes second information related to an authen- tication of a user of the terminal based on the first informa- tion.

BRIEF DESCRIPTION OF THE DRAWINGS

The above and/or other aspects will be more apparent by describing certain example embodiments, with reference to the accompanying drawings, in which:

FIG. 1 is a diagram illustrating an example structure of a communication system according to an aspect of embodi- ments;

FIG. 3B is a diagram illustrating example information stored in a storage of the server according to the first example embodiment;

FIG. 3C is a diagram illustrating example user registration data according to the first example embodiment;

FIG. 3D is a diagram illustrating example shop registra- tion data according to the first example embodiment;

FIG. 3H is a diagram illustrating example authentication skip condition data according to the first example embodi- ment;

FIG. 3J is a diagram illustrating example authentication skip condition user setting data according to the first example embodiment;

FIG. 3AA is a diagram illustrating an example display screen of the terminal according to the first example embodi- ment;

FIG. 3AB is a diagram illustrating an example display screen of the terminal according to the first example embodi- ment;

FIG. 3AC is a flowchart illustrating example process flows by the terminal, a shop code reader device, and the server according to the first example embodiment;

FIG. 3AD is a flowchart illustrating example process flows by the terminal, the shop code reader device, and the server according to the first example embodiment;

FIG. 3AE is a flowchart illustrating example process flows by the terminal, the shop code reader device, and the server according to the first example embodiment;

FIG. 3AF is a flowchart illustrating example process flows by the terminal, the shop code reader device, and the server according to the first example embodiment;

FIG. 3AG is a flowchart illustrating example flows of a first authentication skip determination process according to the first example embodiment;

FIG. 3AH is a diagram illustrating example authentication skip condition data according to a first modified example;

FIG. 3AI is a flowchart illustrating example process flows by the terminal, the shop code reader device, and the server according to the first modified example;

FIG. 3AJ is a diagram illustrating example data structure of a terminal read code management database according to the first modified example;

FIG. 4C is a diagram illustrating example authentication skip condition data according to the second example embodiment;

FIG. 4D is a flowchart illustrating example process flows by a terminal, a shop code reader device, and the server according to the second example embodiment;

FIG. 4H is a flowchart illustrating example process flows by the terminal, the shop code reader device, and the server according to the second modified example;

FIG. 6E is a diagram illustrating example data structure of a money transaction management database according to the fourth example embodiment;

FIG. 6H is a diagram illustrating an example data structure of an authentication skip condition data according to the fourth example embodiment;

FIG. 6X is a diagram illustrating an example data structure of the authentication skip condition data according to a fourth modified example.

DETAILED DESCRIPTION

Figure 2:
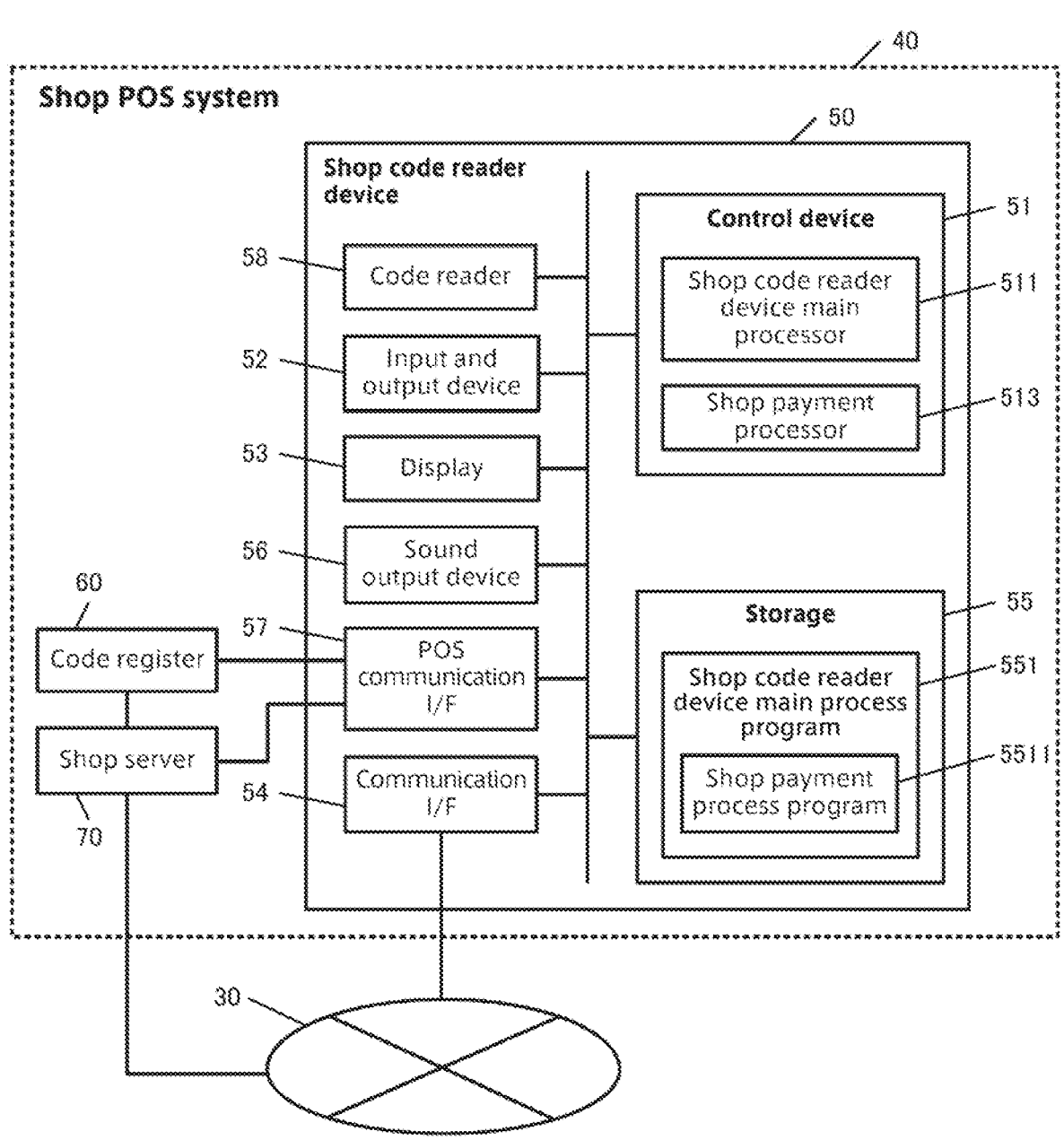
FIG. 2 is a diagram illustrating an example system con- figuration of a shop POS system according to an aspect of the embodiments.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

[System Configuration]

FIG. 1 is a diagram illustrating an example configuration of a communication system 1 according to an example embodiment of the present disclosure.

As illustrated in FIG. 1, the communication system 1 includes a server 10, terminals 20 (a terminal 20A, a terminal 20B, a terminal 20C, and the like), and shop point-of-sale (POS) systems 40 (a shop POS system 40A, a shop POS system 40B, and the like) that are connected to each other via a network 30.

The server 10 provides a service that enables the terminals 20 of respective users to transmit and receive contents including messages, etc., among the terminals 20 via the network 30. Moreover, the server 10 provides a service (referred to as a "payment service" below) for processing an electronic payment (not as a limitation but as an example payment), through communication with the terminal 20. Note that the number of the terminals 20 connected to the network 30 is not limited to a particular number.

The network 30 is configured to connect the one or more terminals 20, the one or more servers 10, and the one or more shop POS systems 40 to each other. The network 30 may be referred to as a communication network that provides, after the above-described various devices establish a connection, communication routes for enabling data to be transmitted and received.

One or a plurality of portions of the network 30 may be a wired network, a wireless network, and the like. The network 30 includes, not as limitations but as examples, an ad hoc network (ad hoc network), an intranet, an extranet, a Virtual Private Network (VPN), a Local Area Network (LAN), a Wireless LAN (Wireless LAN: WLAN), a Wide Area Network (WAN), a Wireless WAN (WWAN), a Metropolitan Area Network (MAN), a part of the Internet, a part of the Public Switched Telephone Network (PSTN), a mobile phone network, an Integrated Service Digital Network (ISDN), a wireless LAN, a Long Term Evolution (LTE), a Code Unit Multiple Access (CDMA), the Bluetooth (registered trademark), a satellite communication, etc., or a combination of equal to or greater than two of those. The network 30 may include the one or more networks 30.

The terminals 20 (the terminal 20A, the terminal 20B, the terminal 20C, and the like) (which are not as a limitation but as an example terminal or information processing device) are not limited to any particular terminals as long as those are information processing terminals that can accomplish the functions to be described in the respective embodiments. Each terminal 20 includes, not as limitations but as examples, a smart phone, a mobile phone (a feature phone), a computer (not as a limitation but as an example, a desktop computer, a laptop computer, or a tablet computer), a media computer platform (not as a limitation but as an example, a cable, a satellite set-top box, or a digital video recorder), a handheld computer device (not as a limitation but as an example, a Personal Digital Assistant (PDA), or an electronic mail client), a wearable terminal (such as a glasses-type device, or a clock type-device), other types of computers, or a communication platform. Moreover, the terminals 20 each may be referred to as an information processing terminal.

Since the basic structures of the terminal 20A, the terminal 20B, and the terminal 20C are common, the terminal 20 will be described in the following description. Moreover, in accordance with a necessity, the terminal utilized by a user X will be referred to as a terminal 20X, and user information in a predetermined service and in association with the user X or with the terminal 20X will be referred to as user information X. Note that the user information is information on a user associated with an account that is utilized by the user in a predetermined service. The user information contains information associated with the user, such as, not as a limitation but as an example, a user's name, a user's icon image, a user's age, a user's gender, a user's address, a user's interest, and a user's identifier which are input by the user or are given by a predetermined service, and may be one of those pieces of information, or a combination thereof.

The server 10 (not as a limitation but an example server, information processing device, and information managing device) is provided with the function that provides a predetermined service to the terminal 20. The server 10 is not limited to any particular device as long as it is an information processing device that may accomplish the functions described in the respective embodiments. The servers 10 is, not as limitations but as examples, a server device, a computer (not as a limitation but as an example, a desktop computer, a laptop computer, or a tablet computer), a media computer platform (not as a limitation but as an example, a cable, a satellite set-top box, or a digital video recorder), a handheld computer device (not as a limitation but as an example, a PDA or an electronic mail client), other types of computers, or a communication platform. Moreover, the server 10 may be referred to as an information processing device. When it is unnecessary to distinguish the server 10 from the terminal 20, the server 10 and the terminal 20 may be respectively referred to as information processing devices.

In the following embodiments to be described below, the server 10 will be described as having a function of providing a messaging service (Instant Messaging Service (IMS)), and a function of providing a payment service.

Note that a server that has the function of providing the IMS and a server that has the function of providing the payment service may be separated from each other, and the two servers that are the IMS server and the payment server may be individually constructed.

Furthermore, not as a limitation but as an example, a business operator that operates the server 10 will be referred to as a company (e.g., a company "X"), and shops (affiliated shops) that cooperate with the business operator of the IMS will be referred to as the "shop 1", the "shop 2", and the like.

The shop POS system 40 is a POS system which is installed at and is utilized by the shop that cooperates with the business operator of the IMS.

The shop POS system 40 includes, not as limitations but as examples, a shop code reader device 50, a code register 60, and a shop server 70, as shown in FIG. 2.

[Hardware (HW) Configuration of Each Device]

The HW configuration of each device in the communication system 1 will be described.

(1) HW Configuration of Terminal

FIG. 1 illustrates an example HW configuration of the terminal 20.

The terminal 20 includes a control device 21 (e.g., a Central Processing Unit (CPU)), a storage 28, a communication interface (I/F) 22, an input and output device 23, a display 24, a microphone 25, a speaker 26, a camera 27, a clock device 29A, and a position calculation information detection device 29B. Each HW component of the terminal 20 is, not as a limitation but as an example, connected with each other via a bus B. Note that it is not always necessary to include all the components as the HW configuration of the terminal 20. Not as a limitation but as an example, the terminal 20 may employ a structure such that individual components, such as the microphone 25, and camera 27, or the plurality of components, are removable.

The communication I/F 22 transmits and receives various kinds of data via the network 30. The communication may be accomplished by either wired or wireless scheme, and any communication protocols are applicable as long as mutual communication is accomplished. The communication I/F 22 may communicate with various devices like the server 10 via the network 30. The communication I/F 22 transmits various kinds of data to the various devices like the server 10 in accordance with the commands from the control device 21. Moreover, the communication I/F 22 receives various kinds of data transmitted from the various devices like the server 10, and transmits such data to the control device 21. Furthermore, the communication I/F 22 may be also referred to as a communication interface. Still further, when the communication I/F 22 is formed by a physical circuit, it may be referred to as a communication circuit.

The input and output device 23 includes a device to input various operations to the terminal 20, and a device to output the process results processed by the terminal 20. The input and output device 23 may have the integrated input device and output device, or the separated input device and output device.

The input device is accomplished by any of all kinds of devices which receive user's input, and which transmit information on the input operation to the control device 21, or by a combination thereof. The input device is, not as limitations but as examples, hardware keys, such as a touch panel, a touch display, and a keyboard, a pointing device like a mouse, a camera (for an operation input through a motion image), and a microphone (for an operation input by voice).

The output device is accomplished by any of all kinds of devices that can output the process results processed by the control device 21, or by a combination thereof. The output device includes, not as limitations but as examples, a touch panel, a touch display, a speaker (for audio output), a lens (not as limitations but as examples, for three-dimensional (3D) output and hologram output), and a printer, etc.

The display 24 is accomplished by any of all kinds of devices capable of displaying in accordance with display data written in a frame buffer, or by a combination thereof. The displays 24 is, not as limitations but as examples, a touch panel, a touch display, a monitor (not as a limitation but as an example, a liquid crystal display or an Organic ElectroLuminescence Display (OELD)), a head mounted display (HDM), and a device capable of displaying an image or text information on a screen, or displaying a hologram image in the air, etc. Note that such a display 24 may be able to display 3D display data.

When the input and output device 23 is a touch panel, the input and output device 23 and the display 24 may be placed so as to face with each other at substantially the same size and shape.

The clock device 29A is an internal clock of the terminal 20, and outputs time information (timekeeping information). The dock device 29A includes, not as a limitation but as an example, a clock that utilizes a crystal oscillator, or a clock that utilizes a Network identity and Time Zone (NITZ) standard, etc. The clock device 29A may be referred to as, not as a limitation but as an example, a timekeeping device or a clock time information detection device.

The position calculation information detection device 29B is a functional unit that detects (measures) information ("position calculation information" below) necessary for the control device 21 to calculate (measure) the location of the own terminal 20. The position calculation information detection device 29B may be also referred to as, not as a limitation but as an example, a position calculating sensor unit.

The position calculation information detection device 29B includes, not as a limitation but as an example, a sensor or a unit of satellite positioning sensors (a satellite positioning unit) that calculates the position of the terminal 20 utilizing a global positioning system like a Global Positioning System (GPS), and a sensor or a unit of inertial measurement sensors (an Inertial Measurement Unit (IMU))) that calculates the position of the terminal 20 utilizing an inertial navigation system, etc.

The satellite positioning unit includes, not as limitations but as examples, a radio frequency (RF) receiving circuit that converts an RF signal containing a satellite positioning signal output by a positioning satellite and received from an unillustrated antenna into a digital signal, and a baseband process circuit which executes correlation arithmetic processing on the digital signal output by the RF receiving circuit to obtain the positioning satellite signal, and which outputs, as the position calculation information, information, such as satellite track data and time data taken out from the positioning satellite signal, etc.

The inertial measurement unit includes an inertial sensor that detects necessary information to calculate the position of the terminal 20 by inertial navigation arithmetic processing. The inertial sensor includes, not as limitations but as examples, 3-axis acceleration sensors and 3-axis gyroscope sensors, and outputs, as the position calculation information, the acceleration detected by the acceleration sensors and the angular velocity detected by the gyroscope sensors.

The control device 21 includes a physical circuit structured so as to execute the function accomplished by a code or a command contained in a program, and is accomplished by, not as a limitation but as an example, a data processing device built in hardware. Hence, the control device 21 may be referred to as a control circuit.

The control device 21 is, not as limitations but as examples, a Central Processing Unit (CPU), a micro-processor (microprocessor), a processor-core (processor core), a multi-processor (multiprocessor), an Application-Specific Integrated Circuit (ASIC), or a Field Programmable Gate Array (FPGA).

The storage 28 may store various programs and various pieces of data necessary for the terminal 20 to operate. The storage 28 includes, not as limitations but as examples, various kinds of storage media, such as a hard disk drive (HDD), a solid-state drive (SSD), a flash memory, a Random Access Memory (RAM), and a Read-Only Memory (ROM). Moreover, the storage 28 may be referred to as a memory.

The terminal 20 stores a program P in the storage 28, and executes the program P to cause the control device 21 to execute processes as each component in the control device 21. That is, the program P stored in the storage 28 causes the terminal 20 to accomplish the respective functions executed by the control device 21. Note that the program P may be referred to as a program module.

The microphone 25 is utilized for inputting voice data. The speaker 26 is utilized for outputting the voice data. The camera 27 is utilized for obtaining motion image data.

(2) HW Configuration of Server

FIG. 1 illustrates an example HW configuration of the server 10.

The server 10 includes a control device 11 (e.g., a CPU), a storage 15, a communication interface (I/F) 14, an input and output device 12, a display 13, and a clock device 19. Each HW component of the server 10 is, not as a limitation but as an example, connected with each other via a bus B. Note that, regarding the HW of the server 10, it is not always necessary to include all the components as the HW configuration of the server 10. Not as a limitation but an example, regarding the HW of the server 10, a structure in which the display 13 is removable may be employed.

The control device 11 includes a physical circuit configured so as to execute the function accomplished by the code or command in the program, and is accomplished by, not as a limitation but as an example, a data processing device built in hardware.

The control device 11 is typically a Central Processing Unit (CPU), or may be a microprocessor, a processor core, a multiprocessor, an ASIC, or an FPGA. According to the present disclosure, the control device 11 is not limited to these examples.

The storage 15 may store various programs and various pieces of data necessary for the server 10 to operate. The storage 15 is accomplished by various kinds of storage media, such as an HDD, an SSD, or a flash memory. According to the present disclosure, however, the storage 15 is not limited to these examples. Moreover, the storage 15 may be referred to as a memory.

The communication I/F 14 transmits and receives various kinds of data via the network 30. The communication may be accomplished by either wired or wireless scheme, and any communication protocols are applicable as long as mutual communication is accomplished. The communication I/F 14 may communicate with various devices like the terminals 20 via the network 30. The communication I/F 14 transmits various kinds of data to the various devices like the terminals 20 in accordance with the commands from the control device 11. Moreover, the communication I/F 14 receives various kinds of data transmitted from the various devices like the terminals 20, and transmits such data to the control device 11. Furthermore, the communication I/F 14 may be also referred to as a communication interface. Still further, when the communication I/F 14 is formed by a physical circuit, it may be referred to as a communication circuit.

The input and output device 12 is accomplished by a device to input the various operations to the server 10. The input and output device 12 is accomplished by any of all kinds of devices capable of receiving the user's input, and of transmitting information on the input operation to the control device 11, or by a combination thereof. The input and output device 12 is typically accomplished by a hardware key like a keyboard, and a pointing device like a mouse. Note that the input and output device 12 includes, not as limitations but as examples, a touch panel, a camera (for an operation input through a motion image), and a microphone (for an operation input by voice). According to the present disclosure, however, the input and output device 12 is not limited to these examples.

The display 13 is typically accomplished by a monitor (not as a limitation but as an example, a liquid crystal display or an Organic ElectroLuminescence Display (OELD)). Note that the display 13 may be a head mounted display (HDM), etc. Note that such a display 13 may display 3D display data. According to the present disclosure, the display 13 is not limited to these examples.

The clock device 19 is an internal clock of the server 10, and outputs a clock time information (timekeeping information). The clock device 19 includes, not as a limitation but as an example, a Real Time Clock (RTC), or a system clock, etc., as a hardware dock. The clock device 19 may be referred to as, not as a limitation but as an example, a timekeeping device or a clock time information detection device.

(3) System Configuration of Shop POS

FIG. 2 illustrates an example system configuration of the shop POS system 40.

The shop POS system 40 is a POS system installed at and utilized by the shop cooperating with the business operator (the business operator of the IMS) operating the server 10, and includes, not as limitations but as examples, the shop code reader device 50, the code register 60, and the shop server 70.

The shop code reader device 50 communicates and is connected to the code register 60 and to the shop server 70 via a POS communication I/F 57 (not as a limitation but as an example, a wired communication I/F or a wireless communication I/F within a shop), and reads terminal displayed code to be displayed on the display 24 of the terminal 20 when a payment is made by the code register 60. Next, based on the read terminal displayed code, information on the payment by the terminal 20 (not as a limitation but as an example, payment request information to be described later) is transmitted to the server 10 via a communication I/F 54, and information on the payment result by the server 10 (not as a limitation but as an example, shop payment result information to be described later) is received from the server 10 via the communication I/F 54.

The shop code reader device 50 includes, not as limitations but as examples, a control device 51, an input and output device 52, a display 53, the communication I/F 54, a storage 55, a sound output device 56, the POS communication I/F 57, and a code reader 58.

The code reader 58 is a code reader for reading a two-dimensional code, and in this specification, includes a two-dimensional code reader (e.g., a QR code reader) for reading the terminal displayed code that is the two-dimensional code (e.g., a QR code (registered trademark)) which is displayed on the display 24 of the terminal 20, and which is presented by the user of the terminal 20.

The code register 60 communicates and is connected to, not as a limitation but as an example, the shop code reader device 50 and to the shop server 70 via the POS communication I/F 57, and issues a receipt on which the total amount of money for sold commodities is printed based on the shop payment result information obtained by the shop code reader device 50 from the server 10. The code register 60 is a register configured to be compatible with a payment application, and may be referred to as stationary terminal compatible with the payment application.

The shop server 70 manages, not as limitations but as examples, various information, such as shop information on the own shop, information on the commodities on sale at the own shop, information on a service provided at the own shop, and information on the amount of sales for the sold commodities and for the provided service at the own shop. The shop server 70 is configured to be communicable with the shop code reader device 50 and with the code register 60 via the POS communication I/F 57, and communicable with the external device like the server 10 via the network 30.

It is not always necessary for the shop server 70 to be directly communicable with the shop code reader device 50, and such a server may be configured to communicate with the shop code reader device 50 via the code register 60. For example, the shop payment result information obtained by the shop code reader device 50 from the server 10 may be transmitted to the code register 60, and then transmitted to the shop server 70 from the code register 60.

(4) Others

The server 10 stores the program P in the storage 15, and executes this program P to cause the control device 11 to execute the respective processes as the components of the control device 11. That is, the program P stored in the storage 15 causes the server 10 to accomplish the respective functions to be executed by the control device 11. This program P may be referred to as a program module, or computer readable instructions.

The same is true for the other devices.

A description will be given of a case in which each example embodiment of the present disclosure is accomplished when the CPU of the terminal 20 and/or of the server 10 executes the program P.

The same is true for the other devices.

Note that the control device 21 of the terminal 20 and/or the control device 11 of the server 10 may accomplish the respective processes by not only the CPU including a control circuit, but also a logical circuit (hardware) or a special-purpose circuit formed on an Integrated Circuit (IC) chip, or a Large Scale Integration (LSI), etc. Such circuits may be accomplished by one or a plurality of integrated circuits, and a plurality of processes to be described in the respective example embodiments may be accomplished by a single integrated circuit. Moreover, the LSI may be called as VLSI, a super LSI, and an Ultra LSI, etc., depending on the difference in scale of integration. Hence, the control device 21 may be referred to as a control circuit.

The same is true for the other devices.

Moreover, the program P (not as a limitation but as an example, a software program, a computer program, or a program module) according to each example embodiment of the present disclosure may be provided in a state stored in a computer readable storage medium. The program P can be stored in the storage medium that is a "non-transitory tangible medium". Moreover, the program P may be for accomplishing some of the functions according to each example embodiment of the present disclosure. Furthermore, a so-called diff file (a diff program) may be applied which can accomplish the functions according to each example embodiment of the present disclosure in combination with the program P already stored in the storage medium.

The applicable storage media is one or more semiconductor-based or other Integrated Circuits (not as a limitation but as an example, a Field Programmable Gate Array (FPGA) or an Application Specific Integrated Circuit (ASIC)), a Hard Disk Drive (HDD), a Hybrid Hard Drive (HHD), an optical disc, an Optical Disk Drive (ODD), a magneto-optical disc, a magneto-optical drive, a floppy diskette, a Floppy Disk Drive (FDD), a magnetic tape, a Solid-State Drive (SSD), a RAM drive, a secure digital card or a drive, other arbitrary appropriate storage medium, or an appropriate combination of equal to or two of those examples. In an appropriate case, the storage medium may be volatile, non-volatile, or a combination of volatile and non-volatile forms. Note that the storage medium is not limited to these examples, and any devices or media are applicable but as long as the program P can be stored. Moreover, the storage medium may be referred to as a memory.

The server 10 and/or the terminal 20 reads the program P stored in the storage medium, and executes the program P to accomplish the functions of a plurality of functional units described in each embodiment.

The same is true of the other devices.

Moreover, the program P according to the present disclosure may be provided to the server 10 and/or the terminal 20 via an arbitrary transmission medium (a communication network or broadcast waves, etc.) that can transmit a program. The server 10 and/or the terminal 20 executes the program P downloaded via, not as a limitation but as an example, the Internet to accomplish the functions of the plurality of functional units described in each example embodiment.

The same is true of the other devices.

Moreover, according to each example embodiment of the present disclosure, the program P may be accomplished by electric transmission, such as in the form of data signals superimposed on carrier waves.

At least some of the processes by the server 10 and/or the terminal 20 may be accomplished by cloud computing established by a plurality of computers.

At least some of the processes by the terminal 20 may be executed by the server 10. In this case, at least some of the processes by the respective functional units of the control device 21 of the terminal 20 may be executed by the server 10.

At least some of the processes by the server 10 may be executed by the terminal 20. In this case, at least some of the processes by the respective functional units of the control device 11 of the server 10 may be executed by the terminal 20.

The structure on a determination in the example embodiment of the present disclosure is not essential as far as there is an apparent notation, a predetermined process may be executed when a determination condition is satisfied, or the predetermined process may be executed when the determination condition is not satisfied.

Note that the program according to the present disclosure is implemented using, not as a limitation but as an example, a script language, such as ActionScript or JavaScript (registered trademark), an object-orientation programming language, such as Objective-C or Java (registered trademark), or a markup language like HTML5, etc.

First Example Embodiment

Recently, network services, such as an IMS and a Social Networking Service (SNS), are becoming popular.

The "IMS" is a service which allows messages to be transmitted and received between user's communication devices via the Internet. In this specification, although a term "IMS" that is the abbreviated term for Instant Messaging Service is used, it indicates whole messaging services, and is not limited to the Instant Messaging Service only.

The "SNS" is a service that forms a social network and community over the Internet for the purpose of mainly communications between the users of the communication devices. Note that the IMS may be considered as a form (an aspect) of the SNS. Hence, the IMS and the SNS may be distinguished from each other.

Moreover, in relation to such network services, applications (application software) for an electronic payment are becoming popular, and the cases in which the user of the terminal 20 makes a payment at a shop using the application for an electronic payment are becoming common.

According to the first example embodiment to the third example embodiment, not as a limitation but as an example, an electronic payment is made using a function of an IMS application software (simply referred to as an "IMS application" below) that is an application provided by a business operator, or an IMS payment application software (simply referred to as a "payment application" below) which is an application in conjunction with the IMS application, and is an application for an electronic payment available for the user of the terminal 20. One or more features of the first example embodiment may be combined with one or more features of the second and the third example embodiments, to provide an electronic payment service.

More specifically, according to the first example embodiment to the third example embodiment, when the user of the terminal 20 purchases a commodity at a shop, or receives a service provided by the shop, an electronic payment is made using the payment application. In this case, an authentication for the electronic payment requested for the user is to be skipped at the terminal 20 when a certain condition is satisfied.

In the embodiments to be described below, the term "payment" means an "electronic payment" using the payment application unless otherwise particularly noted.

Moreover, the term "authentication" means an authentication that the user of the terminal 20 for making the payment is a legitimate user unless otherwise particularly noted, and the term "authentication process" means a process of accomplishing such an authentication for the payment.

Furthermore, the term "authentication skip condition" means a condition to skip the above-described authentication process for payment unless otherwise particularly noted, and the term "skip the authentication process" means to process the next command with the process command for the authentication process being ignored, i.e., to omit the authentication process.

Still further, the term "IMS money" is electronic money that is managed by the business operator of the IMS using the server 10 unless otherwise noted, and means electronic money available for the user of the terminal 20 on the payment application.

In this case, the term "electronic money" is payment means which is provided by the business operator (the IMS business operator in the example embodiments to be described below), utilizes information and communication technologies, and is a substitution of cash.

Although it is described below in the modified example, the electronic money according to the present disclosure is not limited to the IMS money, and covers a concept involving the whole payment means available for the user as a substitution of cash.

The details described in the first example embodiment are also applicable to all of the other respective embodiments.

<Functional Structure>

(1) Functional Structure of Server

Figure 3E:
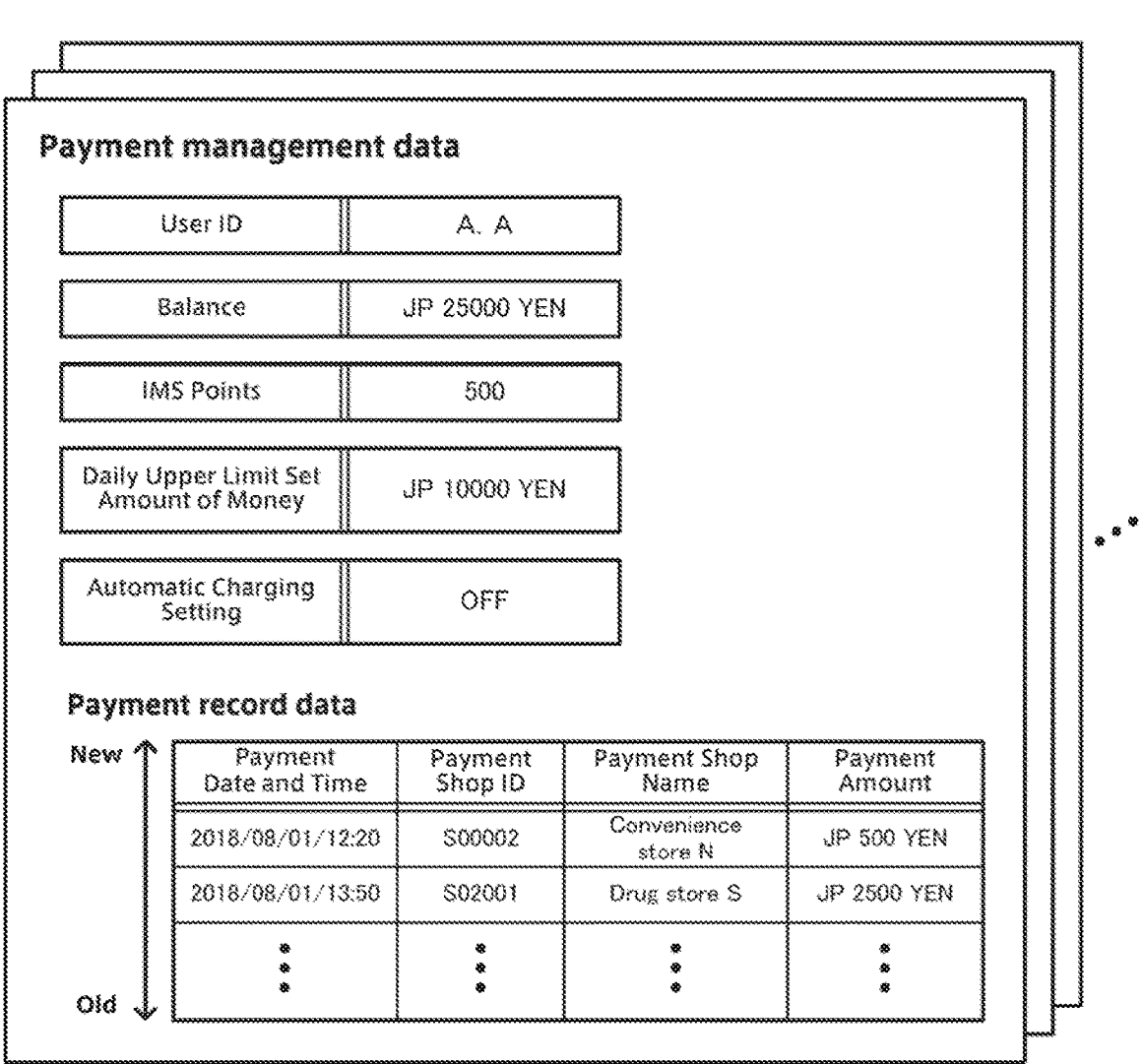
FIG. 3E is a diagram illustrating an example payment management database according to the first example embodiment.
Figure 3F:
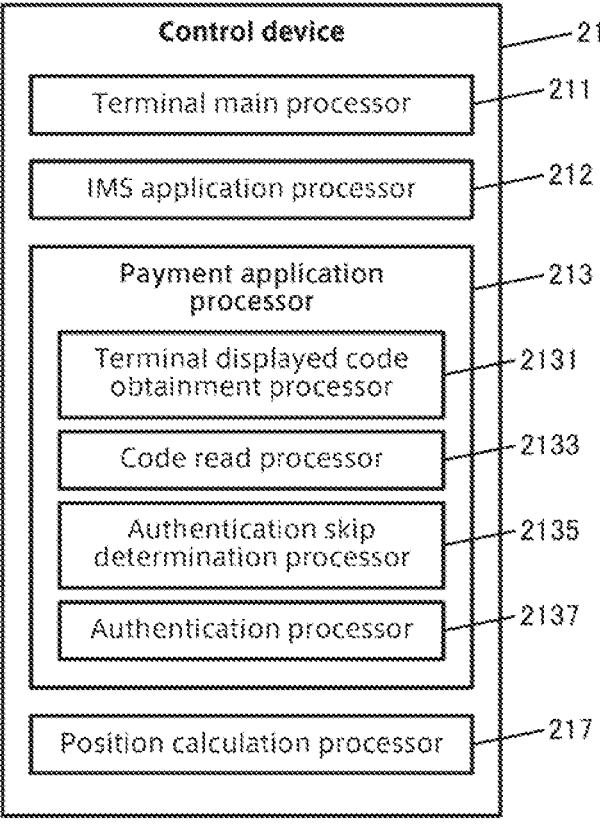
FIG. 3F is a diagram illustrating example functions accomplished by a control device of a terminal according to the first example embodiment.
Figure 3G:
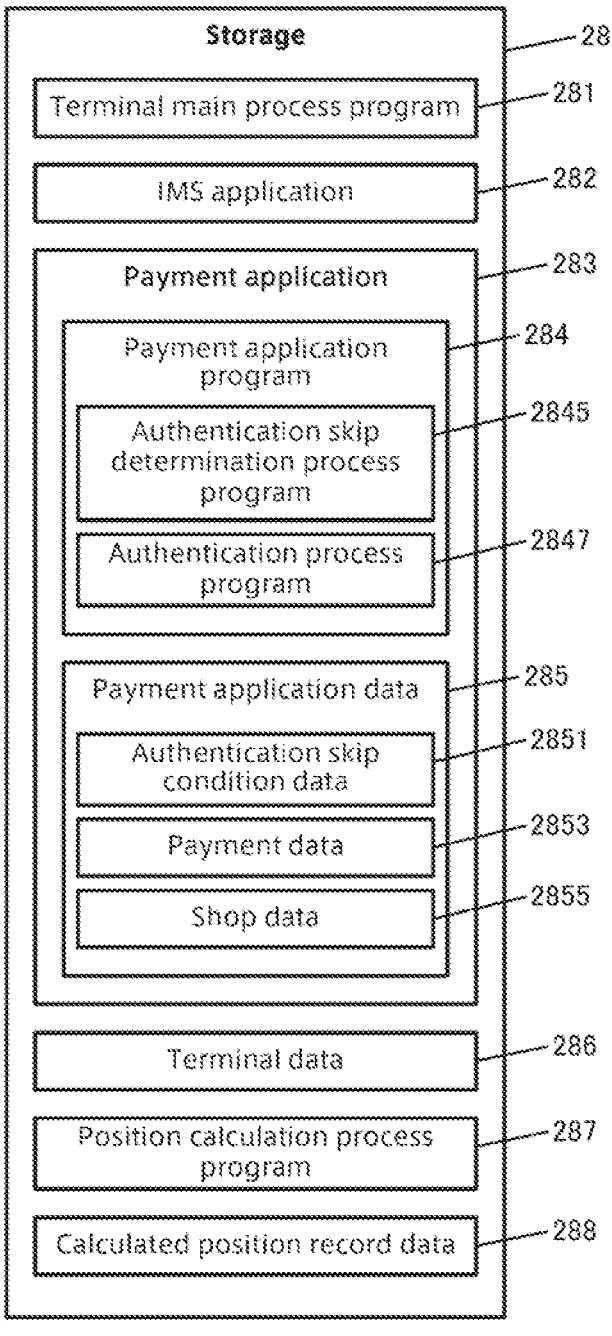
FIG. 3G is a diagram illustrating example information stored in a storage of the terminal according to the first example embodiment.
Figure 3I:
FIG. 3I is a diagram illustrating example terminal user data according to the first example embodiment.
Figure 3K:
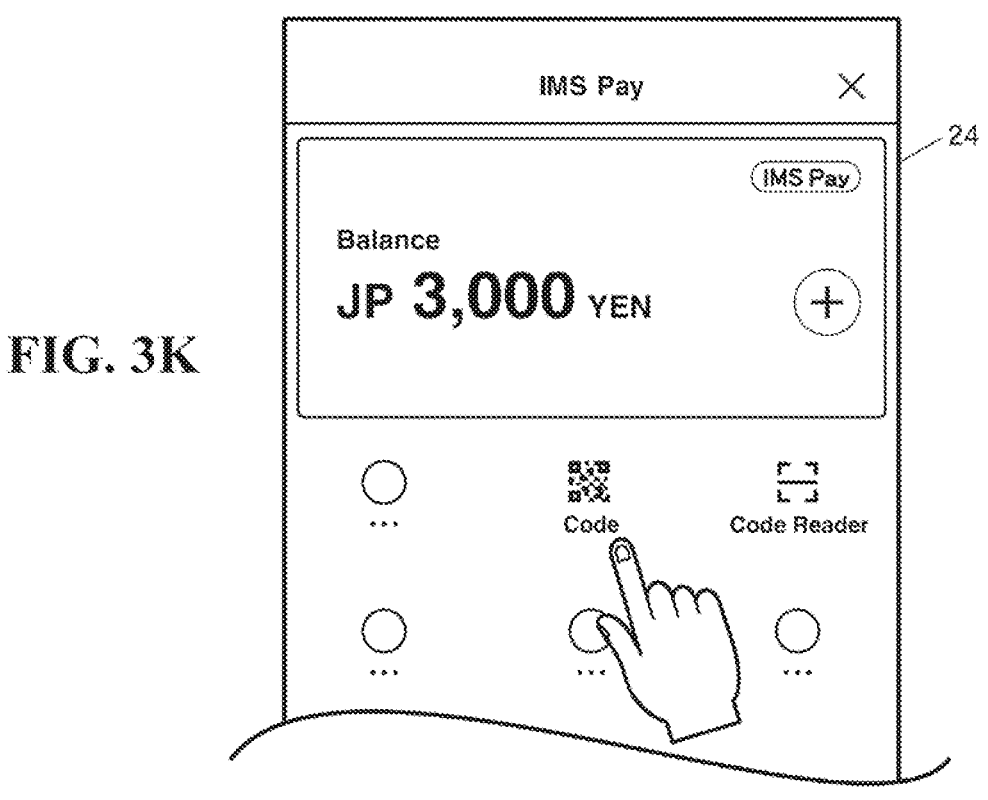
FIG. 3K is a diagram illustrating an example display screen of the terminal according to the first example embodi- ment.
Figure 3L:
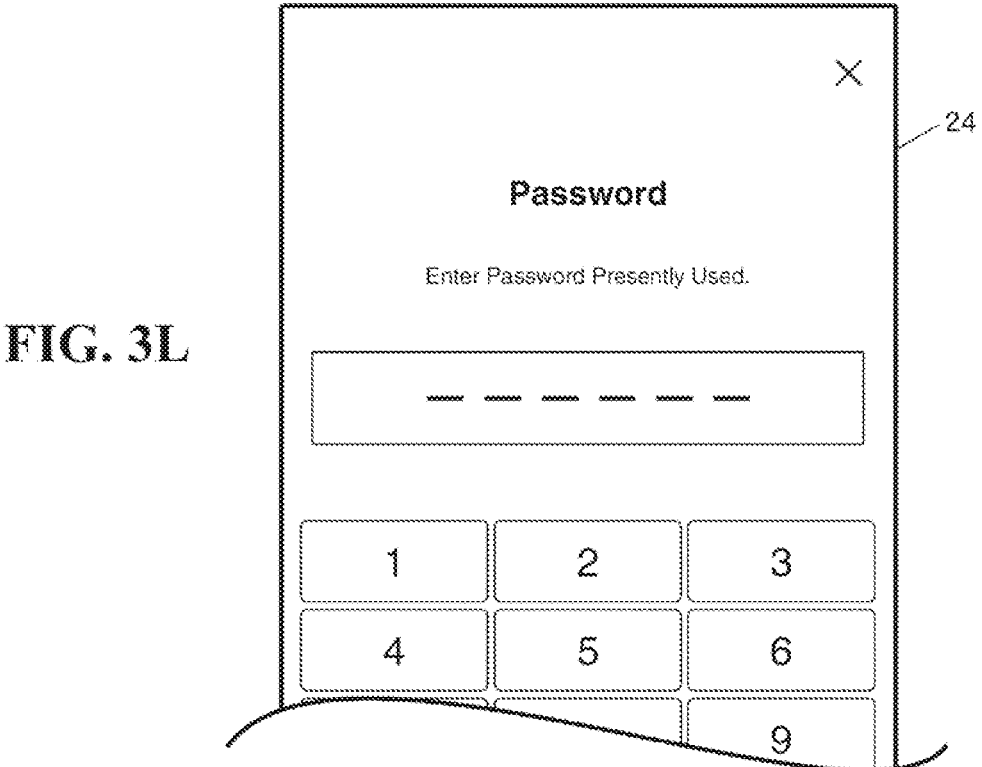
FIG. 3L is a diagram illustrating an example display screen of the terminal according to the first example embodi- ment.
Figure 3M:
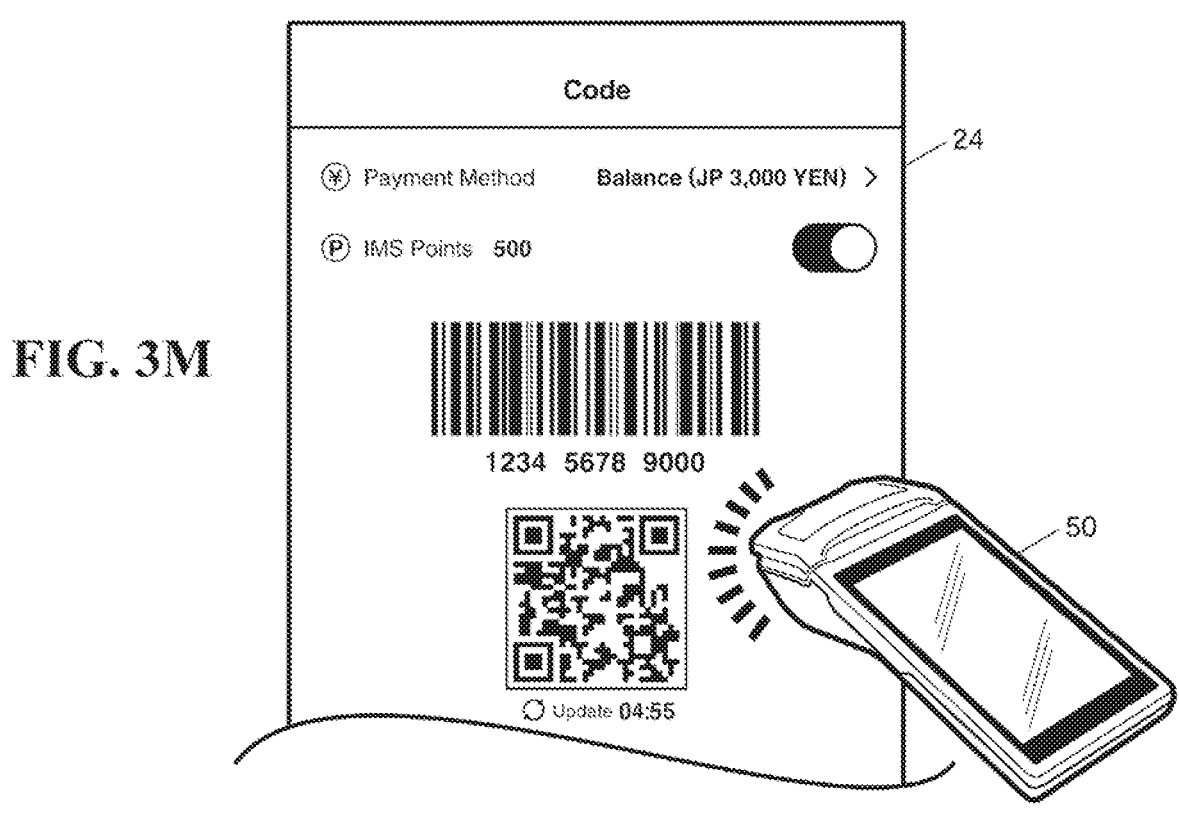
FIG. 3M is a diagram illustrating an example display screen of the terminal according to the first example embodi- ment.
Figure 3N:
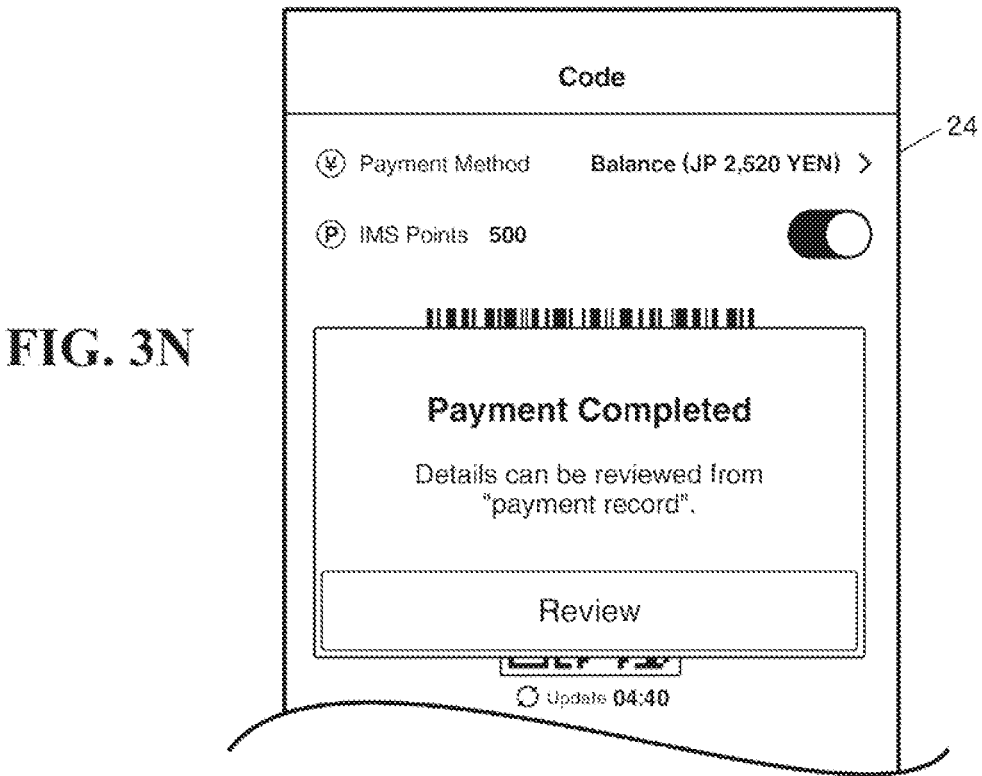
FIG. 3N is a diagram illustrating an example display screen of the terminal according to the first example embodi- ment.
Figure 3O:
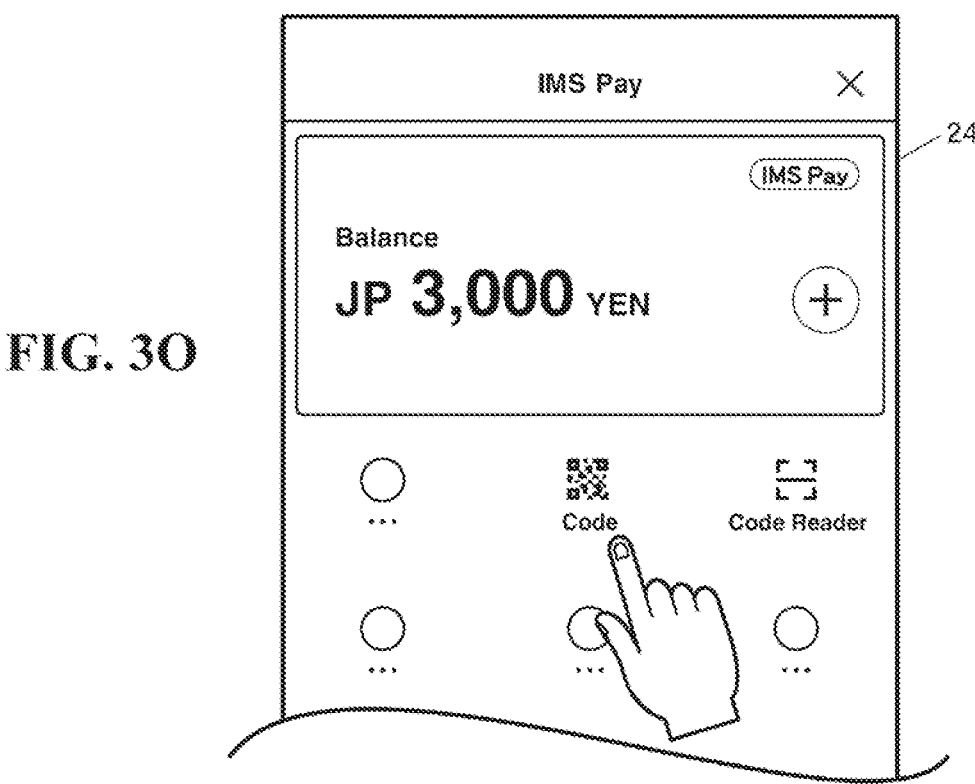
FIG. 3O is a diagram illustrating an example display screen of the terminal according to the first example embodi- ment.
Figure 3P:
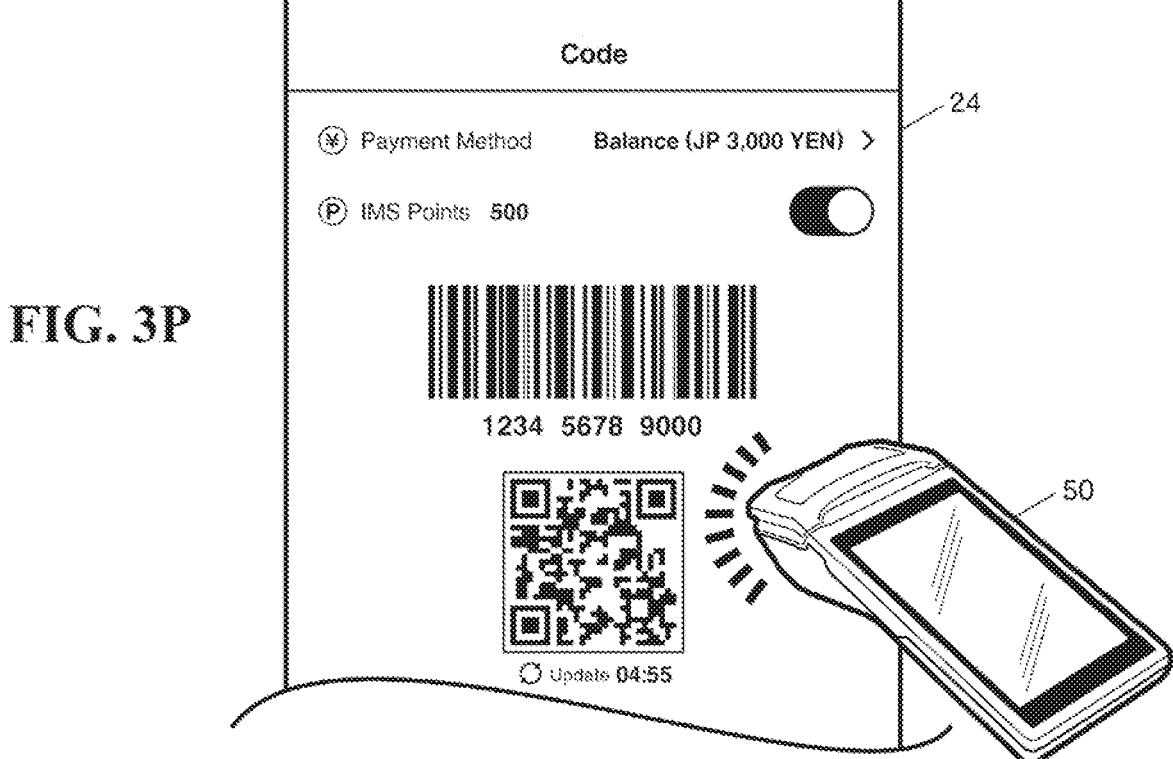
FIG. 3P is a diagram illustrating an example display screen of the terminal according to the first example embodi- ment.
Figure 3Q:
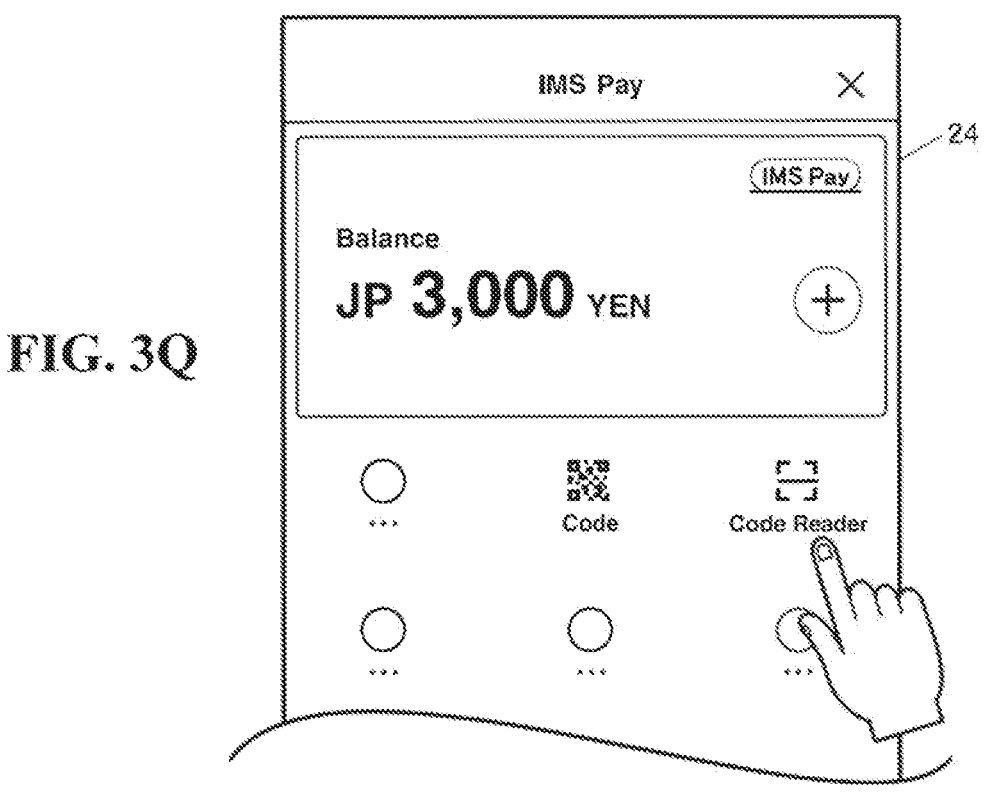
FIG. 3Q is a diagram illustrating an example display screen of the terminal according to the first example embodi- ment.
Figure 3R:
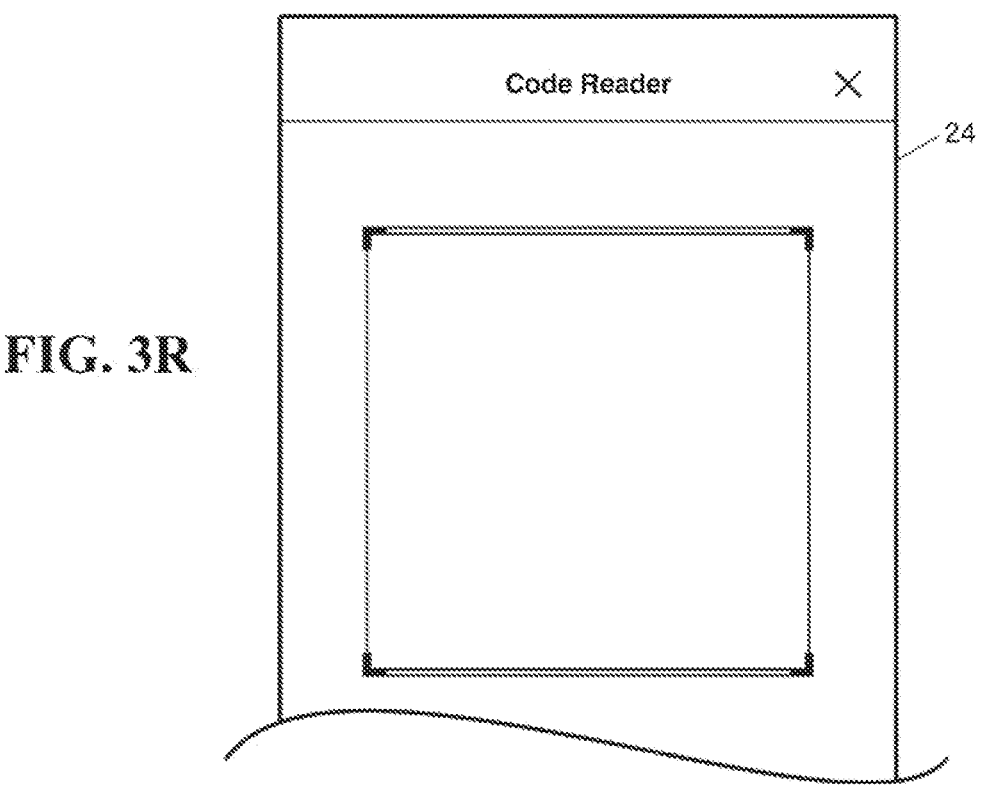
FIG. 3R is a diagram illustrating an example display screen of the terminal according to the first example embodi- ment.
Figure 3S:
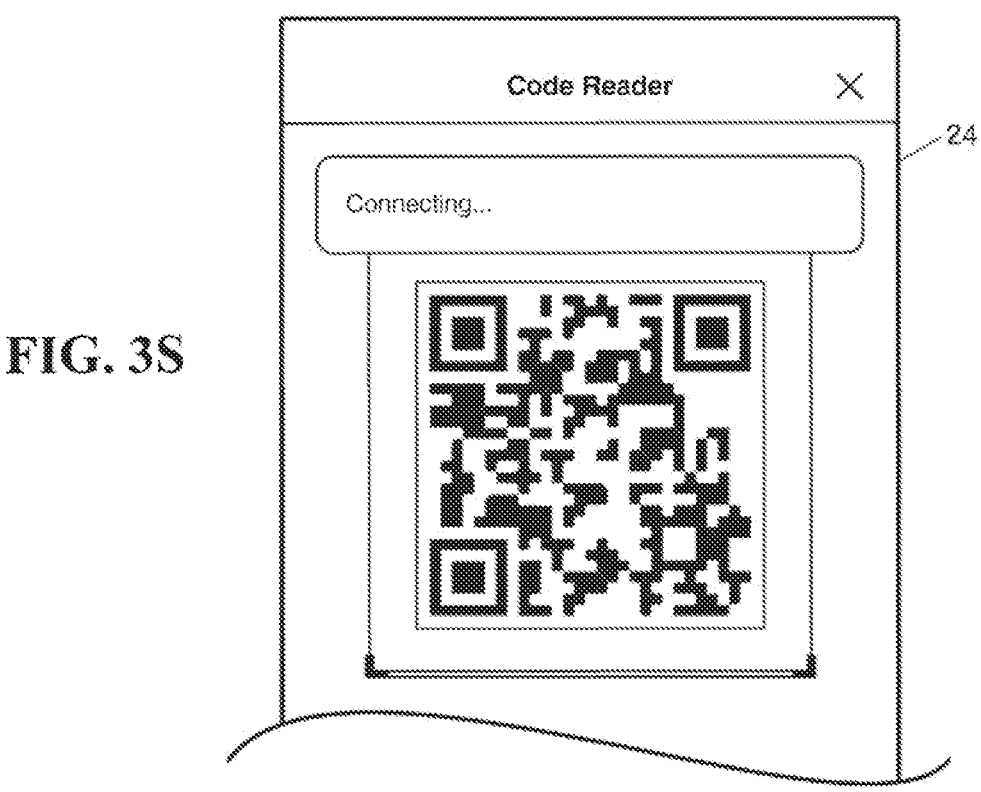
FIG. 3S is a diagram illustrating an example display screen of the terminal according to the first example embodi- ment.
Figure 3T:
FIG. 3T is a diagram illustrating an example display screen of the terminal according to the first example embodi- ment.
Figure 3U:
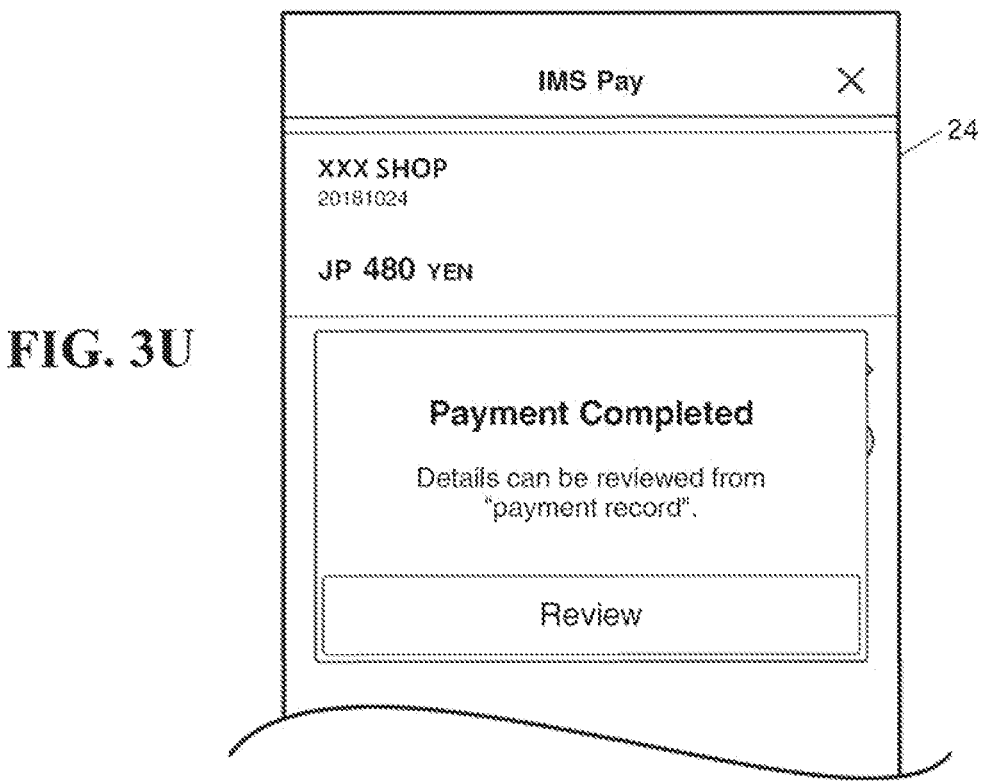
FIG. 3U is a diagram illustrating an example display screen of the terminal according to the first example embodi- ment.
Figure 3V:
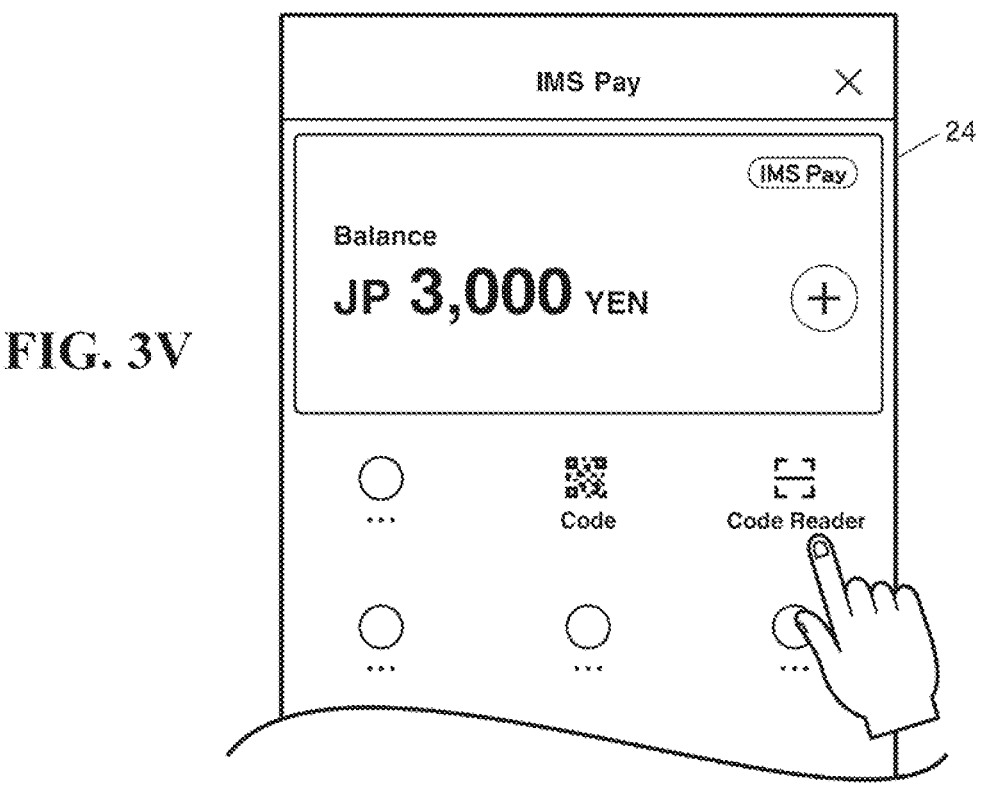
FIG. 3V is a diagram illustrating an example display screen of the terminal according to the first example embodi- ment.
Figure 3W:
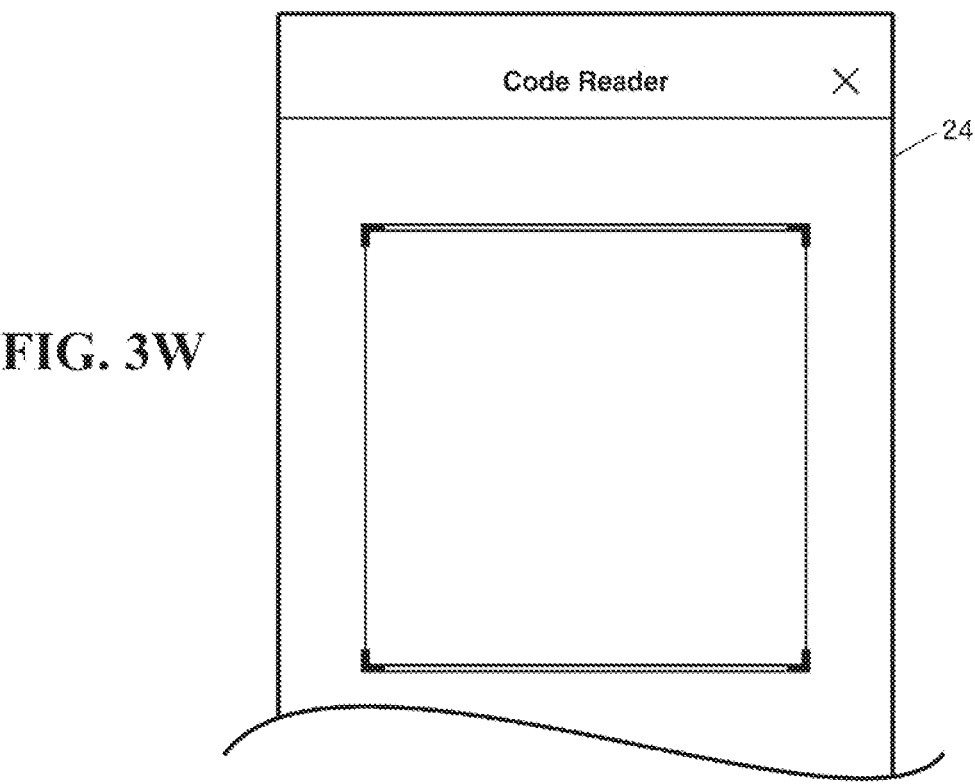
FIG. 3W is a diagram illustrating an example display screen of the terminal according to the first example embodi- ment.
Figure 3X:
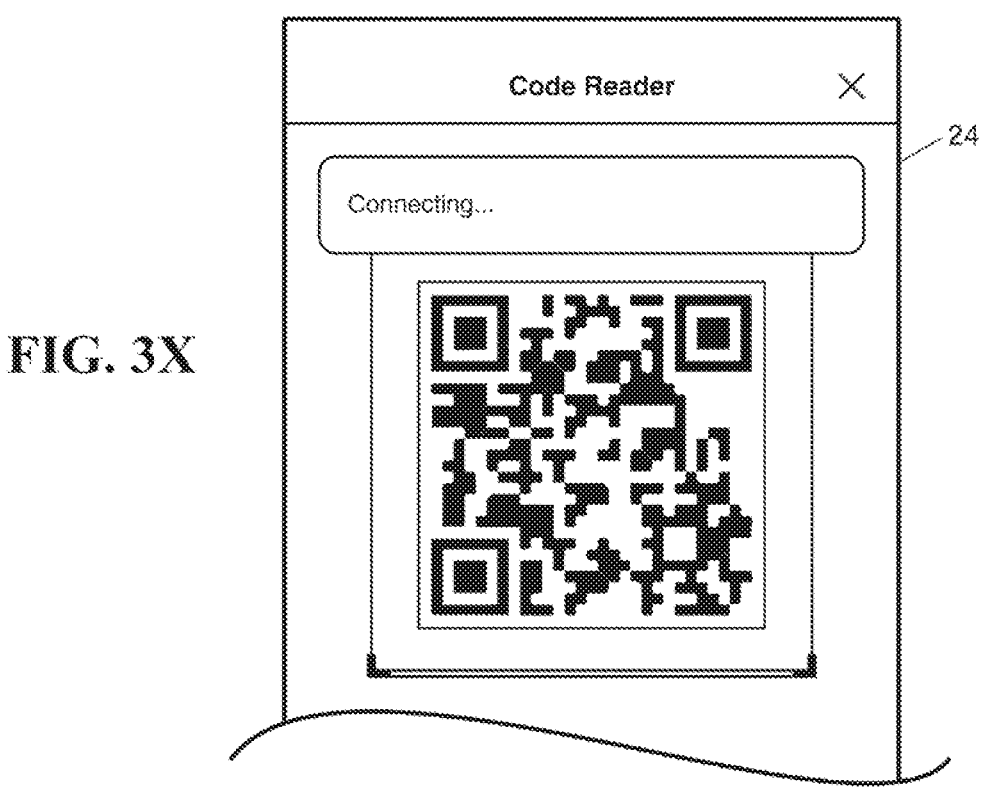
FIG. 3X is a diagram illustrating an example display screen of the terminal according to the first example embodi- ment.
Figure 3Y:
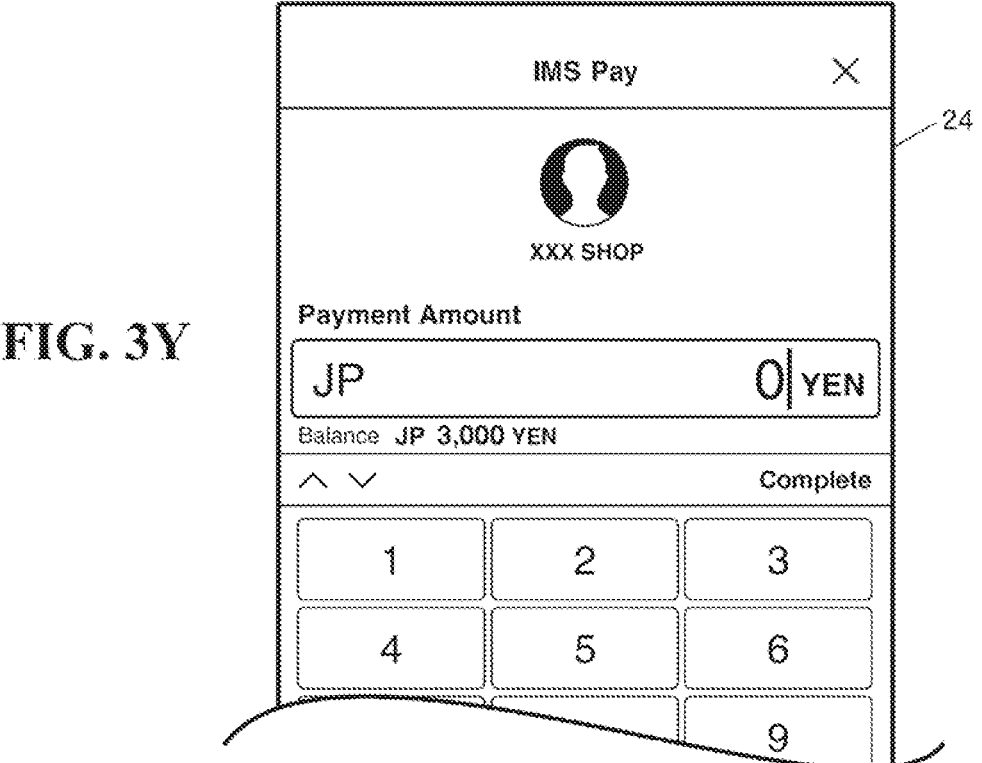
FIG. 3Y is a diagram illustrating an example display screen of the terminal according to the first example embodi- ment.
Figure 3Z:
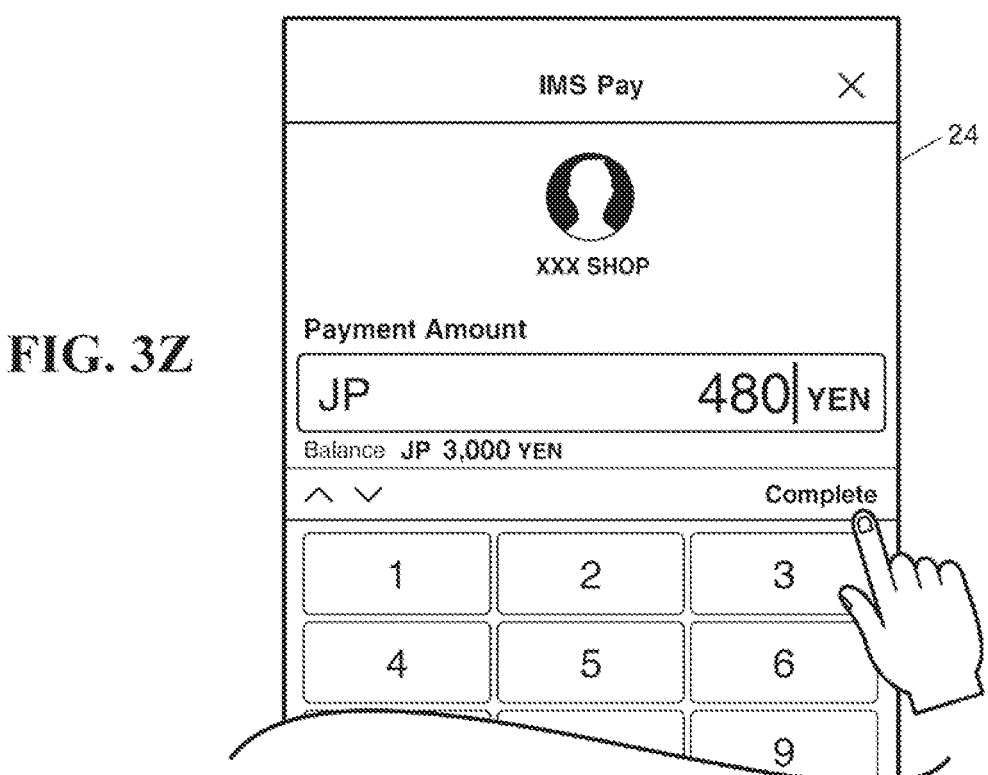
FIG. 3Z is a diagram illustrating an example display screen of the terminal according to the first example embodi- ment.
Figure 3A:
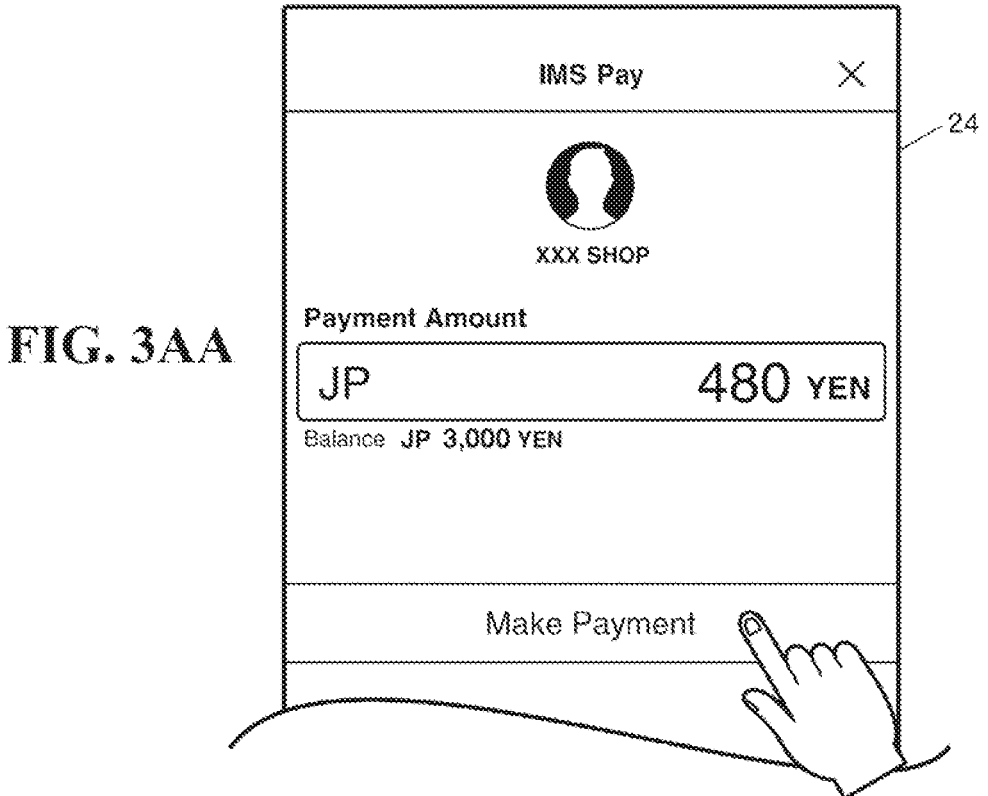
FIG. 3A is a diagram illustrating example functions accomplished by a control device of a server according to a first example embodiment.
Figure 3A:
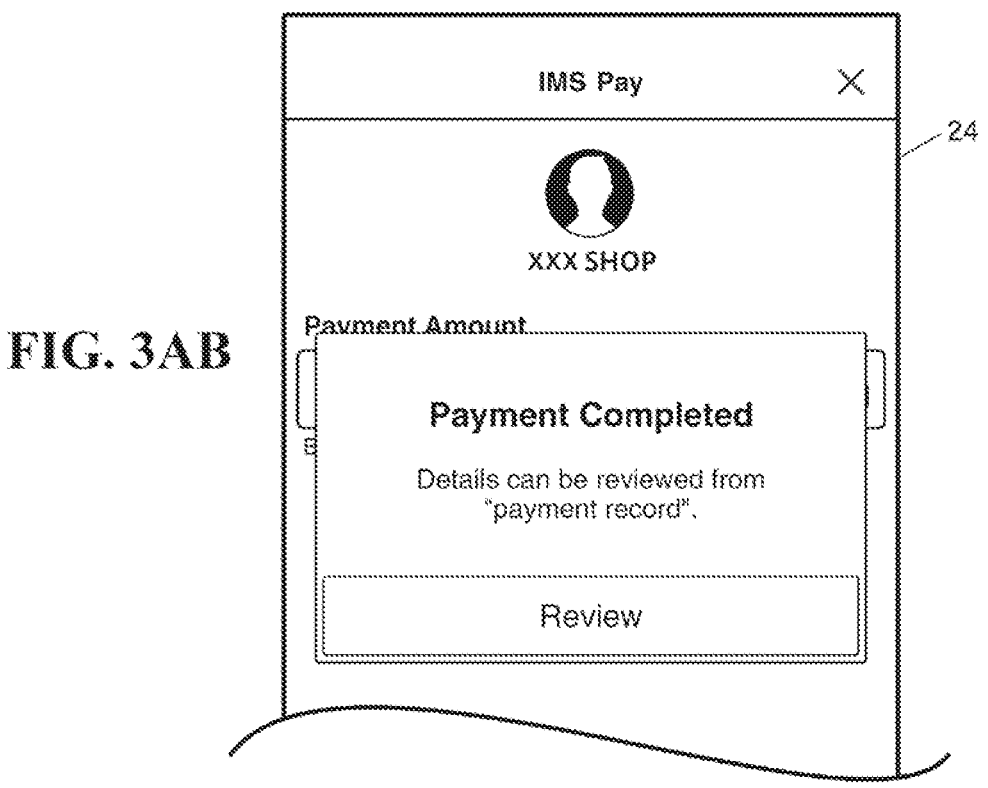
Figure 3A:
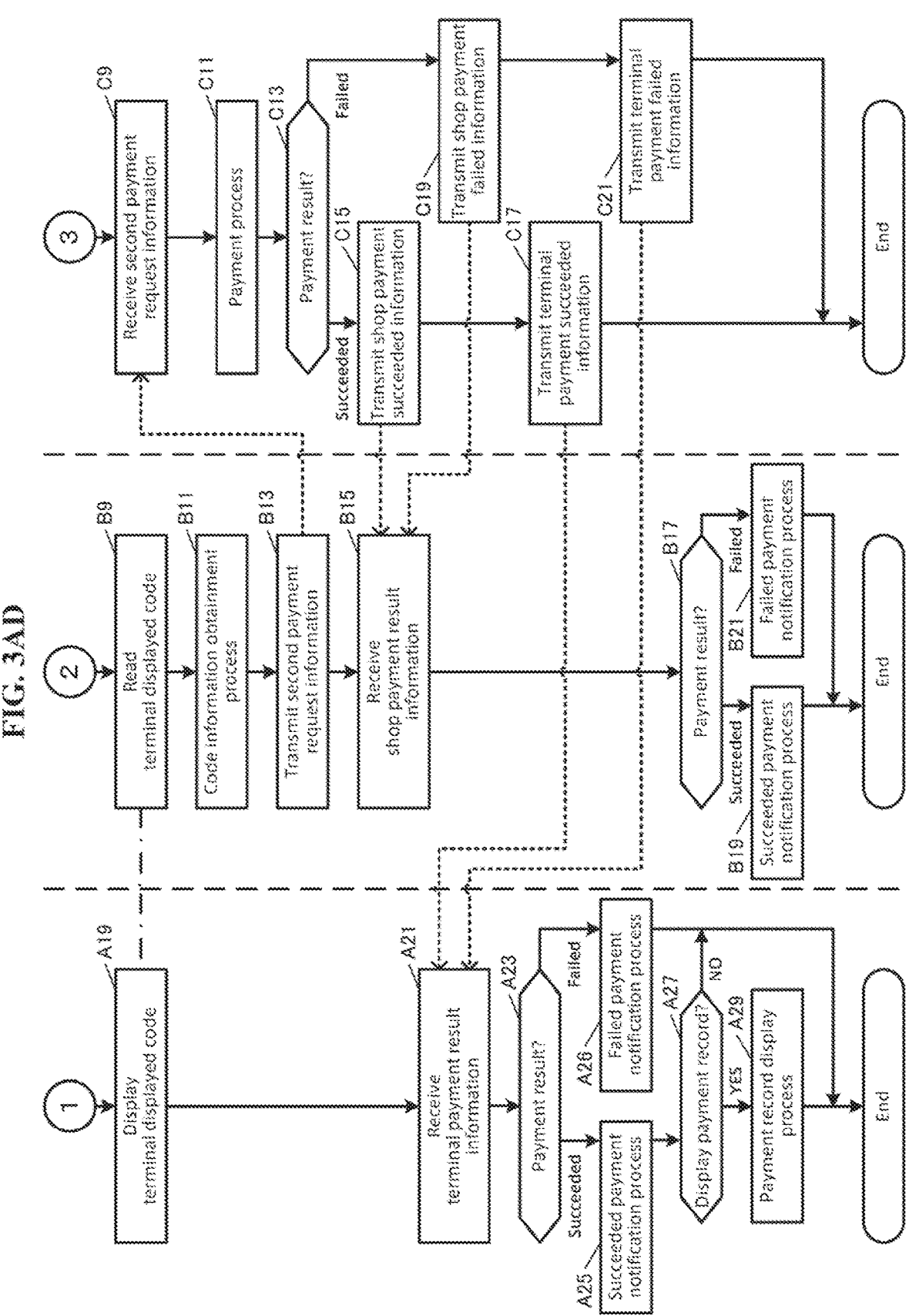
Figure 3A:
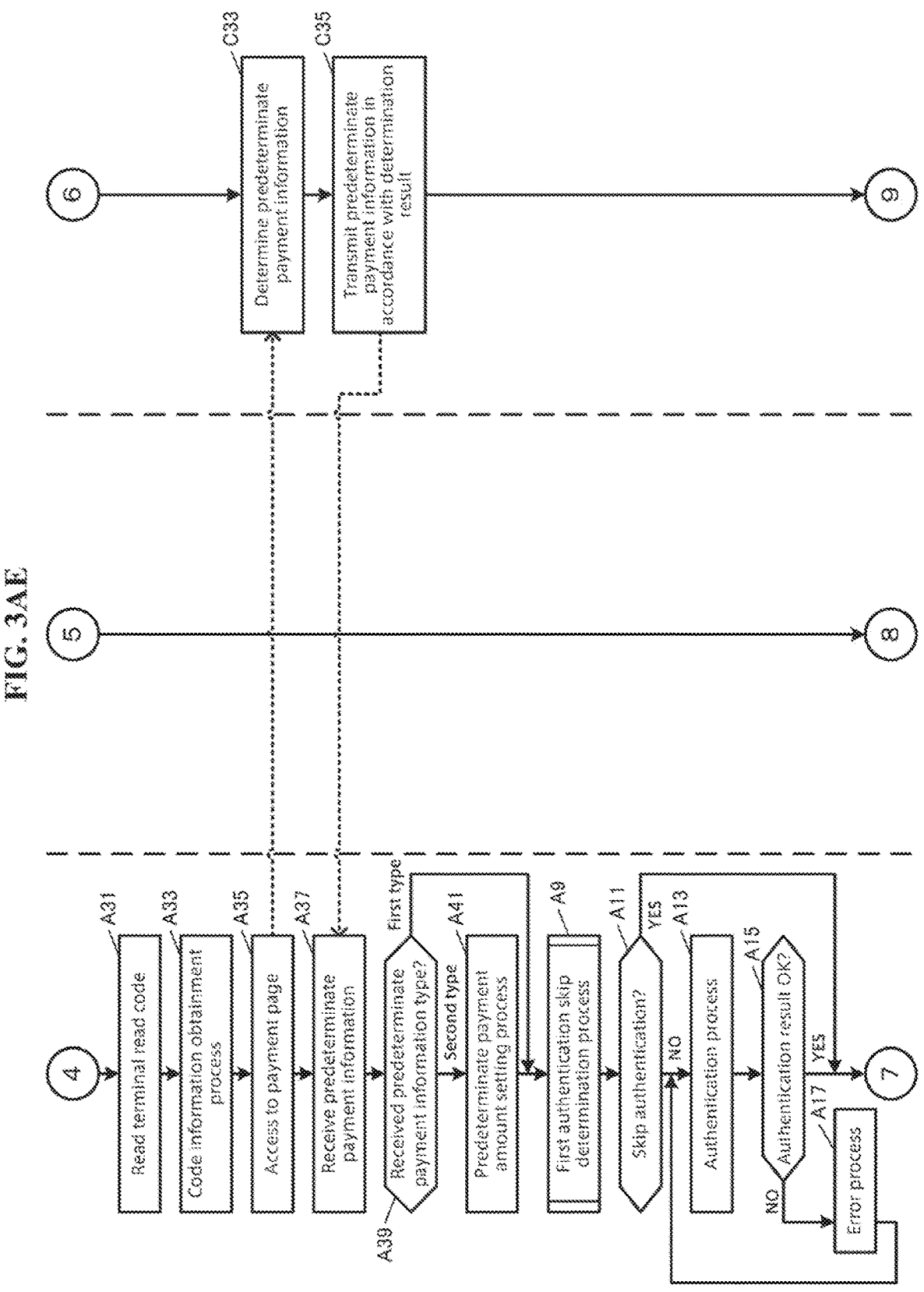
Figure 3A:
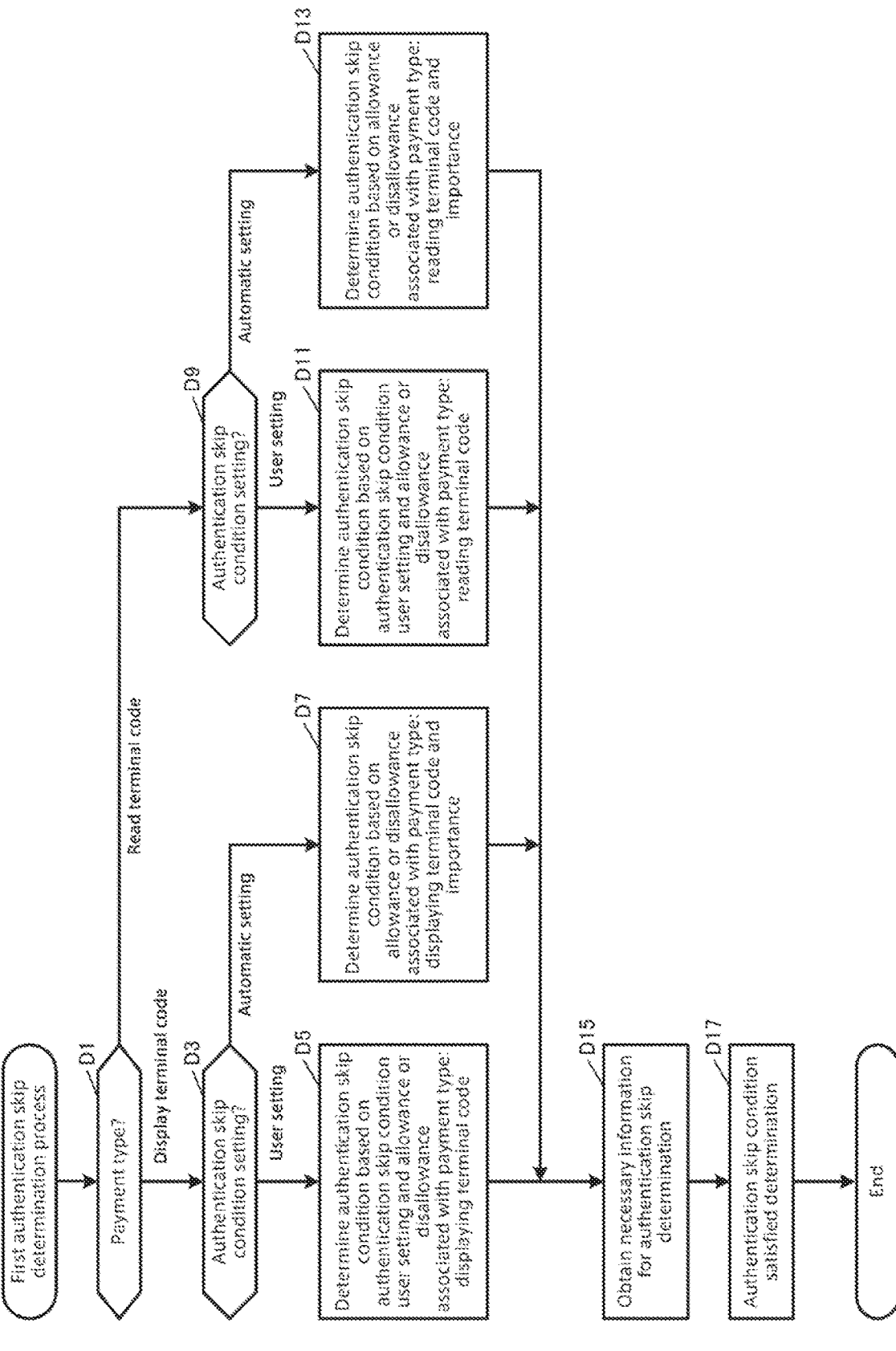
Figure 3A:
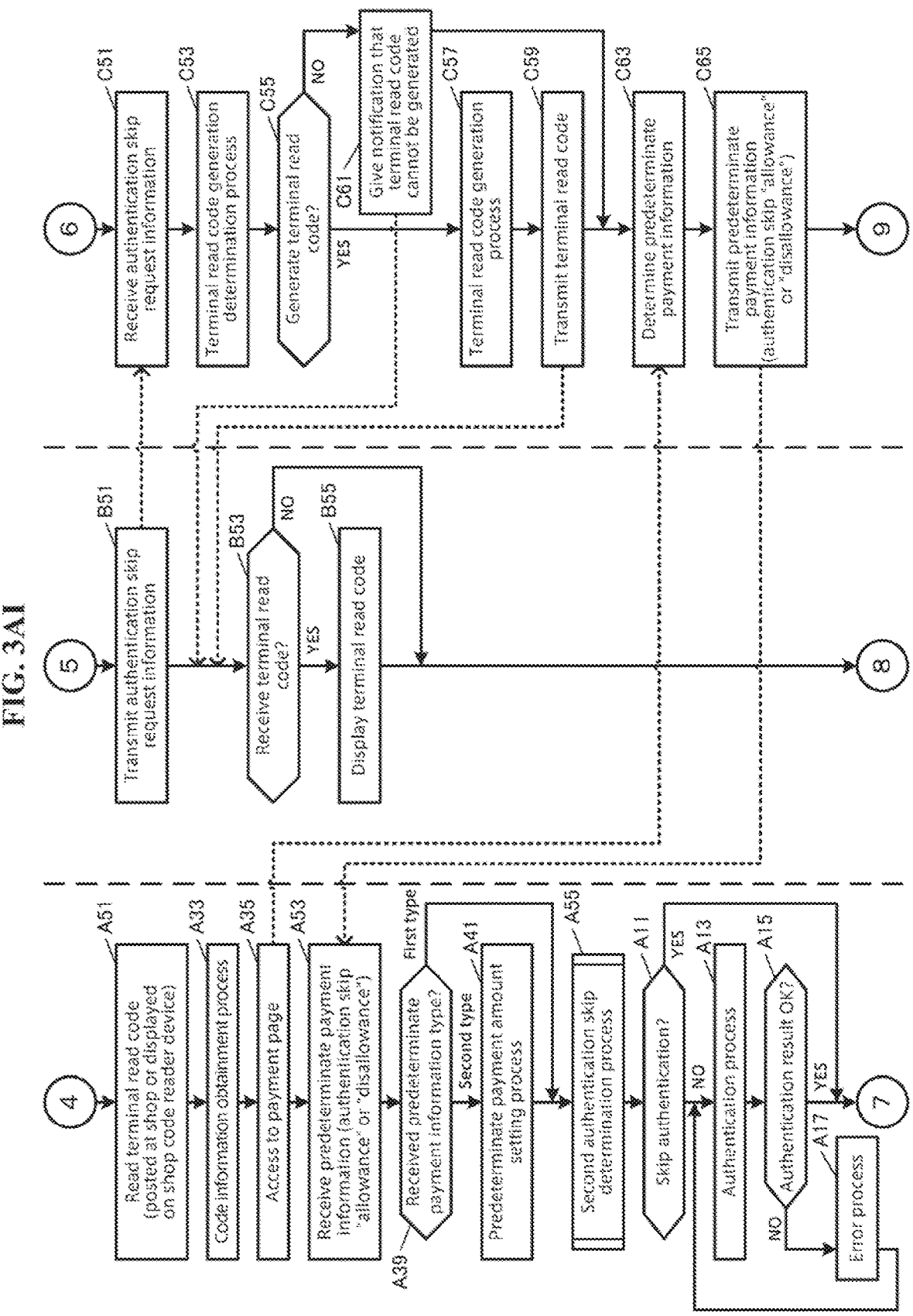
Figure 3A:

FIG. 3A is a diagram illustrating example functions accomplished by the control device 11 of the server 10 according to this example embodiment.

The server 10 includes, as the functions accomplished by the control device 11, a server main processor 111, an IMS processor 112, and a payment management processor 113.

The server main processor 111 may execute a server main process to comprehensively control the server 10 in accordance with a server main process program 151 stored in the storage 15.

The IMS processor 112 may execute an IMS process to accomplish the transmission and reception of contents containing IMS messages, etc., between the terminals 20 in accordance with an IMS process program 1512 stored in the storage 15.

The payment management processor 113 may execute a payment management process to execute and manage the payment by IMS money in accordance with a payment management process program 1513 stored in the storage 15.

According to this example embodiment, a description will be given of a case in which the user of the terminal 20 can make a payment by two payment types that are, not as limitations but as examples, a payment type of "displaying terminal code" and a payment type of "reading terminal code" using the payment application stored in the terminal 20.

The payment type "displaying terminal code" is a payment type of making a payment by, when the user of the terminal 20 makes a payment at a shop, presenting the terminal displayed code displayed on the terminal 20 to a sales staff via the code register 60 using the payment application stored in the terminal 20, and by causing this terminal displayed code to be read by the shop code reader device 50.

The payment type "reading terminal code" is a payment type of making a payment by, when the user of the terminal 20 makes a payment at the shop, reading a terminal read code posted at a site, such as the shop front of the shop, around the code register 60, and a shelf area corresponding to the commodity kind of the commodity on sale at the shop (as easy-understand examples, a boxed food area, a beverage area, and a foodstuff area) using the payment application stored in the terminal 20.

According to this example embodiment, the terminal displayed code and the terminal read code are both represented by a two-dimensional code. The two-dimensional code is a code that has a display scheme of having pieces of information in the horizontal direction and in the perpendicular direction, and examples thereof are a matrix-type code (a "matrix code" below) that has small squares arranged vertically and horizontally, and a stack-type code ("a stack code" below) that has multiple one-dimensional codes (not as a limitation but as an example, a bar code) stacked vertically.

According to this example embodiment, a description will be given of a case in which a quick response (QR) Code (registered trademark) that is an example matrix code used widely is an example terminal displayed code and an example terminal read code for facilitating the understanding to the description.

Note that unlike this example embodiment, as a matrix code other than the QR Code, a service provider (SP) code, a maxi code, a content provider (CP) code, and a chameleon code, etc., may be applied. Moreover, instead of the matrix code, various kinds of stack codes may be applied.

The payment management processor 113 includes functional or hardware units that are, not as limitations but as examples, a terminal displayed code generation processor 1131, a terminal displayed code transmission processor 1133, a shop payment result information transmission processor 1136, and a terminal payment result information transmission processor 1137.

The terminal displayed code generation processor 1131 may create the terminal displayed code. Based on received terminal displayed code generation request information transmitted from the terminal 20, the terminal displayed code generation processor 1131 generates, as the terminal displayed code, at least access information to access a payment page that is one of the webpages provided by the server 10, and the QR code containing authentication information.

The access information contains therein, not as a limitation but as an example, the Uniform Resource Locator (URL) for the shop code reader device 50 which has read the terminal displayed code to access the payment page. This access information can be also referred to as a "link" or "link information". The URL of the payment page will be referred to as a "payment page URL".

The authentication information contains therein, not as a limitation but as an example, as the authentication information necessary for the authentication by the server 10 that the terminal 20 or the user of the terminal 20 is the legitimate terminal 20 or the legitimate user of the terminal 20, a token issued at random by the server 10.

The authentication information is information issued by a certificate authority, and the token is authentication information issued for the authentication to the terminal 20 or to the user of the terminal 20 with the server 10 being as a certificate authority.

The token according to this example embodiment may be also referred to as, for example, a "random token", an "access token", a "payment token," a one-time password, a one-time personal identification number (PIN), a dynamic password. In this example embodiment, since the token is issued at random, the token becomes different every time the terminal displayed code is generated. Hence, the token or the terminal displayed code containing such a token functions as a one-time password.

Moreover, according to this example embodiment, in addition to the two-dimensional code (not as a limitation but as an example, the QR code), the terminal displayed code generation processor 1131 also creates a one-dimensional code (not as a limitation but as an example, a bar code) as the terminal displayed code. This is because depending on the shop, reading of the one-dimensional code is available although reading of the two-dimensional code is unavailable.

Furthermore, in this example embodiment, when creating the terminal displayed code, the terminal displayed code generation processor 1131 transmits this terminal displayed code to the terminal 20 in association with a validated period (e.g., a period of "5 minutes" after the generation of the code). When the terminal displayed code displayed on the terminal 20 within this validated period is read by the shop code reader device 50, the payment is enabled, but when the terminal displayed code is read by the shop code reader device 50 after the validated period has elapsed, re-obtainment of the terminal displayed code becomes necessary. That is, the terminal displayed code in this example embodiment functions as a time-limited code.

Conversely, the terminal read code utilized for the payment type "reading terminal code" contains the access information which is at least the payment page URL for the terminal 20 that has read the terminal read code to access the payment page.

According to this example embodiment, a description will be given of a case in which the terminal read code contains two types of the terminal read code.

The terminal read code of a first type (referred to as a "first type terminal read code" below) is a code utilized by various kinds of and various types of business of shops (e.g., a convenience store in the user's own country), etc. This first type terminal read code may be, as an example utilized form, a code utilized for making a payment for commodities with various commodity kinds to be sold at a certain sales amount of money (a fixed sales amount of money), such as a boxed food, or a beverage.

The first type terminal read code contains, not as a limitation but as an example, a payment page URL which is associated with the shop utilizing the first type terminal read code and which corresponds to the commodity or the commodity kind on sale at the shop.

The server 10 stores and manages, not as a limitation but as an example, for the shop utilizing the first type terminal read code, not as limitation but as an example, the commodity or the commodity kind, the sales amount of money, and the payment page URL in association with the shop ID (not as a limitation but as example shop identification information) of the shop.

The terminal read code of a second type (referred to as a "second type terminal read code" below) is a specific code, and is a code utilized at a particular foreign shop (e.g., a food stall in a foreign country, like China) or an electronic commerce utilizing the Internet, etc. Unlike the first type terminal read code, this second type terminal read code is, as an example utilized form, a code for the case in which the server 10 does not manage the commodity kind and the sales amount of money, but the user of the terminal 20 inputs the amount of money for the commodity to be purchased for making a payment.

The second type terminal read code contains, not as a limitation but as an example, the payment page URL corresponding to the shop which utilizes the second type terminal read code associated therewith.

Regarding the shop that utilizes the second type terminal read code, the server 10 stores and manages, not as a limitation but as an example, the payment page URL in association with the shop ID of such a shop.

In another example, only one code type (e.g., either the first type terminal read code or the second type terminal read code) may be adopted as the terminal read code, rather than using a plurality of different code types (e.g., both the first type terminal read code and the second type terminal read code).

In this case, in the function, the data, and the process, etc., described in this example embodiment, the structure relating to the type of the terminal read code not adopted may be eliminated.

FIG. 3B is a diagram illustrating example information stored in the storage 15 of the server 10 according to this example embodiment.

The storage 15 stores, not as a limitation but as an example, the server main process program 151 which is a program read by the control device 11, and executed by a server main process.

Moreover, the server main process program 151 contains subroutine programs that are the IMS process program 1512 which is read by the control device 11, and which is executed as an IMS process, and the payment management process program 1513 executed as a payment management process.

The payment management process will be described later in detail with reference to a flowchart.

Moreover, the storage 15 stores data that are, not as limitations but as examples, user registration data 153, shop registration data 155, a payment management database 157, and a code management database 159.

The user registration data 153 is the registration data on the terminal 20 utilizing the payment service, and on the user of the terminal 20, and FIG. 3C illustrates an example data structure thereof.

The user registration data 153 stores, not as limitations but as examples, a user name, a terminal phone number, a terminal mail address, a user ID, an authentication password, and other registration information in association with each other.

The user name is the name of the user of the terminal 20 that utilizes the payment service, and the name registered when the user of the terminal 20 utilizes the payment services is stored.

The terminal phone number is the phone number of the terminal 20 of the user with this user name, and the phone number of the terminal 20 registered when the user of the terminal 20 utilizes the payment services is stored.

The terminal mail address is the mail address of the terminal 20 of the user with this user name, and the mail address of the terminal 20 registered when the user of the terminal 20 utilizes the payment services is stored.

The terminal phone number and the terminal mail address are pieces of example identification information (referred to as "terminal identification information" below) to identify the terminal 20.

The user ID is an ID that functions as identification information to identify the user of the terminal 20, and is the ID set uniquely to the user utilizing the payment application. Regarding this user ID, not as a limitation but as an example, the server 10 sets and stores the unique ID for each user.

The user ID is example identification information (referred to as "user identification information" below) to identify the user of the terminal 20.

The authentication password is the password for authentication required for the user to input in the user terminal 20 with this user name when the authentication process for payment (simply referred to as an "authentication process" below) is executed, and the password set by the user is stored.

The other registration information is other registration information on the user with this user name, and contains, not as limitations but as examples, a user icon image that is the image data of an icon utilized by the user in the IMS application, and the user's profile, etc.

Note that the above-described various kinds of user information are stored and managed by the server 10 as the common user information to the IMS application and to the payment application.

The shop registration data 155 is the registration data of the shop that cooperates with the IMS business operator (the business operator of the payment service), and FIG. D illustrates an example data structure.

The shop registration data 155 stores pieces of shop information in association with each other which are a business category, a shop name, shop position information, shop POS system information, a shop ID, a first particular business category flag, and a second particular business category flag.

The business category stores the business category of the shop. This business category includes, not as limitations but as examples, various kinds of business category, such as a "convenience store", a "supermarket", a "pharmacy", a "bar", a "department store", a "restaurant", a "bookshop", and a "clock shop".

The shop name stores, for each business category, the shop name of the shop involved in (belonging to) such a business category.

The shop position information stores the position information on the location of the shop with this shop name (referred to as "shop position information" below). This shop position information may have the location of the shop represented by two-dimensional or three-dimensional positional coordinates, and may have the location of the shop represented by a latitude and a longitude (the latitude, the longitude, and an altitude in some cases).

The shop POS system information stores information on the shop POS system 40 utilized at this shop. The shop POS system information contains, not as a limitation but as an example, information necessary for the server 10 to communicate with the shop code reader device 50 and the shop server 70.

In order to execute the process in conjunction with the server 10, not as a limitation but as an example, the shop POS system 40 may obtain the software package for the payment services provided (distributed) from the server 10 in advance, and store such a package in the shop code reader device 50 and in the shop server 70, and call and run this software package from the program for the payment process at the shop. A typical example is an Application Programming Interface (API), and for example, the shop code reader device 50 launches the API to accomplish the transmission of the information to the server 10, and the reception of the information from the server 10.

Moreover, not as a limitation but as an example, the server 10 receives, from the shop server 70 at the shop, information, such as the business category of the shop, the shop name, the shop position information, and the shop POS system information, etc., and stores such pieces of information in the shop registration data 155.

The shop ID is an ID that functions as identification information to identify the shop with this shop name. Regarding this shop ID, not as a limitation but as an example, the server 10 sets and stores the unique ID for each shop.

The shop ID is example identification information (referred to as "shop identification information" below) to identify the shop.

The first particular business category flag is a flag indicating whether or not this business category is the first type of particular business category (referred to as "first particular business category" below) that is set in advance, is set as "ON" for the business category corresponding to the first particular business category, and is set as "OFF" for the business category that does not correspond to the first particular business category. Not as a limitation but as an example, the first particular business category may be set by the server 10 in advance. In this example, the "convenience store" and the "supermarket" which are the business categories utilized by many users on daily basis are set as the first particular business category.

The second particular business category flag is a flag indicating whether or not this business category is the second type of particular business category (referred to as a "second particular business category" below) that is set in advance, is set as "ON" for the business category corresponding to the second particular business category, and is set as "OFF" for the business category which does not correspond to the second particular business category. Not as a limitation but as an example, the second particular business category may be also set by the server 10 in advance. In this example, the "bar" which is the business category with a high possibility such that the user leaves the terminal 20 is set as the second particular business category.

The payment management database 157 is a database that accumulates and stores data to manage the information on the payment by the user of each terminal 20, and FIG. 3E illustrates an example data structure thereof.

The payment management database 157 stores payment management data generated for each terminal 20 or for each user of the terminal 20.

Each payment management data stores, not as limitations but as examples, the user ID of the user of the terminal 20, a balance, an IMS point, a daily upper limit set amount of money, an automatic charge setting, and payment record data.

The user ID stores the user ID stored in the user registration data 153.

The balance stores the latest value of the balance of the IMS money (remaining amount of money) possessed by the user with this user identification.

The IMS point stores points that can be collected through various IMS services and through the affiliated shop cooperating with the IMS business operator. The IMS point has a value of, not as a limitation but as an example, JP 1 YEN per a point, can be exchanged to a gift certificate, a commodity, etc., and can be converted into cash and utilized for payment in the payment application.

The daily upper limit set amount of money stores the upper limit amount of money which is the amount of money available per a day for the user with this user ID for the payment.

The automatic charge setting is to automatically reload (automatically charge) the IMS money when the balance becomes a small amount of money (e.g., "JP 500 YEN" or "JP 0 YEN"). For example, the automatic charge setting is set as "ON" when the user of the terminal 20 sets the automatic charging, and is set as "OFF" in other cases. The automatic charging may be executed through, not as a limitation but as an example, a bank account, etc., that is registered by the user of the terminal 20.

The payment record data is data of the record of the payment by the user with this user ID, and stores, in association with each other, not as limitations but as examples, a payment date and time at which the payment is made in past by the server 10 for the user with this user ID, the shop ID that is the ID of the shop at which the payment is made in past, a payment shop name that is the name of the shop with this shop ID, and the payment amount of money that is the paid amount of money.

The code management database 159 is a database to manage the terminal displayed code and the terminal read code, and includes a terminal displayed code management database 1591 and a terminal read code management database 1593.

The terminal displayed code management database 1591 is a database to manage the terminal displayed code, and stores data that associates, not as limitations but as examples, the user ID stored in the user registration data 153 with the token contained in the terminal displayed code generated for the terminals 20 of the user identified from this user ID.

Note that instead of the user ID that is the user identification information, or in addition thereto, the terminal displayed code management database 1591 may store the terminal identification information like the terminal phone number stored in the user registration data 153.

The terminal read code management database 1593 is a database to manage the terminal read code, and stores, not as limitations but as examples, data to manage the first type terminal read code, and data to manage the second type terminal read code.

More specifically, regarding the first type terminal read code, data is stored in association with, not as limitations but as examples, the commodity or the commodity kind on sale at the shop, the sales amount of money, and the payment page URL with each other for each shop ID.

Note that according to this example embodiment, since the commodity is to be sold at a uniform sales amount of money (fixed sales amount of money) at the shop that adopts the first type terminal read code, the data may be stored without being associated with the commodity or the commodity kind, but by associating the sales amount of money with the payment page URL.

Moreover, for the second type terminal read code, data is stored in association with, not as a limitation but as an example, the payment page URL for each shop ID.

Note that instead of the shop ID that is the shop identification information or in addition thereto, the terminal read code management database 1593 may store the shop POS system information stored in the shop registration data 155, and contact information, such as the phone number of the shop, and the e-mail address of the shop, etc.

(2) Functional Structure of Terminal

FIG. 3F is a diagram illustrating example functions accomplished by the control device 21 of the terminal 20 according to this example embodiment.

The terminal 20 includes, as the functions accomplished by the control device 21, a terminal main processor 211, an IMS application processor 212, a payment application processor 213, and a position calculation processor 217.

The terminal main processor 211 may execute a terminal main process to comprehensively control the terminal 20 in accordance with a terminal main process program 281 stored in the storage 28. Not as a limitation but as an example, when the terminal 20 is a mobile phone, processes, etc., are executed to control a phone call with the other mobile phones or with a fixed-line phone via the communication I/F 22, to control for an access to various websites via the communication I/F 22, to control the display 24 to display various information, to analyze various sound data input from the microphone 25, and to analyze the still image or the motion image picked up by the camera 27.

The IMS application processor 212 may execute an IMS application process to transmit and receive contents with the other users' terminal 20 via the server 10 based on an IMS application 282 stored in the storage 28.

The payment application processor 213 may execute a payment application process to make a payment by communication with the server 10 based on a payment application 283 stored in the storage 28.

The payment application processor 213 includes, as functional or hardware units, a terminal displayed code obtainment processor 2131, a code read processor 2133, an authentication skip determination processor 2135, and an authentication processor 2137.

The terminal displayed code obtainment processor 2131 may execute a process to obtain the terminal displayed code from the server 10 in the payment type that is "displaying terminal code".

The code read processor 2133 may execute a process to read the terminal read code posted at the shop in the payment type that is "reading terminal code".

The authentication skip determination processor 2135 may execute an authentication skip determination process to determine whether or not the authentication process to be executed by the authentication processor 2137 is skipped in accordance with an authentication skip determination process program 2845 stored in the storage 28. The authentication skip determination processor 2135 may execute the authentication skip determination process when the terminal 20 receives a payment request from the user or from an external device.

According to this example embodiment, the authentication skip determination processor 2135 executes, not as a limitation but as an example, the authentication skip determination process in the payment type that is "displaying terminal code" at a timing after receiving the terminal displayed code from the server 10 based on the process by the terminal displayed code obtainment processor 2131.

Moreover, the authentication skip determination processor 2135 executes, not as a limitation but as an example, in the payment type that is "reading terminal code", the authentication skip determination process at a timing after receiving information on the proceeding of the payment (referred to as a "predeterminate payment information" below) from the server 10 based on the information contained in the terminal read code read through the process by the code read processor 2133.

However, the execution timing of such authentication skip determination process can be changed as appropriate.

The authentication processor 2137 may execute the authentication process in accordance with an authentication process program 2847 stored in the storage 28.

In the authentication process, not as limitations but as example, as a display process relating to the execution of authentication to the user of the terminal 20, a process is executed to display, on the display 24, an authentication screen for causing the user of the terminal 20 to enter an authentication password, and a determination is made on whether or not the authentication password entered from this authentication screen matches the registered authentication password.

The position calculation processor 217 may execute a position calculation process to calculate the position of the own terminal 20 based on the position calculation information output by the position calculation information detection device 29B. The position calculation processor 217 calculates the position of the own terminal 20 by executing, for example, satellite positioning calculation based on satellite track data, and time information, etc., that are output by a satellite positioning sensor (a satellite positioning unit) contained in the position calculation information detection device 29B. Moreover, the position calculation processor 217 calculates the position of the own terminal 20 by executing inertial navigation calculation based on the information on an acceleration and an angular speed output by an inertia measurement sensor (an inertia measuring unit) contained in the position calculation information detection device 29B.

Note that unlike this example embodiment, not as a limitation but as an example, a processor or an arithmetic unit (e.g., a CPU or a digital signal processor (DSP)) may be provided in the position calculation information detection device 29B, and instead of the control device 21 of the terminal 20, the position calculation information detection device 29B may calculate and output the position of the terminal 20.

Moreover, not as a limitation but as an example, a wireless device that enables the terminal 20 to obtain the position information, e.g., a beacon that transmits beacon signals (e.g., Bluetooth signals) may be installed at an affiliated shop, and the terminal 20 may obtain the position information based on the beacon signals transmitted from the beacon installed at the shop.

FIG. 3G is a diagram illustrating example information stored in the storage 28 of the terminal 20 according to this example embodiment.

The storage 28 stores, not as limitations but as examples, the terminal main process program 281 which is read by the control device 21 and which is executed as the terminal main process, and the position calculation process program 287 which is read by the control device 21 and which is executed as the position calculation process.

Moreover, the storage 28 stores, not as limitations but as examples, the IMS application 282 and the payment application 283 that are application software obtained in advance from the server 10 by downloading, etc.

Note that the IMS application 282 and the payment application 283 may be a singular application, or may be separate applications.

Furthermore, the storage 28 stores, not as limitations but as example, terminal data 286 and calculated position record data 288.

The terminal data 286 is data relating to this terminal 20, and contains, not as limitations but as examples, information, such as the terminal identification information like the terminal phone number and the terminal mail address, a lock setting "ON/OFF" for the OS of the terminal 20, a terminal lock cancel password for canceling the locking for the OS of the terminal 20, and an authentication setting "ON/OFF" at the terminal.

The calculated position record data 288 stores, not as limitations but as examples, the record of the position of the terminal 20 (referred to as a "calculated position" below) calculated by the position calculation processor 217 that has executed a position calculation process for a predetermined time period (e.g., for each "1 minute", for each "5 minutes", and for each "10 minutes").

The payment application 283 includes a payment application program 284 which is read by the control device 21 and which is executed as the payment application process, and payment application data 285 in which various pieces of data relating to the payment application are stored.

The payment application program 284 contains subroutine programs that are, not as limitations but as examples, the authentication skip determination process program 2845 which is read by the control device 21 and which is executed as the authentication skip determination process, and the authentication process program 2847 which is executed by the control device 21 and which is executed as the authentication process.

The payment application data 285 contains, not as limitations but as examples, authentication skip condition data 2851, payment making data 2853, and shop data 2855.

The shop data 2855 contains the shop information which associates, not as limitations but as examples, the business category stored in the shop registration data 155 in the server 10, the first particular business category flag, and the second particular business flag with each other.

Regarding this shop data 2855, for example, the latest shop information is distributed from the server 10 to the terminal 20 and is updated at the update timing of the IMS application 282 and of the payment application 283.

The authentication skip condition data 2851 is data that defines the authentication skip condition which is a condition to skip the authentication process, and FIG. 3H illustrates an example data structure thereof.

The authentication skip condition data 2851 stores, in association with each other, a condition category No. that is the category number of the authentication skip condition, a condition No. that is the authentication skip condition number contained in the category of this condition category No., the authentication skip condition with this condition No., the allowance or disallowance indicating whether or not to make a determination with the authentication skip condition being applied, and the importance (the priority) of this authentication skip condition. The authentication skip condition and the determination method thereof will be respectively described in detail below.

<Condition Category No. "SP1">

The condition category No. "SP1" is a category that is a "time", and contains, not as limitations but as examples, condition Nos. "SP1-1" and "SP1-2" of the authentication skip condition.

Regarding the authentication skip condition with the condition No. "SP1-1", "a predetermined date and time is within a set time from the last payment date and time" is defined.

The "last payment time" is the date and time (the latest time at which the payment is made in past) at which the last payment is made in past regardless of whether or not the authentication process at the terminal 20 being skipped. That is, when the predetermined date and time is within the set time period (e.g., "one hour") from the last payment date and time, the payment is to be made again before too much times have elapsed, and thus the authentication is to be skipped for the improvement of the user friendliness and the reduction in payment processing time.

In the determination on the authentication skip condition, not as limitations but as examples, the terminal 20 obtains the predetermined date and time based on the measured clock time measured by the clock device 29A, and on the last payment date and hour stored in the payment record data in the payment making data 2853, thus being enabled to determine whether or not the predetermined date and time is within the set time period after the last payment date and time.

Regarding the authentication skip condition with the condition No. "SP1-2", "the present clock time is within a set time slot" is defined. The set time slot is, not as a limitation but as an example, may be set by the user of the terminal 20 in advance. More specifically, when, for example, the user of the terminal 20 sets the time slot at which such a user often makes a payment as the set time slot, thereby eliminating the authentication when the payment is made in the set time slot.

In the determination on the authentication skip condition, the terminal 20 may obtain, not as limitations but as examples, the present clock time based on the measured clock time by the clock device 29A, and may determine whether or not the current clock time is within the set time slot.

<Condition Category No "SP2">

The condition category No "SP2" is a category that is "shop and location", and contains, not as limitations but as examples, condition Nos. "SP2-1" to "SP2-4" of the authentication skip condition.

Regarding the authentication skip condition with the condition No. "SP2-1", "the payment or the authentication for payment is made in past at the shop where the payment is about to be made" is defined.

The "shop where the payment is about to be made" means the payment predeterminate shop where the payment will be made (the shop in an unsettled state before the payment). That is, when the payment or the authentication is made in past at the shop where the payment is about to be made, the authentication will be eliminated to improve the user friendliness and to reduce payment processing time.

In the determination on this authentication skip condition, the terminal 20 may obtain, not as limitations but as examples, the record of the calculated position stored in the calculated position record data 288, the latest calculated position, and the payment date and time stored in the payment record data, and may determine whether or not there is the calculated position matching the latest calculated position among the calculated positions corresponding to the same date and time as the past payment date and time.

Regarding the authentication skip condition with the condition No. "SP2-2", "the payment predeterminate shop is a set shop" is defined. Basically, the set shop can be set by the server 10. Not as a limitation but as an example, the server 10 may collect the shops where the user's utilization frequency is statistically higher than a predetermined utilization frequency, and may set such a shop as the set shop. That is, the authentication will be eliminated at the shop where the user's utilization frequency is high to improve the user's friendliness and to reduce payment processing time.

Note that instead of the server 10, the terminal 20 may be enabled to set the set shop. For example, the user of the terminal 20 can set the shop where such a user frequently utilizes as the set shop to the terminal 20. Moreover, for example, the user of the terminal 20 may set the shop with the particular business category (e.g., a convenience store) as the set shop since the shop near the user's home is safe, but may exclude other shops from the set shop since such other shops have the possibility of risk.

In the determination on this authentication skip condition, the terminal 20 may obtain, not as limitations but as examples, the record of the calculated position stored in the calculated position record data 288, the payment shop name stored in the payment record data, and the shop information stored in the shop data 2855, and may determine whether or not there is the calculated position matching the latest calculated position among the calculated positions corresponding to the same date and time as the past payment date and time at the set shop.

Regarding the authentication skip condition with the condition No. "SP2-3", "a payment predeterminate shop is the shop of the first particular business category" is defined. As described above, for the first particular business category, the business category is defined which are utilized by many users on daily basis, such as a "convenience store" and a "supermarket", as described above. When a payment is to be made at such shops, the authentication is to be omitted for the improvement of the user friendliness and the reduction in payment processing time.

In the determination on this authentication skip condition, the terminal 20 may obtain, not as limitations but as examples, the record of the calculated positions stored in the calculated position record data 288, the payment shop name stored in payment record data, and the first particular business category flag stored in the shop data 2855, and determine whether or not there is the calculated position matching the latest calculated position among the calculated positions corresponding to the same date and time as the past payment date and time at the shop with the first particular business category flag that is "ON".

Regarding the authentication skip condition with the condition No. "SP2-4", "the set time has elapsed from the payment date and time at the shop with the second particular business category" is defined. For the second particular business category, the business category which has a high possibility such that the user leaves the terminal 20 like a "bar" is set as described above. Moreover, the set time may be set as a time, such as "3 hours", "6 hours", or "12 hours". When the payment is made at the shop with the high possibility such that the terminal 20 is to be left, the authentication is requisite until the set time has elapsed from the payment date and time, but when the set time has elapsed from the payment date and time, the authentication is to be omitted.

In the determination on this authentication skip condition, the terminal 20 may obtain, not as limitations but as examples, the predetermined date and time based on the measured clock time by the clock device 29A, the payment date and time stored in the payment record data of the payment making data 2853 in the storage 28, and the flag of the second particular business category stored in the shop data 2855, and determine whether or not the predetermined date and time has elapsed from the payment date and time at shop with the second particular business category flag that is "ON".

<Condition Category No. "SP3">

The condition category No. "SP3" is a category that is an "amount of money", and contains, not as limitations but as examples, the condition Nos. "SP3-1" to "SP3-3" of the authentication skip condition.

Regarding the authentication skip condition with the condition No. "SP3-1", "the daily upper limit set amount of money is not exceeded" is defined.

The "daily upper limit set amount of money" is the set amount of money with the upper limit that is a threshold for the total amount of the payment amount of money (already paid amount of money) subjected to the payment already made in a day. That is, when the total amount of the payment amount of money already paid in a day does not exceed the daily upper limit set amount of money, the authentication will be skipped for the improvement of the user friendliness and the reduction in payment processing time.

Conversely, when the total amount of the payment amount of money already paid in a day exceeds the daily upper limit set amount of money, execution of the authentication can cause the user to pay attention that such a user has spent too much money for the payment. Moreover, this allows a parental guardian to limit the payment when a person under age, etc. attempts to make a payment.

In the determination on this authentication skip condition, the terminal 20 may obtain, not as limitations but as examples, the daily upper limit set amount of money stored in the payment making data 2853, and the total amount of the payment amount of money in a day specified from the payment record data, and determine whether or not the total amount exceeds the daily upper limit set amount of money.

Regarding the authentication skip condition with the condition No. "SP3-2", "the balance is equal to or smaller than the set amount of money (or is smaller than the set amount of money), and the automatic charge setting is OFF" is defined. Not as a limitation but as an example, the user of the terminal 20 may set the set amount of money in advance. When the balance is equal to or smaller than the set amount of money (or is smaller than the set amount of money), the user cannot purchase an expensive commodity by payment, and thus the possibility of risk is low. Hence, the authentication is to be omitted for the improvement of the user friendliness and the reduction in payment processing time.

When, however, the automatic charge setting is "ON", since the IMS money is automatically charged, the user can purchase an expensive commodity by payment, and thus the possibility of risk arises. Accordingly, in addition to the balance that is equal to or smaller than the set amount of money (or is smaller than the set amount of money), the automatic charge setting that is "OFF" is taken as the skip condition of the authentication.

Note that in this case, when the automatic charge setting is "ON", even if the balance is equal to or smaller than the set amount of money (or is smaller than the set amount of money), the authentication process will not be skipped in principle. However, in view of the improvement of the user friendliness as described above, the authentication process may be skipped even if the automatic charge setting is "ON". In this case, not as a limitation but as an example, the automatic charge setting that is OFF may be excluded from the authentication skip condition with the above-described condition No "SP3-2", and only "the balance is equal to or smaller than the set amount of money (or is smaller than the set amount of money)" may be taken as the condition. That is, even if the automatic charge setting is "ON", the authentication process is not always requisite, and when the balance is simply equal to or smaller than the set amount of money (or is smaller than the set amount of money) and when the automatic charging is "ON", the authentication process may be executed, or the authentication process may not be executed case by case.

In the determination on this authentication skip condition, the terminal 20 may obtain, not as limitations but as examples, the balance stored in the payment making data 2853 and the automatic charge setting, and determine whether or not the balance is equal to or smaller than the set amount of money (or is smaller than the set amount of money), and the automatic charge setting is "OFF."

Regarding the authentication skip condition with the condition No. "SP3-3", "the payment frequency or the payment amount of money per a month is within a proper range" is defined. For example, the average value, the maximum value, or the maximum frequency value of the payment frequency per a month within a predetermined past time period (past six months or past one year) is calculated as a threshold frequency, and similarly, the average value, the maximum value or the maximum frequency value of the payment amount of money per a month within a predetermined past time period is calculated as a threshold amount of money. Next, when the payment is made based on such thresholds, and when the payment frequency exceeds the threshold frequency or the payment amount of money exceeds the threshold amount of money, the authentication is executed, and the authentication is to be omitted in other cases.

In the determination on this authentication skip condition, the terminal 20 may obtain, not as limitations but as examples, the payment frequency and the payment amount of money both calculated from the payment record data stored in the payment making data 2853, and the threshold frequency and the threshold amount of money stored in the storage 28, and determine whether or not the payment frequency exceeds the threshold frequency or the payment amount of money exceeds the threshold amount of money.

Note that the above-described authentication skip condition may be a condition based on the number of payments (the number of times of payment) instead of the condition based on the frequency (the payment frequency) by IMS money. Moreover, when the payment frequency is within the proper range, when the number of times of payment is within the proper range, and when the payment amount of money is within the proper range may be defined as individual conditions.

Regarding the authentication skip condition with the condition No. "SP3-4", "the predeterminate payment amount of money is equal to or smaller than the set amount of money (or is smaller than the set amount of money)" is defined. Regarding the set amount of money, an amount of money within a range in which the amount of money for a single-time payment is not too high in view of common-sense idea and a socially accepted idea, such as "JP 10000 YEN" or "JP 20000 YEN", may be set.

The term "predeterminate payment amount of money" means the amount of money for the payment to be made (the unsettled amount of money before the payment). That is, when the amount of money for the payment to be made is not so high (e.g., when the amount of money to be paid is lower than a threshold amount), the authentication will be skipped for the improvement of the user friendliness and the reduction in payment processing time.

In the determination on this authentication skip condition, the terminal 20 may obtain, not as a limitation but as an example, the predeterminate payment amount of money from the server 10, and determine whether or not the predeterminate payment amount of money is equal to or smaller than the set amount of money (or is smaller than the set amount of money).

According to this example embodiment, however, in the payment type "displaying terminal code", the terminal 20 executes the authentication skip determination process at the timing after receiving the terminal displayed code from the server 10. At this timing, however, the terminal 20 does not obtain the predeterminate payment information from the server 10 yet, and thus the predeterminate payment amount of money is undefined. Hence, according to this example embodiment, for the payment type "displaying terminal code", the authentication skip condition with the condition No. "SP3-4" is set as disallowable "x", but is set as allowable "○" only for the payment type "reading terminal code".

<Condition Category No. "SP4">

The condition category No. "SP4" is a category that is a "commodity", and contains, not as limitations but as examples, the condition Nos. "SP4-1" and "SP4-2" of the authentication skip condition.

Regarding the authentication skip condition with the condition No. "SP4-1", "a to-be-purchased commodity is a first-moving-consumer commodity" is defined.

The "to-be-purchased commodity" means the commodity to be purchased by payment that is about to be made (the unsettled commodity before the payment). That is, when the commodity to be purchased by payment that is about to be made is a fast-moving-consumer commodity, the authentication is to be omitted for the improvement of the user friendliness and the reduction in payment processing time. Examples of the fast-moving-consumer commodity may include non-durable household goods such as packaged foods, beverages, toiletries, candies, cosmetics, over-the-counter drugs, dry goods, and other consumables.

Regarding the authentication skip condition with the condition No. "SP4-2", "the purchase record of the to-be-purchased commodity is present" is defined. When the to-be-purchased commodity matches the commodity that is purchased by the user of the terminal 20 in past more than one time, for the improvement of the user friendliness and the reduction in payment processing time, the authentication will be skipped.

In order to determine these authentication skip conditions, the terminal 20 needs to obtain the information on the to-be-purchased commodity. According to this example embodiment, however, a scheme is employed in which the information on the to-be-purchased commodity is not transmitted to the terminal 20 from the server 10 for both the payment types "displaying terminal code" and "reading terminal code". Hence, the terminal 20 is unable to determine the authentication skip condition contained in the condition category No. "SP4 (commodity)".

According to this example embodiment, the determination on the authentication skip condition with the condition Nos. "SP4-1" and "SP4-2" is made using an alternative scheme to be described below for the payment type "reading terminal code".

First, regarding the authentication skip condition with the condition No. "SP4-1", the terminal 20 accesses, after reading the terminal read code, the payment page based on the payment page URL contained in this terminal read code, and obtains the shop ID and the sales amount of money associated with this payment page URL from the server 10. Next, the terminal 20 determines that the to-be-purchased commodity is a fast-moving-consumer commodity when the shop identified from the shop ID obtained from the server 10 is the shop of the first particular business category, and when the sales amount of money is equal to or smaller than a threshold amount of money (or is smaller than the threshold amount of money).

Next, for the authentication skip condition with the condition No. "SP4-2", after reading the terminal read code, the terminal 20 accesses the payment page like the above case, and obtains the shop ID and the sales amount of money associated with the payment page URL from the server 10. Subsequently, the terminal 20 determines whether or not there are the payment shop ID and the payment amount of money that match the shop ID and the sales amount of money, respectively, obtained from the server 10 among the payment shop ID and the payment amount of money stored in the payment record data, and determines that there is the purchase record of the to-be-purchased commodity when there are matching payment shop ID and sales amount of money.

<Condition Category No. "SP5">

The condition category No. "SP5" is a category that is "security", and contains, not as a limitation but as an example, the condition No. "SP5-1" of the authentication skip condition.

Regarding the authentication skip condition with the condition No. "SP5-1", "the terminal is being locked or the payment application is being locked" is defined. In this case, when the Operating System (OS) of the terminal 20 is being locked, or when the payment application is being locked, in order to cancel such a locked state, the authentication by entering a terminal lock cancel password or a payment application lock cancel password, etc. is respectively necessary. Hence, in order to improve the user friendliness, the authentication for the payment is made unnecessary.

In the determination on this authentication skip condition, the terminal 20 may obtain, not as limitations but as examples, the lock or unlock information on the OS of the terminal 20 stored in the terminal data 286, and the lock or unlock information on the payment application stored in the payment application data 285, and determine whether or not the terminal is being locked or the payment application is being locked.

<Condition Category No. "SP6">

The condition category No. "SP6" is a category that is an "authentication setting", and contains, not as a limitation but as an example, the condition No. "SP6-1" of the authentication skip condition.

Regarding the authentication skip condition with the condition No. "SP6-1", "the authentication setting is OFF at the terminal or the authentication setting is OFF at the payment application" is defined.

The authentication at the terminal is various authentications required for the user at the terminal 20 including the user personal authentication, etc. The authentication at the payment application is an authentication required for the user when making a payment using the payment application.

That is, when the user of the terminal 20 made a setting to omit the authentication at the terminal 20, or when made a setting to omit the authentication at the payment application, the authentication is to be omitted.

In the determination on this authentication skip condition, the terminal 20 may obtain, not as limitations but as examples, the authentication setting at the terminal stored in the terminal data 286, and a condition-by-condition setting flag for the condition No. "SP6-1" stored in the authentication skip condition user setting data of the payment making data 2853, and determine whether or not at least either one of the authentication setting at the terminal or the authentication setting at the payment application is "OFF".

Moreover, the allowance or disallowance regarding whether or not to apply the authentication skip condition to execute the authentication skip determination for each of the above-described skip conditions is defined for each payment type.

More specifically, for the payment type "displaying terminal code", disallowable "x" is defined for, not as limitations but as examples, the authentication skip condition with the condition Nos. "SP3-3", "SP3-4", "SP4-1", and "SP4-2", and allowable "○" is defined for the other authentication skip condition.

The reason why disallowable "x" is defined for the authentication skip condition with the condition No. "SP3-3" is that, in the payment type "displaying terminal code", the terminal 20 cannot obtain the information on the predeterminate payment amount of money, and cannot determine whether or not the predeterminate payment amount of money is within a predetermined range. However, since the determination on whether or not the payment frequency is within the predetermined range can be made, the determination on whether or not the predeterminate payment amount of money is within the proper range may be omitted.

Similarly, the reason why disallowable "x" is defined for the authentication skip condition with the condition No. "SP3-4" is that the terminal 20 cannot obtain the information on the predeterminate payment amount of money, and cannot determine whether or not the predeterminate payment amount of money is equal to or smaller than the set amount of money (or is smaller than the set amount of money).

Moreover, the reason why disallowable "x" is defined for the authentication skip condition with the condition Nos. "SP4-1" and "SP4-2" is that, in the payment type "displaying terminal code", as described above, since the terminal 20 cannot obtain the information on the to-be-purchased commodity, a determination on whether or not the to-be-purchased commodity is a fast-moving-consumer commodity, and a determination on whether or not there is a purchase record of the to-be-purchased commodity cannot be made.

Conversely, regarding the payment type "reading terminal code", disallowable is basically defined for, not as limitations but as examples, the authentication skip condition with the condition Nos. "SP4-1" and "SP4-2", but it can be allowable by the above-described alternative scheme, and thus "x or ○" is defined.

Moreover, not as a limitation but as an example, an "importance" (which can be considered as a "priority" indicating the level of preferential application of the authentication skip condition) which is an index value indicating the level of the importance of the authentication skip condition for each of the above-described authentication skip conditions is defined for each payment type. The importance is classified into, not as limitations but as examples, three stages, such as "A" to "C", and the importance is defined in such a way that "A" has the highest importance, and "C" has the lowest importance.

More specifically, regarding the payment type "displaying terminal code", the importance "A" is set for, not as limitations but as examples, the condition Nos. "SP1-1", "SP2-1", "SP2-4", "SP3-1", "SP3-2", "SP5-1", and "SP6-1" of the authentication skip condition, the importance "B" is set for the condition Nos. "SP2-2" and "SP2-3" of the authentication skip condition, and the importance "C" is set for the condition No. "SP1-2" the authentication skip condition. Moreover, since the condition Nos. "SP3-3", "SP3-4", "SP4-1", and "SP4-2" of the authentication skip condition are disallowable, the importance "- (none)" is defined.

Moreover, regarding the payment type "reading terminal code", the importance "A" is set for, not as limitations but as examples, the condition Nos. "SP2-1", "SP2-4", "SP3-4", "SP4-1", "SP4-2", and "SP6-1" of the authentication skip condition, the importance "B" is set for the condition Nos. "SP1-1", "SP2-2", "SP2-3", "SP3-1", "SP3-2", and "SP5-1" of the authentication skip condition, and the importance "C" set for the condition Nos. "SP1-2" and "SP3-3" of the authentication skip condition.

Note that the above-described importance setting is merely examples, and can be set and changed as appropriate. Moreover, in the above example, although the allowance or disallowance and the importance are defined for each authentication skip condition (for each condition No.), instead of such setting, the allowance or disallowance and the importance may be defined for each category (a condition category No.) of the authentication skip condition.

Moreover, although the importance is set in association with the authentication skip condition according to this example embodiment, this setting of the importance is not a requisite condition, and the importance may be not set. That is, the field of importance may be eliminated in the above-described authentication skip condition data 2851.

In this case, in the authentication skip determination process, not as a limitation but as an example, the authentication skip conditions may be determined in an arbitrary sequence, and when any one of the authentication skip conditions is satisfied, a determination may be made that the authentication process will be skipped.

The information represented by the category of the authentication skip condition in the above-described authentication skip condition data 2851, and the information utilized for the determination on each authentication skip condition contained in each category are contained in the information on the IMS money (not as a limitation but as an example, electronic money).

More specifically, for example, the category "SP1 (time)" contains the information on the time at which the payment is made in past by IMS money, but this information can be regarded as information on the IMS money in the broad sense.

Moreover, for example, the category "SP2 (the shop and the location)" contains the information on the location at which the payment is made in past by IMS money, and the information on the shop at which the payment is made in past by IMS money, but such information can be regarded as the information on the IMS money in the broad sense.

Furthermore, for example, the category "SP3 (an amount of money)" contains the information on the amount of IMS money, but this information can be regarded as the information on the IMS money in the broad sense.

Still further, for example, the category "SP4 (the commodity)" contains the information on the commodity purchased by IMS money, but this information can be regarded as the information on the IMS money in the broad sense.

Note that the term "information on" has the similar meaning to those of other examples, the detailed description thereof will be omitted.

FIG. 3I is a diagram illustrating an example data structure of the payment making data 2853.

The payment making data 2853 stores the user ID, the authentication password, the payment application lock cancel password that is the password for canceling the locked state of the payment application, the IMS point, the balance, the daily upper limit set amount of money, the automatic charge setting, the payment record data, the authentication skip condition setting, and authentication skip condition user setting data.

The payment record data stores the similar data to the payment record data which are managed by the payment management database 157 of the server 10 and which are stored in the payment management data with this user ID. Regarding this payment record data, not as limitations but as examples, after the payment is executed by the server 10, the payment date and time, the payment shop ID, the payment shop name, and the payment amount of money are transmitted to the terminal 20 from the server 10, and such record is stored as the payment record data.

The authentication skip condition setting is the setting relating to the authentication skip condition utilized for the own terminal 20 for the authentication skip determination. The authentication skip condition setting contains, not as limitations but as examples, the "user setting" and an "automatic setting".

The "user setting" is a setting which applies the authentication skip condition determined based on the user's selection and determination operation of the terminal 20 among the authentication skip conditions defined in the authentication skip condition data 2851, and which makes the authentication skip determination.

The "automatic setting" is a setting which makes the authentication skip determination using the authentication skip condition automatically determined by the terminal 20 among the authentication skip conditions defined in the authentication skip condition data 2851.

The authentication skip condition user setting data is setting data relating to the above-described authentication skip condition setting that is "user setting", and FIG. 3J illustrates an example data structure thereof.

The authentication skip condition user setting data stores, in association with each other, the condition category No., the condition No., the setting type, the condition-category-by-condition-category setting flag, and a condition-by-condition setting flag.

The condition category No. and the condition No. store the condition category No. and the condition No., respectively, which are defined in the authentication skip condition data 2851.

Either one of the "condition-category-by-condition-category" or the "condition by condition" is stored in the setting type.

The setting type "condition-category-by-condition-category" is a type for the user of the terminal 20 to set the applied authentication skip condition for each condition category. That is, when a setting that collectively applies the authentication skip conditions for each category is made, this setting type "condition-category-by-condition-category" is applied.

The setting type "condition by condition" is a type for the user of the terminal 20 to set the applied authentication skip condition for each condition. That is, when a setting is made which applies the individual authentication skip condition for each condition, this setting type "condition by condition" is applied.

The condition-category-by-condition-category setting flag is a flat that indicates, when the setting type is the "condition-category-by-condition-category", whether or not to apply the authentication skip condition contained in the condition category No., and for the applied condition category, the condition category No. thereof is set in association with "ON", and for the unapplied condition category, the condition category No. thereof is set in association with "OFF".

The condition-by-condition setting flag is a flag that indicates, when the setting type is "condition by condition", whether or not the authentication skip condition with such a condition No., and for the applied condition, the condition No. thereof is set in association with "ON", and for the unapplied condition, the condition No. thereof is set in association with "OFF". Not as a limitation but as an example, all the condition-by-condition setting flag are also set as "ON" for the category at which the condition-category-by-condition-category setting flag is set as "ON."

(3) Functional Structure of Shop Code Reader Device

FIG. 2 illustrates example functions accomplished by the control device 51 of the shop code reader device 50 according to this example embodiment.

The shop code reader device 50 includes, as functions accomplished by the control device 51, a shop code reader device main processor 511 and a shop payment processor 513.

The shop code reader device main processor 511 may execute a shop code reader device main process to comprehensively control the shop code reader device 50 in accordance with a shop code reader device main process program 551 stored in the storage 55.

The shop payment processor 513 may execute a shop payment process that is a process relating to the payment at an own shop in accordance with a shop payment process program 5511 stored in the storage 55.

FIG. 2 illustrates example information stored in the storage 55 of the shop code reader device 50 according to this example embodiment.

The storage 55 stores, not as a limitation but as an example, the shop code reader device main process program 551 which is read by the control device 51 and which is executed as the shop code reader device main process. Moreover, the shop code reader device main process program 551 contains a subroutine program that is the shop payment process program 5511 which is read by the control device 51, and which is executed as the shop payment process.

The shop payment process will be described later in detail with reference to flowcharts.

<Payment Method>

With reference to example display screens to be displayed on the display 24 of the terminal 20, the payment method utilizing the payment application according to this example embodiment will be described.

(1) Payment Type "Displaying Terminal Code"

FIG. 3K to FIG. 3N are screen diagrams for describing a flow of the payment without an authentication skip in the payment type that is "displaying terminal code".

FIG. 3K is a diagram illustrating an example payment application screen displayed on the display 24 of the terminal 20.

This payment application screen is a display screen displayed when the payment application is activated, and "IMS Pay" that is the name of the payment application is displayed on the upper part of the screen. The balance (in this example, JP "3000 YEN") is displayed within the flame below, and a charge button for charging the money is displayed side by side. Moreover, displayed below such a frame is a plurality of function icons corresponding to various functions of the payment application.

The icon indicated as a "code" among these function icons is a "code icon" to obtain the terminal displayed code from the server 10 when the payment is made by the payment type "displaying terminal code". Moreover, the icon indicated as a "code reader" is a code reader icon to activate a code reader (referred to as an "application code reader" below) provided as the function of the payment application to cause the terminal 20 to read the terminal read code when the payment is made by the payment type "reading terminal code".

FIG. 3L is a diagram illustrating an example authentication screen displayed when the "code icon" is touched by the user of the terminal 20 in the above-described payment application screen.

When the determination to skip the authentication process is not made in the authentication skip determination process to be described later, this authentication screen is displayed.

In this authentication screen, together with the letter "password" (the authentication password), a message that is "enter password presently used" is displayed, and displayed below such a message are a password display field that displays the entered password and a keyboard to enter the password.

FIG. 3M is a diagram illustrating an example terminal displayed code screen that is displayed when the authentication result of the authentication process based on the entered password in the above-described authentication screen is "OK".

The letter that is "code" is displayed on the upper part of a screen in this terminal displayed code screen, and displayed below such a letter are the payment method and the IMS point tab to set whether or not to make a payment using the IMS points. Moreover, below such a tab, etc., the terminal displayed code represented by a bar code as the terminal displayed code and the terminal displayed code represented by a QR code both transmitted from the server 10 and received by the terminal 20 are displayed. Furthermore, respective validated periods are set for these terminal displayed codes as described above, and the remaining time of the validated period is displayed in the count-down scheme.

The user of the terminal 20 presents the terminal displayed code screen to the sales staff at the shop via the code register 60, and causes the shop code reader device 50 to read the terminal displayed code to make a payment. In this case, the shop code reader device 50 accesses the payment page based on the payment page URL contained in the read terminal displayed code, and transmits necessary information for the payment.

FIG. 3N is a diagram illustrating an example payment completion screen displayed on the terminal 20 when the payment by the server 10 is completed.

In this payment completion screen, together with the wordings "payment completed" at the screen center of the terminal displayed code screen in FIG. 3M, a message "details can be reviewed from "payment record"", and a "review icon" to review the payment record are displayed in the pop-out scheme.

FIG. 3O and FIG. 3P are screen diagrams for describing a flow of the payment with the authentication skip in the payment type that is "displaying terminal code".

FIG. 3O illustrates the same payment application screen as that of FIG. 3K, and FIG. 3P illustrates the same terminal displayed code screen as that of FIG. 3M.

When the user of the terminal 20 touches the "code icon" in the payment application screen in FIG. 3O, and when the determination to skip the authentication process is made in the authentication skip determination process to be described later, the displayed screen is changed to the terminal displayed code screen in FIG. 3P. That is, the displayed screen changes from the payment application screen to the terminal displayed code screen without the authentication screen in FIG. 3L being displayed.

(2) Payment Type "Reading Terminal Code"

As described above, there are two cases that are the case in which the first type terminal read code is read, and the case in which the second type terminal read code is read for the payment type "reading terminal code". Each case will be described.

(2-1) First Type Terminal Read Code

FIG. 3Q illustrates the same payment application screen as that of FIG. 3K, and illustrates a state in which the "code reader icon" among the function icons is tapped.

When the code reader icon is tapped by the user, an application code reader is activated, and a reading standby screen as illustrated in FIG. 3R is displayed on the display 24. In this state, when the terminal 20 is moved in such a way that a two-dimensional code is located within the frame at the center of the screen, the two-dimensional code is read by the application code reader.

FIG. 3S illustrates an example display screen displayed on the display 24 when the two-dimensional code is read by the application code reader, and illustrates a state in which the first type terminal read code is read by the application code reader.

When the first type terminal read code is read by the terminal 20, the terminal 20 accesses the payment page based on the URL contained in the read first type terminal read code, and transmits necessary information for the payment.

FIG. 3T is a diagram illustrating an example payment page screen displayed on the display 24 of the terminal 20.

In this payment page screen, a payment predeterminate shop (e.g., "XXX SHOP"), the date and time (e.g., "2018/10/24") at which the payment is made, and the predeterminate payment amount of money (e.g., "JP 480 YEN") are displayed on the upper part of the screen. Below these pieces of information, the payment method, and the IMS point tab for setting whether or not to make a payment using the IMS points are displayed. Moreover, below such a tap, etc., a payment making icon indicated as "making payment" to make the payment is displayed.

FIG. 3U is a diagram illustrating an example payment completion screen displayed when the user of the terminal 20 taps the payment making icon in the above-described payment page screen.

A message "details can be reviewed from "payment record"", and a "review icon" are displayed in the pop-out scheme on the center of the payment page screen together with the wordings "payment completed" in this payment completion screen.

(2-2) Second Type Terminal Read Code

FIG. 3V to FIG. 3X illustrate the similar display screens as those of FIG. 3Q to FIG. 3S.

FIG. 3Y is a diagram illustrating an example predeterminate payment amount entering and setting screen displayed when the terminal 20 accesses the server 10 after reading the second type terminal read code.

In this predeterminate payment amount entering and setting screen, together with the icon image of the user of the terminal 20, a payment predeterminate shop (in this example, "XXX SHOP") is displayed, and displayed below such an icon image, etc., are a predeterminate payment amount display field that displays the entered predeterminate payment amount, and the current balance, and a keyboard to enter the predeterminate payment amount.

In this predeterminate payment amount entering and setting screen, as illustrated in FIG. 3Z, when, for example, the user of the terminal 20 enters the predeterminate payment amount (in this example, "JP 480 YEN"), and taps a "complete icon" displayed below, the keyboard becomes a non-displayed state, and for example, as illustrated in FIG. 3AA, a payment making icon which is indicated as "make a payment" to make a payment is displayed. Next, when the user of the terminal 20 taps the payment making icon, for example, as illustrated in FIG. 3AB, the payment completion screen is displayed.

<Process>

FIG. 3AC to FIG. 3AF are each a flowchart illustrating example process flows executed by the respective devices according to this example embodiment.

In these figures, illustrated from the left side in sequence are a first payment application process that is an example payment application process executed by the payment application processor 213 of the terminal 20, a first shop payment process that is an example shop payment process executed by the shop payment processor 513 of the shop code reader device 50, and a first payment management process that is an example payment management process executed by the payment management processor 113 of the server 10, respectively.

Each step in each process is indicated by a combination of a capitalized alphabet with a number, and in this specification, the term step will be omitted.

Moreover, the flowchart to be described below merely illustrates an example process according to this example embodiment, and in the flowchart to be described below, some steps may be not executed or an additional step may be inserted.

First, the payment application processor 213 of the terminal 20 receives the user's terminal payment operation to the input and output device 23 (operation A1). Next, the payment application processor 213 determines the payment type based on the received terminal payment operation (operation A3).

When the payment type is "displaying terminal code" (operation A3: displaying terminal code), the terminal displayed code obtainment processor 2131 transmits terminal displayed code generation request information containing therein the user ID to the server 10 via the communication I/F 22 (operation A5).

The server 10 determines whether or not the terminal displayed code generation request information is received from the terminal 20 via the communication I/F 14 (operation C1), and when determining that such information is received (operation C1: Yes), the code generation processor 1131 executes the terminal displayed code generation process (operation C3).

More specifically, a random token is issued using, not as a limitation but as an example, a scheme (an algorithm) to generate a random token. Next, the terminal displayed code containing the access information and the issued token is generated, More specifically, for example, data that contains a letter string of the URL of the website provided by the server 10, and a letter string (e.g., a parameter portion that starts with the symbol "?") of the token is encoded (coded) and is defined as a graphic to generate the terminal displayed code that is represented by the image of a two-dimensional code. Moreover, the user ID contained in the received terminal displayed code generation request information, and the issued token are associated with each other, and are stored in the terminal displayed code management database 1591.

Subsequently, the terminal displayed code transmission processor 1133 transmits the generated terminal displayed code to the terminal 20 via the communication I/F 14 (operation C5).

The payment application processor 213 executes the first authentication skip determination process in accordance with the authentication skip determination process program 2845 stored in the storage 28 (operation A9) when receiving the terminal displayed code from the server 10 via the communication I/F 22 (operation A7).

FIG. 3AG is a flowchart illustrating an example flow of the first authentication skip determination process. Note that in order to distinguish from the authentication skip determination process in the other embodiments, the term "first authentication skip determination process" will be utilized to facilitate understanding.

First, the authentication skip determination processor 2135 determines the payment type (operation D1). Next, when determining that the payment type is "displaying terminal code" (operation D1: displaying terminal code), the authentication skip determination processor 2135 determines the authentication skip condition setting stored in the payment making data 2853 (operation D3).

When determining that the authentication skip condition setting is "user setting" (operation D3: user setting), the authentication skip determination processor 2135 determines the authentication skip condition to be applied based on the authentication skip condition user setting in the authentication skip condition user setting data stored in the payment making data 2853, and the allowance or disallowance defined in the "payment type: displaying terminal code" of the authentication skip condition data 2851 (operation D5).

More specifically, not as limitations but as examples, in the authentication skip condition user setting data among the authentication skip conditions stored in association with the allowance "○" for the "payment type: displaying terminal code" in the authentication skip condition data 2851, the authentication skip condition contained in the condition category which has the stored setting type that is "condition-category-by-condition-category" and which has the stored condition-category-by-condition-category setting flag that is "ON", and the authentication skip condition which has the stored setting type that is "condition by condition" and which has the stored condition-by-condition setting flag that is "ON" are determined as the applied authentication skip conditions.

Moreover, when determining that the authentication skip condition setting is "automatic setting" (operation D3: automatic setting), the authentication skip determination processor 2135 determines the applied authentication skip condition based on the allowance or disallowance defined in the "payment type: displaying terminal code" of the authentication skip condition data 2851, and the importance (the priority) (operation D7).

More specifically, not as a limitation but as an example, among the authentication skip conditions stored in association with the allowance "○" for the "payment type: displaying terminal code" in the authentication skip condition data 2851, the authentication skip condition that is associated with, for example, the importance "A" or "B" is determined as the applied authentication skip condition.

Conversely, when determining that the payment type is "reading terminal code" (operation D1: read terminal code), the authentication skip determination processor 2135 determines the authentication skip condition setting stored in the payment making data 2853 in the storage 28 (operation D9).

When determining that the authentication skip condition setting is "user setting" (operation D9: user setting), the authentication skip determination processor 2135 determines the applied authentication skip condition based on the authentication skip condition user setting of the authentication skip condition user setting data stored in the payment making data 2853, and the allowance or disallowance defined for the payment type: reading terminal code of the authentication skip condition data 2851 (operation D11).

More specifically, not as limitations but as example, in the authentication skip condition user setting data, among the authentication skip conditions stored in association with the allowance "○" for the "payment type: reading terminal code" in the authentication skip condition data 2851, the authentication skip condition contained in the condition category which has the stored setting type that is "condition-category-by-condition-category", and which has the condition-category-by-condition-category setting flag that is "ON", and the authentication skip condition which has the stored setting type that is "condition by condition", and which has the stored condition-by-condition setting flag that is "ON" are determined as the applied authentication skip conditions.

Moreover, when determining that the authentication skip condition setting is "automatic setting" (operation D9: automatic setting), the authentication skip determination processor 2135 determines the applied authentication skip condition based on the allowance or disallowance defined for the "payment type: reading terminal code" of the authentication skip condition data 2851, and the importance (the priority) (operation D13).

More specifically, not as a limitation but as an example, among the authentication skip conditions stored in association with the allowance "○" for the payment type: reading terminal code in the authentication skip condition data 2851, the authentication skip condition associated with, for example, the importance "A" or "B" is determined as the applied authentication skip condition.

After D5, D7, D11 or D13, the authentication skip determination processor 2135 obtains necessary information for the determination on the respective authentication skip conditions (operation D15). The respective necessary information for the determination on the authentication skip condition and the respective determination methods are as described above.

Subsequently, the authentication skip determination processor 2135 executes an authentication skip condition satisfied determination (operation D17). More specifically, based on the information obtained in operation D15, determinations on whether or not the respective authentication skip conditions determined in operation D5, D7, D11, or D13 are satisfied are made. For example, when at least one authentication skip condition is satisfied, a determine is made to skip the authentication process, and a determination is made not to skip the authentication process in other cases.

Next, the authentication skip determination processor 2135 ends the first authentication skip determination process.

Note that the above-described determination method of the authentication skip condition, and the determination method on whether or not the authentication skip condition is satisfied are merely examples, and the present disclosure is not limited to these examples.

More specifically, not as limitations but as examples, only the authentication skip condition associated with the importance that is "A" may be determined as the applied authentication skip condition. Moreover, the authentication skip condition with the importance that is "C" may be contained in the applied authentication skip condition.

Furthermore, not as limitations but as examples, regarding the authentication skip condition associated with the importance that is "A", the determination may be made to skip the authentication process when at least one authentication skip condition is satisfied, and for the authentication skip condition associated with the importance "B", the determination may be made to skip the authentication process when all the authentication skip conditions are satisfied.

Returning to the main process in FIG. 3AC, the payment application processor 213 determines whether or not the determination to skip the authentication process is made in the first authentication skip determination process (operation A11). When the determination is made to skip the authentication process (operation A11: Yes), the payment application processor 213 transitions the process to operation A19.

Conversely, when the determination is made not to skip the authentication process (operation A11: No), the authentication processor 2137 executes the authentication process (operation A13). More specifically, the authentication screen is displayed on the display 24, and the user is prompted to enter the authentication password. Next, when the entered authentication password matches the authentication password stored in the payment making data 2853 in the storage 28, the authentication end is set to "OK". In contrast, the authentication end is set to "No Good" or "Authentication Failed" when the authentication password does not match.

When the determination is made that the authentication result is "No Good" or "Authentication Failed" in the authentication process (operation A15: No), the payment application processor 213 executes an error process (operation A17). More specifically, for example, a notification that prompts the user to enter the authentication password again is given. Next, the payment application processor 213 returns the process to A13.

Subsequently, the payment application processor 213 displays the terminal displayed code on the display 24 (operation A19). At this time, the payment application processor 213 may display, on the display 24 together with the terminal displayed code, a message (a code reading command display), etc., which instructs the user of the terminal 20 to cause the terminal displayed code to be read by the shop code reader device 50.

The shop payment processor 513 of the shop code reader device 50 receives a shop payment operation by the sales staff of the shop to the input and output device 52 (operation B1). Next, the shop payment processor 513 determines whether or not the payment type is "displaying terminal code" based on the received shop payment operation (operation B3).

When the payment type is "displaying terminal code" (operation B3: Yes), the shop payment processor 513 executes a predeterminate payment amount setting process (operation B5). More specifically, based on the operation to enter the amount of money by the sales staff of the shop to the input and output device 52, the amount of money for the commodity to be sold is set as a "predeterminate payment amount".

Subsequently, the shop payment processor 513 gives a notification to instruct reading of the terminal displayed code (operation B7). More specifically, for example, a message that instructs reading of the terminal displayed code is displayed on the display 53, or a sound output that instructs reading of the terminal displayed code is output from the sound output device 56, etc., to give the notification to the sales staff of the shop. The sales staff of the shop prompts the user of the terminal 20 to present the terminal displayed code in accordance with the notification that instructs reading of the terminal displayed code.

When the terminal displayed code displayed on the display 24 of the terminal 20 is read by the code reader 58 of the shop code reader device 50 in operation A19 (operation B9), the shop payment processor 513 executes a code information obtainment process (operation B11). More specifically, data is decoded (decrypted) from the read terminal displayed code to obtain various information contained in the read terminal displayed code.

Subsequently, the shop payment processor 513 accesses, via the communication I/F 54, the payment page based on payment page URL obtained from the read terminal displayed code, and transmits a second payment request information containing therein, not as limitations but as examples, the shop ID, the token obtained from the terminal displayed code, and the predeterminate payment amount set in operation B5 to the server 10 (operation B13).

The payment management processor 113 executes, when receiving, via the communication I/F 14, the second payment request information from the shop code reader device 50 (operation C9), the payment process (operation C11). More specifically, not as a limitation but as an example, the user ID stored in association with the token contained in the second payment request information received from the shop code reader device 50 is identified in the terminal displayed code management database 1591 in the storage 15. Next, based on the balance stored in the payment management data with the identified user ID in the payment management database 157 in the storage 15, a determination is made on whether or not the payment with the predeterminate payment amount can be made. Subsequently, when the payment can be made, the predeterminate payment amount is subtracted from the balance to update the balance, the payment record data is also updated, and the payment result is set as "succeeded". Conversely, when the payment cannot be made, the payment result is set as "failed".

Note that the amount of money having undergone the payment is paid to the shop directly from the business operator of the IMS (the business operator of the payment service) or via a business agency.

Subsequently, the payment management processor 113 determines the payment result (operation C13). When the payment result is "succeeded" (operation C13: succeeded), the shop payment result information transmission processor 1136 transmits, to the shop code reader device 50 via the communication I/F 14, shop payment succeeded information as the shop payment result information (operation C15). Similarly, the terminal payment result information transmission processor 1137 transmits, to the terminal 20 via the communication I/F 14, terminal payment succeeded information as the terminal payment result information (operation C17). Next, the payment management processor 113 ends the first payment management process.

Conversely, when the payment result is "failed" (operation C13: failed), the shop payment result information transmission processor 1136 transmits, to the shop code reader device 50 via the communication I/F 14, shop payment failed information as the shop payment result information (operation C19). Similarly, the shop payment result information transmission processor 1137 transmits, to the terminal 20 via the communication I/F 14, terminal payment failed information as the shop payment result information (operation C21). Next, the payment management processor 113 ends the first payment management process.

When receiving the shop payment result information from the server 10 via the communication I/F 54 (operation B15), the shop payment processor 513 determines the payment result (operation B17), and when the payment result is "succeeded" (operation B17: succeeded), executes a first succeeded payment notification process (operation B19). Next, the shop payment processor 513 ends the first shop payment process.

Conversely, when the payment result is "failed" (operation B17: failed), the shop payment processor 513 executes a failed payment notification process (operation B21). Next, the shop payment processor 513 ends the first shop payment process.

When receiving the terminal payment result information from the server 10 via the communication I/F 22 (operation A21), the payment application processor 213 determines the payment result (operation A23), and when the payment result is "succeeded" (operation A23: succeeded), executes the succeeded payment notification process (operation A25).

Subsequently, the payment application processor 213 determines whether or not to display the payment record (operation A27). More specifically, when, not as a limitation but as an example, the user's payment record reviewing operation to the input and output device 23 is detected, a determination is made to display the payment record.

When determining to display the payment record (operation A27: Yes), the payment application processor 213 executes a payment record display process (operation A29). Next, the payment application processor 213 ends the first payment application process.

Conversely, when the payment result is "failed" (operation A23: failed), the payment application processor 213 executes the failed payment notification process (operation A26). Next, the payment application processor 213 ends the first payment application process.

Next, when determining in A3 that the payment type is "reading terminal code" (operation A3: read terminal code), the code read processor 2133 activates an application code reader in accordance with the user's operation, and executes a process to read the terminal read code (the first type terminal read code or the second type terminal read code) (operation A31).

Subsequently, the payment application processor 213 executes a code information obtainment process (operation A33). More specifically, various information contained in the read terminal read code by decoding (decrypting) the data from the terminal read code read by the application code reader.

Next, the payment application processor 213 accesses the payment page via the communication I/F 22 based on the payment page URL obtained from the read terminal read code (operation A35).

The payment management processor 113 determines the predeterminate payment information in accordance with access to the payment page from the terminal 20 (operation C33). More specifically, with reference to the terminal read code management database 1593, the information stored in association with this payment page is obtained. Next, the payment management processor 113 transmits the predeterminate payment information according to the determined result to the terminal 20 via the communication I/F 14 (operation C35).

In this case, when the information associated with the payment page is information on the shop that adopts the first type terminal read code, the payment management processor 113 transmits first type predeterminate payment information containing therein the payment predeterminate shop and the predeterminate payment amount to the terminal 20 via the communication I/F 14. Conversely, when the information associated with the payment page is information on the shop that adopts the second type terminal read code, the payment management processor 113 transmits second type predeterminate payment information (which does not contain the predeterminate payment amount) containing the payment predeterminate shop to the terminal 20 via the communication I/F 14.

When receiving the predeterminate payment information from the server 10 via the communication I/F 22 (operation A37), the payment application processor 213 determines the type of the received predeterminate payment information (operation A39). Next, when the type of the predeterminate payment information is the "second type predeterminate payment information" (operation A39: second type), such a processor executes the predeterminate payment amount setting process (operation A41). More specifically, based on the amount entering operation by the user of the own terminal 20 to the input and output device 23, the total amount of the to-be-purchased commodities is set as the "predeterminate payment amount".

After operation A41 or when the type of the predeterminate payment information is the "first type predeterminate payment information" (operation A39: first type), the payment application processor 213 executes a first authentication skip determination process in accordance with the authentication skip determination process program 2845 stored in the storage 28 (operation A9). Next, the payment application processor 213 executes the processes in operations A11 to A17.

Subsequently, the payment application processor 213 transmits first payment request information containing therein, not as limitations but as examples, the user ID and payment confirmation information to the server 10 in the payment page (operation A43). When, however, the process in operation A41 is executed, the set predeterminate payment amount is also contained in the first payment request information, and is transmitted to the server 10. Subsequently, the payment application processor 213 executes the process subsequent to operation A21.

The payment management processor 113 executes the payment process (operation C11) when the first payment request information is received from the terminal 20 via the communication I/F 14 (operation C37). Next, the payment management processor 113 transitions the process to the process subsequent to operation C13.

When determining in B3 that the payment type is not "displaying terminal code" (operation B3: No) in FIG. 3AC, the shop payment processor 513 transitions the process to operation B15 in FIG. 3AD.

The case in which the payment type is not "displaying terminal code" is a case in which the payment type is "reading terminal code". In this case, not as limitations but as examples, the sales staff of the shop may instruct the user of the terminal 20 to read the terminal read code, and the user of the terminal 20 may activate the application code reader of the terminal 20 to read the terminal read code.

Note that as described above, either one type of code in the first type terminal read code and the second type terminal read code may be utilized as the terminal read code.

In this case, since the predeterminate payment information transmitted to the terminal 20 from the server 10 becomes only one type in operation C35 in FIG. 3AE, the determination on the type of the predeterminate payment information at the terminal 20 becomes unnecessary, operation A39 in FIG. 3AE may be omitted.

Moreover, when only the first type terminal read code is applied, since the setting of the predeterminate payment amount at the terminal 20 becomes unnecessary, operation A41 in FIG. 3AE may be also omitted.

Advantageous Effects of First Example Embodiment

According to the first example embodiment, the terminal 20 which executes the authentication process (not as a limitation but as an example display process) for electronic payment (not as a limitation but as an example payment) to the user of the terminal 20, and which receives information on the payment by the IMS money (not as a limitation but as an example electronic money) via the communication I/F 22 (not as a limitation but as an example communication interface of the terminal) based on the result of the authentication process obtains information different from the authentication password (not as a limitation but as an example authentication information to authenticate the user of the terminal). Next, the terminal 20 executes the authentication skip determination based on the obtained information, and is configured to, when the authentication skip condition is satisfied, receive the payment result by the server 10 (not as a limitation but as example information the payment by electronic money) via the communication I/F 22 without the authentication process.

An example advantageous effect obtained by such a structure is that the terminal can easily receive the information on the payment by electronic money without executing a display process relating to the execution of the authentication to the user of the terminal regarding the payment by electronic money. Moreover, the terminal becomes unnecessary to execute a display process regarding the payment by electronic money by obtaining the different information from the authentication information to authenticate the user of the terminal, and thus the process load on the terminal can be reduced. Moreover, since it is unnecessary to execute a display process one by one regarding the payment by electronic money, the payment can be promptly and smoothly made, thereby improving the user friendliness.

Moreover, according to the first example embodiment, a structure is described in which the different information (not as a limitation but as example different information from the authentication information) from the authentication password contains the information on the IMS money (not as a limitation but as example information on an electronic money).

An example advantageous effect accomplished according to such a structure is that the terminal becomes unnecessary to execute a display process relating to the execution of the authentication to the user of the terminal regarding the payment by electronic money by obtaining the information on an electronic money, and thus the process load on the terminal can be reduced.

Furthermore, according to the first example embodiment, a structure is described in which the above-described information on the IMS money contains the information on the amount of the IMS money associated with the terminal 20 or with the user of the terminal 20 (not as a limitation but as example information on the amount of electronic money associated with the terminal or with the user of the terminal).

An example advantageous effect accomplished according to such a structure is that the terminal is unnecessary to execute a display process relating to the execution of the authentication to the user of the terminal regarding the payment by electronic money by obtaining the information on the amount of electronic money, and thus the process load on the terminal can be reduced. Moreover, since the information on the amount of electronic money relates to the terminal or the user of the terminal, the terminal can appropriately execute the process relating to the payment based on the information on appropriate the amount of electronic money.

Still further, according to the first example embodiment, a structure is described in which the above-described information on the amount of IMS money contains information on the daily upper limit set amount of money (not as a limitation but as example information on the set amount of set electronic money).

An example advantageous effect obtained by such a structure is that the terminal becomes unnecessary to execute a display process relating to the execution of the authentication to the user of the terminal regarding the payment by electronic money by obtaining the information on the set amount of the set electronic money, and thus the process load on the terminal can be reduced.

Yet still further, according to the first example embodiment, a structure is described in which the terminal 20 skips the authentication process until an excess beyond the daily upper limit set amount of money (not as a limitation but as an example set amount of money) occurs.

An example advantageous effect accomplished according to such a structure is that since the terminal does not display relating to the execution of the authentication until an excess beyond the set amount of set electronic money regarding the payment by electronic money, and thus the process load on the terminal can be reduced, while at the same time, the user friendliness can be improved. Conversely, when an excess beyond the set amount of money occurs regarding the payment by electronic money, a display relating to the execution of the authentication is displayed in some cases, which prompts the user to pay attention that an excess beyond the set amount of money occurs so as to improve payment security.

Moreover, according to the first example embodiment, a structure is described in which the above-described information on the IMS money contains the information on the balance of the IMS money associated with the terminal 20 or with the user of the terminal 20 (not as a limitation but as example information on the balance of the electronic money associated with the terminal or with the user of the terminal).

An example advantageous effect accomplished according to such a structure is that the terminal is unnecessary to execute a display process relating to the execution of the authentication to the user of the terminal regarding the payment by electronic money by obtaining the information on the balance of the electronic money, and thus the process load on the terminal can be reduced. Moreover, since the information on the balance of the electronic money is associated with the terminal or with the user of the terminal, the terminal can appropriately execute the process relating to the payment based on the information on the appropriate balance of the electronic money.

Furthermore, according to the first example embodiment, a structure is described in which the terminal 20 skips the authentication process when the balance of the IMS money is equal to or smaller than the set amount of money or is smaller than the set amount of money.

An example advantageous effect accomplished according to such a structure is that since the terminal skips the display relating to the execution of the authentication when the balance of the electronic money is equal to or smaller than the set amount of money or is smaller than the set amount of money regarding the payment by electronic money, the process load on the terminal can be reduced. Moreover, when, for example, the balance of the electronic money is less, an expensive payment cannot be made, and the possibility of risk can be considered as low. Hence, the user friendliness can be improved by skipping the display relating to the execution of the authentication while the safeness is secured.

Still further, according to the first example embodiment, a structure is described in which the terminal 20 executes the authentication process when the automatic charge setting (not as a limitation but as a setting of automatically charging the electronic money to the terminal) is made at the terminal 20 and when the balance of the IMS money is equal to or smaller than the set amount of money or is smaller than the set amount of money.

An example advantageous effect accomplished according to such a structure is that when the electronic money of the terminal becomes equal to or smaller than the set amount of money or is smaller than the set amount of money and when the electronic money is automatically charged to the terminal, the electronic money is automatically charged to the terminal when the amount of money becomes less. This enables an expensive payment, causing the possibility of risk. Hence, execution of the display relating to the execution of the authentication can cause the user to pay attention that an expensive payment is enabled.

Still further, according to the first example embodiment, a structure is described in which the above-described information on the IMS money contains the information on the frequency or on the number of times of payment by IMS money (not as a limitation, information on the frequency or on the number of times of payment by electronic money).

An example advantageous effect accomplished by such a structure is that the terminal becomes unnecessary to execute the display process relating to the execution of the authentication to the user of the terminal regarding the payment by electronic money by obtaining the information on the frequency or on the number of times of payment by electronic money, and thus the process load on the terminal can be reduced. Moreover, when, for example, the frequency or the number of times of payment by electronic money is high, a possibility that the same user is making the payment by electronic money is high, and the possibility of risk can be considered as low. Hence, the user friendliness can be improved by skipping the display process while the safeness is secured.

Yet still further, according to the first example embodiment, a structure is described in which the above-described information on the IMS money contains the information on the last payment date and time by IMS money (not as a limitation but as example information on the date and time at which the payment is made in past by electronic money).

An example advantageous effect accomplished according to such a structure is that the terminal becomes unnecessary to execute the display process relating to the execution of the authentication to the user of the terminal regarding the payment by electronic money by obtaining the information on the time at which the payment is made in past by electronic money, and thus the process load on the terminal can be reduced.

Moreover, according to the first example embodiment, a structure is described in which the terminal 20 skips the authentication process when the present time is within the set time from the last payment date and time by IMS money.

An example advantageous effect accomplished according to such a structure is that the terminal becomes unnecessary to execute the display relating to the execution of the authentication when the present time is within the set time from the time at which the payment is made in past by electronic money regarding the payment by electronic money, and thus the process load on the terminal can be reduced. Moreover, when the time has not elapsed so much from the time at which the payment is made in past by electronic money, a possibility that the same user makes the payment again is high, and the possibility of risk can be considered as low. Hence, the user friendliness can be improved by skipping the display relating to the execution of the authentication while the secureness is secured.

Moreover, according to the first example embodiment, a structure is disclosed in which the above-described information on the IMS money contains the information on the location at which the payment is made in past by IMS money (not as a limitation, the information on the location at which the payment is made in past by electronic money).

An example advantageous effect accomplished according to such a structure is that the terminal becomes unnecessary to execute the display process relating to the execution of the authentication to the user of the terminal regarding the payment by electronic money by obtaining the information on the location at which the payment is made in past by electronic money, and thus the process load on the terminal can be reduced.

Furthermore, according to the first example embodiment, a structure is disclosed in which the above-described information on the location at which the payment is made in past by IMS money contains information on the shop at which the payment is made in past by IMS money (not as a limitation, the information on the shop at which the payment is made in past by electronic money).

An example advantageous effect accomplished according to such a structure is that the terminal becomes unnecessary to execute the display process relating to the execution of the authentication to the user of the terminal regarding the payment by electronic money by obtaining the information on the shop at which the payment is made in past by electronic money, and thus the process load on the terminal can be reduced.

Still further, according to the first example embodiment, a structure is disclosed in which the terminal 20 skips the authentication process based on the position information on the shop at which the payment is made in past by IMS money (not a limitation but as example information on the location at which the payment is made in past by electronic money), and on the position information on the terminal 20 calculated by the position calculation processor 217 (not as a limitation but as example information on the position of the terminal).

An example advantageous effect accomplished according to such a structure is that the terminal skips the display relating to the execution of the authentication regarding the payment by electronic money, based on the information on the shop at which the payment is made in past by IMS money and on information on the terminal, and thus the process load on the terminal can be reduced. Moreover, when the position of the terminal is not apart from the shop at which the payment is made in past by electronic money, a possibility that the user is attempting to make the payment at the same shop is high, and the possibility of risk can be considered as low. Hence, the user friendliness can be improved by skipping the display process while the safeness is secured.

Yet still further, according to the first example embodiment, a structure is disclosed in which the above-described information on the IMS money contains the information on the location at which the authentication to make the payment by IMS money is executed (not as a limitation but as example information on the location at which the authentication to make the payment by electronic money).

An example advantageous effect accomplished according to such a structure is that the terminal becomes unnecessary to execute the display process relating to the execution of the authentication to the user of the terminal regarding the payment by electronic money by obtaining the information on the location at which the authentication to make the payment by electronic money, and thus the process load on the terminal can be reduced. Moreover, a possibility that the authentication is executed again for the same user is high in the case of the location at which the authentication was executed to make the payment by electronic money, and thus the possibility of risk can be considered as low. Hence, the user friendliness can be improved by skipping the display process while the secureness is secured.

Moreover, according to the first example embodiment, a structure is disclosed in which the above-described information different from the authentication password contains the information on the location.

An example advantageous effect accomplished according to such a structure is that the terminal becomes unnecessary to execute the display process relating to the execution of the authentication to the user of the terminal regarding the payment by electronic money by obtaining the information on the location, and thus the process load on the terminal can be reduced.

Furthermore, according to the first example embodiment, a structure is disclosed in which the above-described information on the location contains the information on the location of the shop at which a commodity is purchased.

An example advantageous effect accomplished according to such a structure is that the terminal becomes unnecessary to execute the display process relating to the execution of the authentication to the user of the terminal regarding the payment by electronic money by obtaining the information on the location at which a commodity is purchased, and thus the process load on the terminal can be reduced. Moreover, the information on the location at which the commodity is purchased can be utilized to determine, for example, whether or not such a location is a shop that is selling inexpensive commodities like fast-moving-consumer commodities. This can be a reference for whether or not to execute the authentication to the user of the terminal.

Moreover, according to the first example embodiment, a structure is disclosed in which the above-described information on the location at which the commodity is purchased contains the information on the shop that sells the commodity.

An example advantageous effect accomplished according to such a structure is that the terminal becomes unnecessary to execute the display process relating to the execution of the authentication to the user of the terminal regarding the payment by electronic money by obtaining the information on the shop that sells the commodity, and thus the process load on the terminal can be reduced. Moreover, the information on the shop that sells the commodity can be utilized as the information to determine, for example, whether or not such is selling inexpensive commodities like fast-moving-consumer commodities. This can be a reference for whether or not to execute the authentication to the user of the terminal.

Furthermore, according to the first example embodiment, a structure is disclosed in which the terminal 20 skips the authentication process when the payment predeterminate shop is the set shop or the shop of the first particular business category (not as a limitation but an example first location), but executes the authentication process until the set time elapses from the payment date and time at the shop of the second particular business category (not as a limitation but as an example second location) different from the foregoing shops.

An example advantageous effect accomplished by such a structure is that, regarding the payment by electronic money, when obtaining the information on the first location, the terminal skips the display relating to the execution of the authentication, but when obtaining the information on the second location different from the first location, executes the display relating to the authentication until the set time elapses after the payment by electronic money is made at the second location. Accordingly, when, for example, the user left the terminal at the second location, or when the user lost the terminal at the second location, a fraudulent payment by a third person that obtains such a terminal can be prevented.

Still further, according to the first example embodiment, a structure is disclosed in which the above-described information different from the authentication password contains the information on the commodity.

An example advantageous effect accomplished according to such a structure is that the terminal becomes unnecessary to execute the display process relating to the execution of the authentication to the user of the terminal regarding the payment by electronic money by obtaining the information on the commodity, and thus the process load on the terminal can be reduced. Moreover, a determination can be made on whether an expensive commodity is purchased or an inexpensive commodity is purchased based on the information on the commodity. This can be a reference for whether or not to execute the authentication to the user of the terminal.

Yet still further, according to the first example embodiment, a structure is disclosed in which the above-described information different from the authentication password contains the information on the setting for the terminal 20 or for the payment application stored in the terminal 20 (not as a limitation but as example information on the setting for the terminal or for the application stored in the terminal).

An example advantageous effect accomplished according to such a structure is that the terminal becomes unnecessary to execute the display process relating to the execution of the authentication to the user of the terminal regarding the payment by electronic money by obtaining the information on the setting for the terminal or for the application stored in the terminal, and thus the process load on the terminal can be reduced. Moreover, when, for example, the information on the setting for the terminal or for the application stored in the terminal is set by the user, the user's intent can be reflected, improving the user friendliness.

Moreover, according to the first example embodiment, a structure is disclosed in which the above-described information different from the authentication password contains the information which is set in the terminal 20 and which indicates whether or not the terminal 20 is being locked (not a limitation but example information on the security of the terminal which is set to the terminal).

An example advantageous effect accomplished according to such a structure is that the terminal becomes unnecessary to execute the display process relating to the execution of the authentication to the user of the terminal regarding the payment by electronic money by obtaining the information on the security of the terminal which is set to the terminal, and thus the process load on the terminal can be reduced. Moreover, when, for example, the information on the security of the terminal is the information on the authentication to the user of the terminal, the user friendliness can be improved by omitting the display process relating to the execution of the authentication to the user of the terminal.

Furthermore, according to the first example embodiment, a structure is disclosed in which the above-described information different from the authentication password contains the information on the authentication setting for the terminal which is set in the terminal 20 or the information on the authentication setting for payment set for the payment application stored in the terminal 20 (not as a limitation but as example information to skip the execution of the authentication set for the terminal or for the application stored in the terminal).

An example advantageous effect accomplished according to such a structure is that the terminal becomes unnecessary to execute the display process relating to the execution of the authentication to the user of the terminal regarding the payment by electronic money by obtaining the information to skip the execution of the authentication set for the terminal or for the application stored in the terminal, and thus the process load on the terminal can be reduced.

Still further, according to the first example embodiment, a structure is disclosed in which the above-described information different from the authentication password contains the information transmitted from the server 10 relating to the payment by IMS money (not as a limitation but as an example server that manages a payment by electronic money).

An example advantageous effect accomplished according to such a structure is that the terminal becomes unnecessary to execute the display process relating to the execution of the authentication to the user of the terminal regarding the payment by electronic money by obtaining the information transmitted from the server relating to the payment by electronic money, and thus the process load on the terminal can be reduced.

Yet still further, according to the first example embodiment, a structure is disclosed in which the terminal 20 skips the payment process based on the information different from the authentication password, displays the terminal displayed code to make a payment by IMS money (not as a limitation but as example code information to make a payment by electronic money) on the display 24, and receives the information on the payment result by IMS money via the communication I/F 22 based on the reading of the terminal displayed code by the code reader 58 (not as a limitation but an example code reader) of the shop code reader device 50.

An example advantageous effect accomplished by such a structure is that the terminal can easily receive, regarding the payment by electronic money, the information on the payment by electronic money by simply causing the code information to make a payment by electronic money and displayed on the display area of the terminal to be read by the code reader.

Moreover, according to the first example embodiment, a structure is disclosed in which the terminal 20 displays, on the display 24, a message, etc., that instruct the user of the terminal 20 to cause the terminal displayed code to be read by the code reader 58 of the shop code reader device 50 (not as a limitation but as an example display relating to the reading of the code information), and obtains the information different from the authentication password based on the reading of the terminal read code by the code reader 58 of the shop code reader device 50.

An example advantageous effect accomplished by such a structure is that the terminal can notify, the user of the terminal, of the information on the reading of the code information. Moreover, by causing the code information displayed on the display area of the terminal to be read by the code reader, the terminal can easily obtain the different information from the authentication information regarding the payment by electronic money.

Furthermore, according to the first example embodiment, a structure is disclosed in which the above-described information different from the authentication password contains a predeterminate payment amount (not as limitations but as example information on the amount of money for the to-be-purchased commodity or the total amount of money for the to-be-purchased commodities).

An example advantageous effect accomplished by such structure is that the terminal can easily obtain, regarding the payment by electronic money, the information on the amount of money for the to-be-purchased commodity or the total amount of money for the to-be-purchased commodities by simply causing the code information displayed on the display area of the terminal to be read by the code reader.

Still further, according to the first example embodiment, a structure is disclosed in which the terminal 20 skips the authentication process when the predeterminate payment amount is equal to or smaller than the set amount of money or is smaller than the set amount of money.

An example advantageous effect accomplished by such a structure is that the terminal skips the display relating to the authentication regarding the payment by electronic money when the total amount of money for the to-be-purchased commodities is equal to or smaller than the set amount of money or is smaller than the set amount of money set by the terminal, and thus the user friendliness can be improved. Moreover, when the total amount for the to-be-purchased commodities is a small amount of money, the possibility of risk can be considered as low. Hence, the user friendliness can be improved by skipping the display relating to the execution of the authentication while the secureness is secured.

Yet still further, according to the first example embodiment, a structure is disclosed in which the terminal 20 skips the authentication process when there is the purchase record of the to-be-purchased commodity (not as a limitation but as an example case in which the commodity matches the commodity purchased by the user more than once).

An example advantageous effect accomplished by such a structure is that the terminal skips, regarding the payment by electronic money, the display relating to the execution of the authentication when commodity matches the commodity purchased by the user of the terminal more than once, and thus the user friendliness can be improved. Moreover, when the same commodity is to be purchased, the possibility of risk can be considered as low. Hence, the user friendliness can be improved by skipping the display relating to the execution of the authentication while the safeness is secured.

Moreover, according to the first example embodiment, a structure is disclosed in which the terminal 20 receives and obtains, via the communication I/F 22, the information which is transmitted from the server 10 that manages the payment by IMS money and which is different from the authentication password based on the reading of the terminal displayed code.

An example advantageous effect accomplished by such a structure is that the terminal can easily obtain, regarding the payment by electronic money, the information which is transmitted from the server that manages the payment by electronic money and which is different from the authentication information by simply causing the code information to be read.

Furthermore, according to the first example embodiment, a structure is disclosed in which the above-described information on the payment by IMS money contains the information which is transmitted from the server 10 (not as a limitation but as an example external server) an which indicates that payment by IMS money is made.

An example advantageous effect accomplished by such a structure is that the terminal can obtain the information indicating that the payment by electronic money is made from the external server.

Moreover, according to the first example embodiment, a structure is disclosed in which the terminal 20 that executes the authentication relating to the payment by the user of the terminal 20 obtains information necessary to execute the authentication skip determination, and executes the authentication process to the user of the terminal 20 when the obtained information does not satisfy the authentication skip condition, and receives the information on the IMS money via the communication I/F 22 based on the authentication result. Conversely, when the obtained information satisfies the authentication skip condition, the authentication to the user of the terminal 20 is skipped, and the information on the IMS money is received via the communication I/F 22.

An example advantageous effect accomplished by such a structure is that, unlike the case in which the condition is not satisfied, the authentication to the user of the terminal is skipped when the information obtained by the terminal satisfies the condition, and thus the process load on the terminal can be reduced. Moreover, since the user of the terminal does not need to execute an operation, etc., necessary for the authentication, the user friendliness can be improved.

First Modified Example (1)

According to the first example embodiment, although the type of the authentication to the user of the terminal 20 is the password authentication, and the display process relating to the execution of this authentication is the process to display the authentication screen to enter the authentication password, the present disclosure is not limited to this example. In addition to such an example, the type of the authentication to the user of the terminal 20 may be, for example, a biometric authentication, such as a face authentication, a fingerprint authentication, or a voice authentication, and the process to display the authentication screen necessary to execute such a biometric authentication may be the display process relating to the execution of the authentication to the user of the terminal.

Moreover, not as a limitation but as an example, the process to display the authentication screen in the authentication process to obtain the account like the user ID to utilize the payment service may be the display process relating to the execution of the authentication to the user of the terminal. Next, when the result of the authentication process is "OK", the terminal 20 may receive the information on the account to utilize the payment service from the server 10 as the information on the payment by electronic money.

Advantageous Effect of First Modified Example (1)

An example advantageous effect according to this modified example is that the terminal can also easily receive the information on the payment by electronic money without executing the display process relating to the execution of the authentication to the user of the terminal for the authentication different from the authentication that utilizes the authentication password.

Moreover, the terminal can easily obtain the information necessary to utilize the payment service as the information on the payment by electronic money without executing the display process relating to the execution of authentication to the user of the terminal.

First Modified Example (2)

According to the first example embodiment, although the description has been given of a case in which the electronic money is the IMS money, the present disclosure not limited to this case. The electronic money is not limited to the IMS money, and may be a concept involving all payment means available by the user instead of cash, such as not as limitations but as examples, a so-called virtual money, a money within a game, a gift code transmitted (presented) from the other terminal 20 as a gift, and a point transmitted (gifted) to the user by various point services including the above-described IMS point.

Advantageous Effect of First Modified Example (2)

An example advantageous effect accomplished by this modified example is that the terminal can easily receive, regarding the payment by electronic money different from the electronic money associated with the IMS, the information on the payment by electronic money without executing the display process relating to the execution of the authentication to the user of the terminal.

First Modified Example (3)

According to the first example embodiment, although the description has been given of a case in which the terminal displayed code and the terminal read code are two-dimensional codes, respectively, the present disclosure is not limited to this case. At least one of the terminal displayed code and the terminal read code may be, not as a limitation but as an example, a one-dimensional code (not as a limitation but as an example, a bar code).

Moreover, at least one of the terminal displayed code and the terminal read code may be a letter code represented by the letter string of information stored in a code, the terminal displayed code may be read by the camera at a shop for letter recognition, and the terminal read code may be read by the camera 27 of the terminal 20 for letter recognition, and thus the information contained in each code may be obtained.

Advantageous Effect of First Modified Example (3)

An example advantageous effect accomplished by this modified example is that the payment at the terminal can be executed based on the terminal displayed code and the terminal read code both different from the two-dimensional code. Moreover, even if the terminal or the shop code reader device is not compatible with the two-dimensional code, the payment by electronic money can be executed.

First Modified Example (4)

According to the first example embodiment, although the description has been given of a case in which the information on the payment and transmitted from the server 10 is stored in the storage 28 of the terminal 20 as the payment record data, and the terminal 20 executes the authentication skip determination based on the information on the payment and contained in such payment record data, the present disclosure is not limited to this case.

More specifically, the storage 28 of the terminal 20 may be caused not to store the payment record data. In this case, the terminal 20 requests, to the server 10, information necessary for the authentication skip determination, and may execute the authentication skip determination based on the information obtained from the server 10.

Advantageous Effect of First Modified Example (4)

An example advantageous effect accomplished by this modified example is that since it is unnecessary to store the information on the record of the payment by electronic money in the terminal, the storage capacity of the terminal can be saved.

First Modified Example (5)

In the first example embodiment, the shop position information may be contained in the shop data 2855 distributed to the terminal 20 from the server 10, and the terminal 20 may execute the authentication skip determination based on the shop position information contained in the shop data 2855, and on the position information of the terminal 20 (referred to as "terminal position information" below) calculated by the position calculation processor 217.

More specifically, when the determination is made on, for example, the authentication skip condition that is "the payment predeterminate shop is a set shop" with the condition No. "SP2-2" contained in the condition category No. "SP2", a determination is enabled on whether or not the latest calculated position of the terminal 20 matches the position of the set shop in the shop data 2855.

The same is true of the other authentication skip conditions relating to the shop and the location.

Advantageous Effect of First Modified Example (5)

An example advantageous effect accomplished by this modified example is that the terminal can easily determine whether or not the authentication skip condition is satisfied based on the terminal position information calculated by the own terminal 20, and on the shop position information obtained from the exterior.

First Modified Example (6)

According to the first example embodiment, the daily upper limit set amount of money is the upper limit set amount of money that is the threshold for the total amount of money for the amount of money for the payments (the paid amount of money) in a day, but the present disclosure is not limited to this case.

More specifically, the daily upper limit set amount of money may be, not as a limitation but as an example, an upper limit set amount of money that is a threshold amount of money for the total amount of money for the amount of money for payments (the paid amount of money) in a day and for the total amount of money for the amount of money to be paid (the predeterminate payment amount).

Moreover, it is not always necessary that the upper limit set amount of money is the daily upper limit set amount of money, or may be the upper limit set amount of money for a predetermined past time period (e.g., a past week, past two weeks, or a past month).

Still further, the upper limit set amount of money may be the set amount of money for the amount of money to be paid (the predeterminate payment amount), i.e., the amount of money for the single payment, and the authentication skip determination may be made based on the authentication skip condition that is "the predeterminate payment amount is equal to or smaller than the set amount of money (or is smaller than the set amount of money)". This enables the authentication process to be skipped when the user of the terminal 20 purchases an inexpensive commodity.

Advantageous Effect of First Modified Example (6)

An example advantageous effect accomplished by this modified example is that, a determination is enabled on whether or not to execute the display relating to the execution of the authentication based on not only the amount money paid in past (the payment amount) but also the amount of money to be paid (the predeterminate payment amount).

Moreover, the user friendliness can be improved by skipping the display relating to the execution of the authentication until the amount of money for single payment exceeds the set amount of money.

First Modified Example (7)

Various authentication skip conditions described in the first example embodiment are merely examples, and can be added, deleted or changed as appropriate.

More specifically, not as a limitation but as an example, the authentication skip condition that is "the present date and time is within the set time from the last payment date and time" with the condition No. "SP1-1" may be changed to "the present date and time is within the set time from the last authentication date and time". This is because a situation may occur in which, for example, after the authentication is executed at the terminal 20 when the user of the terminal 20 purchases a given commodity (e.g., a boxed food), the authentication at the terminal 20 becomes necessary again to purchase another commodity (e.g., a coffee).

Moreover, it is not always necessary that the above-described "last authentication date and time" is limited to the data and time at which the authentication for payment is executed at last, and the "last authentication date and time" in the above-described authentication skip condition may be the date and time at which a different type of authentication from the authentication for payment, such as, not as limitations but as examples, the date and time at which the authentication for money transfer when the IMS money is transferred between individual persons at last according to a fourth example embodiment to be described later, the date and time at which the authentication for canceling the locking for the OS of the terminal 20 is executed at last, and the date and time at which the authentication for canceling the locking for the payment application is executed at last.

Furthermore, not as limitations but as examples, the "last payment date and time" in the authentication skip condition with the condition No. "SP1-1" may be the "last charging date time" that is the latest date and time at which the IMS money is charged by the user, and the "last payment related operation date and time" that is the latest date and time at which the user's operation relating to the payment is given in the payment application. When too much time has not elapsed from the date and time at which the IMS money is charged at last, since the possibility that the user charges the IMS money for payment is high, and thus it is reasonable to skip the authentication process. Moreover, when a so much time has not elapsed from the date and time at which the user's operation relating to the payment is given within the payment application, since the possibility that the user plans to make a payment and gives the operation, it is reasonable to skip the authentication process.

Moreover, the "set time slot" in the authentication skip condition with the condition No. "SP1-2" can be a concept involving a particular day of the week and a particular date and time. Not as limitations but as examples, the particular day of the week may be Saturday or Sunday. This is because that, on Saturday or Sunday, there is a tendency such that many users go out for shopping and for meal, and the opportunity of payment to be executed increases. Moreover, the particular date and time may be the Christmas day (including the Christmas Evening), or the new year's first three days, etc. This is because that, in the Christmas day, there is a tendency such that many users go out for purchase a gift and for dinner, and in the new year's first three days, many users go out for new year's sale, and the opportunity of payment to be executed in respective days increases.

Furthermore, the possibility of risk such that the user of the terminal 20 has the own terminal 20 utilized by a third person, an expensive commodity is purchased by payment, and the purchased commodity is converted into cash is considerable. Hence, not as a limitation but as an example, the authentication skip condition that is "the payment predeterminate shop is not a shop selling a commodity that is likely to be converted into cash" can also be added. The commodities that is likely to be converted into cash are commodities, such as a jewel and a watch, and when the payment is to be made at the shop (e.g., a jewel shop, a watch shop, etc.) selling such a commodity, the terminal 20 can be caused not to skip the authentication process.

Still further, the authentication skip condition relating to weather, etc., can be added. For example, since the number of users utilizing a public transportation in a rainy day and a snowy day, the possibility of risk such that the occasion of the terminal 20 being left increases. Hence, the authentication skip condition that is, not as a limitation but as an example, "the weather of the present day is not rain or snow" may be added, and the authentication process may be caused not to be skipped on the rainy day or on the snowy day.

Advantageous Effect of First Modified Example (7)

An example advantageous effect accomplished by this modified example is that the terminal skips, regarding the payment by electronic money, the display relating to the execution of the authentication not only when the present date and time is within the set time from the date and time at which the authentication for payment is executed at last but also when the present date and time is within the set time from the date and time at which the different type of authentication from the authentication for payment is executed at last. This further improves the user friendliness.

Moreover, the user friendliness can be further improved regarding the payment by electronic money by skipping the display relating to the execution of the authentication when the present date and time is within the set time from the date and time at which the charging of electronic money is executed at last, and when the present date and time is within the set time from the date and time at which the operation relating to the payment is given in the application at last.

Furthermore, the user friendliness can be further improved by skipping the display relating to the execution of the authentication in the particular day of the week and in the particular date and time.

Still further, an appropriate payment can be executed having the balance between the user friendliness and the possibility of risk taken into consideration by skipping the display process relating to the execution of the authentication for the user of the terminal based on the information having the possibility of risk taken into consideration.

First Modified Example (8)

In the process in FIG. 3AC described according to the first example embodiment, when the payment type is "displaying terminal code", the terminal 20 executes the first authentication skip determination process at the timing after receiving the terminal displayed code from the server 10 (after operation A7), but the present disclosure is not limited to this case.

The terminal 20 may execute, not as a limitation but as an example, the first authentication skip determination process at the timing before transmitting the terminal displayed code generation request information to the server 10 (before operation A5 in FIG. 3AC).

Moreover, the terminal displayed code may be not transmitted immediately from the server 10 to the terminal 20 after the terminal 20 transmits the terminal displayed code generation request information to the server 10 (operation A7 in FIG. 3AC), but the authentication skip determination process may be executed before, not as a limitation but as an example, the terminal displayed code is transmitted to the terminal 20 from the server 10.

More specifically, the server 10 transmits the authentication request information to request the authentication to the terminal 20 after receiving the terminal displayed code generation request information transmitted from the terminal 20 (operation C1: Yes in FIG. 3AC). Next, the terminal 20 executes the first authentication skip determination process at the timing after receiving this authentication request information from the server 10.

When the determination to skip the authentication process is made, the terminal 20 skips the authentication process, and transmits authentication skip execution information indicating that the authentication process is skipped to the server 10. Conversely, when the determination not to skip the authentication process is made, the terminal 20 executes the authentication process, and transmits, when the authentication result becomes "OK", authentication succeeded information indicating that the authentication is succeeded to the server 10. Next, after receiving either the authentication skip execution information or the authentication succeeded information from the terminal 20, the server 10 executes the terminal displayed code generation process to generate the terminal displayed code (operation C3 in FIG.

3AC), and transmits the generated terminal displayed code to the terminal 20 (operation C5 in FIG. 3AC).

Note that in this case, after receiving the terminal displayed code generation request information transmitted from the terminal 20 (operation C1: Yes in FIG. 3AC), the server 10 may execute the terminal displayed code generation process to generate the terminal displayed code (operation C3 in FIG. 3AC), and may subsequently transmit the authentication request information to the terminal 20.

As described above, the timing at which the authentication skip determination process is executed at the terminal 20 can be a timing among the timings generally divided into three timings as described above.

Advantageous Effect of First Modified Example (8)

An example advantageous effect accomplished by this modified example is that the terminal can determine, regarding the payment by electronic money, whether or not to execute the display process relating to the execution of the authentication to the user of the terminal based on the information different from the authentication information to authenticate the user of the terminal at any timing among the plurality of timings.

First Modified Example (9)

According to the above-described embodiment, although the information on the to-be-purchased commodity is not transmitted to the terminal 20 from the server 10 for both the payment type "displaying terminal code" and "reading terminal code", and the terminal 20 does not obtain the information on the to-be-purchased commodity, the terminal 20 can be caused to obtain the information on the to-be-purchased commodity by, for example, the scheme to be described below.

More specifically, not as a limitation but as an example, a software capable of identifying the kind of commodity based on an image picked up by an imaging device (or an imaging unit), such as a camera provided as a function of the payment application (referred to as an "application camera" below) or the camera 27 of the terminal 20, is stored in the storage 28 of the terminal 20 in advance.

Regarding the payment type "displaying terminal code", for example, before operation A1 of the first payment application process in FIG. 3AC, in accordance with the user's operation, the terminal 20 activates the application camera or the camera 27, and picks up the image of the to-be-purchased commodity. That is, the user of the terminal 20 picks up, at the code register 60 in the shop, the image of the to-be-purchased commodity by the application camera or by the camera 27. Next, the terminal 20 executes a commodity kind identification process to identify the kind of the commodity from the image (referred to as a "picked-up image" below). Subsequently, the terminal 20 executes the first authentication skip determination process (operation A9) after executing the processes of "operation A3: displaying terminal code to operation A7".

Similarly, regarding the payment type "reading terminal code", for example, before operation A1 of the first payment application process in FIG. 3AC, in accordance with the user's operation, the terminal 20 activates the application camera or the camera 27 to pick up the image of the to-be-purchased commodity. Next, the terminal 20 executes the commodity kind identification process to identify the kind of the commodity from the picked-up image. Subsequently, the terminal 20 executes the first authentication skip determination process (operation A9) after executing the processes of "operation A3: read terminal code to operation A41".

FIG. 3AH is a diagram illustrating example authentication skip condition data 2851 in this case. Although this data structure is similar to that of the authentication skip condition data 2851 in FIG. 3H, portions surrounded by black thickened frames differ therefrom.

More specifically, the allowance "○" is defined for both the payment types "displaying terminal code" and "reading terminal code" regarding the authentication skip condition that is "the to-be-purchased commodity is a fast-moving-consumer commodity" with the condition No. "SP4-1". This is because since the terminal 20 becomes able to identify the kind of commodity by the above-described scheme, the determination can be made on whether or not the to-be-purchased commodity is a fast-moving-consumer commodity based on the identified kind of commodity. Moreover, the importance "B" is defined for the payment type "displaying terminal code", and the importance "A" is defined for the payment type "reading terminal code", respectively.

Moreover, the allowance "○" is defined for the payment type "displaying terminal code" regarding the authentication skip condition that is "there is a purchase record of the to-be-purchased commodity" with the condition No. "SP4-2". This is because since the terminal 20 becomes able to identify the kind of commodity by the above-described scheme, the determination can be made on whether or not there is the purchase record of the to-be-purchased commodity by storing the record of the identified kind of commodity in the storage 28. Moreover, the importance "B" is defined for the payment type "displaying terminal code", and the importance "A" is defined for the payment type "reading terminal code", respectively.

Furthermore, according to the first example embodiment, although whether or not the authentication skip condition with the condition Nos. "SP4-1" and "SP4-2" is determined by the alternative scheme regarding the payment type "reading terminal code", according to the above-described scheme that utilizes the camera, since the terminal 20 can identify the kind of the to-be-purchased commodity, the determination on whether or not these authentication skip conditions are satisfied can be made based on the identification result.

Still further, in addition to the above-described case in which the image of the to-be-purchased commodity is picked up by the camera of the terminal 20, for example, the shop code reader device 50 may be provided with a camera, and the image of the to-be-purchased commodity by the user of the terminal 20 may be picked up by the camera of the shop code reader device 50.

In this case, as one of the schemes, the shop code reader device 50 may identify the kind of the to-be-purchased commodity based on the picked-up image by the camera, and transmit the identified kind of to-be-purchased commodity to the terminal 20.

Moreover, as another scheme, the shop code reader device 50 may transmit the picked-up image by the camera to the terminal 20, and the terminal 20 may identify the kind of the to-be-purchased commodity based on the picked-up image received from the shop code reader device 50.

Advantageous Effect of First Modified Example (9)

This modified example discloses a structure in which the above-described information different from the authentication password contains the information on the commodity sold at the shop (not as a limitation but as example information on the commodity).

An example advantageous effect accomplished by such a structure is that since the terminal becomes unnecessary to execute the display process relating to the execution of the authentication to the user of the terminal based on the information on the commodity, the process load on the terminal can be reduced.

Moreover, according to this modified example, a structure is disclosed in which the terminal 20 obtains the picked-up image of the to-be-purchased commodity picked up by the application camera or by the camera 27 (not as a limitation but as an example imaging device) of the terminal 20, and skips the authentication process based on the obtained picked-up image.

An example advantageous effect accomplished by such a structure is that since the terminal skips the display relating to the execution of the authentication based on the image of the commodity picked up by the imaging device, the process load on the terminal can be reduced. When, for example, the commodity identified from the image picked up by the imaging device is the commodity that has the past purchase record or is a commodity of a particular kind, the user friendliness can be improved by skipping the display relating to the execution of the authentication.

Moreover, according to this modified example, a structure is disclosed in which the above-described information different from the authentication password contains the information on the to-be-purchased commodity (not as a limitation but as example information on the commodity purchased by the user of the terminal).

An example advantageous effect accomplished by such a structure is that since the terminal becomes unnecessary to execute the display process relating to the execution of the authentication to the user of the terminal based on the information on the commodity purchased by the user of the terminal, the process load on the terminal can be reduced.

Furthermore, according to this modified example, a structure is disclosed in which the authentication process is skipped when the terminal 20 obtains the information on the to-be-purchased commodity by the user of the terminal and determines that there is a purchase record of the to-be-purchased commodity.

An example advantageous effect accomplished by such a structure is that since the terminal skips the display relating to the execution of the authentication when the commodity matches the commodity purchased by the user of the terminal more than once, the process load on the terminal can be reduced. Moreover, since the possibility of risk can be considered as low when the same commodity is purchased, the user friendliness can be improved by skipping the display relating to the execution of the authentication while the safeness is secured.

Still further, according to this modified example, a structure is disclosed in which the information on the to-be-purchased commodity by the user of the terminal 20 is obtained, and when the determination is made that the commodity is a fast-moving-consumer commodity, the authentication process is skipped.

An example advantageous effect accomplished by such a structure is that since the terminal skips the display relating to the execution of the authentication when the commodity purchased by the user of the terminal is fast-moving-consumer commodity, the process load on the terminal can be reduced. Moreover, since the possibility of risk can be considered as low when the fast-moving-consumer commodity is purchased, the userfriendliness can be improved by skipping the display relating to the execution of the authentication while the safeness is secured.

Note that in addition to the above-described scheme, as a scheme to identify, by the terminal 20, the commodity purchased by the user of the terminal 20 and the commodity kind, not as a limitation but as an example, a scheme that utilizes a near-field wireless communication or a non-contact communication may be applicable.

More specifically, not as a limitation but as an example, an RF tag (e.g., an IC tag) that stores the commodity identification information or the commodity kind identification for each commodity to be sold at the shop or each commodity kind is embedded. Moreover, the terminal 20 is provided with a reader and writer compatible with the RF tag. Next, the terminal 20 scans, by radio wave, the RF tag embedded in the commodity purchased by the user, and obtains the commodity identification information and the commodity kind identification information both stored in the RF tag to identify the commodity purchased by the user, and the commodity kind thereof.

First Modified Example (10)

In the first example embodiment, a request to skip the authentication process of the terminal 20 may be transmitted to the server 10 at the shop, and the server 10 may transmit information to skip the authentication process (referred to as "authentication skip information" below) to the terminal 20.

According to this modified example, it becomes possible for the terminal 20 to skip the authentication process based on the authentication skip information transmitted from the server 10. Hence, when the terminal 20 owned by the other person is utilized to purchase the commodity, or when the person who utilizes the provided service makes a payment, there is a disadvantage such that the terminal 20 skips the authentication process, but executes the payment. According to this modified example, with the occasion of such a disadvantage being accepted, the shop takes a responsibility for a risk, and the terminal 20 is caused to skip the authentication process.

First, a description will be given of a case in which the authentication is skipped shop by shop. This is a case in which the shop takes a responsibility for a determination on whether or not to skip the authentication process by the terminal 20, and the shop that adopts the terminal 20 to skip the authentication process is selected with the risk being accepted.

FIG. 3AI is a flowchart illustrating example process flows executed by the respective devices in this case, and is a process portion in FIG. 3AE extracted therefrom which is the process portion when the payment type is "reading terminal code" in the processes described in the first example embodiment. Note that the same reference numeral will be given to the same step as that of the already-described flowchart, and the description thereof will be omitted.

when the shop payment processor 513 determines in operation B5 that the payment type is not "displaying terminal code", i.e., is "reading terminal code" (operation B3: No), the authentication skip request information is transmitted to the server 10 via the communication I/F 54 (operation B51).

More specifically, when the own shop is the shop that adopts the first type terminal read code, the shop payment processor 513 transmits the authentication skip request information that contains therein, not as limitations but as examples, the shop ID and information on the sales amount of money for the commodity to be sold in association with the first type terminal read code to the server 10.

Moreover, when the own shop is the shop that adopts the second type terminal read code, the shop payment processor 513 transmits the authentication skip request information containing therein, not as a limitation but as an example, the shop ID to the server 10.

In this case, the authentication skip request information is information that requests the server 10 to generate the authentication skip information causing the terminal 20 to skip the authentication process. This authentication skip request information may be transmitted from the shop code reader device 50 to the server 10 based on, not as a limitation but as an example, the acceptance by the shop server 70.

Furthermore, although the description has been given of a case in which the shop code reader device 50 transmits the authentication skip request information to the server 10, instead of such a case, the shop server 70 may transmit the authentication skip request information to the server 10.

The payment management processor 113 executes a terminal read code generation determination process (operation C53) when receiving, via the communication I/F 14, the authentication skip request information from the shop code reader device 50 (operation C51).

More specifically, a determination is made on, not as a limitation but as an example, whether or not the shop that transmits the authentication skip request information is an affiliated shop. Moreover, when the received authentication skip request information contains the information on the sales amount of money for the commodity to be sold in association with the first type terminal read code, a determination is made on whether or not the sales amount of money indicated by the sales amount of money information is the amount of money within an appropriate range (not as a limitation but as an example, equal to or smaller than a threshold amount of money (depending on the business category of the shop and the commodity and the kind thereof to be sold, for example, "equal to or smaller than JP 1000 YEN", "equal to or smaller than JP 2000 YEN", and "equal to or smaller than JP 3000 YEN", etc.). Next, when such a condition is satisfied, it is determined to generate the terminal read code. Conversely, when such a condition is not satisfied, it is determined not to generate the terminal read code.

When determining to generate the terminal read code (operation N55: Yes), the payment management processor 113 executes the terminal read code generation process (operation C57).

In this terminal display code generation process, the payment management processor 113 generates the terminal read code containing access information. More specifically, for example, the letter string of payment page URL is encoded (coded) and is defined as a graphic to generate the terminal read code represented by the image of a two-dimensional code. Moreover, the payment management processor 113 associates, so as to correspond to the shop ID of this shop, the sales amount of money (only for the shop that adopts the first type terminal read code), the payment page URL, and the authentication skip allowance and disallowance (in this case, authentication skip "allowable") with each other, and stores such associated information in the terminal read code management database 1593 of the code management database 159.

Subsequently, the payment management processor 113 transmits the generated terminal read code to the shop code reader device 50 that is the transmission originator of the authentication skip request information via the communication I/F 14 (operation C59).

Conversely, when it is determined not to generate the terminal read code (operation C55: No), the payment management processor 113 notifies, via the communication I/F 14, the shop code reader device 50 of the terminal read code being not generated (operation C61). Next, the payment management processor 113 transitions the process to operation C63.

The shop payment processor 513 determines whether or not the terminal read code is received from the server 10 via the communication I/F 54 (operation B53), and when determining that it is received (operation B53: Yes), displays the received terminal read code on the display 53 (operation B55).

The payment application processor 213 of the terminal 20 reads the terminal read code by the application code reader (operation A51). More specifically, either terminal read code that is the terminal read code posted at the shop or the terminal read code displayed on the shop code reader device 50 in operation B55 is read. Next, the payment application processor 213 executes processes in operations A33 and A35.

After operation C59 or C61, the payment management processor 113 determines the predeterminate payment information in accordance with an access to the payment page from the terminal 20 (operation C63). More specifically, with reference to the terminal read code management database 1593, the information stored in association with the payment page URL of this payment page is obtained. Next, the payment management processor 113 transmits the predeterminate payment information (authentication skip "allowable" or "disallowable") according to the determination result to the terminal 20 via the communication I/F 14 (operation C65).

When the information stored in association with the payment page URL is information with the authentication skip "disallowable" (in the case of the process flow of operations C61 to C63), the process is similar to that in operation C35 in FIG. 3AE. That is, the payment management processor 113 transmits the predeterminate payment information that does not contain the authentication skip information to the terminal 20.

Conversely, when the information stored in association with the payment page URL is information with the authentication skip "disallowable" (in the case of the process flow of operations C59 to C63), the payment management processor 113 transmits predeterminate payment information containing therein the authentication skip information to the terminal 20.

In this case, when the information associated with the payment page URL is information on the shop that adopts the first type terminal read code, the payment management processor 113 transmits, to the terminal 20, the first type predeterminate payment information containing therein the payment predeterminate shop, the predeterminate payment amount of money, and the authentication skip information.

Conversely, when the information associated with the payment page URL is information on the shop that adopts the second type terminal read code, the payment management processor 113 transmits, to the terminal 20, the second type predeterminate payment information (that does not contain the predeterminate payment amount) containing the payment predeterminate shop and the authentication skip information via the communication I/F 14.

When receiving the predeterminate payment information (authentication skip "allowable" or "disallowable") from the server 10 via the communication I/F 22 (operation A53), the payment application processor 213 executes a second authentication skip determination process (operation A55) after executing operations A39 and A41. Note that in order to distinguish from the authentication skip determination process in other embodiment, it is referred to as the "second authentication skip determination process" for such a purpose.

In this second authentication skip determination process, the authentication skip determination processor 2135 determines whether or not the authentication skip information is contained in the predeterminate payment information received from the server 10. When the terminal read code displayed on the shop code reader device 50 is read in operation A51, a determination is made that the authentication skip information is contained in the received predeterminate payment information, but when the terminal read code posted at the shop is read, a determination is made that the authentication skip information is not contained in the received predeterminate payment information. Next, when the determination is made that the authentication skip information is contained in the received predeterminate payment information, it is determined to skip the authentication process. Next, the payment application processor 213 transitions to operation A11.

Note that in the above-described second authentication skip determination process, when, not as limitations but as examples, the authentication setting for the payment to the payment application is "ON" on the terminal 20, or when the terminal 20 is set to a mode that does not skip the authentication process, even if the authentication skip information is contained in the predeterminate payment information, the skip of the authentication process may be avoided.

Next, although the above-described process is the process for the case in which the authentication is skipped shop by shop, not as a limitation but as an example, the authentication can be skipped commodity by commodity or commodity kind by commodity kind to be sold at the shop.

FIG. 3AJ is a diagram illustrating an example terminal read code management database 1593 stored in the storage 15 of the server 10 in this case.

This terminal read code management database 1593 contains terminal read code management data generated for the shop that accepts the skip of the authentication process at the terminal 20.

The terminal read code management data for each shop contains, not as limitations but as examples, in association with the shop ID of such a shop, the commodity kind, the sales amount of money, the payment page URL, and the authentication skip allowance or disallowance in association with each other.

In this example, the commodity kinds, such as "boxed food", "beverage", and "gift commodity", are contained in the commodity kind, and the sales amount of money, the payment page URL, and authentication skip allowance or disallowance are associated with each other for each commodity kind. Although regarding the commodity kinds "boxed food" and "beverage", the authentication skip allowance or disallowance is defined as "allowable", regarding the commodity kind "gift commodity", the authentication skip allowance or disallowance is defined as "disallowable". Hence, when the user purchases a boxed food or a beverage at this shop, the authentication process at the terminal 20 is skipped, but when the user purchases a gift commodity at this shop, the authentication process at the terminal 20 is not skipped.

Furthermore, in the single commodity kind, the sales amount of money, the payment page URL, and the authentication skip allowance or disallowance may be classified and associated with each other.

More specifically, not as limitations but as examples, the commodity kind "boxed food" may be classified into a boxed food with the sales amount of money that is "JP 200 YEN", a boxed food with the sales amount of money that is "JP 300 YEN", and a boxed food with the sales amount of money that is "JP 500 YEN", and for each classification, the payment page URL and the authentication skip allowance or disallowance may be associated with each other.

The plurality of above-described patterns can be set and changed as appropriate at the server 10 in accordance with what operation the shop adopts.

Advantageous Effect of First Modified Example (10)

According to this modified example, a structure is disclosed in which the information different from the authentication password contains the authentication skip information.

An example advantageous effect accomplished by such structure is that the terminal can skip the authentication to the user of the terminal based on the skip information to cause the terminal to skip the authentication the user of the terminal. Moreover, since it can be determined whether or not to skip the authentication to the user of the terminal based on the skip information, and a determination on whether or not the other conditions are satisfied is unnecessary, the process load on the terminal can be reduced.

Moreover, according to this modified example, a structure is disclosed in which the authentication skip information is generated by the server 10 based on the authentication skip request information transmitted from the shop code reader device 50.

An example advantageous effect accomplished by such a structure is that the terminal can easily skip the authentication to the user of the terminal based on the skip information generated by the server based on the request from the shop that manages the commodity. Moreover, since it can be determined, based on the skip information generated by the server, whether or not to skip the authentication to the user of the terminal, and a determination on whether or not the other conditions are satisfied is unnecessary, the process load on the terminal can be reduced.

Second Example Embodiment

A second example embodiment is an embodiment that improves the user friendliness of a payment like the first example embodiment. More specifically, when a payment is made by utilizing the payment application at the terminal 20, not as a limitation but as an example, an authentication skip determination is made at the server 10, and the authentication process conventionally requested to the user of the terminal 20 is skipped when the authentication skip condition is satisfied.

The details described in the second example embodiment is applicable to all of the other embodiments.

Moreover, the same structural component as those already described will be denoted by the same reference numeral, and the description thereof will be omitted.

<Functional Structure>

Figure 4A:
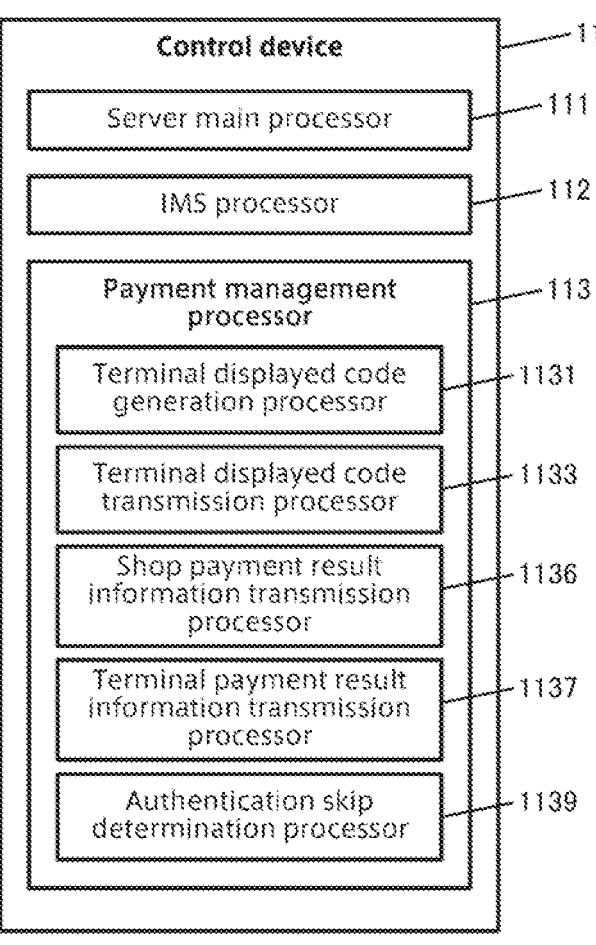
FIG. 4A is a diagram illustrating example functions accomplished by a control device of a server according to a second example embodiment.

FIG. 4A is a diagram illustrating example functions accomplished by the control device 11 of the server 10 according to this example embodiment.

The payment management processor 113 includes, not as limitations but as examples, the terminal displayed code generation processor 1131, the terminal displayed code transmission processor 1133, the shop payment result information transmission processor 1136, the terminal payment result information transmission processor 1137, and further an authentication skip determination processor 1139 as functional units.

The authentication skip determination processor 1139 may execute an authentication skip determination process to determine whether or not the authentication process to be executed at the terminal 20 is skipped according to the authentication skip determination process program 1515 stored in the storage 15. This authentication skip determination process can be also regarded as an authentication necessity determination process to determine whether or not it is necessary for the terminal 20 to execute the authentication process.

According to this example embodiment, the authentication skip determination processor 1139 executes the authentication skip determination process in the payment type "displaying terminal code" at the timing after, not as a limitation but as an example, receiving the terminal displayed code generation request information from the terminal 20.

Moreover, the authentication skip determination processor 1139 executes the authentication skip determination process in the payment type "reading terminal code" at the timing after, not as a limitation but as an example, receiving the first payment request information from the terminal 20.

However, the execution timing of such an authentication skip determination process can be changed as appropriate.

Figure 4B:
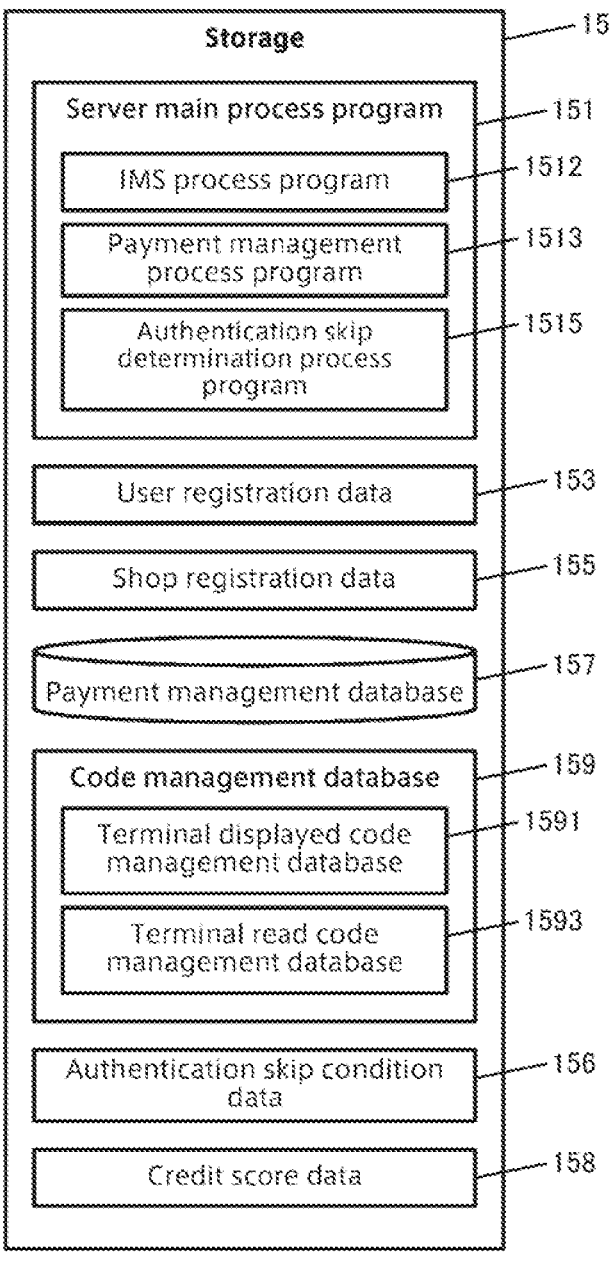
FIG. 4B is a diagram illustrating example information stored in a storage of the server according to the second example embodiment.

FIG. 4B is a diagram illustrating example information stored in the storage 15 of the server 10 according to this example embodiment.

The payment management process program 1513 contains, not as a limitation but as an example, a subroutine program that is the authentication skip determination process program 1515 which is read by the control device 11, and which is executed as the authentication skip determination process.

Moreover, the storage 15 stores data that are, not as limitations but as examples, the user registration data 153, the shop registration data 155, the payment management database 157, the code management database 159, and further authentication skip condition data 156 and credit score data 158.

The authentication skip condition data 156 is data that defines the authentication skip condition which is a condition to cause the terminal 20 to skip the authentication process for payment.

The credit score data 158 is data that stores, for each terminal 20 or for each user of the terminal 20, a credit score which indicates a social credibility of the user of the terminal 20 by a numerical value, a ranking, etc.

The credit score is calculated or determined based on, not as limitations but as examples, the payment actual accomplishment by the user of the terminal 20, age, years of service to a company and the like, and annual income, etc.

According to this example embodiment, the credit score is quantified by, not as a limitation but as an example, a scoring scheme between "0 point" to "100 points", and the credit score "100 point" indicates that the user's social credibility is the highest, and the credit score "0 point" indicates that the user's social credibility is the lowest.

FIG. 4C is a diagram illustrating an example data structure of the authentication skip condition data 156 according to this example embodiment. Although this data structure is similar to that of the authentication skip condition data 2851 of the terminal 20, some information differ. The description below will be mainly given of the difference in condition.
<Condition Category No. "SP2-5">

Regarding the condition category No. "SP2 (shop and location)", "the position of the payment predeterminate shop and the position of the terminal are not apart" is defined as the authentication skip condition with the condition No. "SP2-5". That is, the authentication process at the terminal 20 is skipped when the position of the payment predeterminate shop and the position of the terminal 20 which is about to make a payment is not apart by, for example, equal to or greater than a predetermined distance.

In this determination, the server 10 obtains, in authentication skip determination process, not as a limitation but as an example, the shop position information on the payment predeterminate shop from the shop information registered into the shop registration data 155. Moreover, the server 10 requests the terminal position information to the terminal 20, and receives and obtains, from the terminal 20, the terminal position information that is the latest calculated position calculated by the position calculation processor 217. Next, the server 10 determines whether or not the shop position and the terminal position is apart by equal to or greater than the predetermined distance.

Note that in the above-described authentication skip condition, not as a limitation but as an example, the information on a region (an area) where each shop is located may be stored in the storage 15 of the server 10, and the server 10 may identify the region where the payment predeterminate shop is located, and may determine whether or not the terminal position is within the identified region.
<Condition Category No. "SP5-2">

Regarding the authentication skip condition with the condition No. "SP5-2" contained in the condition category No. "SP5 (security)", "the credit score of the user of the terminal is equal to or higher than 80 points" is defined. That is, the authentication process by the terminal 20 is skipped when the credit score of the user of the terminal 20 stored in the credit score data 158 is equal to or higher than 80 points, i.e., the credibility of the user of the terminal 20 reaches a certain level.

In this determination, the terminal 20 obtains the credit score of the user of the terminal 20 which is about to make a payment among the credit scores stored in the credit score data 158. Next, a determination is made on whether or not the obtained credit score is equal to or higher than 80 points.

Although the other conditions are the same as those of the authentication skip condition data 2851 in the terminal 20, unlike the first example embodiment, the server 10 executes the authentication skip determination process according to this example embodiment. Hence, the server 10 obtains necessary information for the authentication skip determination from information stored and managed by the server 10 (referred to as "server management information" below), such as the user information stored in the user registration data 153 in the storage 15, the shop information stored in the shop registration data 155, and the payment management information stored in the payment management database 157. Moreover, the server 10 requests, to the terminal 20, information not managed by the server 10 like the position information on the terminal 20 (the terminal position information), and obtains such information. Next, the server 10 executes the authentication skip determination based on the obtained information.

Next, regarding the payment type "displaying terminal code", not as limitations but as examples, the disallowance is defined for the condition Nos. "SP2-1" to "SP2-5" (the conditions in the condition category No. "SP2"), the condition Nos. "SP3-3" and "SP3-4", and the condition Nos. "SP4-1" and "SP4-2" (the conditions in the condition category No. "SP4").

The reason why the authentication skip condition in the condition category No. "SP2" is set as disallowable "x" is that the server 10 is unable to grasp the payment predeterminate shop at a timing at which the authentication skip determination process is executed in the payment type "displaying terminal code".

The reason why the authentication skip condition with the condition Nos. "SP3-3" and "SP3-4" are set as disallowable "x" is that the server 10 is unable to grasp the predeterminate payment amount at a timing at which the authentication skip determination process is executed in the payment type "displaying terminal code".

The reason why the authentication skip condition in the condition category No "SP4" is set as disallowable "x" is that the server 10 is unable to grasp the to-be-purchased commodity at a timing at which the authentication skip determination process is executed in the payment type "displaying terminal code".

Conversely, regarding the payment type "reading terminal code", not as limitations but as examples, disallowance "x" is defined in the authentication skip condition with the condition No. "SP5-1", and allowance "○" is defined for the other authentication skip conditions.

Moreover, although "x or ○" is defined for the authentication skip condition with the condition No. "SP5-1" regarding both the payment types "displaying terminal code" and "reading terminal code", this is because the server 10 is unable to grasp the locked state of the OS on the terminal 20 and the locked state of the payment application due to a basic specification.

When, however, the specification of the terminal 20 is changed so as to notify the server 10 of information on the locked state, the server 10 becomes able to grasp the locked state of the terminal 20, and thus the authentication skip determination is enabled.
<Processes>

Figure 4D:
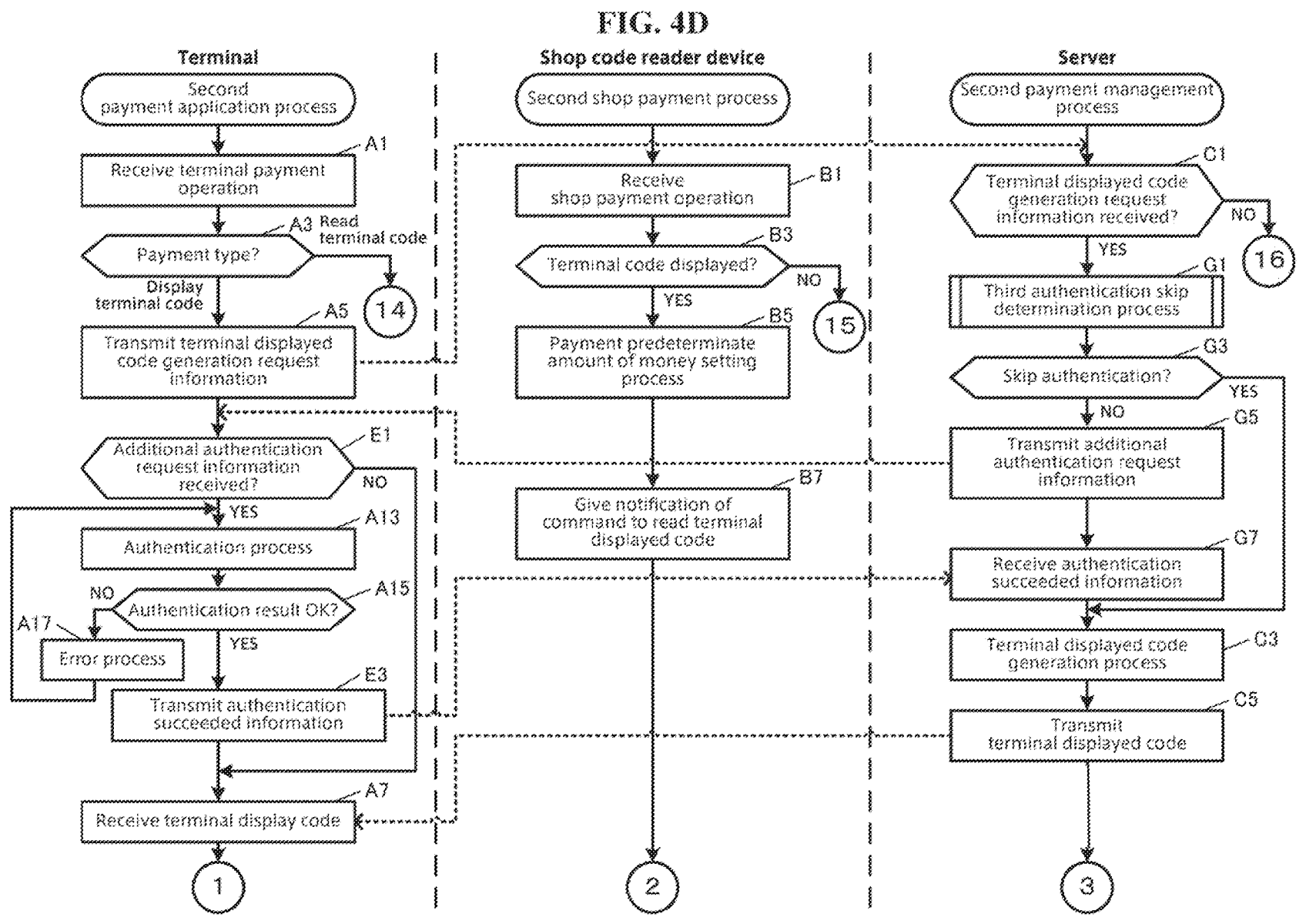
Figure 4E:
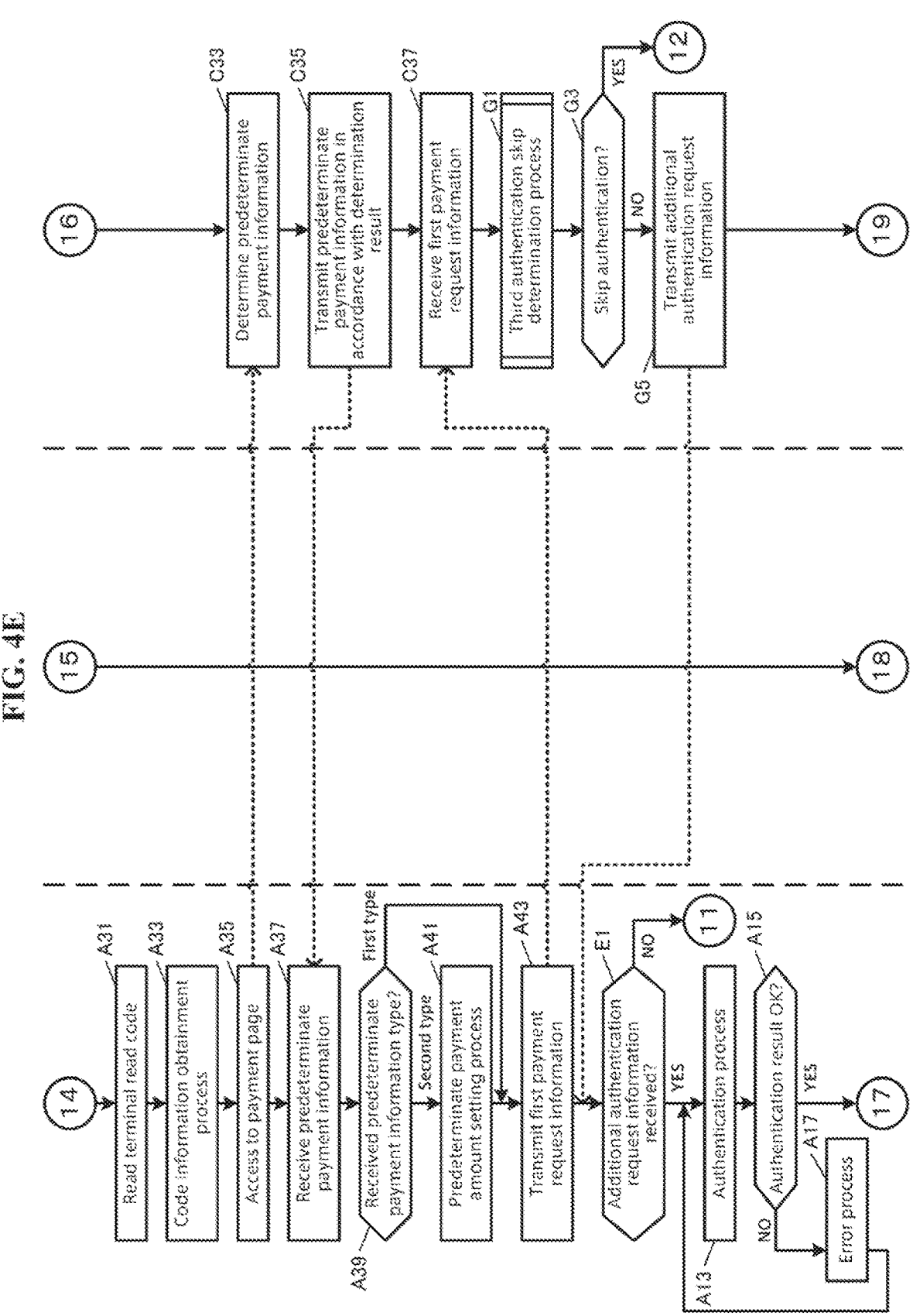
FIG. 4E is a flowchart illustrating example process flows by the terminal, the shop code reader device, and the server according to the second example embodiment.
Figure 4F:
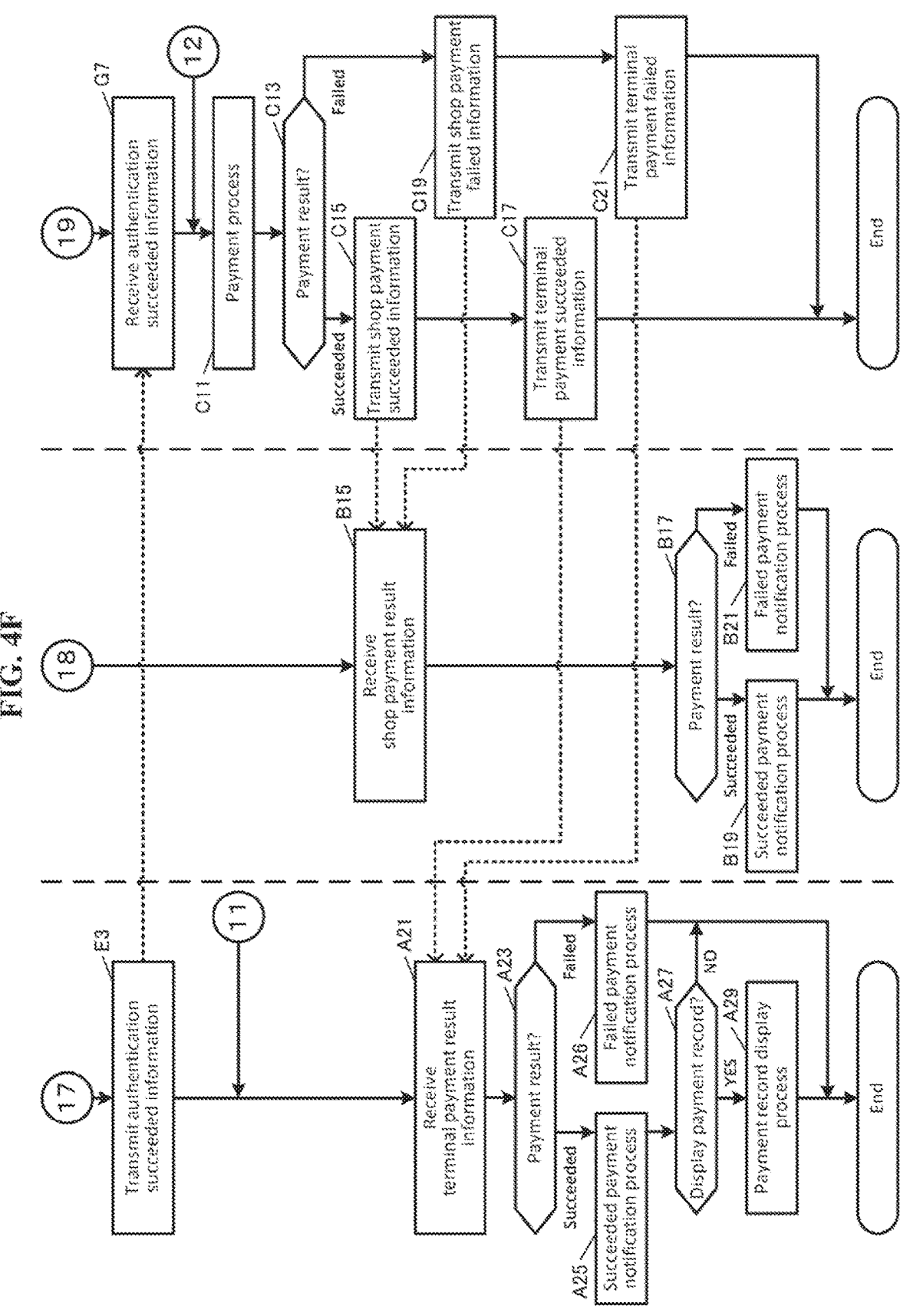
FIG. 4F is a flowchart illustrating example process flows by the terminal, the shop code reader device, and the server according to the second example embodiment.

FIG. 4D to FIG. 4F are each a flowchart illustrating example process flows executed by the respective devices according to this example embodiment.

In those figures, illustrated from the left side in sequence are a second payment application process that is an example payment application process executed by the payment application processor 213 of the terminal 20, a second shop payment process that is an example shop payment process executed by the shop payment processor 513 of the shop code reader device 50, and a second payment management process that is an example payment management process executed by the payment management processor 113 of the server 10, respectively.

Note that the flowchart to be described below illustrates the process merely in this example embodiment, and in the flowchart to be described later, some steps may be not executed, and an additional step may be added.

Moreover, the same step as that of the already-described flowchart will be denoted by the same reference numeral, and the description thereof will be omitted.

First, the payment application processor 213 of the terminal 20 executes operations A1 to A3. When the payment type is "displaying terminal code" (operation A3: displaying terminal code), the terminal displayed code obtainment processor 2131 executes operation A5.

When the server 10 determines that the terminal displayed code generation request information is received from the terminal 20 via the communication I/F 14 (operation C1: Yes), the authentication skip determination processor 1139 executes a third authentication skip determination process in accordance with the authentication skip determination process program 1515 stored in the storage 15 (operation G1). Note that in order to distinguish from the authentication skip determination process in the other embodiment, it is referred to as the "third authentication skip determination process" for such a purpose.

More specifically, the authentication skip determination processor 1139 determines, like the similar scheme to that of the first example embodiment, whether or not the authentication skip condition contained in the authentication skip condition data 156 in the storage 15 is satisfied based on various server management information obtained from the storage 15 and on the information obtained upon request to the terminal 20.

After executing the third authentication skip determination process, the payment management processor 113 determines whether or not the determination to skip the authentication process is made (operation G3). When the determination is made to skip the authentication process (operation G3: Yes), the payment management processor 113 transitions the process to operation C3.

Conversely, when the determination is made not to skip the authentication process (operation G1: No), the payment management processor 113 transmits additional authentication request information to the terminal 20 via the communication I/F 14 (operation G5).

The payment application processor 213 determines whether or not the additional authentication request information is received from the server 10 via the communication I/F 22 (operation E1), and when determining that not receiving (operation E1: No), transitions the process to operation A7. In this case, the authentication process at the terminal 20 is skipped.

Conversely, when determining that the additional authentication request information is received from the server 10 via the communication I/F 22 (operation E1: Yes), the payment application processor 213 executes the processes in operations A13 to A17. In this case, the authentication process is executed at the terminal 20.

When the authentication issue through the authentication process becomes "OK" (operation A15: Yes), the payment application processor 213 transmits the authentication succeeded information to the server 10 via the communication I/F 22 (operation E3).

The payment management processor 113 executes the processes in operations C3 and C5 when receiving the authentication succeeded information from the terminal 20 via the communication I/F 14 (operation G7). That is, after receiving the information indicating that the authentication is succeeded from the terminal 20, the terminal displayed code is generated (operation C3), and the generated terminal displayed code is transmitted to the terminal 20 (operation C5).

Conversely, when determining in A3 that the payment type is "reading terminal code" (operation A3: read terminal code), the payment application processor 213 executes the processes in operations A31 to A43.

When the server 10 receives the first payment request information from the terminal 20 via the communication I/F 14 (operation C37), the authentication skip determination processor 1139 executes the third authentication skip determination process in accordance with the authentication skip determination process program 1515 stored in the storage 15 (operation G1).

After executing the third authentication skip determination process, the payment management processor 113 determines whether or not the determination to skip the authentication process is made (operation G3). When the determination to skip the authentication process is made (operation G3: Yes), the payment management processor 113 transitions the process to operation C11.

Conversely, when the determination is made not to skip the authentication process (operation G1: No), the payment management processor 113 transmits additional authentication request information to the terminal 20 via the communication I/F 14 (operation G5).

The payment application processor 213 determines whether or not the additional authentication request information is received from the server 10 via the communication I/F 22 (operation E1), and transitions the process to operation A21 when determining that not receiving (operation E1: No). In this case, the authentication process at the terminal 20 is skipped.

Conversely, when determining that the additional authentication request information is received from the server 10 via the communication I/F 22 (operation E1: Yes), the payment application processor 213 executes the processes in operations A13 to A17. In this case, the authentication process is executed at the terminal 20.

Note that in the above-described process, when the payment type is "displaying terminal code", the server 10 executes the third authentication skip determination process at the timing after receiving the terminal displayed code generation request information from the terminal 20 (after operation C1: Yes), but the present disclosure is not limited to this case.

It is not as a limitation but as an example, the server 10 may execute the third authentication skip determination process at the timing after receiving the second payment request information from the shop code reader device 50 (after operation C9).

Advantageous Effect of Second Example Embodiment

According to the second example embodiment, a structure is disclosed in which the server 10 receives the payment request information (not as a limitation but as example information on the payment by electronic money at the terminal) from the terminal 20 via the communication I/F 14, and transmits the additional authentication request information (not as a limitation but as information on the authentication to the user of the terminal) from the terminal 20 via the communication I/F 14. Moreover, the server 10 receives the authentication succeeded information (not limitation but an example information illustrating that as a limitation but as example information indicating that the user of the terminal is authenticated) via the communication I/F 14 from the terminal 20, and transmits, based on the received authentication succeeded information, the payment result information (example payment information indicating that the payment by electronic money is made) to the terminal 20 via the communication I/F 14. Next, the server 10 obtains the information different from the authentication password (not as a limitation but as example authentication information) to authenticate the user of the terminal 20, and transmits the payment result information to the terminal 20 via the communication I/F 14 without transmitting the additional authentication request information to the terminal 20 via the communication I/F 14.

An example advantageous effect accomplished by such structure is that, by obtaining the different information from the authentication information to authenticate the user of the terminal regarding the payment by electronic money, since the server does not transmit, to the terminal, the information on the authentication to the user of the terminal, the process load on the server can be reduced. Moreover, since the payment information can be transmitted to the terminal without the information on the authentication to the user of the terminal being transmitted to the terminal, the user friendliness can be improved.

Moreover, according to the second example embodiment, a structure is disclosed in which the above-described information different from the authentication password contains the terminal identification information of the terminal 20 or the information associated with the user identification information of the terminal 20 (not as a limitation but as example information associated with the identification information to identify the terminal or the user of the terminal).

An example advantageous effect accomplished by such a structure is that the server can transmit the payment information to the terminal by obtaining the information associated with the identification information to identify the terminal or the user of the terminal without transmitting, to the terminal, the information on the authentication to the user of the terminal.

Furthermore, according to the second example embodiment, a structure is disclosed in which the above-described terminal identification information of the terminal 20 or the information associated with the user identification information of the terminal 20 contains the information on the IMS money associated with the terminal 20 or with the user of the terminal 20 (not as a limitation but as example information on the electronic money associated with the terminal or with the user of the terminal).

An example advantageous effect accomplished by such a structure is that the server can transmit the payment information to the terminal by obtaining the information on the electronic money associated with the terminal or with the user of the terminal without transmitting, to the terminal, the information on the authentication to the user of the terminal.

Still further, according to the second example embodiment, a structure is disclosed in which the above-described information on the IMS money associated with the terminal 20 or with the user of the terminal 20 contains the information on the amount of the IMS money associated with the terminal 20 or with the user of the terminal 20 (not as a limitation but as example information on the amount of electronic money associated with the terminal or with the user of the terminal or a terminal).

An example advantageous effect accomplished by such a structure is that the server can transmit the payment information to the terminal by obtaining the information on the amount of electronic money associated with the terminal or with the user of the terminal without transmitting, to the terminal, the information on the authentication to the user of the terminal. When, for example, the amount of electronic money is a small amount, by not transmitting, to the terminal, the information on the authentication to the user of the terminal, it becomes possible to omit the authentication at the terminal, and thus the user friendliness can be improved.

Yet still further, according to the second example embodiment, a structure is disclosed in which the above-described information on the amount of IMS money associated with the terminal 20 or with the user of the terminal 20 contains the daily upper limit set amount of money (not as a limitation but as example information on the above-described set amount of electronic money).

An example advantageous effect accomplished by such a structure is that the server can transmit the payment information to the terminal by obtaining the information on the set amount of electronic money without transmitting, to the terminal, the information on the authentication to the user of the terminal.

Moreover, according to the second example embodiment, a structure is disclosed in which the server 10 does not transmit the additional authentication request information (not as a limitation but as example information on the authentication to the user of the terminal) to the terminal 20 via the communication I/F 14, but transmits the payment result information to the terminal 20 via the communication I/F 14 until an excess beyond the above-described daily upper limit set amount of money occurs.

An example advantageous effect accomplished by such a structure is that since the server does not transmit, to the terminal, the information on the authentication to the user of the terminal until an excess beyond the set amount of electronic money occurs, the communication traffic of the server can be reduced, and thus the load on the server can be reduced. Moreover, the server transmits, to the terminal, the information on the authentication to the user of the terminal when an excess beyond the set amount of electronic money occurs, thereby notifying the user of the occurrence of the excess beyond the set amount of money.

Furthermore, according to the second example embodiment, a structure is disclosed in which the above-described information on the amount of IMS money contains the information on the balance of the IMS money associated with the terminal 20 or with the user of the terminal 20 (not as a limitation but as example information on the balance of the electronic money associated with the terminal or with the user of the terminal).

An example advantageous effect accomplished by such a structure is that the server can transmit the payment information to the terminal by obtaining the information on the balance of the electronic money associated with the terminal or with the user of the terminal without transmitting, to the terminal, the information on the authentication to the user of the terminal. Moreover, the server can appropriately execute the process relating to the payment based on the information on the balance of the electronic money associated with the terminal or with the user of the terminal.

Still further, according to the second example embodiment, a structure is disclosed in which when the above-described balance of the IMS money is equal to or smaller than the set amount of money or smaller than the set amount of money, the server 10 does not transmit the additional authentication request information (not as a limitation but as example information on the authentication to the user of the terminal) to the terminal 20 via the communication I/F 14, but transmits the payment result information to the terminal 20 via the communication I/F 14.

An example advantageous effect accomplished by such a structure is that when the balance of the electronic money is equal to or smaller than the set amount of money or smaller than the set amount of money, the server does not transmit, to the terminal, the information on the authentication to the user of the terminal, the and thus the communication traffic of the server can be reduced and the load on the server can be reduced. Moreover, when, for example, the balance of the electronic money is a small amount, an expensive payment cannot be made, and the possibility of risk can be considered as low. Hence, omission of the authentication at the terminal is enabled by not transmitting, to the terminal, the information on the authentication to the user of the terminal, thereby improving the user friendliness while the safeness is secured.

According to the second example embodiment, a structure is disclosed in which when the automatic charge setting of the terminal 20 is set to "ON", the server 10 transmits the additional authentication request information to the terminal 20 via the communication I/F 14 when the balance of the IMS money is equal to or smaller than the set amount of money or smaller than the set amount of money, and transmits the payment result information to the terminal 20 via the communication I/F 14.

An example advantageous effect accomplished by such a structure is that when the setting to automatically charge the electronic money to the terminal is made and when the electronic money of the terminal becomes equal to or smaller than the set amount of money or smaller than the set amount of money, the server is enabled to settle an expensive payment since the electronic money is automatically charged to the terminal when the amount becomes small, and thus the possibility of risk occurs. Hence, the server can notify the user of the expensive payment being enabled by transmitting, to the terminal, the information on the authentication to the user of the terminal via the communication interface.

Moreover, according to the second example embodiment, a structure is disclosed in which the above-described information on the IMS money contains the information on the frequency or the number of times of payment made by IMS money.

An example advantageous effect accomplished by such a structure is that the server can transmit the payment information to the terminal by obtaining the information on the frequency or the number of times of payment made by electronic money without transmitting, to the terminal, the information on the authentication to the user of the terminal. When, for example, the frequency of payment made by electronic money is high or when the number of times is large, the possibility such that the same user makes the payment by electronic money is high, and the possibility of risk can be considered as low. Hence, by not transmitting, to the terminal, the information on the authentication to the user of the terminal, omission of the authentication at the terminal is enabled, and thus the user friendliness can be improved while the safeness is secured.

Furthermore, according to the second example embodiment, a structure is disclosed in which the above-described information on the IMS money contains the information on the time at which the payment by IMS money is made.

An example advantageous effect accomplished by such a structure is that the server can transmit the payment information to the terminal by obtaining the information on the time at which the payment by electronic money is made without transmitting, to the terminal, the information on the authentication to the user of the terminal.

Still further, according to the second example embodiment, a structure is disclosed in which the server 10 does not transmit the additional authentication request information (not as a limitation but as example information on the authentication to the user of the terminal) to the terminal 20 via the communication I/F 14, but transmits the payment result information to the terminal 20 via the communication I/F 14 when the present time is within the set time after the time at which the payment is made.

An example advantageous effect accomplished by such a structure is that since a server does not transmit, to the terminal, the information on the authentication to the user of the terminal when the present time is within the set time after the time at which the payment is made, and thus the communication traffic of the server can be reduced, and the load on the server can be reduced. Moreover, when, for example, a so much time has not elapsed after the payment is made, the possibility such that the same user makes the payment again is high, and the possibility of risk can be considered as low. Accordingly, by not transmitting, to the terminal, the information on the authentication to the user of the terminal, the user friendliness can be improved while the safeness is secured.

Yet still further, according to the second example embodiment, a structure is disclosed in which the above-described information on the IMS money contains the information on the location where the payment by IMS money is made.

An example advantageous effect accomplished by such a structure is that the server can transmit the payment information to the terminal by obtaining the information on the location at which the payment by electronic money is made without transmitting, to the terminal, the information on the authentication to the user of the terminal.

Moreover, according to the second example embodiment, a structure is disclosed in which the above-described information on the location at which the payment by IMS money is made contains the information on the shop at which the payment by IMS money is made.

An example advantageous effect accomplished by such a structure is that the server can transmit the payment information to the terminal by obtaining the information on the shop at which the payment by electronic money is made without transmitting, to the terminal, the information on the authentication to the user of the terminal.

Furthermore, according to the second example embodiment, a structure is disclosed in which the server 10 does not transmit the additional authentication request information (not as a limitation but as example information on the authentication to the user of the terminal) to the terminal 20 via the communication I/F 14, but transmits the payment result information to the terminal 20 via the communication I/F 14 based on the position of the shop at which the payment by IMS money is made and on the position of the terminal 20.

An example advantageous effect accomplished by such a structure is that the server, does not transmit the information on the authentication to the user of the terminal based on the information on the shop at which the payment by electronic money is made, and the information on the position of the terminal, and thus the communication traffic of the server can be reduced and the load on the server can be reduced. Moreover, when the position of the terminal is not apart from the shop at which the payment by electronic money is made in past, the possibility such that the user is about to make a payment the same shop is high, and the possibility of risk can be considered as low. Hence, by not transmitting, to the terminal, the information on the authentication to the user of the terminal, the user friendliness can be improved while the safeness is secured.

Still further, according to the second example embodiment, a structure is disclosed in which the above-described information on the IMS money contains the information on the location of the shop at which the authentication for the payment by IMS money is executed.

An example advantageous effect accomplished by such a structure is that the server can transmit the payment information to the terminal by obtaining the information on the location at which the authentication for the payment by electronic money is executed without transmitting, to the terminal, the information on the authentication to the user of the terminal. Moreover, in the case of the location at which the authentication for the payment by electronic money is executed in past, this is a case in which the authentication is executed again for the same user, and thus the possibility of risk can be considered as low. Hence, by not transmitting, to the terminal, the information on the authentication to the user of the terminal, the user friendliness can be improved while the safeness is secured.

According to the second example embodiment, a structure is disclosed in which the above-described terminal identification information on the terminal 20 or the information associated with the user identification information of the terminal 20 (not as a limitation but as example information associated with the identification information to identify the terminal or the user of the terminal) contains the information on the commodity purchased by the user of the terminal 20.

An example advantageous effect accomplished by such a structure is that the server can transmit the payment information to the terminal by obtaining the information on the commodity purchased by the user of the terminal without transmitting, to the terminal, the information on the authentication to the user of the terminal.

Moreover, according to the second example embodiment, a structure is disclosed in which the server 10 does not transmit the additional authentication request information to the terminal 20 via the communication I/F 14, but transmits the payment result information to the terminal 20 via the communication I/F 14 based on the information on the commodity purchased by the user of the terminal 20 and the information on the commodity to be purchased by the user of the terminal 20.

An example advantageous effect accomplished by such a structure is that the server does not transmit, to the terminal, the information on the authentication to the user of the terminal based on the information on the commodity purchased by the user of the terminal, and the information on the commodity to be purchased by the user of the terminal, and thus the communication traffic of the server can be reduced and the load on the server can be reduced. Moreover, when the same commodity is purchased in past, the possibility such that the same user is about to purchase the same commodity is high, and the possibility of risk can be considered as low. Hence, the user friendliness can be improved while the safeness is secured by not transmitting, to the terminal, the information on the authentication to the user of the terminal.

Furthermore, according to the second example embodiment, a structure is disclosed in which the above-described information different from the authentication password contains the information on the shop.

An example advantageous effect accomplished by such a structure is that the server can transmit the payment information to the terminal by obtaining the information on the location without transmitting, to the terminal, the information on the authentication to the user of the terminal.

Still further, according to the second example embodiment, a structure is disclosed in which the above-described information on the shop contains the information on the shop at which the commodity is purchased, is transmitted from the shop server 70, an is received by the server 10 via the communication I/F 14.

An example advantageous effect accomplished by such a structure is that the server can obtain the information on the shop at which the commodity is purchased by receiving such information transmitted from the server of the shop that manages the commodities.

Yet still further, according to the second example embodiment, a structure is disclosed in which the server 10 receives the position information on the shop 20 from the terminal 20 via the communication I/F 14, and does not transmit the additional authentication request information to the terminal 20 via the communication I/F 14, but transmits the payment result information to the terminal 20 via the communication I/F 14 based on the position information on the shop at which the user of the commodity purchases the terminal 20, and the position information on the terminal 20.

An example advantageous effect accomplished by such a structure is that the server does not transmit the information on the authentication to the user of the terminal based on the information on the position of the shop at which the commodity is purchased, and the information on the position of the received terminal, and thus the communication traffic of the server can be reduced and the load on the server can be reduced. Moreover, when, for example, the position of the shop at which the commodity is purchased and the position of the terminal are not apart from each other, the possibility such that the user is making a payment at such a shop is high, and the possibility of risk can be considered as low. Hence, the user friendliness can be improved by not transmitting, to the terminal, the information on the authentication to the user of the terminal.

Moreover, according to the second example embodiment, a structure is disclosed in which the above-described information different from the authentication password contains the information on the commodity.

An example advantageous effect accomplished by such a structure is that the server can transmit the payment information to the terminal by obtaining the information on the commodity without transmitting, to the terminal, the information on the authentication to the user of the terminal.

Furthermore, according to the second example embodiment, a structure is disclosed in which when the to-be-purchased commodity is a fast-moving-consumer commodity, the server 10 does not transmit the additional authentication request information (not as a limitation but as example information on the authentication to the user of the terminal) to the terminal 20 via the communication I/F 14, but transmits the payment result information to the terminal 20 via the communication I/F 14.

An example advantageous effect accomplished by such a structure is that the server does not transmit, to the terminal, the information on the authentication to the user of the terminal when the information on the commodity matches the information on the preset commodity, and thus the communication traffic of the server can be reduced and the load on the server can be reduced.

Still further, according to the second example embodiment, a structure is disclosed in which the above-described information on the commodity contains the information on the total amount of money for the commodities to be purchased.

An example advantageous effect accomplished by such a structure is that the server can transmit the payment information to the terminal by obtaining the information on the total amount of money for the commodities without transmitting, to the terminal, the information on the authentication to the user of the terminal. Moreover, when, for example, the total amount of money for the commodities is a small amount, the possibility of risk can be considered as low. Hence, the user friendliness can be improved while the safeness is secured by not transmitting, to the terminal, the information on the authentication to the user of the terminal.

Second Modified Example (1)

The authentication skip determination at the terminal 20 as described in the first example embodiment and the authentication skip determination at the server 10 as described in the second example embodiment may be combined to execute a combined process.

Figure 4G:
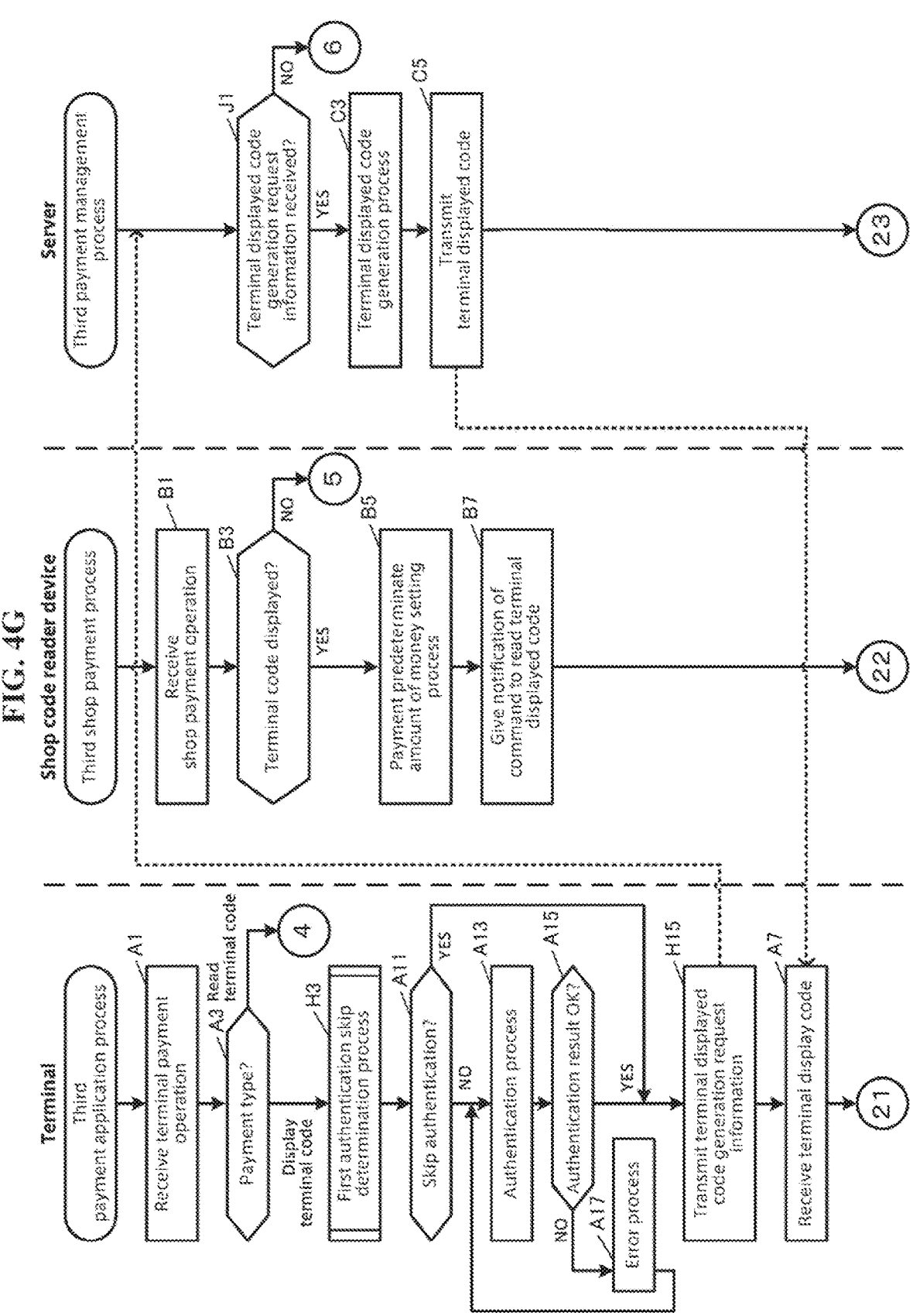
FIG. 4G is a flowchart illustrating example process flows by the terminal, the shop code reader device, and the server according to a second modified example.

FIG. 4G and FIG. 4H are each a flowchart illustrating example process flows executed by respective devices in this case.

In these figures, illustrated from the left side in sequence are the third payment application process that is an example payment application process executed by the payment application processor 213 of the terminal 20, the third shop payment process that is an example shop payment process executed by the shop payment processor 513 of the shop code reader device 50, and the third payment management process that is an example payment management process executed by the payment management processor 113 of the server 10, respectively.

When determining in operation A3 that the payment type is "displaying terminal code" (operation A3: displaying terminal code), the payment application processor 213 executes the first authentication skip determination process (operation H3). Next, the payment application processor 213 executes the processes in operations A11 to A17.

When determining in operation A15 that the authentication result is "OK" (operation A15: Yes), Or when determining in operation A11 to skip the authentication process (operation A11: Yes), the payment application processor 213 transmits, to the server 10, the terminal displayed code generation request information which contains therein the user ID and authentication skip status information that is information indicating whether or not the authentication process is skipped via the communication I/F 22 (operation H15).

The payment management processor 113 determines whether or not the terminal displayed code generation request information is from the terminal 20 via the communication I/F 14 (operation J1). Next, when determining that it is received (operation C1: Yes), after operation C3 to C9 are executed, the authentication skip determination processor 1139 executes a fourth authentication skip determination process (operation J3). Note that in order to distinguish from the authentication skip determination process in the other embodiment, it is referred to as the "fourth authentication skip determination process" for such a purpose.

In this fourth authentication skip determination process, the authentication skip determination processor 1139 determines whether or not the authentication process at the terminal 20 is skipped based on the authentication skip status information contained in the terminal displayed code generation request information received from the terminal 20.

When the authentication process is not skipped at the terminal 20, the authentication skip determination processor 1139 determines that the additional authentication is unnecessary. This is because the authentication process has been already executed at the terminal 20.

Conversely, when the authentication process at the terminal 20 is skipped, the authentication skip determination processor 1139 determines whether or not the authentication skip condition is satisfied based on the authentication skip condition contained in the authentication skip condition data 156 in the storage 15. Next, when the authentication skip condition is satisfied, it is determined that the additional authentication is unnecessary, and when the authentication skip condition is not satisfied, it is determined that the additional authentication is necessary. This is because it is preferable in some cased to cause the terminal 20 to execute the additional authentication depending on the result of the authentication skip determination by the server 10, although the authentication process at the terminal 20 is skipped.

As a specific example, at the terminal 20, it is determined that the predeterminate payment amount of money is not large and determined to skip the authentication process due to a difference between the setting for the authentication skip at the terminal 20 and the setting for the authentication skip at server 10, but at the server 10, since the predeterminate payment amount of money is a large amount and it is determined that there is a problem (a risk) to skip the authentication process at the terminal 20, and the authentication skip at the terminal 20 is canceled, and the additional authentication is executed.

Note that unlike the above-described case, when the authentication process at the terminal 20 is skipped, the server 10 may determine that the additional authentication is unnecessary by trusting the determination by the terminal 20. In this case, it is unnecessary for the server 10 to execute the authentication skip determination.

When it is determined in the fourth authentication skip determination process that the additional authentication is necessary (operation G3: No), the payment management processor 113 transmits the additional authentication request information to the terminal 20 via the communication I/F 14 (operation G5). Next, the payment management processor 113 executes payment process (operation C11) after receiving authentication succeeded information from the terminal 20 via the communication I/F 14 (operation G7). Subsequently, the payment management processor 113 transitions to operation C13.

After A19, the payment application processor 213 transitions the process to operation A21 after executing operations E1, A13 to A17, and E3.

Advantageous Effect of Second Modified Example
(1)

An advantageous effect accomplished by such a modified example is that it can be determined whether or not to execute the display process relating to the authentication to the user of the terminal by the cooperation between the terminal and the server. Moreover, the server can easily determine whether or not to cause the terminal to additionally execute the display process by transmitting, from the terminal, the information on whether or not the display process is executed to the server.

Second Modified Example (2)

A request to skip the authentication process at the terminal 20 may be made to the server 10 from the shop like the <First Modified Example (10)>.

Figure 4I:
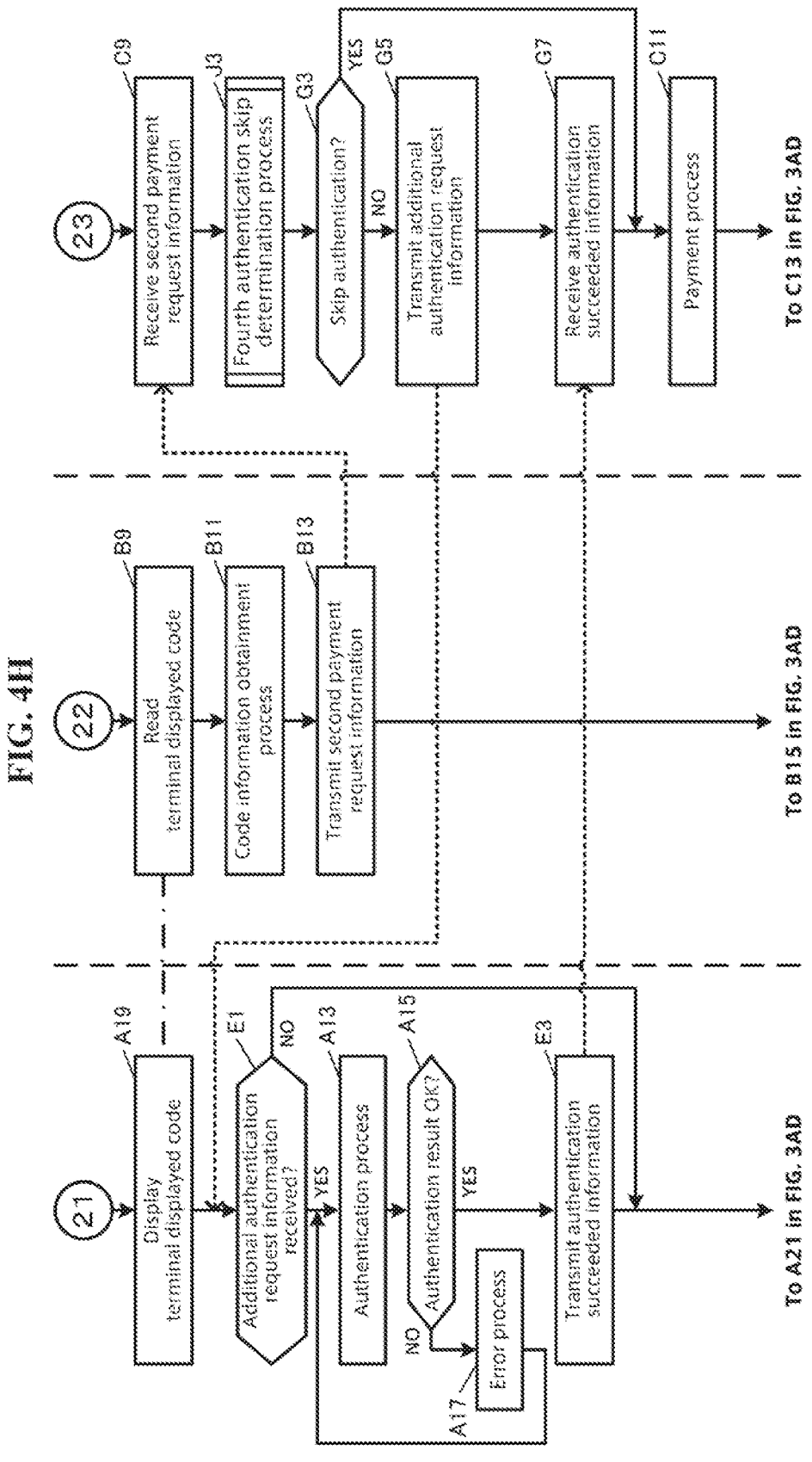
FIG. 4I is a flowchart illustrating example process flows by the terminal, the shop code reader device, and the server according to the second modified example.
Figure 41:
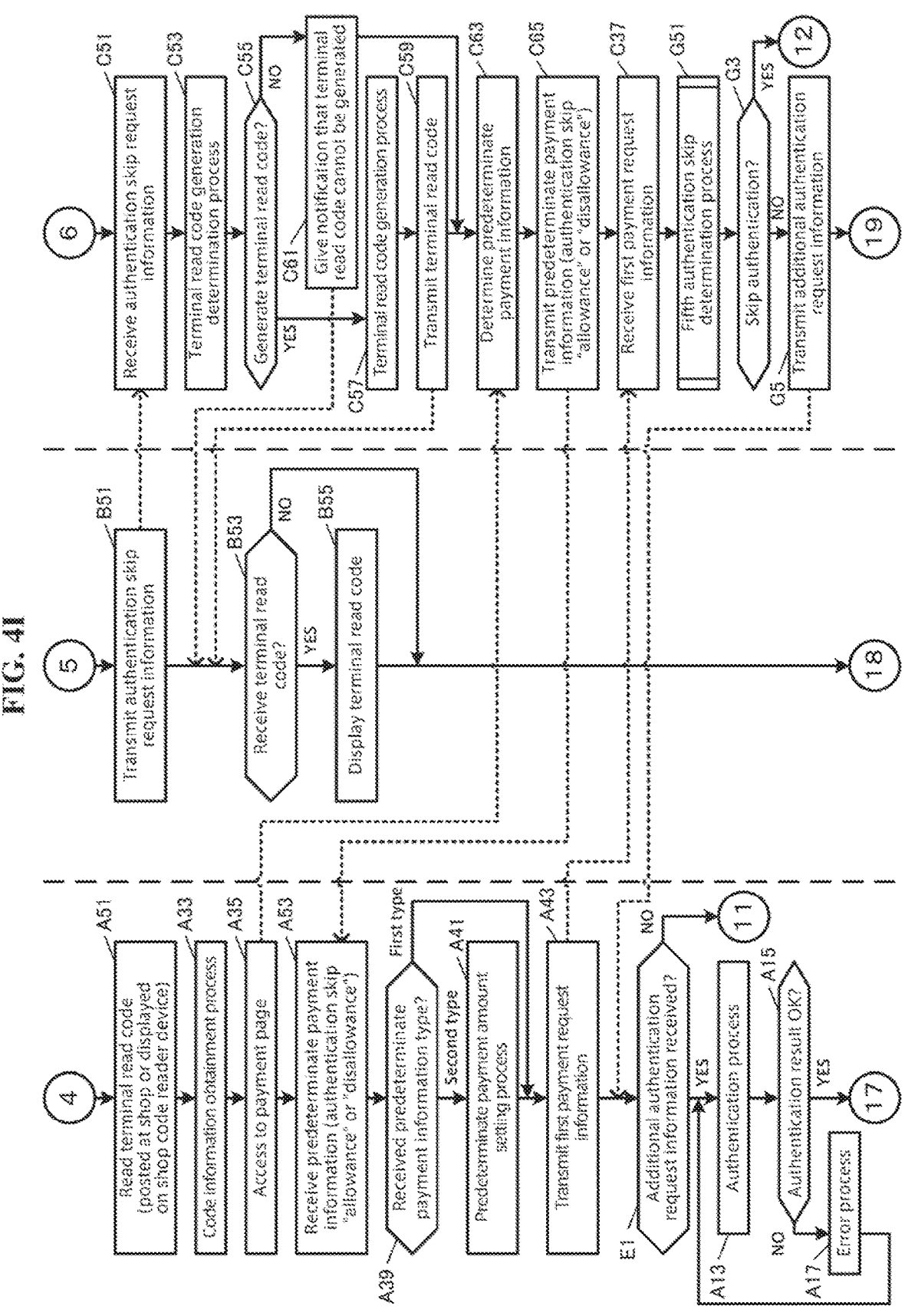

FIG. 4I is a flowchart illustrating example process flows by respective devices, and is the extracted process portion in FIG. 4E that is the process portion when the payment type is "reading terminal code" in the process described in the second example embodiment. Note that the same reference numeral will be given to the same step as that of the already-described flowchart, and the explanation for the second time is omitted.

The payment management processor 113 executes operations C53 to C65 when receiving, via the communication I/F 14, the authentication skip request information from the shop code reader device 50 (operation C51). Subsequently, when the payment management processor 113 receives the first payment request information from the terminal 20 via the communication I/F 14 (operation C37), the authentication skip determination processor 1139 executes a fifth authentication skip determination process (operation G51). Note that in order to distinguish from the authentication skip determination process in the other embodiment, it is referred to as the "fifth authentication skip determination process" for such a purpose.

In this fifth authentication skip determination process, the authentication skip determination processor 1139 determines whether or not the payment page URL accessed by the terminal 20 is associated with the authentication skip "allowance" by referring to the terminal read code management database 1593, and when it is associated, determines to skip the authentication process. Next, the payment management processor 113 transitions to the process subsequent to operation G3.

Advantageous Effect of Second Modified Example
(2)

According to this modified example, a structure is disclosed in which the information different from the authentication password contains the authentication skip information.

An example advantageous effect accomplished by such a structure is that the server can easily cause the terminal to skip the authentication to the user of the terminal based on the skip information to skip the authentication to the user of the terminal.

Moreover, according to this modified example, a structure is disclosed in which the server 10 generates, based on the authentication skip request information transmitted from the shop code reader device 50, the authentication skip information.

An example advantageous effect accomplished by such a structure is that the server can generate the skip information to cause the terminal to skip the authentication to the user of the terminal skip based on the request from the shop that manages the commodities.

Second Modified Example (3)

The server 10 may change the authentication skip condition based on the credit score of the user of the terminal 20.

More specifically, not as a limitation but as an example, the higher the credit score of the user of the terminal 20 is, the longer the server 10 may set the "set time" in the authentication skip condition with the condition No. "SP1-1" in the authentication skip condition data 156.

More specifically, not as a limitation but as an example, the set time when the credit score is zero is set as "2 hours". Moreover, thresholds that are integral multiples of 10 points (10 points, 20 points, and, 100 points, etc.) are set as the thresholds for the credit score. Next, every time the credit score of the user of the terminal 20 reaches each threshold, the set time may be extended by 1 hour.

Moreover, not as a limitation but as an example, the higher the credit score of the user of the terminal 20 is, the higher the server 10 may set the "daily upper limit set amount of money" in the authentication skip condition with the condition No. "SP3-1" in the authentication skip condition data 156. More specifically, not as a limitation but as an example, the daily upper limit set amount of money when the credit score is zero point may be set as "JP 0 YEN". Moreover, thresholds that are integral multiples of 10 points (10 points, 20 points, and 100 points, etc.) may be set as the thresholds for the credit score. Substantially, every time the credit score of the user of the terminal 20 reaches the threshold, the daily upper limit set amount of money may be increased by JP 5000 YEN.

Furthermore, not as a limitation but as an example, the higher the credit score of the user of the terminal 20 is, the more the determination may be likely to be made so as to skip the authentication process. For example, regarding the user with the credit score that is "equal to or greater than 90 points", the authentication process is skipped regardless of whether or not the other kinds of authentication skip conditions are satisfied. Moreover, regarding the user with the credit score that is "equal to or higher than 80 points and smaller than 90 points", when any one of the authentication skip conditions in the other kinds of authentication skip conditions is satisfied, the authentication process is skipped. Regarding the user with the credit score that is "equal to or higher than 70 points and smaller than 80 points", when any two authentication skip conditions in the other kinds of authentication skip conditions are satisfied, the authentication process is skipped.

The same is true of the following.

Still further, not as a limitation but as an example, regarding the user with the credit score that is equal to or higher than a threshold score (e.g., "equal to or higher than 60 points"), the authentication skip determination only at the server 10 is executed by the scheme described in the second example embodiment. However, regarding the user with the credit score that is smaller than the threshold score (e.g., "smaller than 60 points"), the authentication skip determination may be made at both the terminal 20 and the server 10 by the scheme described in the second modified example (1).

Advantageous Effect of Second Modified Example
(3)

An example advantageous effect accomplished by this modified example is that the skip condition can be changed based on the credibility of the user of the terminal. For example, the higher the credibility of the user is, the more the authentication is likely to be skipped. This improves the user friendliness.

Second Modified Example (4)

As a location at which the terminal 20 makes a payment, for example, a case in which a commodity is purchased through a sell in a bullet train, and a case in which the user has a meal at moving food stall are expectable. In this case, the position of the terminal 20 and the position of the shop will change, respectively.

Accordingly, regarding the moving-type shop, the server 10 is caused to obtain the shop position information from the moving-type shop. Moreover, the server 10 obtains the terminal position information from the terminal 20. Next, when the server 10 determines, for example, the authentication skip condition with the condition No. "SP2-5" that is whether or not "the position of the payment predeterminate shop and the position of the terminal are not apart from each other", a determination may be made based on the shop position information obtained from the moving-type shop and on the terminal position information obtained from the terminal 20.

Advantageous Effect of Second Modified Example (4)

An example advantageous effect accomplished by this modified example is that even if the shop moves, the server can appropriately cause the terminal to skip the authentication to the user of the terminal based on the position information obtained from the terminal, and on the position information obtained from the shop.

Third Example Embodiment

A third example embodiment is an embodiment in which the authentication skip information as described above is contained in a code for payment. According to the third example embodiment, the shop has a responsibility for the possibility of risk based on the similar concept to that of the <first modified example (10)>, and the terminal 20 is caused to skip the authentication process. The difference from the <first modified example (10)> is that the authentication skip information is contained in the terminal read code.

The details described in the third example embodiment is applicable to any of the other embodiments.

Moreover, the same reference numeral will be given to the same component as already-described component, and the description thereof will be omitted.

<Functional Structure>

Figure 5A:
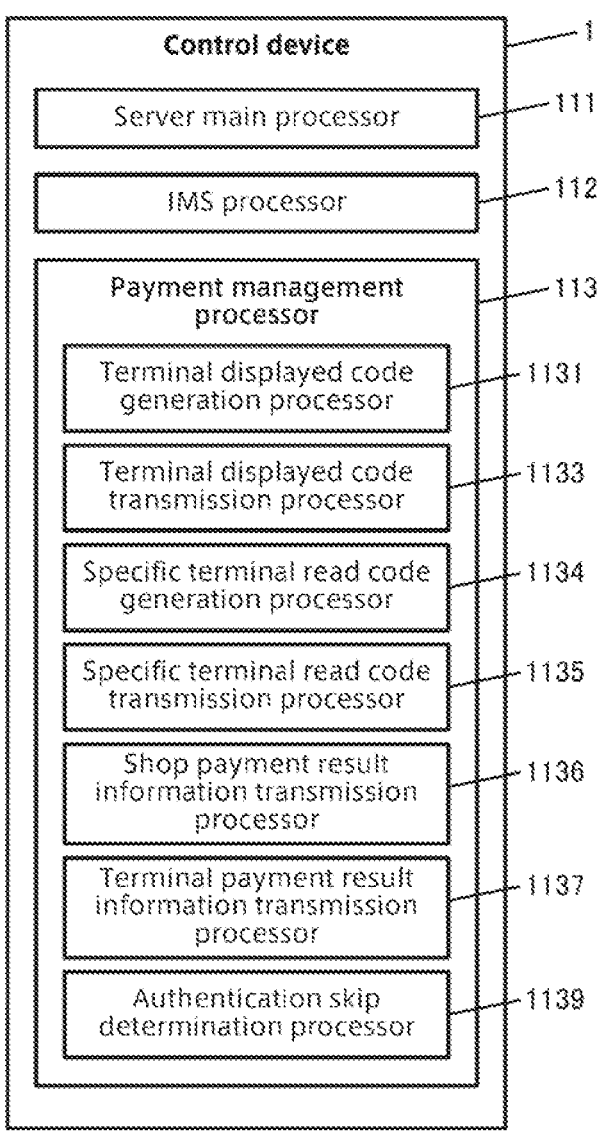
FIG. 5A is a diagram illustrating example functions accomplished by a control device of a server according to a third example embodiment.

FIG. 5A is a diagram illustrating example functions accomplished by the control device 11 of the server 10 according to this example embodiment.

The payment management processor 113 includes the terminal displayed code generation processor 1131, the terminal displayed code transmission processor 1133, the shop payment result information transmission processor 1136, the terminal payment result information transmission processor 1137, and the authentication skip determination processor 1139, and also a specific terminal read code generation processor 1134 and a specific terminal read code transmission processor 1135.

The specific terminal read code generation processor 1134 may generate a specific terminal read code that is a terminal read code which is specific because it contains the authentication skip information.

The specific terminal read code transmission processor 1135 may transmit the specific terminal read code generated by the specific terminal read code generation processor 1134 to the terminal 20.

<Process>

Figure 5B:
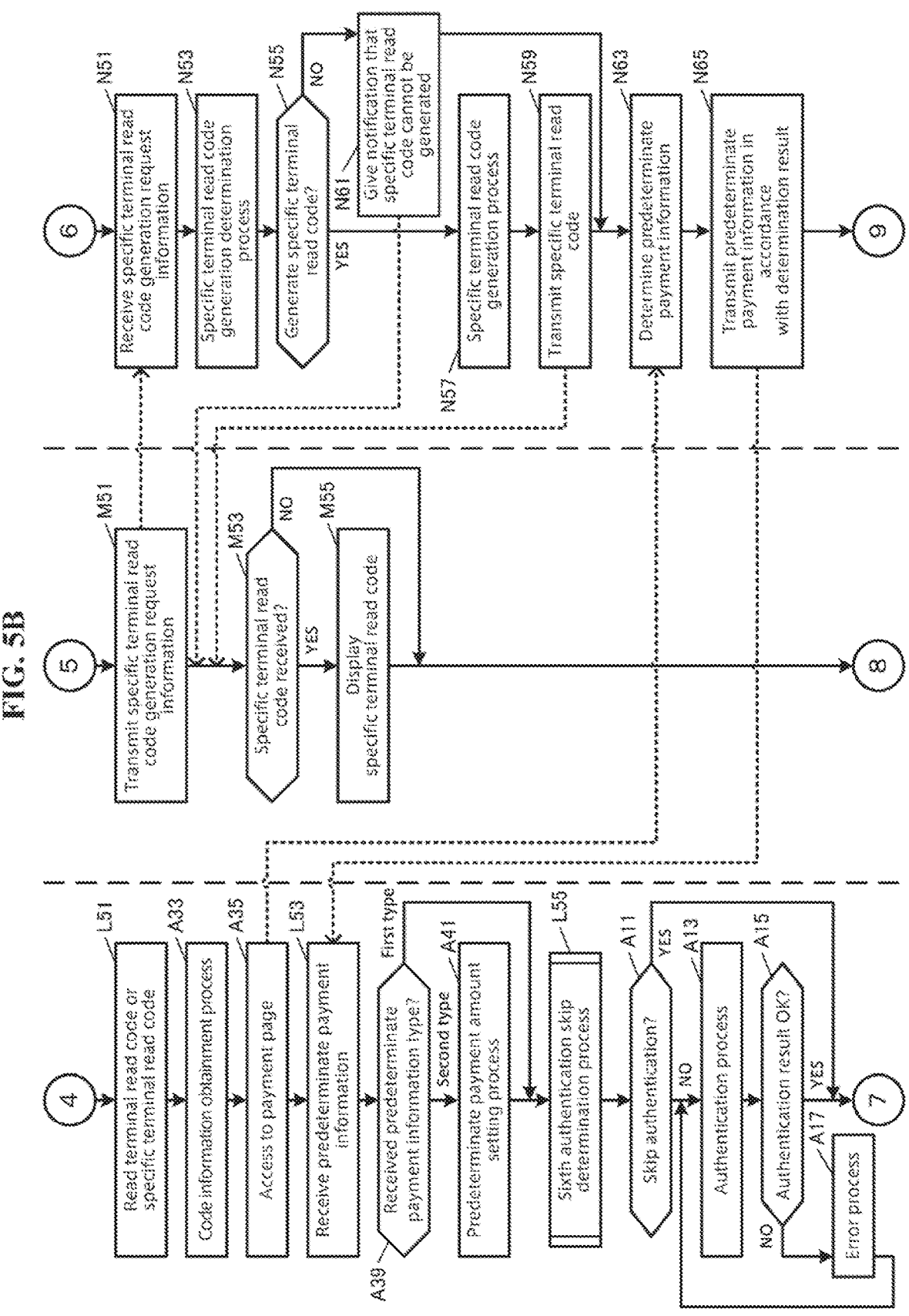
FIG. 5B is a flowchart illustrating example process flows by a terminal, a shop code reader device, and the server according to the third example embodiment.

FIG. 5B is a flowchart illustrating example process flows by respective devices in this example embodiment, and is an extracted process portion in FIG. 3AC that is the process portion in a case in which the payment type is "reading terminal code" in the process described in the first example embodiment. Note that the same reference numeral will be given to the same step as that of the already-described flowchart, and the description thereof will be omitted.

When determining in operation B3 that the payment type is not "displaying terminal read code", i.e., the payment type is "reading terminal code" (operation B3: No), the shop payment processor 513 transmits the specific terminal read code generation request information to the server 10 via the communication I/F 54 (operation M51).

More specifically, when the own shop is a shop that adopts the first type terminal read code, the shop payment processor 513 transmits, to the terminal 10, the specific terminal read code generation request information that contains therein, not as limitations but as examples, the shop ID, the sales amount of money information on the commodity associated with the first type terminal read code, and the authentication skip request information.

Moreover, when the own shop is a shop that adopts the second type terminal read code, the shop payment processor 513 transmits, to the server 10, the specific terminal read code generation request information that contains therein, not as limitations but as examples, the shop ID and the authentication skip request information.

In this case, the authentication skip request information is similar to the authentication skip request information as described in the <first modified example (10)>, and is information (request information) that requests the server 10 to generate the authentication skip information. This authentication skip request information can be transmitted to the server 10 from the shop code reader device 50 based on, not as a limitation but as an example, the approval by the shop server 70. That is, the authentication skip request information can also be also referred to as information requested by the server (the shop server 70) of the shop at which the terminal 20 makes a payment by IMS money.

More specifically, when the own shop is a shop that adopts the first type terminal read code, the specific terminal read code generation request information may contain, not as a limitation but as an example, the sales amount of money information on the commodity, such as a boxed food or a beverage, which is to be sold at the uniform amount of money at the shop.

However, the information that can be contained in the specific terminal read code generation request information is not limited to the above-described information. In addition to the above-described information, not as a limitation but as an example, the information on the commodity (e.g., the commodity name or the commodity kind) to be sold in association with the specific terminal read code may be contained therein.

Moreover, the above-described information on the commodity may be the information on the commodity that is, not as a limitation but as an example, equal to or smaller than the set amount of money or is smaller than the set amount of money (depending on the business category of the shop, the commodity to be sold, and the commodity kind, etc., for example, the commodity that is "equal to or smaller than JP 500 YEN" or is "smaller than JP 500 YEN", or the commodity that is "equal to or smaller than JP 1000 YEN" or is smaller than "JP 1000 YEN").

Furthermore, in the case of the shop that adopts the first type terminal read code, not as a limitation but as an example, the sales staff of the shop may enter the total amount of money for the commodities to be purchased by the user of the terminal 20 by IMS money into the shop code reader device 50 in such a way that the information on the total amount of money for the commodities to be purchased by the user of the terminal 20 by IMS money is contained in the specific terminal read code generation request information.

Still further, the shop code reader device 50 may contain, instead of or in addition to the shop ID (the shop identification information), area information on the location of the shop (not as a limitation but as example information on the location) in the specific terminal read code generation request information, and may transmit such information to the server 10.

Note that although the description will be given of a case in which the shop code reader device 50 transmits the specific terminal read code generation request information to the server 10, instead of this case, the shop server 70 may transmit, to the server 10, the specific terminal read code generation request information.

The payment management processor 113 executes the specific terminal read code generation determination process (operation N53) when receiving, via the communication I/F 14, the specific terminal read code generation request information from the shop code reader device 50 (operation N51).

More specifically, not as a limitation but as an example, a determination is made on whether or not the shop that is a transmission originator of the specific terminal read code generation request information is an affiliated shop. Moreover, when the sales amount of money information on the commodity to be sold in association with the first type terminal read code is contained in the received specific terminal read code generation request information, a determination is made on whether or not the sales amount of money indicated by this sales amount of money information is within an appropriate range of the amount of money (not as limitations but as examples, equal to or smaller than a threshold amount of money (depending on the business category of the shop, the commodity to be sold and the commodity kind, for example, "equal to or smaller than JP 1000 YEN", "equal to or smaller than JP 2000 YEN", and "equal to or smaller than JP 3000 YEN", etc.). Next, when such a condition is satisfied, a determination is made to generate the specific terminal read code. Conversely, when such a condition is not satisfied, a determination is made not to generate the specific terminal read code.

When the determination is made to generate the specific terminal read code (operation N55: Yes), the specific terminal read code generation processor 1134 executes the specific terminal read code generation process (operation N57).

In this specific terminal read code generation process, the specific terminal read code generation processor 1134 generates the specific terminal read code that contains, not as limitations but as examples, the access information and the authentication skip information. More specifically, the data formed by, for example, the letter string of the payment page URL and the letter string of a command that commands or requests to skip the authentication process is encoded (coded) and defined as a graphic to generate the specific terminal read code represented by the image of a two-dimensional code.

Moreover, the payment management processor 113 stores, in the terminal read code management database 1593 of the code management database 159, the sales amount of money (only for the shop that adopts a first type specific terminal read code), the payment page URL and the authentication skip allowance and disallowance in association with each other so as to correspond to the shop ID of this shop.

Note that as for the authentication skip information, instead of causing the command that commands or requests to skip the authentication process to be contained in the specific terminal read code, a token containing the authentication skip information may be contained in the specific terminal read code.

Subsequently, the specific terminal read code transmission processor 1135 transmits the specific terminal read code to the shop code reader device 50 of the transmission originator of the specific terminal read code generation request information via the communication I/F 14 (operation N59).

Conversely, when the determination is made not to generate the specific terminal read code (operation N55: No), the payment management processor 113 notifies, via the communication I/F 14, the shop code reader device 50 of the specific terminal read code being not generated (operation N61). Next, the payment management processor 113 transitions to operation N63.

The shop payment processor 513 determines whether or not the specific terminal read code is received from the server 10 via the communication I/F 54 (operation M53), and when determining that it is received (operation M53: Yes), displays the received specific terminal code on the display 53 (operation M55).

Conversely, when determining that the authentication skip disallowable information without receiving the specific terminal read code from the server 10 via the communication I/F 54 (operation M53: No), the shop payment processor 513 transitions to operation B15 in FIG. 3AF.

The payment application processor 213 of the terminal 20 reads either one of the terminal read code posted at the shop or the specific terminal read code displayed on the display 53 of the shop code reader device 50 in operation M55 by the application code reader (operation L51). Next, the payment application processor 213 executes operations A33 and A35.

The payment management processor 113 determines the predeterminate payment information in accordance with an access to the payment page from the terminal 20 (operation N63). More specifically, with reference to the terminal read code management database 1593, the information stored in association with this payment page is obtained. Next, the payment management processor 113 transmits the predeterminate payment information according to the determination result to the terminal 20 via the communication I/F 14 (operation N65).

In this case, when the information associated with the payment page is information on the shop that adopts the first type specific terminal read code, the payment management processor 113 transmits, to the terminal 20, the first type predeterminate payment information containing therein the payment predeterminate shop and the predeterminate payment amount of money via the communication I/F 14. Conversely, when the information associated with the payment page is information on the shop that adopts a second type specific terminal read code, the payment management processor 113 transmits, to the terminal 20, the second type predeterminate payment information (not containing predeterminate payment amount of money) containing the payment predeterminate shop via the communication I/F 14.

When receiving the predeterminate payment information from the server 10 via the communication I/F 22 (operation L53), the payment application processor 213 executes a sixth authentication skip determination process (operation L55) after executing operations A39 and A41.

In this sixth authentication skip determination process, the authentication skip determination processor 2135 determines whether or not the authentication skip information is contained in the code information obtained in the code information obtainment process in operation A33. When the specific terminal read code displayed on the shop code reader device 50 is read in operation L51, a determination is made that the authentication skip information is contained in the obtained code information, but when the terminal read code posted at the shop is read, a determination is made that the authentication skip information is not contained in the obtained code information. Next, when the determination is made that the authentication skip information is contained in the obtained code information, a determination is made to skip the authentication process. Subsequently, the payment application processor 213 transitions the process to operation A11.

Advantageous Effect of Third Example Embodiment

According to the third example embodiment, a structure is disclosed in which the server 10 (not as a limitation but as an example information processing device) generates the specific terminal read code (not as a limitation but as example code information) on the payment by IMS money (not as a limitation but as an example electronic money) by the terminal 20. The server 10 obtains information (not as a limitation but as example information) containing the shop information, and the sales amount of money information, etc., based on the specific terminal read code request information. Next, the server 10 generates the specific terminal read code so as to contain therein the information on the authentication process executed at the terminal 20 (not as a limitation but as example information on the authentication to the user of the terminal) based on the obtained information.

An example advantageous effect accomplished by such a structure is that the information processing device can easily generate the code information containing therein the information on the authentication to the user of the terminal based on the obtained information. Moreover, since the terminal is enabled to obtain the information on the authentication to the user of the terminal through the generated code information, the user friendliness can be improved.

Moreover, according to the third example embodiment, a structure is disclosed in which the above-described specific terminal read code (not as a limitation but as example code information) contains the information that is read by the application code reader (not as a limitation but as an example code reader) of the terminal 20.

An example advantageous effect accomplished by such a structure is that the information processing device can generate the code information containing therein the information that is read by the code reader of the terminal.

Furthermore, according to the third example embodiment, a structure is disclosed in which the above-described information obtained by the server 10 contains the information different from the authentication password (not as a limitation but as example authentication information to authenticate the user of the terminal).

An example advantageous effect accomplished by such a structure is that the information processing device can generate the code information containing therein the information on the authentication to the user of the terminal by obtaining the different information from the authentication information to authenticate the user of the terminal. Moreover, since the terminal is enabled to obtain the information on the authentication to the user of the terminal through the generated code information, a user friendliness can be improved.

Still further, according to the third example embodiment, a structure is disclosed in which the above-described information different from the authentication password contains the information on the location.

An example advantageous effect accomplished by such a structure is that the information processing device can generate the code information containing therein the information on the authentication to the user of the terminal by obtaining the information on the location. Moreover, since the terminal is enabled to obtain the information on the authentication to the user of the terminal through the generated code information, the user friendliness can be improved.

Yet still further, according to the third example embodiment, a structure is disclosed in which the above-described information on the location contains the shop identification information (not as a limitation but as example information on the shop at which the payment by electronic money is made by the terminal).

An example advantageous effect accomplished by such a structure is that the information processing device can generate the code information containing therein the information on the authentication to the user of the terminal by obtaining the information on the shop at which the payment by electronic money is made. Moreover, since the terminal is enabled to obtain the information on the authentication to the user of the terminal through the generated code information, the user friendliness can be improved.

Moreover, according to third example embodiment, a structure is disclosed in which the above-described specific terminal read code is generated so as to contain the authentication skip information when the shop is the shop with the first particular business category stored in the server 10 (not as a limitation but as an example particular shop).

An example advantageous effect accomplished by such a structure is that when the shop is the particular shop stored in the information processing device, the information processing device can generate the code information containing therein the information on the authentication to the user of the terminal. Moreover, since the terminal is enabled to obtain the information on the authentication to the user of the terminal through the generated code information, the user friendliness can be improved.

Furthermore, according to the third example embodiment, a structure is disclosed in which the above-described information different from the authentication password contains the information on the commodity name and commodity kind to be sold at the shop (not as a limitation but as example information on the commodity)

An example advantageous effect accomplished by such a structure is that the information processing device can generate the code information containing therein the information on the authentication to the user of the terminal by obtaining the information on the commodity. Moreover, since the terminal is enabled to obtain the information on the authentication to the user of the terminal through the generated code information, the user friendliness can be improved.

Still further, according to the third example embodiment, a structure is disclosed in which the above-described information on the commodity contains the information on the commodity that is equal to or smaller than the set amount of money or is smaller than the set amount of money.

An example advantageous effect accomplished by such a structure is that the information processing device can generate the code information containing therein the information on the authentication to the user of the terminal by obtaining the information on the commodity which is equal to or smaller than the set amount of money or is smaller than the set amount of money. In this case, when, for example, the amount of money for the commodity to be purchased by user is a small amount, the possibility of risk can be considered as low. Hence, since the terminal is enabled to obtain the information on the authentication to the user of the terminal through the generated code information while the safeness is secured by generating the code information containing therein the information on the authentication to the user of the terminal, the user friendliness can be improved.

Yet still further, according to the third example embodiment, a structure is disclosed in which the above-described information on the commodity contains the information on the total amount of money for the commodities purchased by the user of the terminal 20 by IMS money.

An example advantageous effect accomplished by such a structure is that the information processing device can generate the code information containing therein the information on the authentication to the user of the terminal by obtaining the information on the total amount of money for the commodities purchased by the user of the terminal by electronic money. In this case, when, for example, the total amount of money for the commodities purchased by the user of the terminal by electronic money is a small amount, the possibility of risk can be considered as low. Hence, since the terminal is enabled to obtain the information on the authentication to the user of the terminal through the generated code information while the safeness is secured by generating the code information containing therein the information on the authentication to the user of the terminal, the user friendliness can be improved.

Moreover, according to the third example embodiment, a structure is disclosed in which the above-described information obtained by the server 10 contains the authentication skip request information (not as a limitation but as example request information that requests to generate the information on the authentication to the user of the terminal).

An example advantageous effect accomplished by such a structure is that the information processing device can generate the code information containing therein the information on the authentication to the user of the terminal by obtaining the request information which requests to generate the information on the authentication to the user of the terminal. Moreover, since the terminal is enabled to obtain the information on the authentication to the user of the terminal through the generated code information, the user friendliness can be improved.

Furthermore, according to the third example embodiment, a structure is disclosed in which the above-described information obtained by the server 10 contains the authentication skip request information (not as a limitation but as example request information requested by the server of the shop at which the payment by electronic money is made by the terminal).

An example advantageous effect accomplished by such a structure is that the information processing device can generate the code information containing therein the information on the authentication to the user of the terminal in accordance with the intent of the shop by obtaining the request information requested by the server of the shop at which the payment by electronic money is made by the terminal. Moreover, since the terminal is enabled to obtain the information on the authentication to the user of the terminal through the generated code information, the user friendliness can be improved.

Still further, according to the third example embodiment, a structure is disclosed in which the above-described information containing therein the specific terminal read code contains the authentication skip information (not as a limitation but as example skip information for causing the terminal to skip the authentication to the user of the terminal).

An example advantageous effect accomplished by such a structure is that the information processing device can generate the code information containing therein the skip information for causing the terminal to skip the authentication to the user of the terminal. Moreover, the terminal is enabled to skip the authentication to the user of the terminal through the generated code information.

Yet still further, according to the third example embodiment, a structure is disclosed in which the above-described authentication skip information contains the information that causes the terminal 20 to skip the authentication process by causing the terminal 20 to obtain the authentication skip information.

An example advantageous effect accomplished by such a structure is that the authentication to the user of the terminal can be easily and surely skipped by the terminal based on the skip information contained in the code information.

Moreover, according to the third example embodiment, a structure is disclosed in which the server 10 transmits the specific terminal read code (not as a limitation but example code information) to the shop code reader device 50 via the communication I/F 14, and receives the payment request information from the terminal 20 via the communication I/F 14 based on the specific terminal read code that is read by the application code reader of the terminal 20.

An example advantageous effect accomplished by such a structure is that the server can receive and obtain the information on payment by electronic money made by the terminal based on the transmitted code information that is read by the code reader of the terminal.

Furthermore, according to the third example embodiment, a structure is disclosed in which the above-described information different from the authentication password contains the authentication skip information associated with the above-described specific terminal read code.

An example advantageous effect accomplished by such a structure is that the server can associate the different information from the authentication information with the code information that is read by the code reader of the terminal.

Still further, according to the third example embodiment, a structure is disclosed in which the above-described authentication skip information contains the information generated by the shop code reader device 50.

An example advantageous effect accomplished by such a structure is that the server can associate the information generated based on the shop that manages the commodities with the code information that is read by the code reader of the terminal.

Yet still further, according to the third example embodiment, a structure is disclosed in which the above-described authentication skip information is generated based on the request information transmitted from the shop code reader device 50.

An example advantageous effect accomplished by such a structure is that the server can create the information associated with the code information based on the request by the shop that manages the commodities.

Third Modified Example (1)

According to the third example embodiment, although the server 10 generates the specific terminal read code that contains therein the authentication skip information, the present disclosure is not limited to this case. The server 10 may generate the specific terminal read code that contains therein, not as a limitation but as an example, the information utilized by the terminal 20 to skip the authentication to the user of the terminal 20, i.e., the information necessary for the terminal 20 to execute the authentication skip determination.

More specifically, based on the request from the shop, the server 10 may generate, in the specific terminal code generation process, the specific terminal read code that contains therein various information such as, not as limitations but as examples, the information on the amount of money for the commodity to be purchased by the user of the terminal 20 by IMS money, the information on the commodity to be purchased by the user of the terminal 20, the information on the region (area) at which the user of the terminal 20 makes a payment by IMS money, and the information on the shop at which the user of the terminal 20 purchases the commodity by IMS money.

For example, the shop code reader device 50 puts the predeterminate payment amount of money, such as the amount of money for the commodity to be purchased by the user of the terminal 20 and the total amount of money for such commodities, in the specific terminal read code generation request information based on the operation by the sales staff of the shop, and transmits such request information to the server 10. Next, the server 10 generates the specific terminal read code that contains therein the predeterminate payment amount of money contained in the specific code generation request information received from the shop code reader device 50.

Moreover, for example, the shop code reader device 50 puts the commodity kind identification information to identify the commodity purchased by the user of the terminal 20 and the commodity identification information to identify the commodity in the specific terminal read code generation request information based on the operation by the sales staff of the shop, and transmits such request information to the server 10. Next, the server 10 generates the specific terminal read code that contains therein the commodity identification information or the commodity kind identification information contained in the specific code generation request information received from the shop code reader device 50.

Furthermore, for example, the shop code reader device 50 puts the information stored in the own device in advance, such as the area information on the location of the own shop and the shop identification information (shop ID) on the own shop, in the specific terminal read code generation request information, and transmits such request information to the server 10. Next, the server 10 generates the specific terminal read code that contains therein the area information and the shop identification information contained in the specific terminal read code generation request information received from the shop code reader device 50.

The specific terminal read code generated by the server 10 as described above is transmitted to and displayed on the shop code reader device 50, and is read by the terminal 20. The terminal 20 can execute the authentication skip determination based on various information obtained by decoding the data from the read specific terminal read code.

Note that the determination method of the terminal 20 for the authentication skip may be executed based on the descriptions in the above-described embodiments and modified examples thereof.

Advantageous Effect of Third Modified Example
(1)

According to this modified example, a structure is disclosed in which the above-described information contained in the specific terminal read code contains therein the information utilized by the terminal 20 to skip the authentication to the user of the terminal 20.

An example advantageous effect accomplished by such a structure is that the server can generate the code information containing therein the information utilized by the terminal to skip the authentication to the user of the terminal. Moreover, the terminal is enabled to obtain the information utilized by the terminal to skip the authentication to the user of the terminal through the generated code information, and can easily determine whether or not to skip the authentication to the user based on such information.

Moreover, according to this modified example, a structure is disclosed in which the above-described information contained in the specific terminal read code contains therein the information on the commodity to be purchased by the user of the terminal 20 by IMS money.

An example advantageous effect accomplished by such a structure is that the server can generate the code information containing therein the information on the commodity to be purchased by the user of the terminal by electronic money. Moreover, the terminal is enabled to obtain the information on the commodity to be purchased by the user of the terminal by electronic money through the generated code information, and can easily determine whether or not to skip the authentication to the user based on, for example, the commodity to be purchased by the user.

Furthermore, according to this modified example, a structure is disclosed in which the above-described information on the commodity to be purchased by the user of the terminal 20 contains therein the information on the amount of money for the commodity to be purchased by the user of the terminal 20 by IMS money.

An example advantageous effect accomplished by such a structure is that the server can generate the code information containing therein the information on the amount of money for the commodity. Moreover, the terminal is enabled to obtain the information on the sales amount of money for the commodity through the generated code, and can easily determine whether or not to skip the authentication to the user based on, for example, the sales amount of money for the commodity to be purchased by the user.

Still further, according to this modified example, a structure is disclosed in which the above-described information contained in the specific terminal read code contains therein the information on the region (area) at which the user of the terminal 20 makes a payment.

An example advantageous effect accomplished by such a structure is that the server can generate the code information containing therein the information on the location. Moreover, the terminal is enabled to obtain the information on the location through the generated code information, and can easily determine whether or not to skip the authentication to the user based on, for example, the area and the location of the shop at which the user makes a payment.

Yet still further, according to this modified example, a structure is disclosed in which the above-described information contained in the specific terminal read code contains therein the information on the shop at which the user of the terminal 20 purchases the commodity.

An example advantageous effect accomplished by such a structure is that the server can generate the code information containing therein the information on the shop at which the commodity is purchased. Moreover, the terminal is enabled to obtain the information on the shop at which the commodity is purchased through the generated code information, and can easily determine whether or not to skip the authentication to the user based on, for example, the shop at which the commodity is purchased.

Third Modified Example (2)

According to the third example embodiment, although the server 10 generates the specific terminal read code containing therein the authentication skip information, the present disclosure is not limited to this case. More specifically, not as a limitation but as an example, the terminal 20 may generate the terminal displayed code (referred to as a specific terminal displayed code" below) which is the terminal displayed code utilized for the payment type "displaying terminal code", and which contains therein the authentication skip information.

Figure 5C:
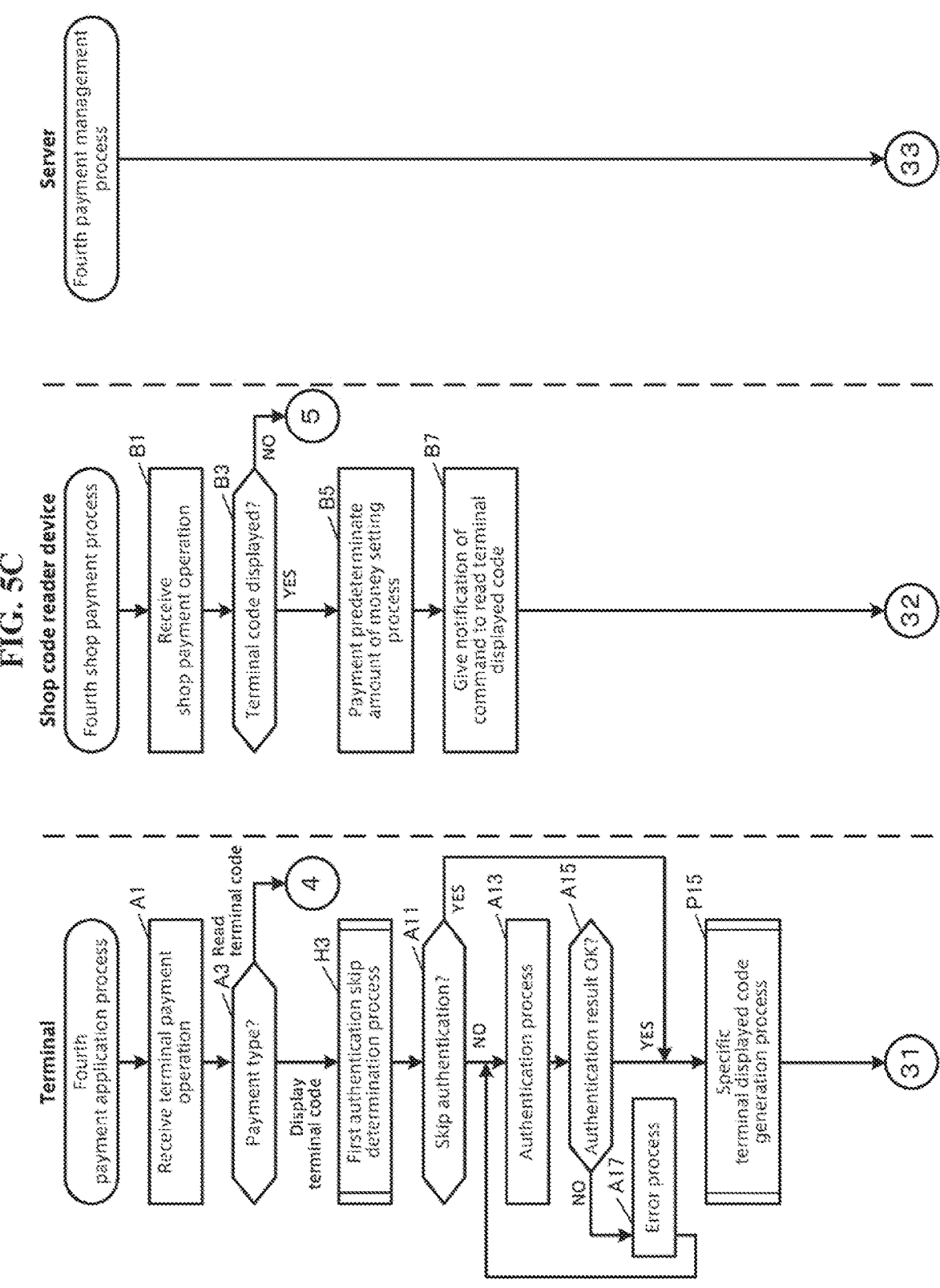
FIG. 5C is a flowchart illustrating example process flows by the terminal, the shop code reader device, and the server according to a third modified example.
Figure 5D:
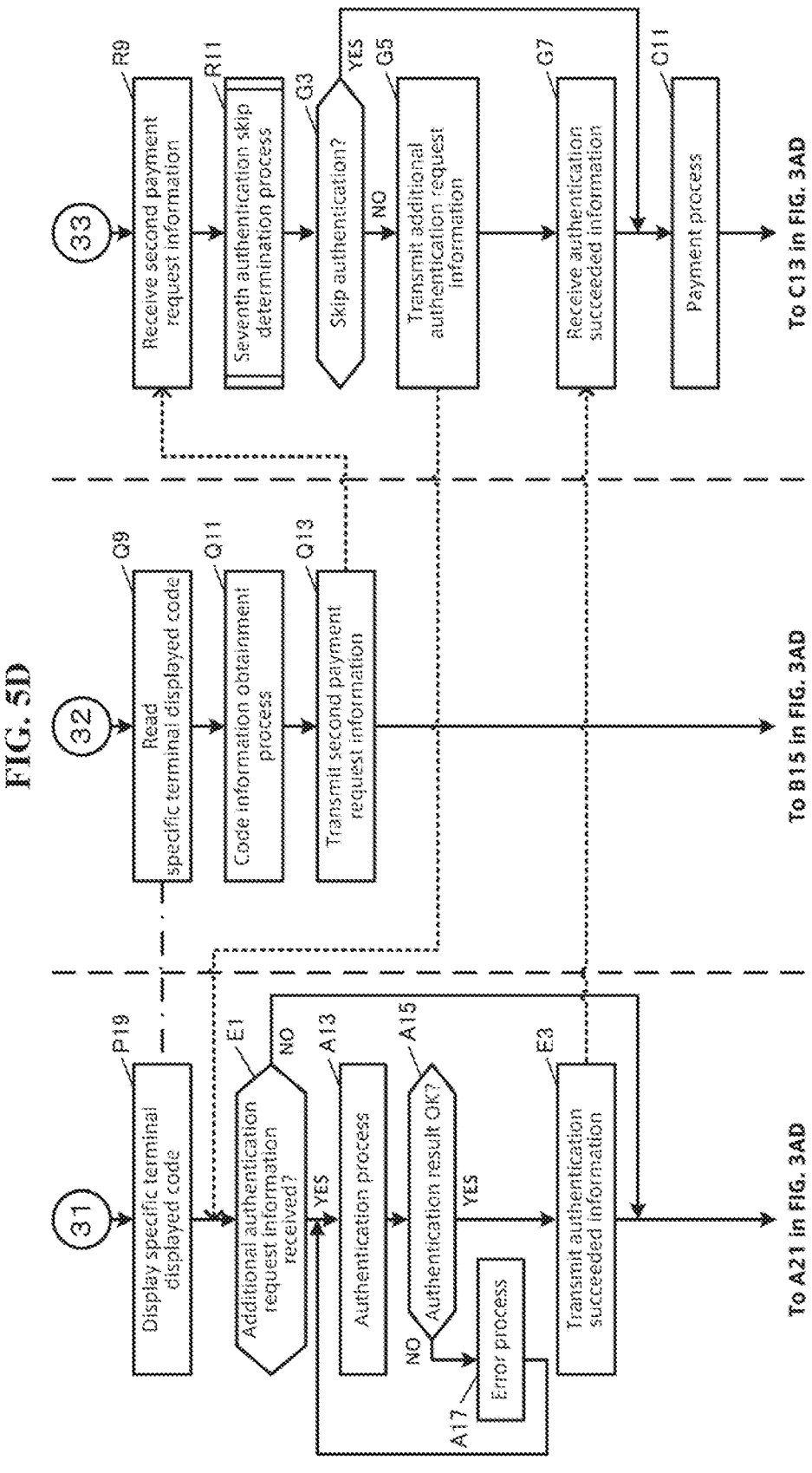
FIG. 5D is a flowchart illustrating example process flows by the terminal, the shop code reader device, and the server according to the third modified example.

FIG. 5C and FIG. 5D are flowcharts each illustrating example process flows by respective devices in this case. Note that the same step as that of the already-described flowchart will be denoted by the same reference numeral, and the description thereof will be omitted.

When determining in operation A3 that the payment type is "displaying terminal code" (operation A3: displaying terminal code), the payment application processor 213 executes the first authentication skip determination process (operation H3). Next, the payment application processor 213 executes operations A11 to A17.

When determining in A15 that the authentication result is "OK" (operation A15: Yes), or when determining in A11 to skip the authentication process (operation A11: Yes), the payment application processor 213 executes a specific terminal displayed code generation process (operation P15). More specifically, not as a limitation but as an example, the specific terminal displayed code that contains therein the authentication skip status information which is information on whether or not the authentication process at the terminal 20 is skipped is generated. Next, the payment application processor 213 displays the generated specific terminal displayed code on the display 24 (operation P19).

The shop payment processor 513 causes the code reader 58 to read the specific terminal displayed code displayed on the display 24 of the terminal 20 (operation Q9). Next, the shop payment processor 513 transmits, after executing a code information obtainment process to obtain the information contained in the read specific terminal displayed code (operation Q11), the second payment request information containing therein the obtained information to the server 10 via the communication I/F 54 (operation Q13).

When the payment management processor 113 receives the second payment request information from the shop code reader device 50 via the communication I/F 14 (operation R9), the authentication skip determination processor 1139 executes a seventh authentication skip determination process (operation R11). Note that in order to distinguish from the authentication skip determination process in the other embodiment, it will be referred to as the "seventh authentication skip determination process" for such a purpose.

In this seventh authentication skip determination process, the authentication skip determination processor 1139 determines whether or not the authentication process at the terminal 20 is to be skipped based on the authentication skip status information contained in the second payment request information received from the shop code reader device 50.

When the authentication process at the terminal 20 is not skipped, the authentication skip determination processor 1139 determines that the additional authentication is unnecessary. This is because the authentication process has been already executed at the terminal 20.

Conversely, when the authentication process at the terminal 20 is skipped, the authentication skip determination processor 1139 determines whether or not the authentication skip condition is satisfied based on the authentication skip condition contained in the authentication skip condition data 156 in the storage 15. Next, when the authentication skip condition is satisfied, a determination is made that the additional authentication is unnecessary, and when the authentication skip condition is not satisfied, a determination is made that the additional authentication is necessary. This is because although the authentication process is skipped at the terminal 20, it is preferable that the terminal 20 should execute the additional authentication depending on the result of the authentication skip determination by the server 10.

As a specific example, although the determination is made at the terminal 20 to skip the authentication process since the predeterminate payment amount of money is not large due to a difference between the setting for the terminal 20 regarding the authentication skip and the setting for the server 10 regarding the authentication skip, the server 10 determines that there is a problem (the possibility of risk) to skip the authentication process at the terminal 20 since the predeterminate payment amount of money is a large amount. Hence, the authentication skip at the terminal 20 is canceled in such a case, and the additional authentication is to be executed.

Note that unlike the above-described case, when the authentication process at the terminal 20 is skipped, the server 10 may determine that the additional authentication is unnecessary by accepting the determination by the terminal 20. In this case, it is unnecessary to execute the authentication skip determination at the server 10.

When the determination is made that the additional authentication is necessary in the seventh authentication skip determination process (operation G3: No), the payment management processor 113 transmits the additional authentication request information to the terminal 20 via the communication I/F 14 (operation G5). Next, the payment management processor 113 executes, after receiving the authentication succeeded information from the terminal 20 via the communication I/F 14 (operation G7), the payment process (operation C11). Next, the payment management processor 113 transitions to operation C13.

Note that in the above-described process, although the terminal 20 generates the specific terminal displayed code that contains therein the authentication skip status information, the present disclosure is not limited to this case.

For example, the terminal 20 may generate the specific terminal displayed code containing therein the information utilized by the server 10 to determine whether or not to skip the authentication to the user of the terminal 20, i.e., the necessary information for the server 10 to execute the authentication skip determination.

More specifically, the terminal 20 may generate, in the specific terminal displayed code generation process, the specific terminal displayed code that contains therein various information such as, not as limitations but as examples, the information on the amount of money for the commodity to be purchased by the user of the terminal 20, the information on the commodity to be purchased by the user of the terminal 20, the information on the region (the area) at which the user of the terminal 20 makes a payment, the information on the shop at which the user of the terminal 20 purchases the commodity, the information on the setting for the terminal 20 or for the payment application, the information on the locked state (locked or unlocked) of the OS of the terminal 20 and on the lock setting (ON/OFF) thereof, and the information on the locked state (locked or unlocked) of the payment application of the terminal 20 and the lock setting (ON/OFF) thereof.

For example, the terminal 20 generates the specific terminal displayed code so as to contain therein the predeterminate payment amount of money that contains therein the amount of money for the commodity to be purchased by the user of the terminal 20, and the total amount of money thereof based on the user's operation.

Moreover, for example, the terminal 20 generates the specific terminal displayed code so as to contain therein the commodity identification information to identify the commodity purchased by the user of the terminal 20 and the commodity kind identification information to identify the commodity kind thereof based on the user's operation.

Furthermore, for example, based on the latest calculated position stored in the calculated position record data 288, the terminal 20 may generate the specific terminal displayed code so as to contain therein the area information on the area at which the own terminal 20 is located, or generate the specific terminal displayed code containing therein the shop identification information (the shop ID) of the shop at which the user of the terminal 20 purchases the commodity based on the user's operation.

Still further, for example, the terminal 20 generates the specific terminal displayed code containing therein the information on the authentication setting (ON/OFF) at the own terminal 20, and the information on the authentication setting (ON/OFF) at the payment application of the own terminal 20.

Yet still further, for example, the terminal 20 generates the specific terminal displayed code so as to contain therein the locked state (locked or unlocked) at the OS of the own terminal 20, and the locked state (locked or unlocked) at the payment application, and, the lock setting (ON/OFF) at the OS of the own terminal 20, and the lock setting (ON/OFF) at the payment application.

The specific terminal displayed code generated as described above by the terminal 20 is displayed on the display 24 of the terminal 20 as described above, and is read by the shop code reader device 50. Next, the second payment request information containing therein the various information obtained by decoding the data from the read specific terminal displayed code is transmitted to the server 10 from the shop code reader device 50. Subsequently, the server 10 can execute the authentication skip determination based on the above-described various information contained in the second payment request information received from the shop code reader device 50.

Note that the authentication skip determination method by the server 10 may be executed based on the above-described embodiments and the modified examples thereof.

Advantageous Effect of Third Modified Example (2)

According to this modified example, a structure is disclosed in which the terminal 20 (not as a limitation but as an example information processing device) generates the specific terminal displayed code (not as a limitation but as example code information) regarding the payment by IMS money (not as limitation but as an example electronic money) by the terminal 20. The terminal 20 obtains information (not as a limitation but example information), such as the information on the amount of money for the commodity to be purchased by the user of the terminal 20, the information on the commodity to be purchased by the user of the terminal 20, the information on the region (the area) at which the user of the terminal 20 makes a payment, the information on the shop at which the user of the terminal 20 purchases the commodity, and the information on the lock or unlock of the terminal 20 and the lock or unlock of the payment application of the terminal 20. Next, the terminal 20 generates the specific terminal displayed code containing therein the information on the authentication process executed at the terminal 20 (not as a limitation but as example information on the authentication to the user of the terminal) based on the obtained information.

An example advantageous effect accomplished by such a structure is that the terminal that is a kind of information processing device can easily generate the code information containing therein the information on the authentication to the user of the terminal based on the obtained information. Moreover, the information on the authentication to the user of the terminal can be provided to the other device through the generated code information.

Moreover, according to this modified example, a structure is disclosed in which the terminal 20 generates the specific terminal displayed code containing therein the above-described information on the authentication process executed at the terminal 20.

An example advantageous effect accomplished by such a structure is that the terminal that is a kind of information processing device can easily generate the code information containing therein the information on the authentication to the user of the terminal.

Furthermore, according to this modified example, a structure is disclosed in which the above-described information contained in the specific terminal displayed code contains therein the authentication skip status information (not as a limitation but as example information indicating that the user of the terminal is authenticated by the terminal).

An example advantageous effect accomplished by such a structure is that the terminal that is a kind of the information processing device can generate the code information containing therein the information indicating that the user of the terminal is authenticated by the terminal.

Still further, according to this modified example, a structure is disclosed in which the above-described information obtained by the terminal 20 contains therein the information different from the authentication password (not as a limitation but as example authentication information to authenticate the user of the terminal).

An example advantageous effect accomplished by such a structure is that the terminal that is a kind of information processing device can generate the code information containing therein the different information from the authentication information to authenticate the user of the terminal.

Yet still further, according to this modified example, a structure is disclosed in which the above-described information different from the authentication password contains therein the information on the IMS money (not as a limitation but as example information on the electronic money).

An example advantageous effect accomplished by such a structure is that the terminal that is a kind of the information processing device can generate the code information containing therein the information on the electronic money.

Moreover, according to this modified example, a structure is disclosed in which the above-described information different from the authentication password contains therein the information on the region (area) at which the user of the terminal 20 makes a payment (not a limitation but as example information on the location).

An example advantageous effect accomplished by such a structure is that the terminal that is a kind of the information processing device can generate the code information containing therein the information on the location. For example, the information on the location at which the user of the terminal makes a payment can be provided to the other device through the generated code information by containing the information on the location at which the user of the terminal makes a payment as information on the location.

Furthermore, according to this modified example, a structure is disclosed in which the above-described information different from the authentication password contains therein the information on the commodity to be purchased by the user of the terminal 20 (not as a limitation but as example information on the commodity).

An example advantageous effect accomplished by such a structure is that the terminal that is a kind of the information processing device can generate the code information containing therein the information on the commodity.

Still further, according to this modified example, a structure is disclosed in which the above-described information different from the authentication password contains therein the information on the authentication setting (ON/OFF) at the terminal 20 or the authentication setting (ON/OFF) at the payment application (not as a limitation but as example information on the setting for the terminal or for the application stored in the terminal).

An example advantageous effect accomplished by such a structure is that the terminal that is a kind of the information processing device can generate the code information containing therein the information on the setting for the terminal or for the application stored in the terminal.

Yet still further, according to this modified example, the above-described information different from the authentication password contains therein the information on the locked state and the lock setting for the terminal 20 and the information on the locked state and the lock setting for the payment application of the terminal 20 (not as limitations but as example information on the security for the terminal or for the application stored in the terminal)

An example advantageous effect accomplished by such a structure is that the terminal that is a kind of the information processing device can generate the code information containing therein the information on the security for the terminal or for the application stored in the terminal.

Moreover, according to this modified example, a structure is disclosed in which the above-described information contained in the specific terminal displayed code is obtained by the server 10 (not as a limitation but as an example server that manages a payment by electronic money).

An example advantageous effect accomplished by such a structure is that the terminal that is a kind of the information processing device can provide, to the server that manages a payment by electronic money, the information on the authentication to the user of the terminal.

Furthermore, according to this modified example, a structure is disclosed in which, when the authentication skip condition is satisfied based on the information contained in the specific terminal displayed code, the server 10 does not transmit the additional authentication request information (not as a limitation but as example information on the execution of the authentication by the terminal to the user of the terminal) to the terminal 20 via the communication I/F 14 of the server 10, but transmits the payment result information (not as a limitation but as example information indicating that a payment by electronic money is made) to the terminal 20 via the communication I/F 14.

An example advantageous effect accomplished by such a structure is that the server that manages a payment by electronic money does not transmit, to the terminal, the information on the execution of the authentication by the terminal to the user of the terminal via the communication interface of the server but transmits, to the terminal, the payment information indicating that a payment by electronic money is made via the communication interface of the server based on the information on the authentication to the user of the terminal. Accordingly, the process load on the server can be reduced.

Third Modified Example (3)

The generation of the specific terminal read code described in the third example embodiment can be executed shop by shop, and also can be executed commodity by commodity to be sold at the shop, or commodity kind by commodity kind like the <First Modified Example (10)>.

When, for example, it is desirable to skip the authentication for the commodity kinds "boxed food" and "beverage" at the shop like the example described with reference to FIG. 3AJ, the shop code reader device 50 transmits, to the server 10, the specific terminal read code generation request information that contains therein the shop ID, the identification information on the commodity kind(s) (in this example, the "boxed food" and the "beverage"), the sales amount of money information thereon, and the authentication skip request information. Next, upon receiving the specific terminal read code generation request information from the shop code reader device 50, the server 10 generates the specific terminal read code that contains therein the authentication skip information for the commodity kinds "boxed food" and "beverage".

Conversely, when, for example, it is desirable not to skip the authentication for the commodity kind "gift commodity" at the shop like the example described with reference to FIG. 3AJ, the terminal read code generation request information is transmitted which requests the generation of, instead of the specific terminal read code that contains therein the authentication skip information, the normal terminal read code that does not contain therein the authentication skip information. Next, upon receiving the terminal read code generation request information from the shop code reader device 50, the server 10 generates the terminal read code that does not contain therein the authentication skip information for the commodity kind "gift commodity".

Moreover, the commodity that has the authentication to be skipped, and the commodity that has the authentication not skipped can be classified in a single commodity kind like the <First Modified Example (10)>. As described above, this is a case like the example in which the commodity kind "boxed food" is classified into the boxed food with the sales amount of money "JP 200 YEN", the boxed food with the sales amount of money "JP 300 YEN", and the boxed food with the sales amount of money "JP 500 YEN". Next, the server 10 generates the specific terminal read code containing therein the authentication skip information for the commodity that has the authentication to be skipped, and generates the normal terminal read code that does not contain the authentication skip information for the commodity which has the authentication not skipped.

Advantageous Effect of Third Modified Example (3)

An example advantageous effect accomplished by this modified example is that the information processing device can generate the code information containing therein the information on the authentication to the user of the terminal for each commodity to be sold at the shop and for each commodity kind. Moreover, depending on the commodity to be sold at the shop and the commodity kind, there is a case in which the information on the authentication to the user of the terminal is contained in code information or is a case in which such information is not contained, and thus the code information can be generated in accordance with the intent of the shop.

Fourth Example Embodiment

A fourth example embodiment is an embodiment in which, not as a limitation but as an example, the user of the terminal 20 transfers the IMS money to the other user's terminal 20 registered as a friend in the IMS application using the payment application. In this case, the authentication for money transfer necessary for the user is skipped when a particular condition is satisfied.

One or more features of the first to the third example embodiments may be combined with one or more features of the fourth example embodiment, to provide an electronic payment service.

Unless otherwise particularly mentioned, the term "authentication" in this example embodiment means to authenticate that the user of the terminal 20 is the qualified user for money transfer, and the term "authentication process" means a process to accomplish the authentication for this money transfer.

Moreover, unless otherwise particularly mentioned, the term "authentication skip condition" means the condition to skip the above-described authentication process for money transfer, and the term "skip the authentication process" means to ignore the process command for the authentication process and to execute the subsequent process, i.e., to omit the authentication process.

Figure 6A:
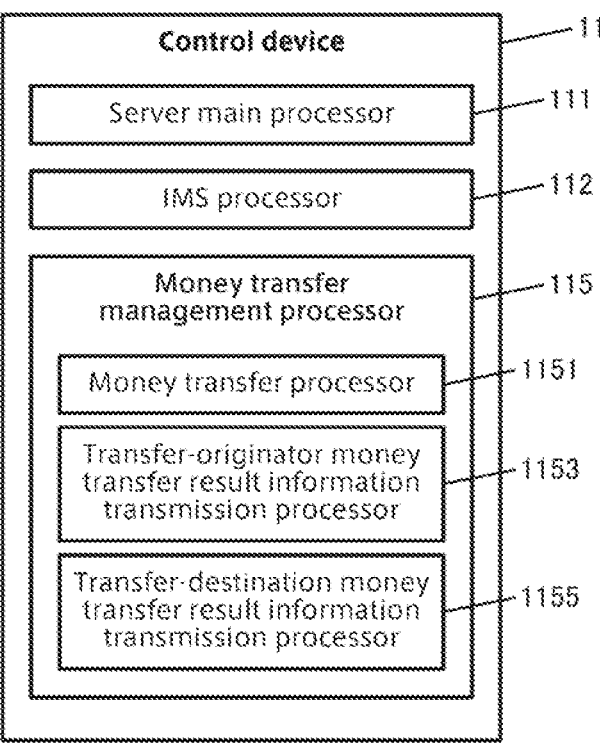
FIG. 6A is a diagram illustrating example functions accomplished by a control device of a server according to a fourth example embodiment.

The details described in the fourth example embodiment is applicable to each of the other embodiments.
<Functional Structure>
(1) Functional Structure of Server FIG. 6A is a diagram illustrating example functions accomplished by the control device 11 of the server 10 in this example embodiment.

The payment management processor 113 includes the server main processor 111, the IMS processor 112, and also a money transfer management processor 115 as a functional or hardware unit.

The money transfer management processor 115 may execute a money transfer management process which transfers the IMS money to the other user's terminal 20 registered as a friend in the IMS application, and which receives the IMS money from the other user's terminal 20 in accordance with a money transfer management process program 1517 stored in the storage 15.

The money transfer management processor 115 includes, not as limitations but as examples, a money transfer processor 1151, a transfer-originator money transfer result information transmission processor 1153, and a transfer-destination money transfer result information transmission processor 1155.

The money transfer processor 1151 may execute a money transfer process to transfer the IMS money possessed by the user of a first terminal 20 to a second terminal 20 based on the money transfer request information transmitted from the first terminal 20.

The transfer-originator money transfer result information transmission processor 1153 may transmit money transfer result information that is information on a money transfer result to the first terminal 20 that is the transfer originator of the IMS money.

The transfer-destination money transfer result information transmission processor 1155 may transmit money transfer result information that is information on a money transfer result to the second terminal 20 that receives the IMS money.

Figure 6B:
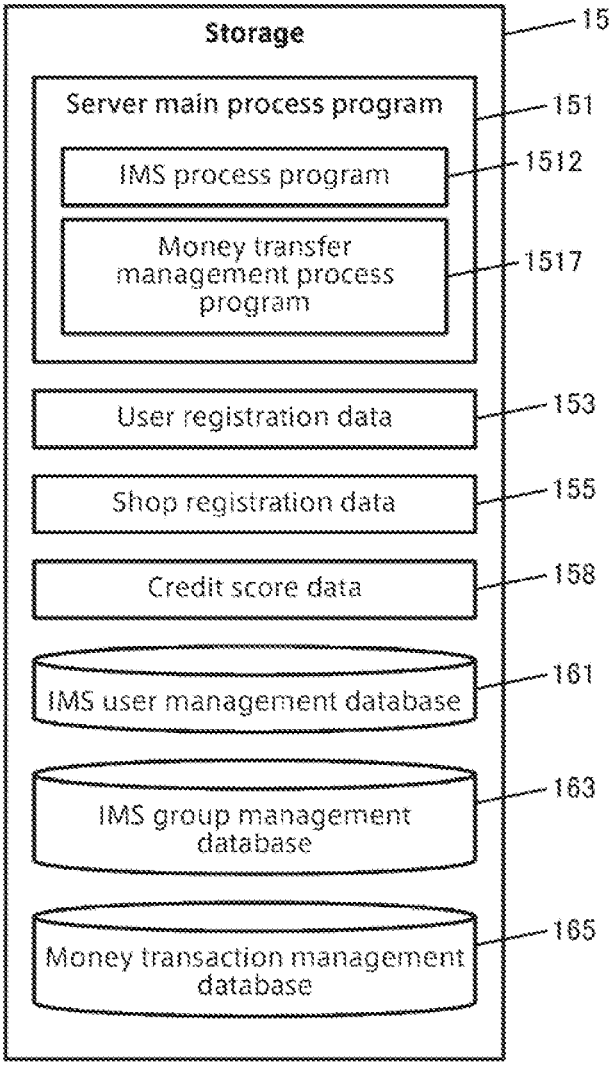
FIG. 6B is a diagram illustrating example information stored in a storage of the server according to the fourth example embodiment.

FIG. 6B is a diagram illustrating example information stored in the storage 15 of the server 10 in this example embodiment.

In addition to the IMS process program 1512, the server main process program 151 includes a subroutine program that is the money transfer management process program 1517 to be executed as a money transfer management process.

Moreover, the storage 15 stores the user registration data 153 and the shop registration data 155, and also an IMS user management database 161, an IMS group management database 163, and a money transaction management database 165.

According to this example embodiment, the description will be given of a case in which the user information stored and registered in the user registration data 153 is the user information shared by the IMS application and by the payment application.

Figure 6C:
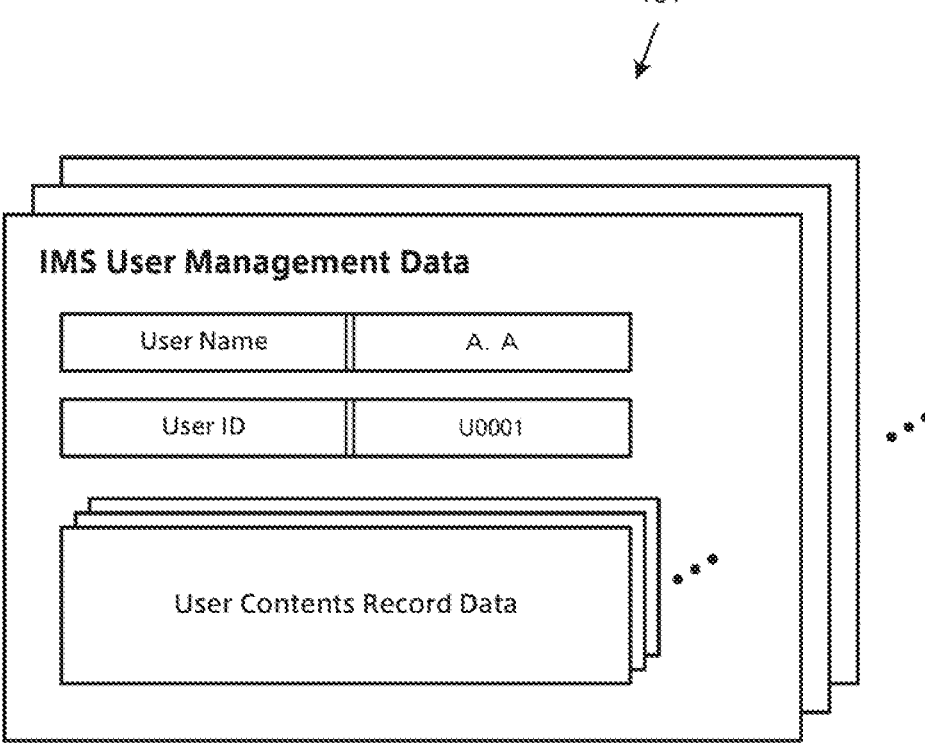
FIG. 6C is a diagram illustrating example data structure of an IMS user management database according to the fourth example embodiment.

The IMS user management database 161 is a database to manage the data on the utilization of the IMS by the user registered in the user registration data 153, and FIG. 6C illustrates an example data structure thereof.

Individual IMS user management data is stored in the IMS user management database 161 for each of the plurality of users.

The IMS user management data of each user stores, not as a limitation but as an example, user contents record data in association with the user name and the user ID.

The user contents record data is data on the record for contents transmitted and received between this user's terminal 20, and the other users' terminal 20, and data is stored as a record which associates, not as limitations but as examples, the contents transmitted and received in this user's talkroom, the date and time at which the contents are transmitted and received, and a contents number that is identification information to identify the contents with each other.

Figure 6D:
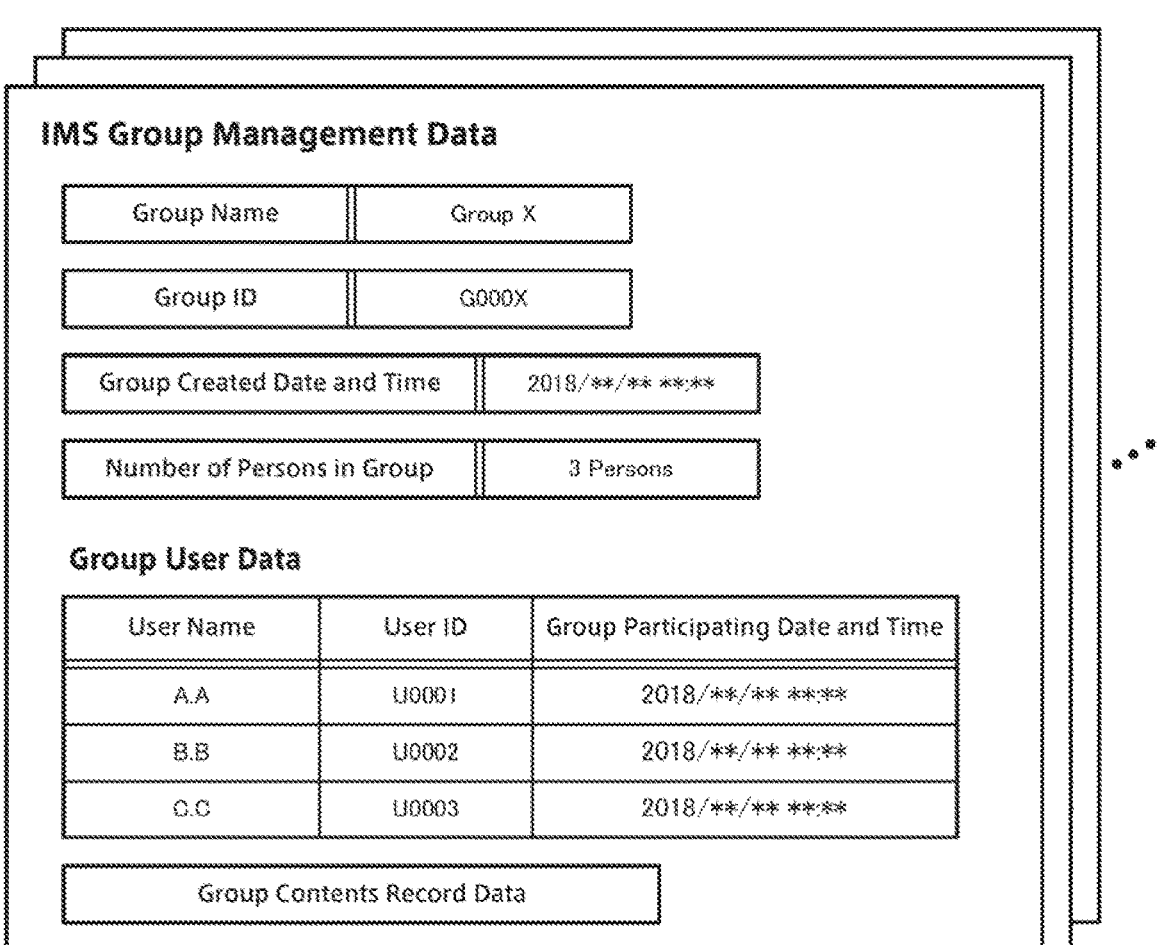
FIG. 6D is a diagram illustrating example data structure of an IMS group management database according to the fourth example embodiment.

The IMS group management database 163 is a database to manage data on the utilization of the IMS by a group that is formed by the plurality of users registered in the user registration data 153, and FIG. 6D illustrates an example data structure thereof.

Individual IMS group management data is stored in the IMS group management database 163 for each of the plurality of groups.

The IMS group management data for each group stores, not as limitations but as examples, the group name that is the name of this group, a group ID, the group created date and time, the number of users in the group, group user data, and group contents record data.

The group ID is an ID that functions as identification information to identify this group, and the ID to uniquely identify each group is stored and registered.

The group created date and time a date and time at which this group is created. Not as a limitation but as an example, the user utilizing the IMS can freely create a group as appropriate, and the user who created the group, or the user already participating the group invites the other user to allow the other user to participate the group.

The number of users in the group stores the total number of users involved in this group. Every time a new user participates the group, the number of users in the group is incremented and updated, and every time the participating user leaves the group, the number of users in the group is decremented and updated.

The group user data stores, not as limitations but as examples, the user name of the user involved in this group (referred to as a "group user" below), the user ID of this group user, and a group participating date and time at which this group user participates the group in association with each other.

The group contents record data is data on the record of the contents transmitted and received between the terminals 20 of the group users involved in this group, and data is stored as a record which associates, not as limitations but as examples, the contents transmitted and received in the talkroom of this group, the date and time at which the contents are transmitted and received, and the contents number to identify the contents with each other.

The money transaction management database 165 is a database to manage the money transfer and the money receiving, and FIG. 6E illustrates an example data structure thereof.

Individual money transaction management data is stored in the money transaction management database 165 for each of the plurality of users.

The money transaction management data of each user stores the user ID, the balance, the IMS points, the daily upper limit set amount of money, the automatic charge setting, money transfer record data, and money receive record data.

The money transfer record data is record data on the money transfer from the user with this user ID, and stores, not as limitations but as examples, a money transfer date and time at which the money transfer is made, a transfer destination user ID that is the user ID of the transfer destination user, and a money transfer amount that is an amount of money subjected to the money transfer in association with each other.

The money receive record data is record data on the money received by the user of this user ID, stores, not as limitations but as examples, a money receive date and time at which the money is received, a transfer originator user ID that is the user ID of the transfer originator user, and a received money amount that is an amount of received money in association with each other.

In this example embodiment, the server 10 executes the money transfer process based on the money transfer function (transferring money) of the payment application. More specifically, not as a limitation but as an example, the server 10 executes a process to transfer the IMS money to the other users' terminal 20 registered as a friend of the one user in the IMS application upon receiving money transfer request information from the terminal 20 of the one user.

Moreover, the server 10 executes a money transfer inquire process based on the money transfer inquiry request function (inquiring money transfer) of the payment application. More specifically, not as a limitation but as an example, the server 10 executes a process of inquiring the other user's terminal 20 registered as the friend of the one user in the IMS application to transfer the money to the terminal 20 of the one user upon receiving money transfer inquiry request information transmitted from the terminal 20 of the one user.

Furthermore, the money transfer inquire process contains a separate check inquire process based on the separate check function of the payment application. The separate check inquire process is a process of inquiring, to the terminals 20 of the plurality of other users registered as friends of the one user in the IMS application or the terminals 20 of the plurality of other users involved in the same group as the one user in the IMS application, the amount of money obtained by equally dividing the amount of money specified by the one user by the total number of users upon receiving separate check inquire request information from the terminal 20 of the one user. The separate check function is utilized when, for example, a dinner party or a drinking session is carried out among the users registered as friends in the IMS application or among the users that form the group in the IMS application, and when the one user who is a party organizer requests, to the plurality of other users, the amount of money obtained by dividing the total amount of money by the number of participating users.

(2) Functional Structure of Terminal

Figure 6F:
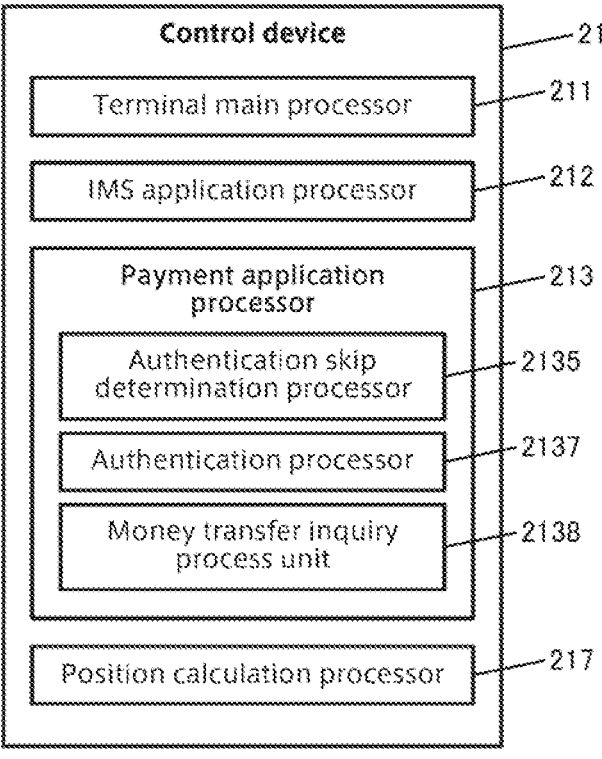
FIG. 6F is a diagram illustrating example functions accomplished by a control device of a terminal according to the fourth example embodiment.

FIG. 6F is a diagram illustrating example functions accomplished by the control device 21 of the terminal 20 in this example embodiment.

The payment application processor 213 includes functional units that are the authentication skip determination processor 2135, the authentication processor 2137, and also a money transfer request processor 2138.

The money transfer request processor 2138 may execute a process to request the server 10 to transfer the money to the other terminal 20 or the user of the other terminals 20 registered as a friend in IMS application.

Figure 6G:
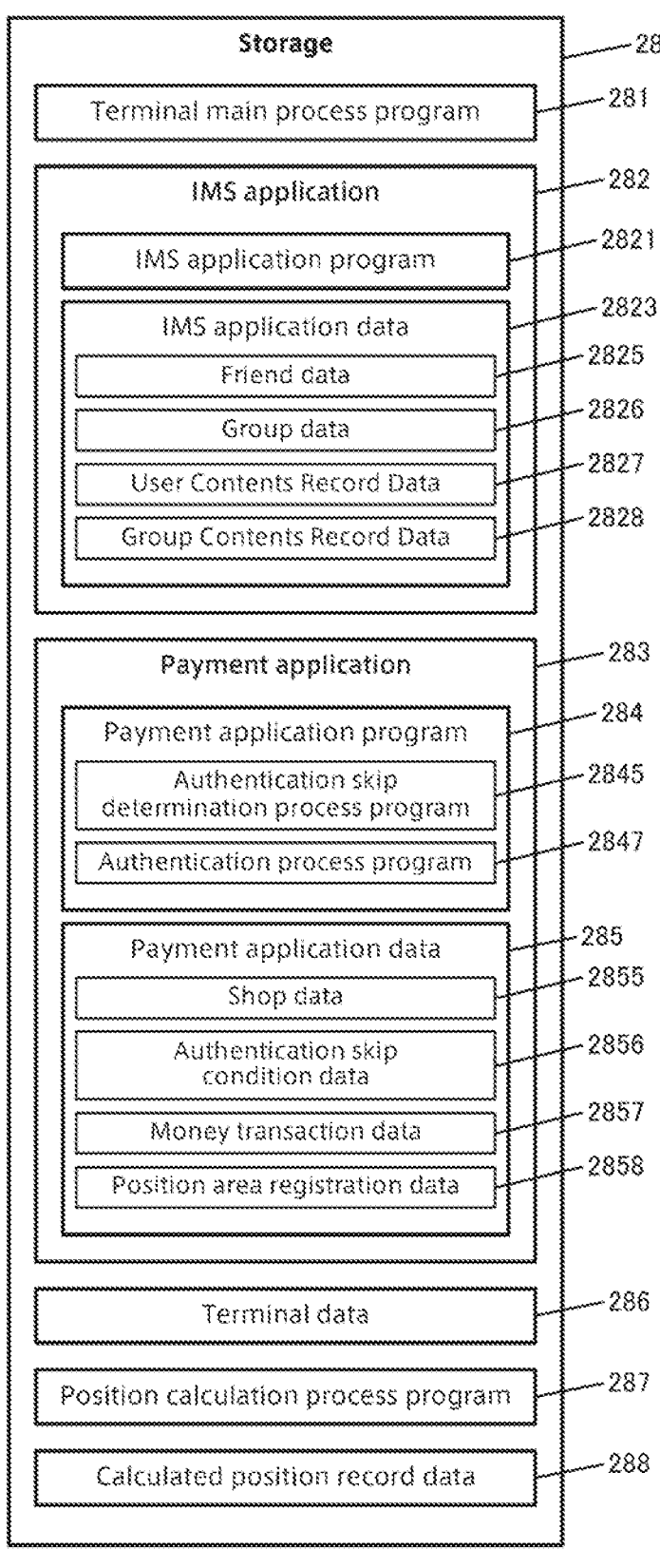
FIG. 6G is a diagram illustrating example information stored in a storage of the terminal according to the fourth example embodiment.

FIG. 6G is a diagram illustrating example information stored in the storage 28 of the terminal 20 in this example embodiment.

The IMS application 282 contains, not as limitations but as examples, an IMS application process program 2821 executed as the IMS application process, and IMS application data 2823.

The IMS application data 2823 contains, not as limitations but as examples, friend data 2825, group data 2826, user contents record data 2827, and group contents record data 2828.

The friend data 2825 is data on the user registered as a friend by the user of the own terminal 20, and stores information, such as, not as limitations but as examples, the user name of the user registered as a friend, the user ID thereof, an icon image thereof, and a profile thereof.

The group data 2826 is data on the group to which the user of the own terminal 20 is participating, and stores information, such as, not as limitations but as examples, the group name of the group to which the user of the own terminal 20 is participating, the group ID, the user names of the other group users in the same group, the user IDs thereof, icon images thereof, and profiles thereof.

The user contents record data 2827 is data on the record of contents transmitted and received between the own terminal 20 and the terminal 20 of the other user registered as a friend, and data is stored as a record which associates, not as limitations but as examples, the contents transmitted and received in the talkroom of this user, the date and time at which the contents are transmitted and received, and the contents number that is the identification information to identify contents with each other.

The group contents record data 2828 is data on the record of the contents transmitted and received between the terminals 20 of the group users in the group to which the user of the own terminal 20 is participating, and data is stored as a record which associates, not as limitations but as examples, the contents transmitted and received in the talkroom of this group, the date and time at which the contents are transmitted and received, and the contents number to identify contents with each other.

The payment application program 284 includes, like the above-described embodiment, subroutine programs that are the authentication skip determination process program 2845 and the authentication process program 2847.

Moreover, the payment application data 285 contains, not as limitations but as examples, the shop data 2855, and also authentication skip condition data 2856, money transaction data 2857, and position area registration data 2858.

The position area registration data 2858 stores information on various positions and areas based on the record of the calculated positions of the own terminal 20 stored in the calculated position record data 288 by the control device 21.

For example, the position information on the position of the home of the user of the own terminal 20 is registered in the position area registration data 2858. The control device 21 registers, not as a limitation but as an example, the position information corresponding to the calculated position statistically most often stored in the calculated position record data 288 within a time slot from 22:00 of a weekday to 6:00 AM of the next day as the position information on the home of the user of the own terminal 20.

Moreover, for example, the position information of the company (a work place) where the user of the own terminal 20 is working is registered in the position area registration data 2858. The control device 21 registers, not as a limitation but as an example, the position information corresponding to the calculated position statistically most often stored in the calculated position record data 288 within a time slot from 9:00 of a weekday to 17:00 thereof as the position information of the company (a work place) of the user of the own terminal 20.

Furthermore, the position information on, for example, a money transfer safe area which is an area set in advance by the server 10 and which is a safe area to execute the money transfer is registered in the position area registration data 2858. The server 10 can set, not as a limitation but as an example, the position information on the area, such as a provincial area or a country side apart from the urban central area as the position information on the money transfer safe area in advance.

Still further, the position information on the location where the user of the own terminal 20 often visits, e.g., the position information on the location where the user of the own terminal 20 has visited by equal to or more than a set number of times may be registered as the money transfer safe area. In this case, in addition to the home and the company (a work place) as described above, the control device 21 can register, not as limitations but as examples, the calculated position occurring at a frequency that is equal to or more than a set frequency, and the calculated position occurring at the number of times that is equal to or higher than the set number of times as the position where the user of the own terminal 20 often visits in the calculated position record data 288 as the money transfer safe area.

Yet still further, the user of the own terminal 20 can register the position and the area in the position area registration data 2858 by himself or herself. For example, the user of the own terminal 20 can register the position information on the home of the relevant person (e.g., the relative, the close friend, the company-relevant person), etc.

FIG. 6H is a diagram illustrating an example data structure of the authentication skip condition data 2856 in this example embodiment.

Not as limitations but as examples, the condition category No., the condition No., the authentication skip condition, and the importance (the priority) are stored in this authentication skip condition data 2856 in association with each other.

<Condition Category No. "SP11">

The condition category No. "SP11" is a category that is "time", and contains therein, not as limitations but as examples, the authentication skip condition with the condition Nos. "SP11-1" and "SP11-2".

Regarding the authentication skip condition with the condition No. "SP11-1", "the present date and time is within a set time from the last money transfer date and time" is defined. When the present date and time is within the set time from the last money transfer date and time, the money transfer is executed again with not so much time having elapsed, and thus the authentication is to be omitted to improve the user friendliness.

In the determination on this authentication skip condition, the terminal 20 obtains, not as limitations but as examples, the present date and time based on the measured time by the clock device 29A and on the last money transfer date and time stored in the money transfer record data in the money transaction data 2857, and determines whether or not the present date and time is within the set time from the last money transfer date and time.

Regarding the authentication skip condition with the condition No. "SP1-2", "the present time is within a set time slot" is defined. Not as a limitation but as an example, the user of the terminal 20 can set the set time slot in advance. More specifically, when the time slot at which the user of the terminal 20 often makes a money transfer, or the time slot at which it is convenient for such a user to make the money transfer (e.g., a time slot for meal) is set as the set time slot, the authentication can be omitted when the money transfer is made within the set time slot.

In the determination on this authentication skip condition, the terminal 20 obtains, not as a limitation but as an example, the present time based on the measured time measured by the clock device 29A, and determines whether or not the present time is within the set time slot.

<Condition Category No. "SP12">

The condition category No. "SP12" is a category that is "terminal and location", and, not as limitations but as examples, the authentication skip condition with the condition Nos. "SP12-1" to "SP12-4" are contained in this authentication skip condition.

Regarding the authentication skip condition with the condition No. "SP12-1", "the position of the own terminal 20 and the position of the home are not apart from each other" is defined. When the position of the own terminal 20 is not apart from the position of the home of the user, it is estimated that the money transfer is safe (there is no problem with the money transfer), and thus the authentication is to be omitted to improve the user friendliness.

In the determination on this authentication skip condition, the terminal 20 obtains, not as limitations but as examples, the latest calculated position stored in the calculated position record data 288, and the position of the home registered in the position area registration data 2858, and determines whether or not the distance between the calculated position of the own terminal 20 and the position of a home is equal to or shorter than a set distance (or is shorter than the set distance).

Regarding the authentication skip condition with the condition No. "SP12-2", "the position of the own terminal is within the money transfer safe area" is defined. When the position of the own terminal 20 is within the money transfer safe area, it is estimated that the money transfer is safe (there is no problem with the money transfer), and thus the authentication is to be omitted to improve the user friendliness.

In the determination on this authentication skip condition, the terminal 20 obtains, not as limitations but as examples, the latest calculated position stored in the calculated position record data 288 and the money transfer safe area registered into the position area registration data 2858, and determines whether or not the calculated position of the own terminal 20 is within the money transfer safe area.

Regarding the authentication skip condition with the condition No. "SP12-3", "the position of the own terminal and the position of the shop compatible with the payment application are not apart from each other" is defined. When the position of the own terminal 20 is not apart from the shop (an affiliated shop) compatible with a payment by payment application, it is estimated that there is a necessity to make a money transfer, and thus the authentication is to be omitted to improve the user friendliness. When, for example, the users of the respective terminals 20 eating and drinking together at a shop compatible with the payment application, there is a case such that the payment is made by payment application. In this case, when the payment application has the function to execute the separate check process, the possibility such that separate check is made by the individual users is high. Hence, when the position of the own terminal 20 and the position of the shop compatible with the payment application are not apart from each other, the authentication may be skipped to prompt the separate check.

In the determination on this authentication skip condition, the terminal 20 obtains, not as limitations but as examples, the latest calculated position stored in the calculated position record data 288 and the position of the affiliated shop stored in in the shop data 2855, and determines whether or not the distance between the calculated position of the own terminal 20 and the position of the affiliated shop is equal to or shorter than a set distance (or is shorter than the set distance).

Regarding the authentication skip condition with the condition No. "SP12-4", "the position of the own terminal and the position of the terminal that transmits a separate check inquiry are not apart from each other" is defined. When the position of the own terminal 20 is not apart from the position of the terminal that transmits the separate check inquiry, it is estimated that this is a case in which the user of the own terminal 20 which receives the separate check inquiry from the user of the other terminal 20 immediately makes a money transfer, and thus the authentication is to be omitted to improve the user friendliness.

In the determination on this authentication skip condition, the terminal 20 obtains, not as a limitation but as an example, the latest calculated position stored in the calculated position record data 288, requests, to the server 10, the position of the terminal 20 that transmitted the separate check inquiry, and receives and obtains the position of the terminal 20 that transmits the separate check inquiry from the server 10. This enables a determination on whether or not the distance between the calculated position of the own terminal 20 and the position of the terminal 20 that transmits the separate check inquiry is equal to or shorter than the set distance (or is shorter than the set distance).

<Condition Category No. "SP13">

The condition category No. "SP13" is a category that is "amount of money", and not as limitations but as examples, the authentication skip condition with the condition Nos. "SP13-1" to "SP13-4" are contained in this condition category.

Regarding the authentication skip condition with the condition No. "SP13-1", "not exceeding the daily upper limit set amount of money" is defined.

The "daily upper limit set amount of money" is the upper limit set amount of money that is a threshold to the total of the money transfer amount (already transferred amount of money) already transferred in a day. That is, when the total of the money transfer amount already transferred in a day does not exceed the daily upper limit set amount of money, the authentication is to be omitted to improve the user friendliness.

Conversely, when the total of the money transfer amount already transferred in a day exceeds the daily upper limit set amount of money, making an authentication notifies the user of the terminal 20 of the excessive money transfer, thus preventing the user from executing an excessive money transfer. Moreover, when a person under age or a child attempts to execute a money transfer, a parental guardian can restrict the utilization.

In the determination on this authentication skip condition, the terminal 20 obtains, not as limitations but as examples, the daily upper limit set amount of money stored in the money transaction data 2857 and the total of the money transfer amount in a day specified by the money transfer record data thereof, and determines whether or not the total amount exceeds the daily upper limit set amount of money.

Regarding the authentication skip condition with the condition No. "SP13-2", "the balance is equal to or smaller than a set amount of money (or is smaller than the set amount of money), and the automatic charge setting is OFF" is defined. Not as a limitation but as an example, the user of the terminal 20 can set the set amount of money in advance. When the balance is equal to or smaller than the set amount of money and the automatic charge setting is "OFF", the user cannot execute a large amount of money transfer, and thus the possibility of risk can be considered as low. Hence, the authentication is to be omitted to improve the user friendliness.

When, however, the automatic charge setting is "ON", since the IMS money is automatically charged, enabling the user to execute a large amount of money transfer, and thus the possibility of risk arises. Accordingly, in addition to the balance that is equal to or smaller than the set amount of money (or is smaller than the set amount of money), the automatic charge setting that is "OFF" is taken as the authentication skip condition.

Note that in this case, when the automatic charge setting is "ON", even if the balance is equal to or smaller than the set amount of money (or is smaller than the set amount of money), the authentication process is not skipped in principle. However, in view of the user friendliness as described above, the authentication process may be skipped even if the automatic charge setting is "ON". In this case, not as a limitation but as an example, the automatic charge setting that is OFF may be excluded from the authentication skip condition with the above-described condition No. "SP13-2", and simply "the balance is equal to or smaller than the set amount of money (or is smaller than the set amount of money)" may be defined. That is, even if the automatic charge setting is "ON", the authentication process is not always necessary, and when the balance is equal to or smaller than the set amount of money (or is smaller than the set amount of money) although the automatic charging is "ON", there may be a case in which the authentication process is executed, and also there may be a case in which the authentication process is skipped.

In the determination on this authentication skip condition, the terminal 20 obtains, not as a limitation but as an example, the balance stored in the money transaction data 2857 and the automatic charge setting, and determines whether or not the balance is equal to or smaller than the set amount of money (or is smaller than the set amount of money) and the automatic charge setting is "OFF".

Regarding the authentication skip condition with the condition No. "SP13-3", "the money transfer frequency or the money transfer amount per a month is within a proper range" is defined. For example, the average value, the maximum value or the mode value of the money transfer frequency per a month within a predetermined past time period (past six months or a past one year) is calculated as a threshold frequency, and similarly, the average value, the maximum value or the mode value of the money transfer amount per a month within a predetermined past time period is calculated as a threshold amount of money. Next, when the money transfer is made based on such a threshold, and when the money transfer frequency exceeds the threshold frequency, or when the money transfer amount exceeds the threshold amount of money, the authentication is to be executed, but the authentication is to be omitted in other cases.

In the determination on this authentication skip condition, the terminal 20 obtains, not as limitations but as examples, the money transfer frequency and the money transfer amount both calculated from the money transfer record data stored in the money transaction data 2857, and the frequency threshold and the threshold amount of money stored in the storage 28, and determines whether or not the money transfer frequency exceeds the threshold frequency, or whether or not the money transfer amount exceeds the threshold amount of money.

Note that the above-described authentication skip condition may be based on the number of times of money transfer (the number of money transfer times) by IMS money instead of the frequency (the money transfer frequency) of money transfer by IMS money. Moreover, whether or not the money transfer frequency is within a proper range, whether or not the number of times of money transfer is within the proper range, and whether or not the money transfer amount is within the proper range may be defined as individual conditions.

Regarding the authentication skip condition with the condition No. "SP3-4", "the predeterminate money transfer amount is equal to or smaller than a set amount of money (or is smaller than the set amount of money)" is defined. Regarding the set amount of money, the amount of money that is not a large amount, such as JP 10000 YEN or JP 20000 YEN may be set in advance.

The term "predeterminate money transfer amount" means the predeterminate amount of money subjected to money transfer (the unsettled amount of money before the money transfer). That is, when the amount money subjected to money transfer from now is not a large amount, the authentication is to be omitted to improve the user friendliness.

In the determination on this authentication skip condition, the terminal 20 obtains, not as limitations but as an example, the amount of money entered by the user of the terminal 20 as the predeterminate money transfer amount, and determines whether or not this predeterminate money transfer amount is equal to or smaller than the set amount of money (or is smaller than the set amount of money).

<Condition Category No. "SP14">

The condition category No "SP14" is a category that is "money transfer destination person", and not as limitations but as examples, the authentication skip condition with the condition Nos. "SP14-1" to "SP14-3" are contained in this category.

Regarding the authentication skip condition with the condition No. "SP14-1", "the money transfer predeterminate destination person is a close friend or a relative" is defined. When the money transfer destination person is the close friend or relative of the user of the terminal 20, there is a rational reason for money transfer, and thus the authentication is to be omitted to improve the user friendliness.

In the determination on this authentication skip condition, the terminal 20 determines, not as limitations but as examples, the user registered as a friend and having the contents transmitting and receiving frequency exceeding the threshold frequency, or having the contents transmitting and receiving number of times exceeding a threshold number of times as the close friend of the user of the terminal 20 based on the friend data 2825 of the IMS application 282 and on the user contents record data 2827. Moreover, with reference to the group data 2826 of the IMS application 282, the group that has a group name containing letters, such as "household member", "family", "relative", or "blood kin", is specified, and the group user involved in this group is determined as the relative. Next, when the money transfer predeterminate destination person is such a user, a determination is made such that this authentication skip condition is satisfied.

Regarding the authentication skip condition with the condition No. "SP14-2", "there is a past money transfer record for the money transfer predeterminate destination person" is defined. When the money transfer is made in past to the money transfer predeterminate destination person, it is estimated that such a person is subjected to money borrowing or lending, and thus the authentication is to be omitted to improve the user friendliness.

In the determination on this authentication skip condition, the terminal 20 refers to, not as a limitation but as an example, the money transfer record data stored in the money transaction data 2857 to determine whether or not there is one or more money transfer in past to the money transfer predeterminate destination person. When a determination is made that there is a money transfer made in past, it is determined that this authentication skip condition is satisfied.

Regarding the authentication skip condition with the condition No. "SP14-3", "there is a money transfer record received from the money transfer predeterminate destination person in past" is defined. When the money transfer is received in past from the money transfer predeterminate destination person, it is estimated that such a person is subjected to money borrowing and lending, and thus the authentication is to be skipped for the improvement of the user friendliness.

<Condition Category No. "SP15">

The condition category No. "SP15" is a category that is "security", and not as a limitation but as an example, the authentication skip condition with the condition No. "SP15-1" is contained in this category.

Regarding the authentication skip condition with the condition No. "SP15-1", "the terminal is being locked or the payment application is being locked" is defined. When the terminal 20 itself is being locked, or when the payment application is being locked, an authentication, such as to enter the terminal lock cancel password or the payment application lock cancel password, etc., is necessary in order to cancel such a locked state, and thus the authentication again is made unnecessary in order to improve the user friendliness.

In the determination on this authentication skip condition, the terminal 20 obtains, not as limitations but as examples, the information on the lock or unlock of the own terminal 20 stored in the terminal data 286, and the information on the lock or unlock of the payment application stored in the payment application data 285, and determines whether or not the terminal is being locked or the payment application is being locked.

<Condition Category No. "SP16">

The condition category No. "SP16" is a category that is "authentication setting", and not as a limitation but as an example, the authentication skip condition with the condition No. "SP16-1" is contained in this category.

Regarding the authentication skip condition with the condition No. "SP16-1", "the authentication setting at the terminal is OFF, or the authentication setting at the payment application is OFF" is defined.

The authentication at the terminal is an authentication required for the user at the terminal 20, such as an authentication to cancel the terminal lock or the personal authentication to the user.

In contrast, the authentication at the payment application is an authentication required for the user to make a money transfer using the payment application.

That is, when a setting is made at the terminal 20 so as not to execute the authentication required for the user at the terminal 20 (setting: OFF), such as the authentication to cancel the terminal lock or the personal authentication of the user, or when a setting is made at the payment application so as not to execute the authentication required for user to make a money transfer using the payment application (setting: OFF), the authentication is to be omitted.

In the determination on this authentication skip condition, the terminal 20 obtains, not as limitations but as examples, the authentication setting at the terminal stored in the terminal data 286, and the condition-by-condition setting flag for the condition No. "SP16-1" stored in the authentication skip condition user setting data in the money transaction data 2857, and determines whether or not at least either one of the authentication setting at the terminal and the authentication setting at the payment application is "OFF".

<Condition Category No. "SP17">

The condition category No "SP17" is a category that is "situation determination", and not as a limitation but as an example, the authentication skip condition with the condition No. "SP17-1" is contained in this category.

Regarding the authentication skip condition with the condition No. "SP17-1", "there is the terminal that simultaneously receives the separate check inquiry, and the authentication is completed at the terminals that are equal to or greater than a set number" is defined.

That is, the authentication at the own terminal 20 is to be omitted when the separate check inquiry is simultaneously received at the plurality of terminals 20 including the own terminal 20 from the other terminal 20, and the authentication for money transfer is completed at the terminals 20 which are equal to or greater than the set number among the other terminals 20 than the own terminal 20.

In the determination on this authentication skip condition, the terminal 20 inquires, not as limitations but as examples, the information on the authentication statuses of the other terminals 20 that receives the same separate check inquiry to the server 10, obtains the information on the authentication statuses of the other terminals 20 from the server 10, and determines whether or not the authentication is completed at the terminals 20 that are equal to or greater than the set number.

Moreover, the importance (the priority) is defined in association with each of the above-described authentication skip conditions. More specifically, the importance "A" is defined for, not as limitations but examples, the authentication skip condition with the condition Nos. "SP12-1" to "SP12-4" (the condition category No. "SP12"), the authentication skip condition with the condition Nos. "SP14-1" to "SP14-3" (the condition category No. "SP14"), and the authentication skip condition with the condition No. "SP16-1", respectively.

Moreover, the importance "B" is defined for, not as limitations but examples, the authentication skip condition with the condition No. "SP11-1", the condition No. "SP13-1", "SP13-2" and "SP13-4", the authentication skip condition with the condition No. "SP15-1", and the authentication skip condition with the condition No. "SP17-1", respectively.

Furthermore, the importance "C" is defined for, not as limitations but examples, the authentication skip condition with the condition Nos. "SP11-2" and "SP13-3".

Note that although the importance is set in association with the authentication skip condition in this example embodiment, the setting of the importance is not always necessary, and no importance may be set. That is, the field of importance may be eliminated in the above-described authentication skip condition data 2856.

In this case, in the authentication skip determination process, not as limitations but as examples, whether or not the authentication skip conditions are each satisfied may be determined in an arbitrary sequence, and when all the authentication skip conditions are satisfied, a determination may be made to skip the authentication process.

Figure 6I:
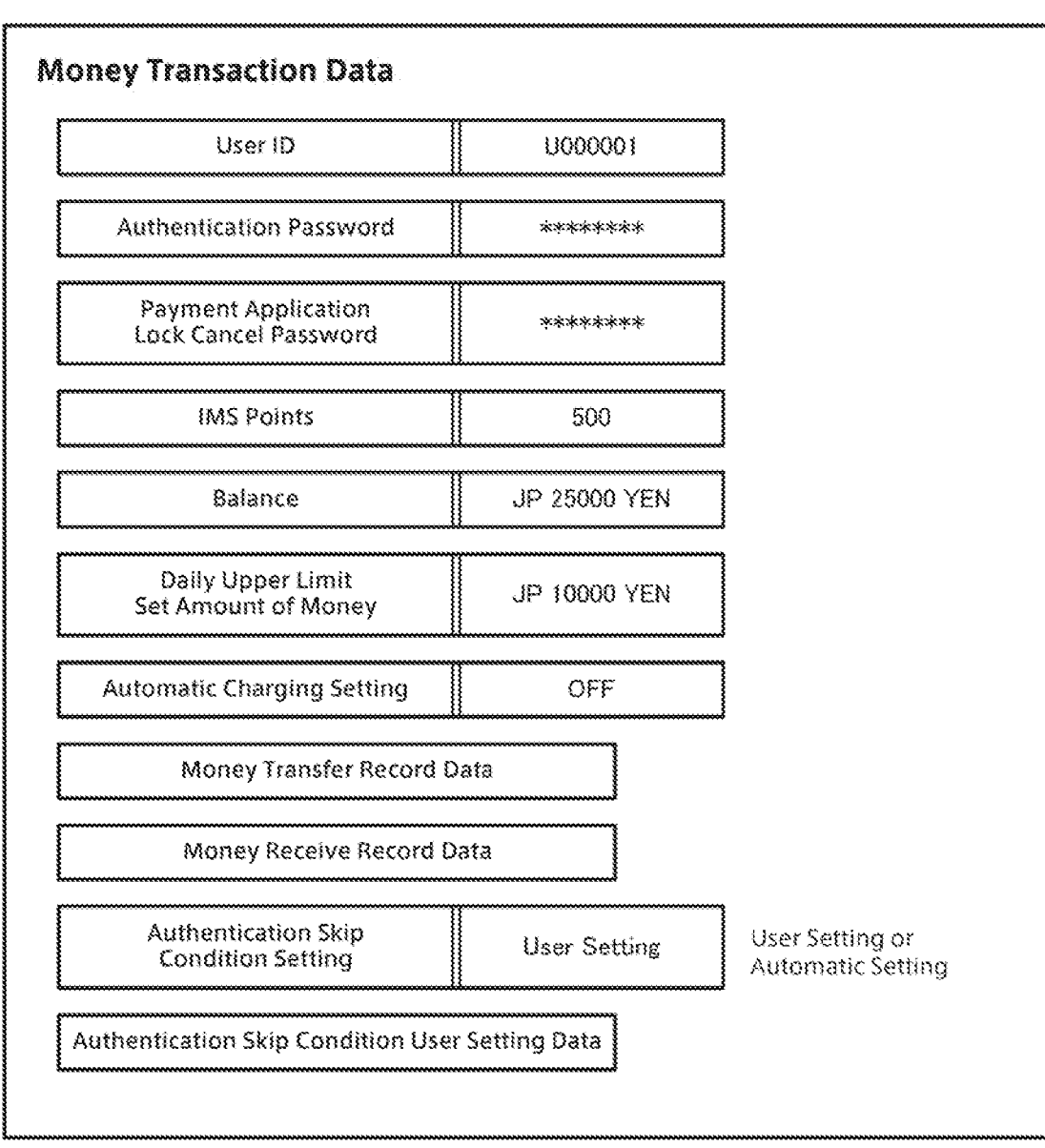
FIG. 6I is a diagram illustrating an example data structure of transmitted and received money data according to the fourth example embodiment.

FIG. 6I is a diagram illustrating an example data structure of the money transaction data 2857.

The money transaction data 2857 stores, not as limitations but as examples, the user ID of the payment application, the authentication password that is a password for authentication, a payment application lock cancel password that is a password to cancel the locked state of the payment application, the IMS points, the balance, the daily upper limit set amount of money, the automatic charge setting, the money transfer record data, money receive record data, the authentication skip condition setting, and the authentication skip condition user setting data.

Since the pieces of data other than the money transfer record data and the money receive record data are the same as those of the embodiments as described above, the description thereof will be omitted.

The money transfer record data is data on the record of money transfer by user with this user ID, and stores, not as limitations but as examples, the money transfer date and time at which the money transfer is made, a money transfer destination user ID that is the user ID of the user who is the money transfer destination, and the money transfer amount which is the amount of transferred money in association with each other for the user with such a user ID.

The money receive record data is data on the record of the received money by the user with this user ID, and stores, not as limitations but as examples, a money received date and time at which the money is received, a money transfer originator user ID that is the user ID of the user who is the originator of the money transfer, and the received amount of money that is the amount of received money in association with each other for the user with such a user ID in time series.

<Money Transfer Method>

With reference to an example display screen displayed on the display 24 of the terminal 20, a money transfer method using the payment application according to this example embodiment will be described.

(1) Normal Money Transfer

FIG. 6J to FIG. 6O are screen diagrams for describing the flow of money transfer when the normal money transfer is made without the authentication skip.

Figure 6J:
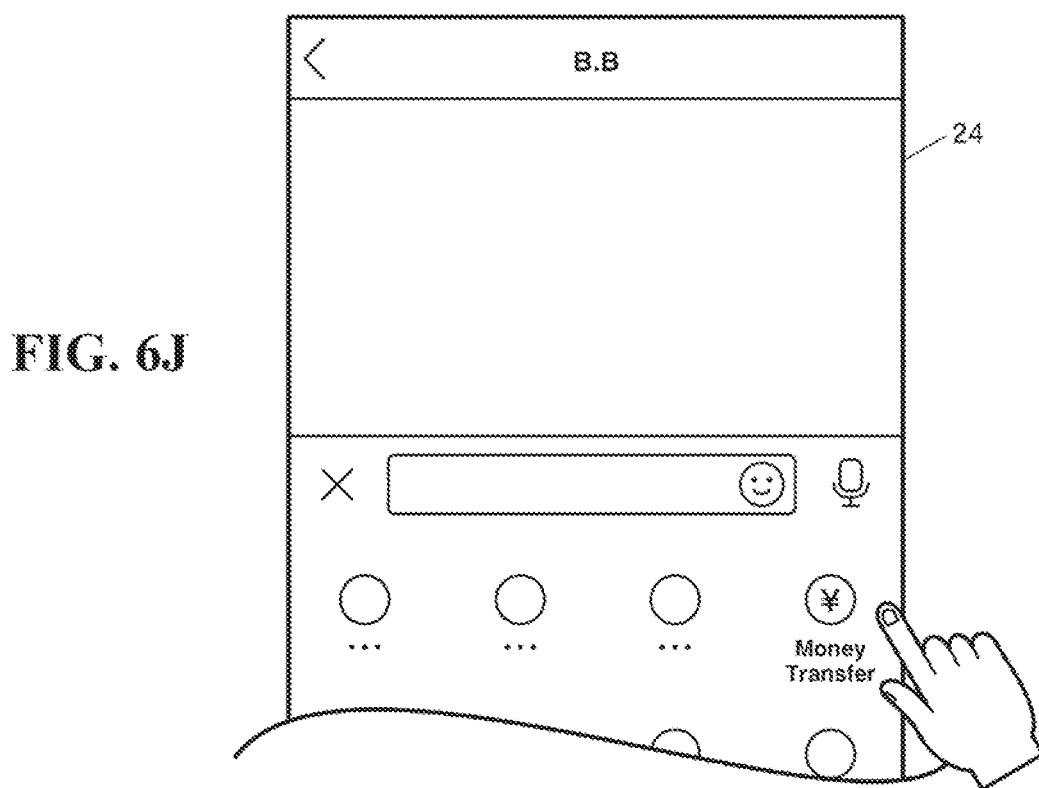
FIG. 6J is a diagram illustrating an example display screen of the terminal according to the fourth example embodiment.

FIG. 6J is a diagram illustrating an example talkroom screen in the IMS application displayed on the display 24 of the terminal 20.

This talkroom screen is to cause, not as a limitation but as an example, a "user A.A" who is the user of the own terminal 20 to talk to a "user B.B" who is the user of the other terminal 20 registered as a friend. A "money transfer icon" indicated as "money transfer" is displayed at the lower part of the talkroom screen as a function of the payment application in conjunction with the IMS application.

Figure 6K:
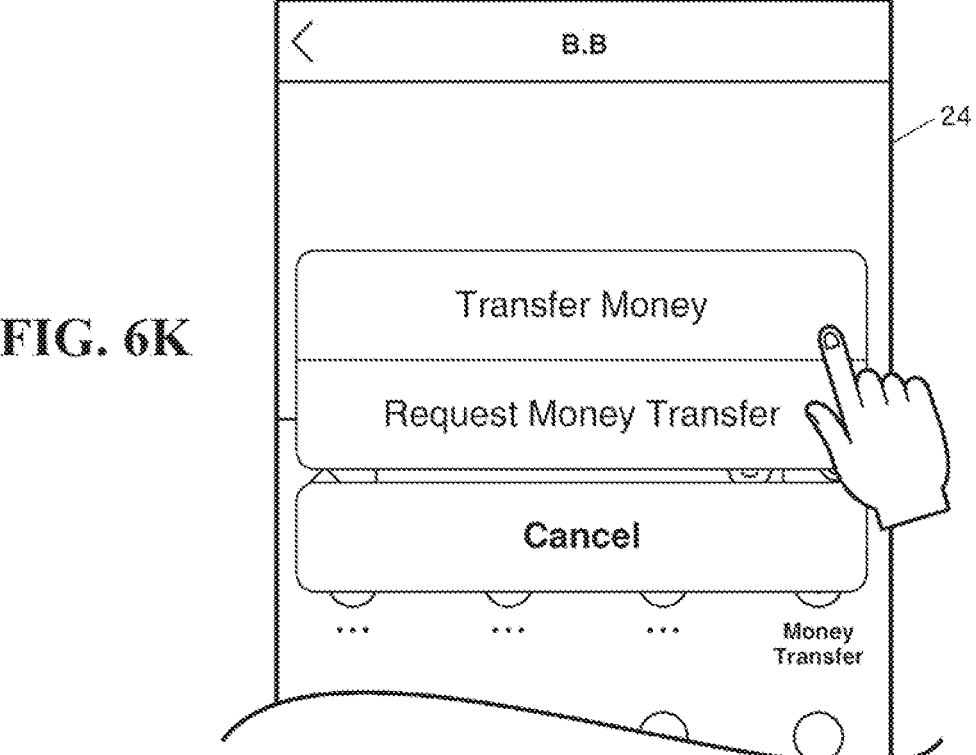
FIG. 6K is a diagram illustrating an example display screen of the terminal according to the fourth example embodiment.

FIG. 6K is a diagram illustrating an example screen displayed when the user of the terminal 20 touches the "money transfer icon" in the above-described talkroom screen.

Displayed in this screen in the pop-up form are the "money transfer icon" indicated as "transfer money" at the center of the talkroom screen, and a "money transfer inquiry icon" indicated as "inquire money transfer".

The money transfer icon is an icon utilized when the "user A.A" makes a money transfer to the "user B.B". In contrast, the money transfer inquire icon is an icon utilized for the "user A.A" to require the money transfer from the "user B.B".

Figure 6L:
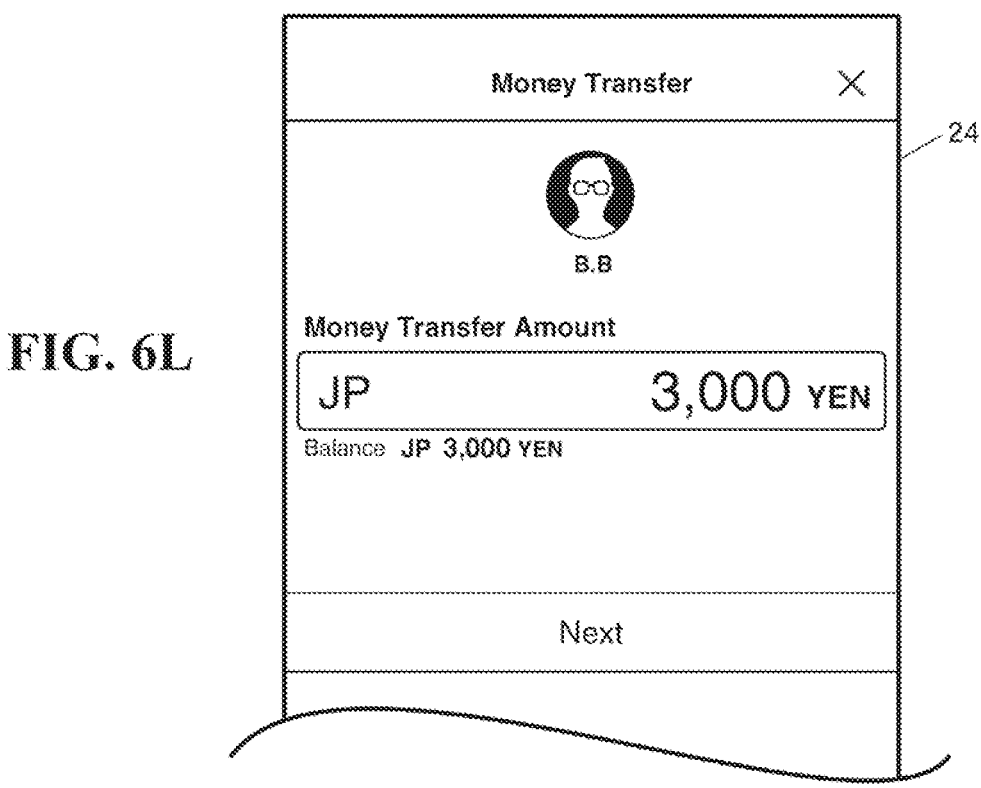
FIG. 6L is a diagram illustrating an example display screen of the terminal according to the fourth example embodiment.

FIG. 6L is a diagram illustrating an example money transfer screen displayed when the user of the terminal 20 touches the "money transfer icon" in the above-described screen.

In this money transfer screen, the user name and the icon image of "user B.B" who is the money transfer predeterminate destination person, and a money transfer predeterminate amount display field that displays the entered predeterminate money transfer amount is displayed therebelow together with the balance. In this example, "JP 3000 YEN" is entered and displayed as the predeterminate money transfer amount. Moreover, displayed at the lower part of the screen is a "next icon" indicated as "next" to proceed the screen to the next screen.

Figure 6M:
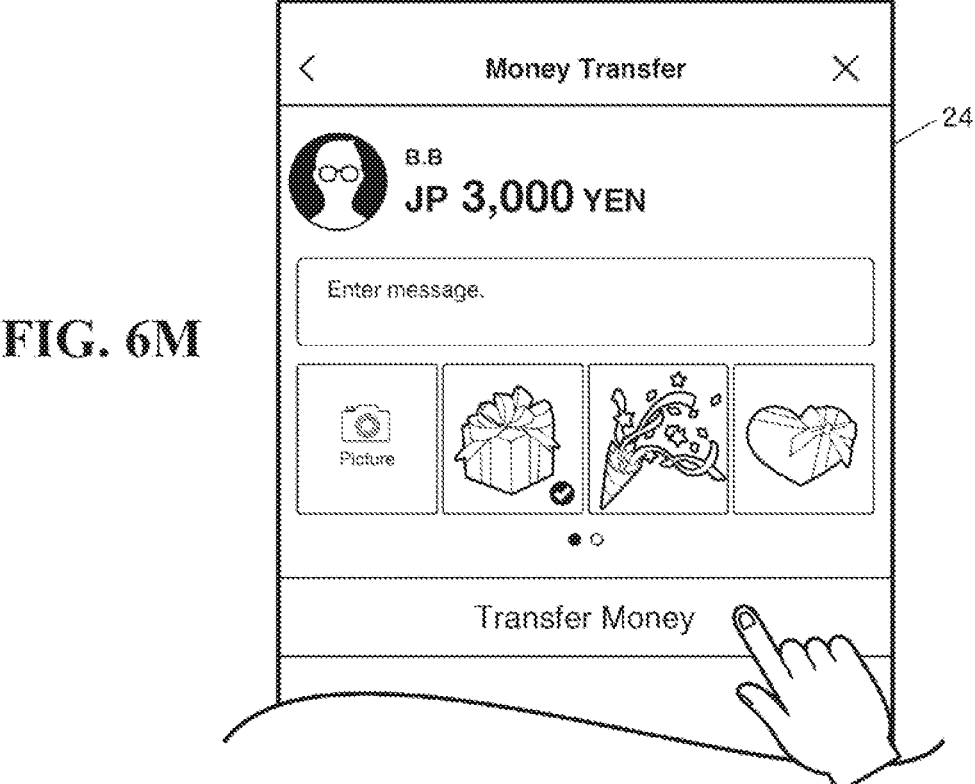
FIG. 6M is a diagram illustrating an example display screen of the terminal according to the fourth example embodiment.

FIG. 6M is a diagram illustrating an example money transfer execution screen displayed when the user of the terminal 20 touches the "next icon" in the above-described money transfer screen.

In this money transfer execution screen, the predeterminate money transfer amount (in this example, "JP 3000 YEN") is displayed in association with the user name and the icon of the "user B.B" who is the money transfer predeterminate destination person, and a message display field to display an entered message to be transmitted to the money transfer predeterminate destination person is displayed therebelow. Moreover, a candidate attached image to be transmitted to the money transfer predeterminate destination person together with the message is also displayed therebelow. Furthermore, a "money transfer execution icon" to execute the money transfer is displayed at the lower part of the screen.

Figure 6N:
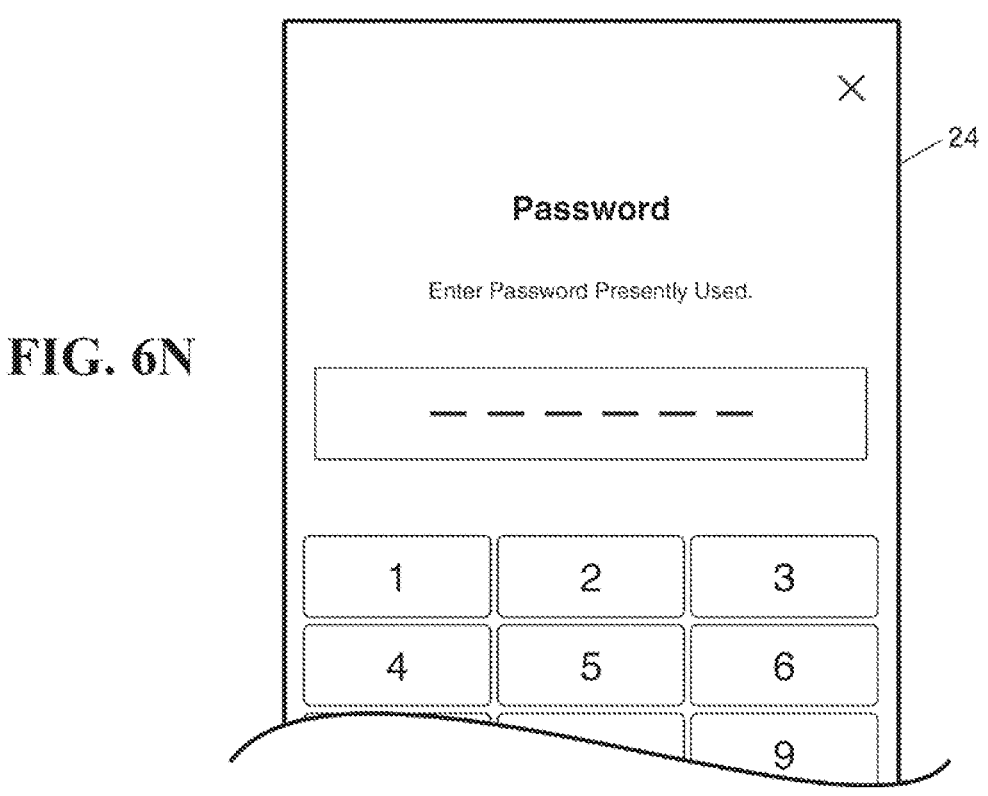
FIG. 6N is a diagram illustrating an example display screen of the terminal according to the fourth example embodiment.

FIG. 6N is a diagram illustrating an example authentication screen displayed when the user of the terminal 20 touches the "money transfer execution icon" in the above-described money transfer execution screen.

When, in the authentication skip determination process, the determination to skip the authentication process is not made, this authentication screen is displayed.

In this authentication screen, displayed together with the letters that are "password" (an authentication password) is a message such that "enter password presently used", and a password display field to display the entered password, and a keyboard to enter the password are displayed therebelow.

Figure 6O:
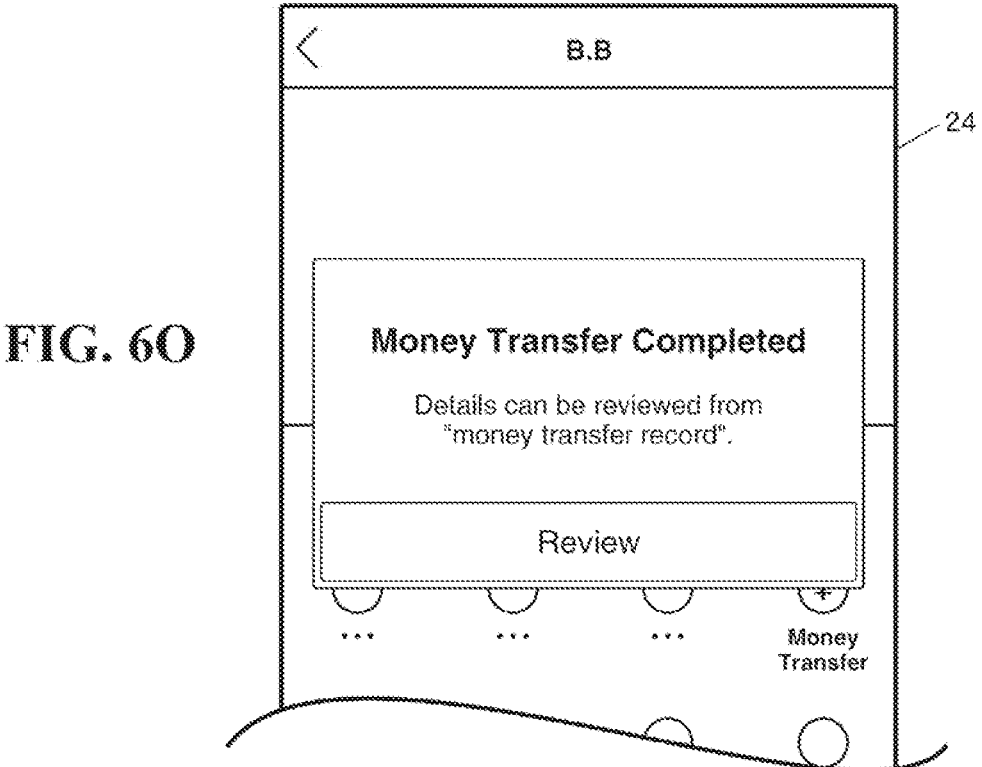
FIG. 6O is a diagram illustrating an example display screen of the terminal according to the fourth example embodiment.

FIG. 6O is a diagram illustrating an example money transfer completion screen displayed when the authentication result is "OK" in the authentication process based on the password entered through the above-described authentication screen.

Displayed in this money transfer completion screen are a message such that "details can be reviewed from "money transfer record"" together with the wordings that are "money transfer completed", and a "review icon" to review the money transfer record at the center of the screen in the pop-up form.

Figures 6P, 6Q:
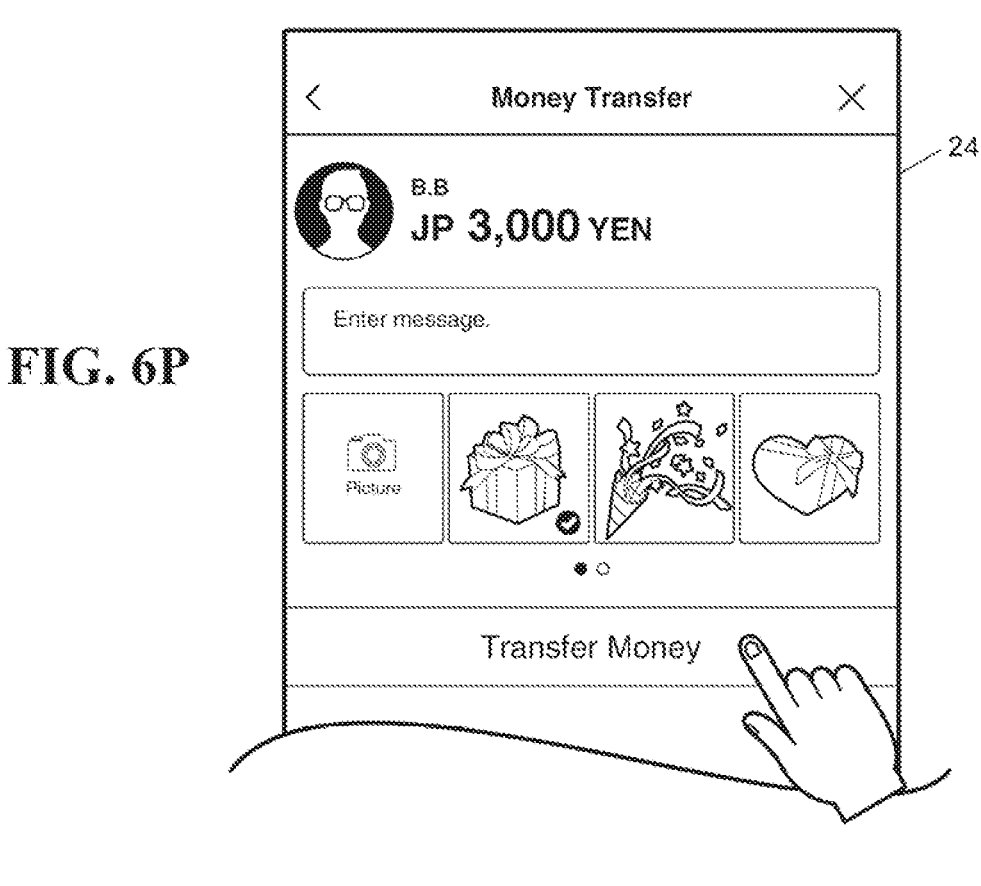
FIG. 6P is a diagram illustrating an example display screen of the terminal according to the fourth example embodiment.
FIG. 6Q is a diagram illustrating an example display screen of the terminal according to the fourth example embodiment.

FIG. 6P and FIG. 6Q are screen diagrams for describing the flow of the money transfer with an authentication skip.

FIG. 6P illustrates the same money transfer execution screen as that of FIG. 6M, FIG. 6Q illustrates the same money transfer completion screen as that of FIG. 6O.

When the user of the terminal 20 touches the "money transfer execution icon" in the money transfer execution screen in FIG. 6P and when a determination is made in authentication skip determination process to skip the authentication process, the display is changed to the money transfer completion screen in FIG. 6Q. That is, the display is changed from the money transfer execution screen to the money transfer completion screen without the authentication screen in FIG. 6N being displayed.

(2) Money Transfer when Separate Check Inquiry is Received

Figure 6R:
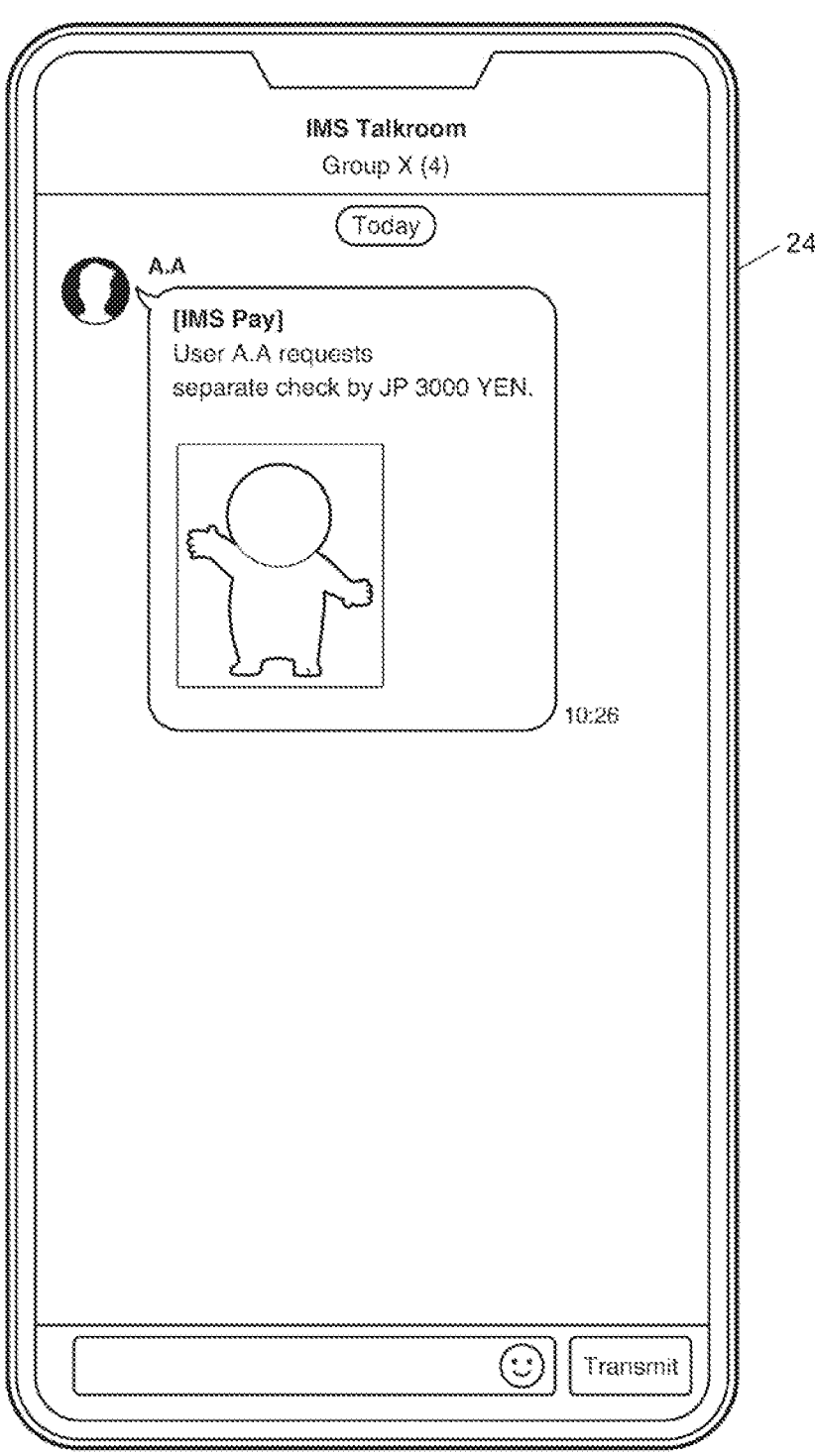
FIG. 6R is a diagram illustrating an example display screen of the terminal according to the fourth example embodiment.

FIG. 6R is a diagram illustrating an example group talkroom screen in the IMS application displayed on the display 24 of the terminal 20.

This group talkroom screen is a screen for transmitting and receiving contents between the terminals 20 of the group users involved in the group, "IMS talkroom" is displayed at the upper part of the screen, and a group name (in this example, "group X") and the number of group members in this group (in this example, (4) that indicates "four persons") is displayed therebelow.

This group talkroom screen is a group talkroom screen displayed at, for example, the terminal 20 of the "user B.B" involved in the group X, and contents like a message transmitted to the own terminal 20 from the terminal 20 of the other group user in the same group is displayed at the left side of the screen, and contents like a message transmitted to the terminal 20 of the other group user from the own terminal 20 is displayed at the right side of the screen.

In this example, the contents that contain the message which is transmitted from the terminal 20 of the "user A.A" in the same group and which is "[IMS Pay] user A.A requested JP 3000 YEN by separate check", and the attached image transmitted from the terminal 20 of the "user A.A" are displayed.

Figure 6S:
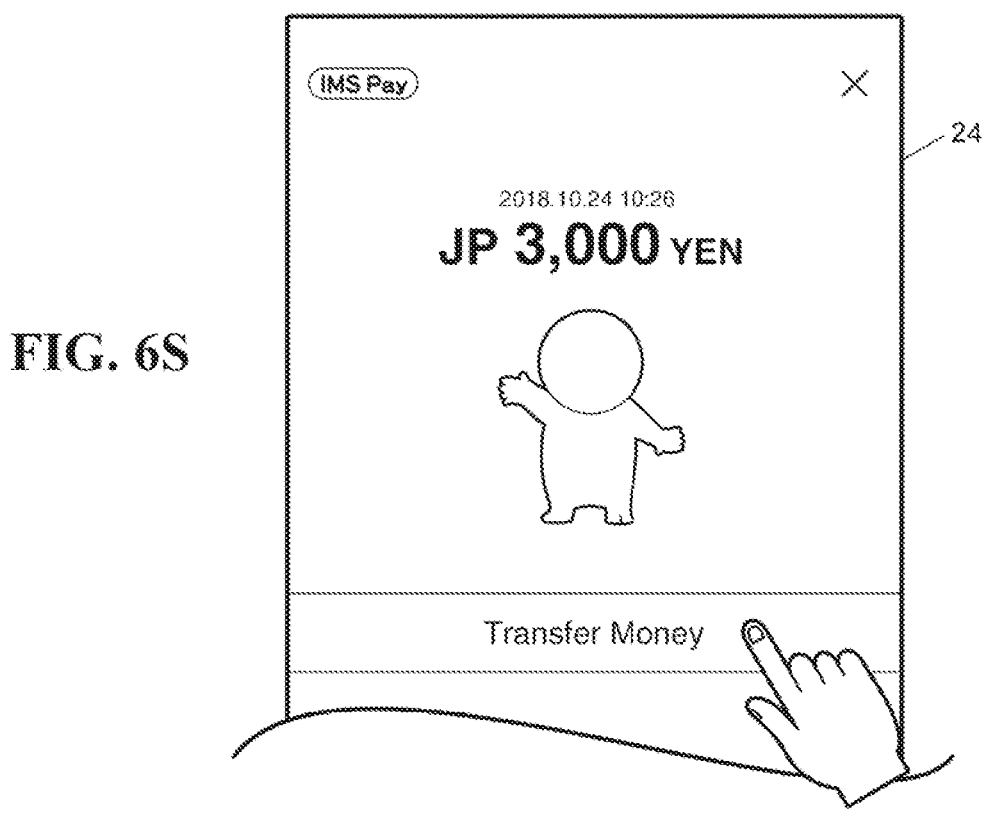
FIG. 6S is a diagram illustrating an example display screen of the terminal according to the fourth example embodiment.

FIG. 6S is a diagram illustrating an example money transfer screen displayed when the user of the terminal 20 touches contents in the above-described group talkroom screen.

When the "user B.B" of the own terminal 20 touches the contents transmitted from the terminal 20 of the "user A.A" in the above-described group talkroom screen, the payment application is activated and the money transfer screen illustrated in FIG. 6S is displayed.

This money transfer screen displays the amount of money (in this example, "JP 3000 YEN") subjected to the money transfer requested by the separate check inquiry, and the image transmitted from the terminal 20 of the "user A.A", and the "money transfer icon" indicated as "transfer money" is displayed therebelow.

Figure 6T:
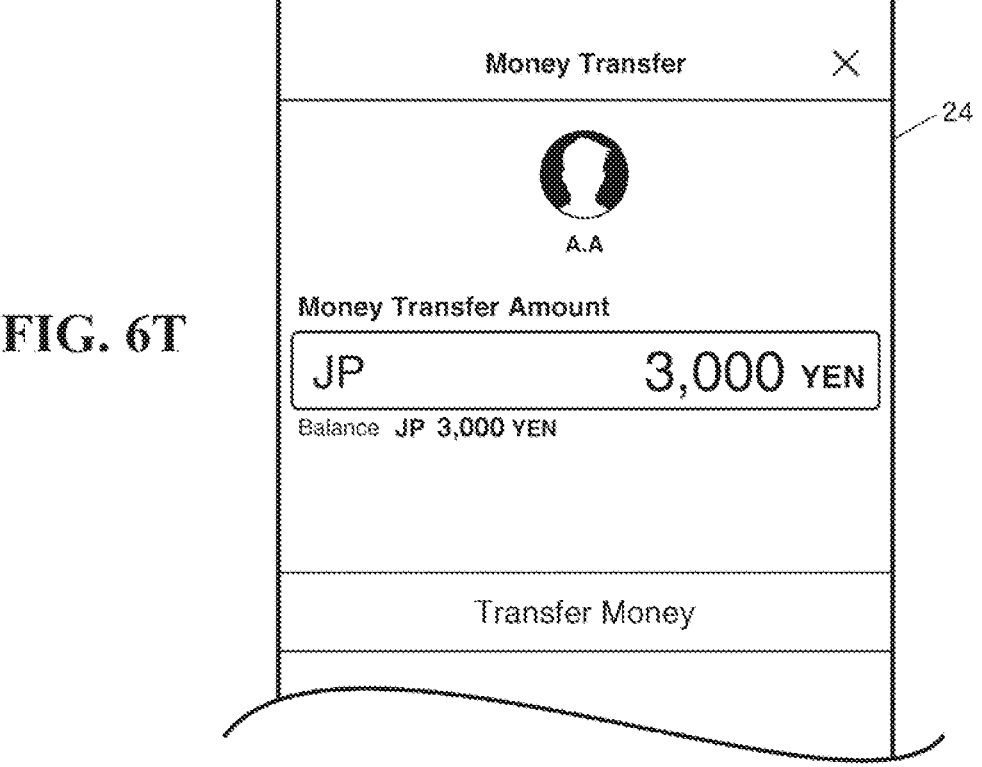
FIG. 6T is a diagram illustrating an example display screen of the terminal according to the fourth example embodiment.

FIG. 6T is a diagram illustrating an example money transfer execution screen displayed when the user of the terminal 20 touches the "money transfer icon" in the above-described money transfer screen.

This money transfer execution screen displays the user name of the "user A.A" who is a money transfer predeterminate destination person, the icon image thereof, a predeterminate money transfer amount display field that displays the entered predeterminate money transfer amount (in this example, "JP 3000 YEN"), and the balance. Moreover, the "money transfer execution icon" to execute the money transfer is displayed at the lower part of the screen.

Figure 6U:
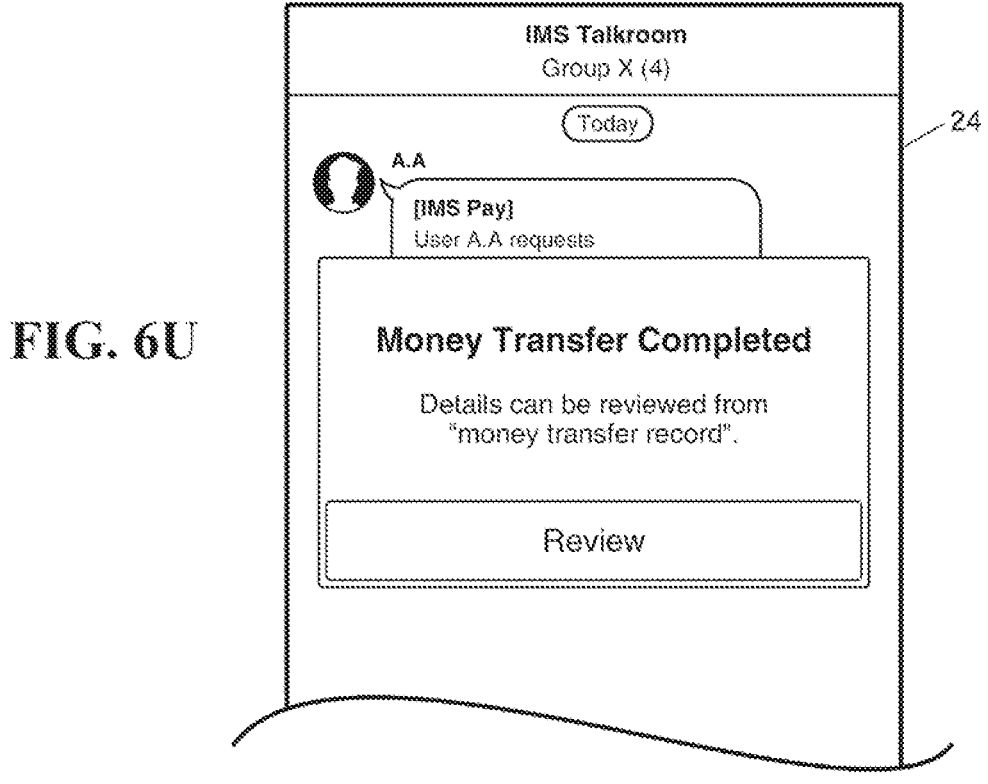
FIG. 6U is a diagram illustrating an example display screen of the terminal according to the fourth example embodiment.

FIG. 6U is a diagram illustrating an example money transfer completion screen displayed when the user of the terminal 20 touches the "money transfer execution icon" in the above-described money transfer execution screen.

When, in the authentication skip determination process, a determination to skip the authentication process is not made, and the "money transfer execution icon" is touched in the above-described money transfer execution screen, a display is changed from the money transfer execution screen in FIG. 6T to an authentication screen.

In contrast, when, in the authentication skip determination process, the determination to skip the authentication process is made, the display is changed from the money transfer execution screen in FIG. 6T to the money transfer completion screen in FIG. 6U without the authentication screen being displayed.

This money transfer completion screen displays, in a pop-up form, a message "details can be reviewed from "money transfer record"" together with the wordings that are "money transfer completed", and a "review icon" to review the money transfer record at the center of the screen.

<Process>

Figure 6V:
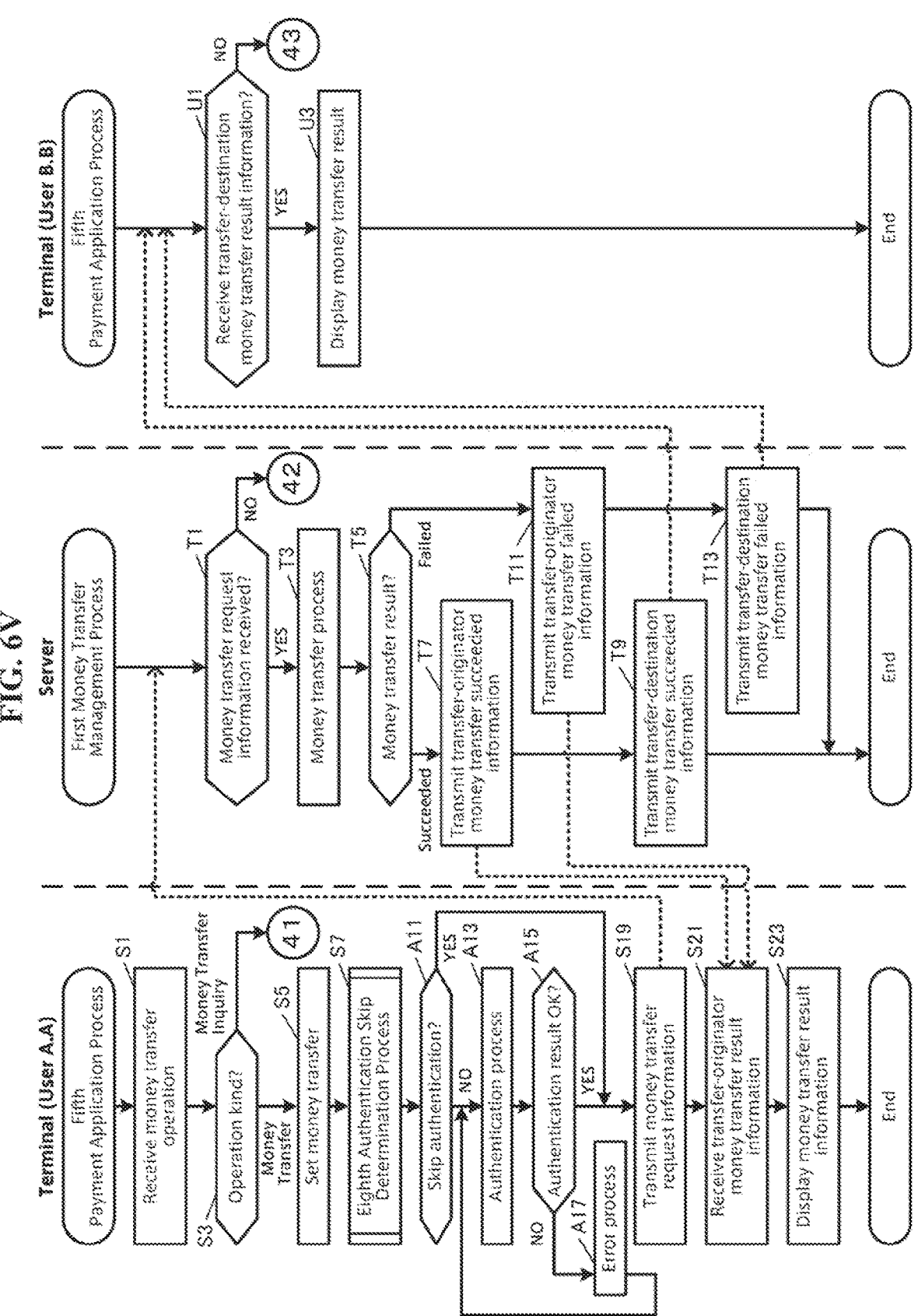
FIG. 6V is a flowchart illustrating example process flows by the terminal, and the server according to the fourth example embodiment.
Figure 6W:
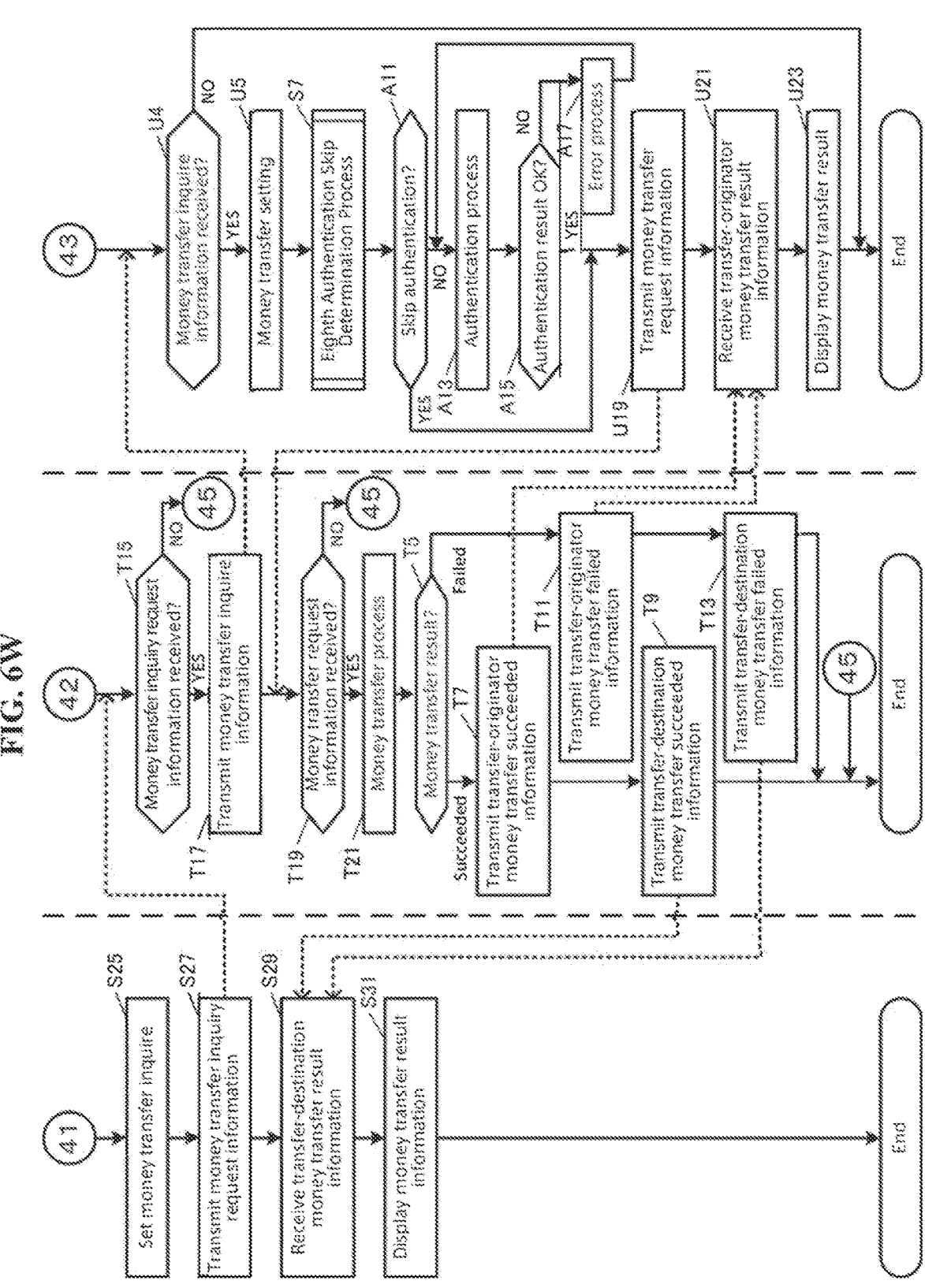
FIG. 6W is a flowchart illustrating example process flows by the terminal, and the server according to the fourth example embodiment.

FIG. 6V and FIG. 6W are flowcharts illustrating example flows of the processes executed by the respective devices in this example embodiment.

In those figures, illustrated from the left side in sequence are a fifth payment application process that is an example payment application process executed by the payment application processor 213 of the terminal 20A of the "user A.A", a first money transfer management process that is executed by the money transfer management processor 115 of the server 10, and a fifth payment application process that is an example payment application process executed by the payment application processor 213 of the terminal 20B of the "user B.B", respectively.

Note that the same reference numeral will be given to the same step as that of the already-described flowchart, and the description thereof will be omitted.

First, the payment application processor 213 of the terminal 20A receives a money transfer operation to the input and output device 23 (operation S1). Next, the payment application processor 213 of the terminal 20A determines the kind of the received operation (operation S3).

When the operation kind is "a money transfer operation" (S3: money transfer), the payment application processor 213 of the terminal 20A executes a money transfer setting that is SO a setting for the money transfer in accordance with the user's operation to the input and output device 23 (operation S5). Next, the authentication skip determination processor 2135 of the terminal 20A executes an eighth authentication skip determination process (operation S7). Note that in order to distinguish from the authentication skip determination process in the modified example or the other embodiment, it will be referred to as the "eighth authentication skip determination process" for such a purpose.

In this eighth authentication skip determination process, it is determined whether or not the authentication skip condition stored in the authentication skip condition data 2856 in the storage 28 is satisfied by the similar scheme to that of the first authentication skip determination process described in the first example embodiment.

Subsequently, the authentication skip determination processor 2135 of the terminal 20A executes operations A11 to A17 based on the determination result by the eighth authentication skip determination process.

Next, the money transfer request processor 2138 of the terminal 20A transmits, to the server 10 via the communication I/F 22, the money transfer request information containing therein the user ID of the user of the own terminal 20, the user ID of the money transfer predeterminate destination person (the person receiving the money), and the predeterminate money transfer amount (operation S19).

The money transfer management processor 115 of the server 10 determines whether or not the money transfer request information is received from the terminal 20A via the communication I/F 14 (operation T1), and when determining that it is received (operation T1: Yes), executes the money transfer process (operation T3). More specifically, a determination is made on whether or not the money transfer by predeterminate money transfer amount is possible based on, not as a limitation but as an example, the balance of the transfer-originator user stored in the money transaction management database 165 in the storage 15. Next, when the money transfer is possible, the predeterminate money transfer amount is subtracted from the balance to update the balance, and the money transfer record data is updated. Hence, the money transfer result is set as "succeeded". Moreover, the predeterminate money transfer amount is added to the balance of the money-receiving user to update the balance, and the money receive record data is updated. Conversely, when the money transfer is impossible, the money transfer result is set as "failed".

Subsequently, the money transfer management processor 115 determines the money transfer result by the money transfer process (operation T5). Next, when the money transfer result is "succeeded" (operation T5: succeeded), the transfer-originator money transfer result information transmission processor 1153 transmits the money transfer succeeded information to the terminal 20A via the communication I/F 14 (operation T7). Moreover, the transfer-destination money transfer result information transmission processor 1155 transmits the transfer-destination money transfer succeeded information to the terminal 20B via the communication I/F 14 (operation T9).

Conversely, when the money transfer result is "failed" (operation T5: failed), the transfer-originator money transfer result information transmission processor 1153 transmits the money transfer failed information to the terminal 20A via the communication I/F 14 (operation T11). Moreover, the transfer-destination money transfer result information transmission processor 1155 transmits the transfer-destination money transfer failed information to the terminal 20B via the communication I/F 14 (operation T13). Next, the money transfer management processor 115 terminates the first money transfer management process.

The payment application processor 213 of the terminal 20A displays the money transfer result information on the display 24 in accordance with the kind (succeeded/failed) of the received transfer-originator money transfer result information (operation S23) when receiving the transfer-destination money transfer result information from the server 10 via the communication I/F 22 (operation S21). Next, the payment application processor 213 of the terminal 20A terminates the fifth payment application process.

The payment application processor 213 of the terminal 20B determines whether or not the transfer-destination money transfer result information is received from the server 10 via the communication I/F 22 (operation U1), and when determining that it is received (operation U1: Yes), displays the money transfer information in accordance with the kind (succeeded/failed) of the received transfer-destination money transfer result information on the display 24 (operation U3). Next, the payment application processor 213 of the terminal 20B terminates the fifth payment application process.

Conversely, when determining in S3 that the operation kind is "money transfer inquiry" (operation S3: money transfer inquiry), the payment application processor 213 of the terminal A executes a money transfer inquiry setting that is a setting for a money transfer inquiry in accordance with the user's operation to the input and output device 23 (operation S25).

Subsequently, the payment application processor 213 of the terminal 20A transmits money transfer inquiry request information that contains therein the user ID of the user of the own terminal 20, the user ID of the money transfer inquiring person, and a money transfer inquiry amount via the communication I/F 22 to the server 10 (S27).

The money transfer management processor 115 determines whether or not the money transfer inquiry request information from the terminal 20A via the communication I/F 14 (operation T15), and when determining that it is received (operation T15: Yes), transmits, via the communication I/F 14, money transfer inquire information containing therein the money transfer inquiry amount contained in the money transfer inquiry request information to the terminal 20 (in this example, the terminal 20B) associated with the user ID of the money transfer inquiring person contained in the money transfer inquiry request information (operation T17).

The payment application processor 213 of the terminal 20B determines whether or not the money transfer inquire information is received from the server 10 via the communication I/F 22 (operation U4), and when determining that it is received (operation U4: Yes), executes, in accordance with the user's operation to the input and output device 23, the money transfer setting that is a setting for the money transfer (operation U5). Next, the authentication skip determination processor 2135 of the terminal 20B executes the eighth authentication skip determination process (operation S7).

Subsequently, the payment application processor 213 of the terminal 20B executes operations A11 to A17. Next, the money transfer request processor 2138 of the terminal 20B transmits, to the server 10 via the communication I/F 22, the money transfer request information containing therein the user ID of the user of the own terminal 20, the user ID of the money transfer predeterminate person, and the predeterminate money transfer amount (operation U19).

The money transfer management processor 115 of the server 10 determines whether or not the money transfer request information is received from the terminal 20B via the communication I/F 14 (operation T19), and when determining that it is received (operation T19: Yes), executes the money transfer process (operation T21). Next, the money transfer management processor 115 executes operations T5 to T13.

The payment application processor 213 of the terminal 20B displays the money transfer result information in accordance with the kind (succeeded/failed) of the received transfer-originator money transfer result information on the display 24 (operation U23) when receiving the transfer-originator money transfer result information from the server 10 via the communication I/F 22 (operation U21). Next, the payment application processor 213 of the terminal 20B terminates the fifth payment application process.

The payment application processor 213 of the terminal 20A displays the money receive result information in accordance with the kind (succeeded/failed) of the received transfer-destination money transfer result information on the display 24 (operation S31) when receiving the transfer-destination money transfer result information from the server 10 via the communication I/F 22 (operation S29). Next, the payment application processor 213 of the terminal 20A terminates the fifth payment application process.

Advantageous Effect of Fourth Example Embodiment

According to the fourth example embodiment, a structure is disclosed in which the authentication process (not as a limitation but as an example display process) relating to the execution of the authentication to the user of the terminal 20 is executed on the display 24 (not as a limitation but an example display area) of the terminal 20, and based on the authentication to the user of the terminal 20, the information on the money transfer by IMS money is transmitted via the communication I/F 22 of the terminal 20, and the terminal 20 that transfers the IMS money to the other terminal 20 (not as a limitation but as an example first terminal) owned by the other user (not as a limitation but as an example first user) who is registered as a friend in the IMS application obtains the information. Next, the terminal 20 executes the authentication skip determination based on the obtained information, and when the authentication skip condition is satisfied, skips the authentication process but transmits the money transfer request information (not as a limitation but as example information on the money transfer by electronic money) via the communication I/F 22.

An example advantageous effect accomplished by such a structure is that the terminal can easily transmit the information on the money transfer by electronic money without executing the display process relating to the execution of the authentication to the user of the terminal regarding the money transfer by electronic money. Moreover, since the terminal does not need to execute the display process based on the obtained information, the process load on the terminal can be reduced. Furthermore, since it is unnecessary to execute the display process every time the money transfer by electronic money is made, the money transfer can be promptly and smoothly executed, improving the user friendliness.

Moreover, according to the fourth example embodiment, a structure is disclosed in which the above-described information obtained by terminal contains therein the information different from the authentication password (not as a limitation but as example authentication information).

An example advantageous effect accomplished by such a structure is that, by obtaining the different information from the authentication information to authenticate the user of the terminal regarding the money transfer by electronic money, the terminal becomes unnecessary to execute the display process relating to the execution of the authentication to the user of the terminal, and thus the process load on the terminal can be reduced.

Furthermore, according to the fourth example embodiment, a structure is disclosed in which the above-described information different from the authentication password contains therein the information on the IMS money (not as a limitation but as example information on the electronic money).

An example advantageous effect accomplished by such a structure is that, by obtaining the information on the electronic money regarding the money transfer by electronic money, the terminal becomes unnecessary to execute the display process relating to the execution of the authentication to the user of the terminal, and thus the process load on the terminal can be reduced.

Still further, according to the fourth example embodiment, a structure is disclosed in which the above-described information on the IMS money contains therein the information on the amount of IMS money associated with the terminal 20 or with the user of the terminal 20 (not as a limitation but as example information on the amount of electronic money associated with the terminal or with the user of the terminal).

An example advantageous effect accomplished by such a structure is that by obtaining the information on the amount of electronic money regarding the money transfer by electronic money, the terminal becomes unnecessary to execute the display process relating to the execution of the authentication to the user of the terminal, and thus the process load on the terminal can be reduced. Moreover, the information on the amount of electronic money is associated with the terminal or with the user of the terminal, and thus the terminal can properly execute the process relating to the money transfer based on the proper information on the amount of electronic money.

Yet still further, according to the fourth example embodiment, a structure is disclosed in which the above-described information on the amount of the IMS money contains therein the information on the predeterminate money transfer amount (not as a limitation but as example information on the money transfer to the first user of the first terminal) to the user (not as a limitation but as an example first user) of the other terminal 20 (not as a limitation but as an example first terminal) registered as a friend.

An example advantageous effect accomplished by such a structure is that by obtaining the information on the money transfer to the first user of the first terminal regarding the money transfer by electronic money, the terminal becomes unnecessary to execute the display process relating to the execution of the authentication to the user of the terminal, and thus the process load on the terminal can be reduced.

Moreover, according to the fourth example embodiment, a structure is disclosed in which the above-described information on the predeterminate money transfer amount contains therein the money transfer amount to the other user of the other terminal 20.

An example advantageous effect accomplished by such a structure is that by obtaining the information on the money transfer to the first user of the first terminal regarding the money transfer by electronic money, the terminal becomes unnecessary to execute the display process relating to the execution of the authentication to the user of the terminal, and thus the process load on the terminal can be reduced. Moreover, when, for example, the money transfer amount to the first user of the first terminal is a small amount, the possibility of risk can be considered as low. Hence, the user friendliness can be improved while the safeness is ensured by skipping the display process relating to the execution of the authentication to the user of the terminal.

Furthermore, according to the fourth example embodiment, a structure is disclosed in which the terminal 20 skips the authentication process until an excess beyond the daily upper limit set amount of money (not as a limitation but as an example set money transfer amount) occurs.

An example advantageous effect accomplished by such a structure is that a terminal can improve the user friendliness while reducing the process load on the terminal since the terminal skips the display relating to the execution of the authentication until an excess beyond the set money transfer amount occurs regarding the money transfer by electronic money occurs. Conversely, when the excess beyond the set money transfer amount occurs regarding the money transfer by electronic money, the display relating to the execution of the authentication may be executed. This causes the user to pay attention that the excess beyond the set money transfer amount has occurred.

Still further, according to the fourth example embodiment, a structure is disclosed in which the above-described information on the amount of IMS money contains therein the information (not as a limitation but as example information on the balance of the electronic money associated with the terminal or with the user of the terminal) on the balance of the IMS money associated with the terminal 20 or with the user of the terminal 20.

An example advantageous effect accomplished by such a structure is that by obtaining the information on the balance of the electronic money regarding the money transfer by electronic money, the terminal becomes unnecessary to execute the display process relating to the execution of the authentication to the user of the terminal, and thus the process load on the terminal can be reduced. Moreover, the information on the balance of the electronic money is associated with the terminal or with the user of the terminal, and thus the terminal can properly execute the process relating to the money transfer based on the proper information on the balance of the electronic money.

Yet still further, according to the fourth example embodiment, a structure is disclosed in which the terminal 20 skips the authentication process when the balance of the IMS money is equal to or smaller than the set amount of money or is smaller than the set amount of money.

An example advantageous effect accomplished by such a structure is that since the terminal skips the display relating to the execution of the authentication regarding the money transfer by electronic money when the balance of the electronic money is equal to or smaller than the set amount of money or is smaller than the set amount of money, the process load on the terminal can be reduced. Moreover, when, for example, the balance of the electronic money is a small amount, a large amount of money transfer is unable, and thus the possibility of risk can be considered as low. Hence, the user friendliness can be improved while the safeness is secured by skipping the display relating to the execution of the authentication.

Moreover, according to the fourth example embodiment, a structure is disclosed in which the terminal 20 executes the authentication process when the automatic charge setting of the terminal 20 (not as a limitation but as an example setting to automatically charge the electronic money to the terminal when the electronic money is equal to or smaller than the set amount of money or is smaller than the set amount of money) is "OFF" and the balance of the IMS money is equal to or smaller than the set amount of money or is smaller than the set amount of money.

An example advantageous effect accomplished by such a structure is that, regarding the money transfer by electronic money, when the setting is made to automatically charge the electronic money to the terminal and the electronic money of the terminal becomes equal to or smaller than the set amount of money or becomes smaller than the set amount of money, the electronic money is to be automatically charged to the terminal when the amount becomes a small amount of money. This enables a large amount of money transfer, arising a risk. Hence, the display relating to the execution of the authentication causes the user to pay attention to that the large amount of money transfer is enabled.

Furthermore, according to the fourth embodiment, a structure is disclosed in which the above-described information on the IMS money contains therein the information on the frequency or the number of times of money transfer by IMS money (not as a limitation but as example information on the frequency or the number of times of money transfer by electronic money).

An example advantageous effect accomplished by such a structure is that by obtaining the information on the frequency or the number of times of money transfer by electronic money regarding the money transfer by electronic money, the terminal becomes unnecessary to execute the display process relating to the execution of the authentication to the user of the terminal, and thus the process load on the terminal can be reduced. Moreover, when, for example, the frequency or the number of times of money transfer by electronic money is large, the possibility such that the same user makes the money transfer by electronic money is high, and the possibility of risk can be considered as low. Hence, the user friendliness can be improved while the safeness is secured by skipping the display process.

Still further, according to the fourth example embodiment, a structure is disclosed in which the above-described information on the IMS money contains therein the information on the other terminal 20 or on the user of the other terminal 20 to which the terminal 20 or the user of the other terminal 20 makes the money transfer in past by IMS money regarding the money transfer by electronic money.

An example advantageous effect accomplished by such a structure is that by obtaining the information on the terminal or on the user of the terminal to which the terminal or the user of the terminal makes the money transfer in past regarding the money transfer by electronic money, the terminal becomes unnecessary to execute the display process relating to the execution of the authentication to the user of a terminal, and thus the process load on the terminal can be reduced. Moreover, in the case of the other terminal or the user of the other terminal to which the user of the terminal makes the money transfer in past, the possibility of risk can be considered as low. Hence, the user friendliness can be improved while the safeness is secured by skipping the display process.

Yet still further, according to the fourth example embodiment, a structure is disclosed in which the above-described information on the IMS money contains the last money transfer date and time (not as a limitation but as example information on the time at which the money transfer by electronic money is made).

An example advantageous effect accomplished by such a structure is that by obtaining the information on the time at which the money transfer by electronic money is made, the terminal becomes unnecessary to execute the display process relating to the execution of the authentication to the user of the terminal regarding the money transfer by electronic money, and thus the process load on the terminal can be reduced.

Moreover, according to the fourth example embodiment, a structure is disclosed in which the terminal 20 skips the authentication process within the set time from the above-described last money transfer date and time.

An example advantageous effect accomplished by such a structure is that since the terminal does not need to execute the display relating to the execution of the authentication regarding the money transfer by electronic money within the set time from the time at which the money transfer by electronic money is made, and thus the process load on the terminal can be reduced. Moreover, the possibility such that the same user makes the money transfer again is high when a so much time has not elapsed after the time at which the money transfer is made, and the possibility of risk can be considered as low. Hence, the user friendliness can be improved while the safeness is secured by skipping the display relating to the execution of the authentication.

Furthermore, according to the fourth example embodiment, a structure is disclosed in which the above-described information on the IMS money contains therein the information on the location at which the money transfer by IMS money is made (not as a limitation but as example information on the location at which the money transfer by electronic money is made).

An example advantageous effect accomplished by such a structure is that by obtaining the information on the location at which the money transfer by electronic money is made, the terminal becomes unnecessary to execute the display process relating to the execution of the authentication to the user of the terminal regarding the money transfer by electronic money, and thus the process load on the terminal can be reduced.

Still further, according to the fourth example embodiment, a structure is disclosed in which the terminal 20 skips the authentication process based on the information on the location at which the money transfer by IMS money is made, and on the information on the position of the terminal 20.

An example advantageous effect accomplished by such a structure is that since the terminal skips the display process relating to the execution of the authentication regarding the money transfer by electronic money based on the information on the location at which the money transfer by electronic money is made, and on the information on the position of the terminal, the process load on the terminal can be reduced. Moreover, when, for example, the position of the terminal is not apart from the location at which the money transfer by electronic money is made in past, the possibility such that the user is making a money transfer at the same location is high, and the possibility of risk can be considered as low. Hence, the user friendliness can be improved while the safeness is secured by skipping the display relating to the execution of the authentication.

Yet still further, according to the fourth example embodiment, a structure is disclosed in which the above-described information on the IMS money contains therein the information on the location at which the authentication process to transfer the IMS money is executed.

An example advantageous effect accomplished by such a structure is that by obtaining the information on the location at which the authentication to transfer the electronic money is executed regarding the money transfer by electronic money, the terminal, becomes unnecessary to execute the display process relating to the execution of the authentication to the user of the terminal, and thus the process load on the terminal can be reduced. Moreover, in the case of the location at which the authentication to transfer the electronic money is executed in past, the possibility such that the authentication for the same user is executed again, and the possibility of risk can be considered as low. Hence, the user friendliness can be improved while the safeness is secured by skipping the display process.

Moreover, according to the fourth example embodiment, a structure is disclosed in which the above-described information different from the authentication password contains therein the information on the location.

An example advantageous effect accomplished by such a structure is that by obtaining the information on the location regarding the money transfer by electronic money, the terminal becomes unnecessary to execute the display process relating to the execution of the authentication to the user of the terminal, and thus the process load on the terminal can be reduced.

Furthermore, according to the fourth example embodiment, a structure is disclosed in which the above-described information on the location contains therein the information on the money transfer safe area (not as a limitation but as example information on the position where the security is high).

An example advantageous effect accomplished by such a structure is that by obtaining the information on the position where the security is high regarding the money transfer by electronic money, the terminal becomes unnecessary to execute the display process relating to the execution of the authentication to the user of the terminal, and thus the process load on the terminal can be reduced. Moreover, the user friendliness can be improved while the safeness is secured by skipping the display process relating to the execution of the authentication to the user of the terminal based on the information on the position where the security is high.

Moreover, according to the fourth example embodiment, a structure is disclosed in which the above-described information on the location contains therein the information on the location where the user of the terminal visits by equal to or greater than set number of times.

An example advantageous effect accomplished by such a structure is that by obtaining the information on the location where the user of the terminal visits by equal to or greater than the set number of times regarding the money transfer by electronic money, the terminal becomes unnecessary to execute the display process relating to the execution of the authentication to the user of the terminal, and thus the process load on the terminal can be reduced. Moreover, the user friendliness can be improved while the safeness is secured by skipping the display process relating to the execution of the authentication to the user of the terminal based on the information on the location where the user of the terminal visits by equal to or greater than the set number of times.

Furthermore according to the fourth example embodiment, a structure is disclosed in which the above-described information on the location contains therein at least a piece of information among the position of the home of the user of the terminal 20, the position of the company where the user of the terminal 20 is working, and the home of the person relating to the user of the terminal 20.

An example advantageous effect accomplished by such a structure is that by obtaining at least a piece of information regarding the money transfer by electronic money among the position of the home of the user of the terminal, the position of the company where the user of the terminal is working, and the home of the person relating to the user of the terminal, the terminal becomes unnecessary to execute the display process relating to the execution of the authentication to the user of the terminal, and thus the process load on the terminal can be reduced. Moreover, the user friendliness can be improved while the safeness is secured by skipping the display process relating to the execution of the authentication to the user of the terminal based on at least a piece of information among the position of the home of the user of the terminal, the position of the company where the user of the terminal is working, and the home of the person relating to the user of the terminal.

Still further, according to the fourth example embodiment, a structure is disclosed in which the above-described information on the location contains therein the position information on the shop compatible with the payment application (not as a limitation but as example information on the position of the shop where the payment by electronic money can be made).

An example advantageous effect accomplished by such a structure is that by obtaining the information on the position of the shop where the payment by electronic money can be made, the terminal becomes unnecessary to execute the display process relating to the execution of the authentication to the user of the terminal regarding the money transfer by electronic money, and thus the process load on the terminal can be reduced. Moreover, when, for example, the position of the shop where the payment by electronic money can be made and the position of the terminal are not apart from each other, it is expected that the users of the respective terminals exchange money at the time of the payment at this shop, and the possibility of risk can be considered as low. Hence, the user friendliness can be improved while the safeness is secured by skipping the display process relating to the execution of the authentication to the user of the terminal.

Yet still further, according to the fourth example embodiment, a structure is disclosed in which the above-described information different from the authentication password contains therein the information on the money transfer destination person (not as a limitation but as example information on the first user of the first terminal).

An example advantageous effect accomplished by such a structure is that by obtaining the information on the first user of the first terminal regarding the money transfer by electronic money, the terminal becomes unnecessary to execute the display process relating to the execution of the authentication to the user of the terminal, and thus the process load on the terminal can be reduced.

Moreover, according to the fourth example embodiment, a structure is disclosed in which the above-described information on the money transfer destination person contains therein the information (not as a limitation but as example information on the relation to the user of the terminal) such that the money transfer destination person is a close friend or relative, there is a money transfer record to the money transfer destination person in past, or there is a money receive record from the money transfer destination person in past.

An example advantageous effect accomplished by such a structure is that by obtaining the information on the relation to the user of the terminal regarding the money transfer by electronic money, the terminal becomes unnecessary to execute the display process relating to the execution of the authentication to the user of the terminal, and thus the process load on the terminal can be reduced. Moreover, in the case of, for example, the user who has a close relationship to the user of the terminal, the possibility of risk can be considered as low. Hence, the user friendliness can be improved while the safeness is secured by skipping the display process relating to the execution of the authentication to the user of the terminal.

Furthermore, according to the fourth example embodiment, a structure is disclosed in which the above-described information on the money transfer destination person contains therein the information indicating that such a person is involved in the group capable of transmitting and receiving contents with the terminal 20 of the user of the terminal 20 in the IMS application (not as a limitation but as example information indicating that such a person is involved in the group capable of transmitting and receiving a message with the terminal of the user of the terminal).

An example advantageous effect accomplished by such a structure is that by obtaining the information indicating that such a person is involved in the group capable of transmitting and receiving contents with the terminal of the user of the terminal regarding the money transfer by electronic money, the terminal becomes unnecessary to execute the display process relating to the execution of the authentication to the user of the terminal, and thus the process load on the terminal can be reduced. Moreover, in the case of, for example, the first user who is involved in the group capable of transmitting and receiving a message with the terminal of the user of the terminal, the possibility of risk can be considered as low. Hence, the user friendliness can be improved while the safeness is secured by skipping the display process relating to the execution of the authentication to the user of the terminal.

Still further, according to the fourth example embodiment, the above-described group in the IMS application contains the other user (not as a limitation but as an example second user) of the other terminal 20 (not as a limitation but as an example second terminal) than the terminal 20 (not as a limitation but as example first terminal) relative to the user (not as a limitation but as an example first user) of the terminal 20 from which the user of the terminal 20 executes the money transfer.

An example effect obtained by such structure is that the terminal transmits and receives the message with the second terminal of the second user in the group.

Yet still further, according to the fourth example embodiment, a structure is disclosed in which the above-described information different from the authentication password contains therein the information on the setting for the terminal 20 or for the payment application stored in the terminal 20 (not as a limitation but as example information on the setting for the terminal or for the application stored in the terminal).

An example advantageous effect accomplished by such a structure is that by obtaining the information on the setting for the terminal or for the application stored in the terminal regarding the money transfer by electronic money, the terminal becomes unnecessary to execute the display process relating to the execution of the authentication to the user of the terminal, and thus the process load on the terminal can be reduced. Moreover, when, for example, the information on the setting for the terminal or for the application stored in the terminal is information that is set by the user, the user's intent can be reflected, and the user friendliness can be improved.

Moreover, according to the fourth example embodiment, a structure is disclosed in which the above-described information different from the authentication password contains therein the information indicating that the terminal 20 is being locked which is set to such a terminal 20 (not as a limitation but as example information on the security of the terminal set to such a terminal).

An example advantageous effect accomplished by such a structure is that by obtaining the information on the security of the terminal set to such a terminal regarding the money transfer by electronic money, the terminal becomes unnecessary to execute the display process relating to the execution of the authentication to the user of the terminal, and thus the process load on the terminal can be reduced. Moreover, when, for example, the information on the security of the terminal is information on the authentication to the user of the terminal, the user friendliness can be improved by omitting the display process relating to the execution of the authentication to the user of the terminal.

Furthermore, according to the fourth example embodiment, a structure is disclosed in which the terminal 20 receives the information on the money transfer by IMS money to the terminal 20 of the other user (not as a limitation but as an example first terminal) via the communication I/F 22.

An example advantageous effect accomplished by such a structure is that the terminal can receive and obtain the information on the money transfer by electronic money to the first terminal via the communication interface.

Still further, according to the fourth example embodiment, a structure is disclosed in which the terminal skips the authentication process when there is the plurality of terminals 20 which simultaneously receives the separate check inquiry, and the authentication is completed at the terminals 20 by equal to or greater than the set number.

An example advantageous effect accomplished by such a structure is that the information transmitted from the server which manages the money transfer by electronic money is transmitted based on the authentication to the user of the second terminal that receives the information on the money transfer by electronic money to the first terminal. Hence, the terminal can obtain the information transmitted from the server which manages the money transfer by electronic money based on the authentication made to the user of the second terminal.

Fourth Modified Example (1)

Although the terminal 20 executes the authentication skip determination on whether or not to skip the authentication process for money transfer in the fourth example embodiment, the present disclosure is not limited to this case. According to the second example embodiment, a structure is disclosed in which the server 10 executes the authentication skip determination on whether or not to cause the terminal 20 to skip the authentication process for payment, and the server 10 may execute the authentication skip determination on whether or not to cause the terminal 20 to skip the authentication process for money transfer like the second example embodiment.

FIG. 6X is a diagram illustrating an example data structure of authentication skip condition data 166 stored in the storage 15 of the server 10 in this modified example. This authentication skip condition data 166 is data that defines the authentication skip condition which is a condition to cause the terminal 20 to skip the authentication process for money transfer. Although this data structure is similar to the authentication skip condition data 2856 in the terminal 20, some details differ. The description will be given below mainly for a different condition.

<Condition category No. "SP15-2">

Regarding the authentication skip condition with the condition No. "SP15-2" contained in the condition category No. "SP15 (security)", "the credit score of the user of the terminal is equal to or higher than 80 points" is defined. When the credit score of the user of the terminal 20 stored in the credit score data 158 is equal to or higher than 80 points, i.e., when the credit of the user of the terminal 20 reaches a certain level, the authentication process at the terminal 20 it to be skipped.

In this determination, the terminal 20 obtains the credit score of the money transfer predeterminate user of the terminal 20 among the credit scores stored in the credit score data 158. Next, it is determined whether or not the obtained credit score is equal to or higher than 80 points.

Although the other conditions are the same as those of the authentication skip condition data 2856 in the terminal 20, unlike the fourth example embodiment, the server 10 executes the authentication skip determination process for money transfer in this modified example. Accordingly, the server 10 obtains the server management information, such as the user information stored in the user registration data 153 in the storage 15, the shop information stored in the shop registration data 155, the IMS user management data stored in the IMS user management database 161, the IMS group management data stored in the IMS group management database 163, and the money transaction management data stored in the money transaction management database 165. Moreover, the server 10 requests, to the terminal 20, the information not managed by the server 10, such as the position information on the terminal 20 (the terminal position information), and obtains such information. Next, the server 10 executes the authentication skip determination based on the obtained information.

Figure 6Y:
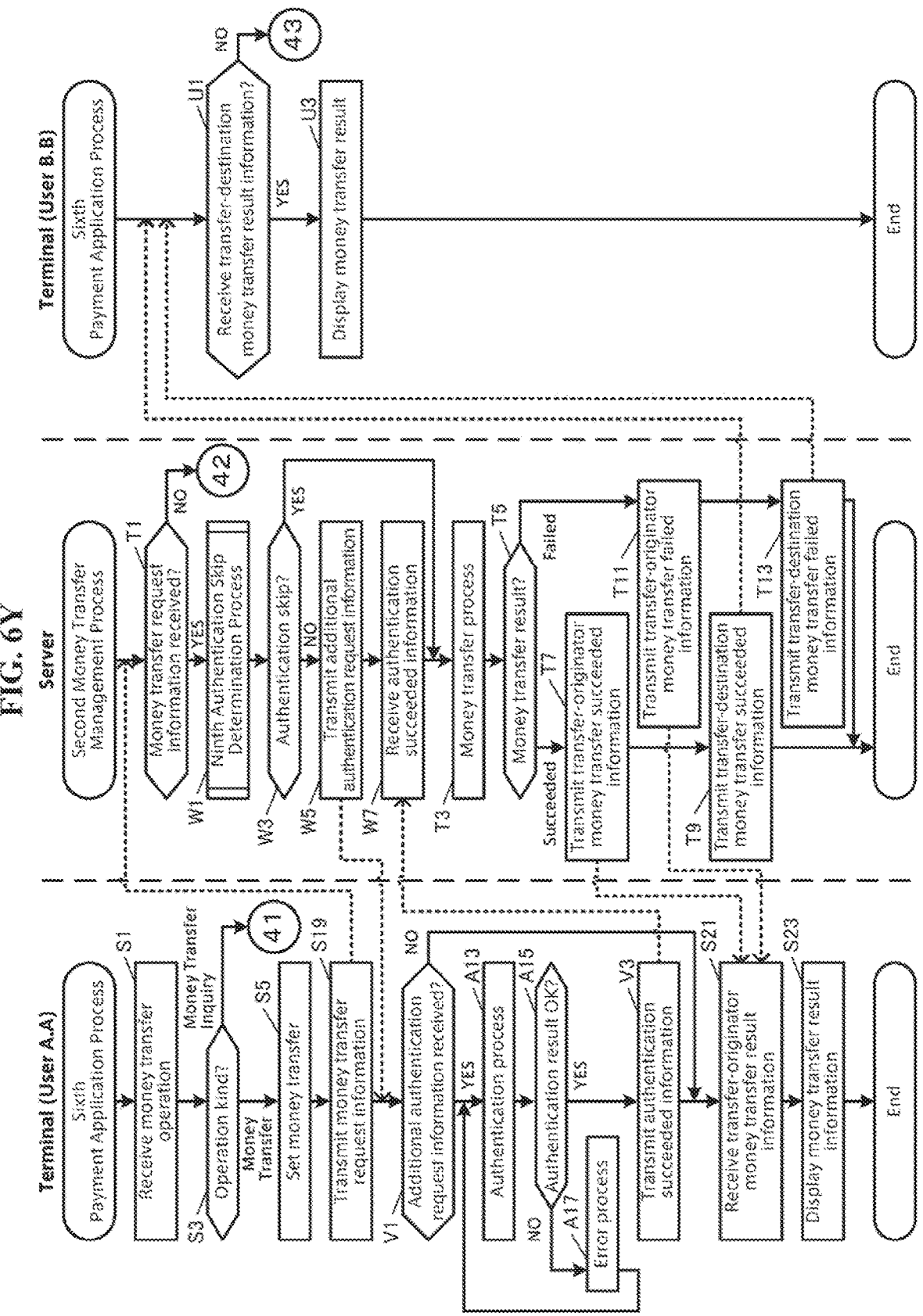
FIG. 6Y is a flowchart illustrating example process flows by the terminal, and the server according to the fourth modified example.

FIG. 6Y is a flowchart illustrating example flows of the processes executed by the respective devices in this modified example.

In this figure, illustrated from the left side in sequence are the sixth payment application process that is an example payment application process executed by the payment application processor 213 of the terminal 20A, the second money transfer management process executed by the money transfer management processor 115 of the server 10, the sixth payment application process that is an example payment application process executed by the payment application processor 213 of the terminal 20B, respectively, and is extracted portions thereof corresponding to FIG. 6V.

Note that the same reference numeral will be given to the same step as that of the already-described flowchart, and the description thereof will be omitted.

The payment application processor 213 of the terminal 20A transmits, after executing the money transfer setting in operation S5, the money transfer request information to the server 10 via the communication I/F 22 (operation S19).

When determining that the money transfer request information is received from the terminal 20A via the communication I/F 14 (operation T1: Yes), the money transfer management processor 115 of the server 10 executes a ninth authentication skip determination process (operation W1). Note that in order to distinguish from the authentication skip determination process in the other embodiment, it is referred to as the "ninth authentication skip determination process" for such a purpose.

More specifically, by the similar scheme to that of the fourth example embodiment, it is determined whether or not the authentication skip condition contained in the unillustrated authentication skip condition data stored in the storage 15 based on the various server management information obtained from the storage 15, and on the information obtained upon requirement to the terminal 20.

After executing the ninth authentication skip determination process, the money transfer management processor 115 determines whether or not the determination to skip the authentication process is made (operation W3). When the determination is made to skip the authentication process (operation W3: Yes), the money transfer management processor 115 transitions to operation T3.

Conversely, when the determination is made not to skip the authentication process (operation W1: No), the money transfer management processor 115 transmits the additional authentication request information to the terminal 20 via the communication I/F 14 (operation W5).

The payment application processor 213 of the terminal 20A determines whether or not the additional authentication request information is received from the server 10 via the communication I/F 22 (operation V1), and when determining that it is not received (operation V1: No), transitions to operation S21. In this case, the authentication process at the terminal 20 is skipped.

Conversely, when determining that the additional authentication request information is received from the server 10 via the communication I/F 22 (operation V1: Yes), the payment application processor 213 executes operations A13 to A17. In this case, the authentication process at the terminal 20 is executed.

When the authentication result in the authentication process is "OK" (operation A15: Yes), the payment application processor 213 transmits the authentication succeeded information to the server 10 via the communication I/F 22 (operation V3).

The money transfer management processor 115 executes operation T3 when receiving the authentication succeeded information from the terminal 20 via the communication I/F 14 (operation W7). That is, the money transfer process is executed (operation T3) after the information indicating that the authentication is succeeded is received from the terminal 20. Next, the money transfer management processor 115 transitions to operation T5.

Advantageous Effect of Fourth Modified Example (1)

According to this modified example, a structure is disclosed in which the server 10 receives the money transfer request information (not as a limitation but as example first information on the money transfer by electronic money) on the money transfer by IMS money by the terminal 20 via the communication I/F 14, and transmits the additional authentication request information (not as a limitation but as example information on the authentication to the user of the terminal) to the terminal 20 via the communication I/F 14. Moreover, the server 10 receives the authentication succeeded information (not as a limitation but as example information indicating that the user of the terminal is authenticated) via the communication I/F 14. Next, based on the authentication succeeded information, the server 10 transmits the transfer-originator money transfer result information (not as a limitation but as example money transfer information indicating that the money transfer by electronic money is made) to the terminal 20 via the communication I/F 14, and transmits, based on the authentication succeeded information and on the money transfer request information, the transfer-destination money transfer result information (not as a limitation but as example second information on the money transfer by electronic money) to the terminal 20 of the transfer-destination person (not as a limitation but as an example different terminal from the terminal) via the communication I/F 14. At this time, based on the obtainment of the different information from the authentication password (not as a limitation but as example authentication information to authenticate the user), the server 10 does not transmit the additional authentication request information to the terminal 20 via the communication I/F 14, but transmits the transfer-originator money transfer result information to the terminal 20 via the communication I/F 14.

An example advantageous effect accomplished by such a structure is that by obtaining the different information from the authentication information to authenticate the user of the terminal regarding the money transfer by electronic money, the server does not transmit, to the terminal, the information on the authentication to the user of the terminal, and thus the process load on the server can be reduced. Moreover, the money transfer information can be transmitted to the terminal without the information on the authentication to the user of the terminal being transmitted to the terminal.

Fourth Modified Example (2)

In the above example, the server 10 may change the authentication skip condition based on the credit score of the user of the terminal 20.

More specifically, not as a limitation but as an example, the higher the credit score of the user of the terminal 20 is, the longer the server 10 may set the "set time" in the authentication skip condition with the condition No. "SP11-1" in the authentication skip condition data 166.

More specifically, not as a limitation but as an example, the set time when the credit score is zero point is set as "two hours". Moreover, thresholds that are the integral multiple of 10 points (10 points, 20 points, and 100 points, etc.) are set as the thresholds for the credit score. Every time the credit score of the user of the terminal 20 reaches each threshold, the set time may be set so as to be extended by one hour.

Moreover, not as a limitation but as an example, the higher the credit score of the user of the terminal 20 is, the higher the server 10 may set the "daily upper limit set amount of money" in the authentication skip condition with the condition No. "SP13-1" in the authentication skip condition data 166. More specifically, not as a limitation but as an example, the daily upper limit set amount of money when the credit score is zero point is set as "JP 0 YEN". Moreover, thresholds that are integral multiples of 10 points (10 points, 20 points, and 100 points, etc.) are set as the thresholds for the credit score. Every time the credit score of the user of the terminal 20 reaches each threshold, the daily upper limit set amount of money may be set so as to be increased by JP 5000 YEN.

Advantageous Effect of Fourth Modified Example (2)

An example advantageous effect accomplished by this modified example is that the server can change the authentication skip condition based on the credibility of the user of the terminal. For example, the user friendliness can be improved by changing the authentication skip condition in such a way that the higher the credibility of the user of the terminal is, the more the authentication process is likely to be skipped.

Fourth Modified Example (3)

Although the information on the money transfer transmitted from the server 10 is stored in the storage 28 of the terminal 20 as the money transfer record data, and the terminal 20 executes the authentication skip determination based on the information on the money transfer contained in this money transfer record data according to the fourth example embodiment, the present disclosure is not limited to this case.

More specifically, no money transfer record data may be stored in the storage 28 of the terminal 20. In this case, the terminal 20 may request, to the server 10, the information necessary for the authentication skip determination, and may execute the authentication skip determination based on the information obtained from the server 10.

Advantageous Effect of Fourth Modified Example (3)

An example advantageous effect accomplished by this modified example is that since it is unnecessary to store the information on the record of the money transfer by electronic money in the terminal, the storage capacity of the terminal can be saved.

Fourth Modified Example (4)

Although the daily upper limit set amount of money is the upper limit set amount of money that is the threshold to the total amount of money already transferred in a day (the money transfer amount) according to the fourth example embodiment, the present disclosure is not limited to this case. More specifically, the daily upper limit set amount of money may be the upper limit set amount of money that is the threshold amount of money to the total amount that includes, not as limitations but as examples, the total amount of money already transferred in a day (the money transfer amount), and the amount of money to be transferred (the predeterminate money transfer amount).

Moreover, it is not always necessary that the upper limit set amount of money should be the daily upper limit set amount of money, and may be the upper limit set amount of money for a predetermined past time period (e.g., a past one week, a past two weeks, or a past one month).

Furthermore, the upper limit set amount money may be the amount of money to be transferred (the predeterminate money transfer amount), i.e., the set amount of money for the amount of money that can be transferred at once, and the authentication skip determination may be made based on the authentication skip condition that is "the predeterminate money transfer amount is equal to or smaller than the set amount of money (or is smaller than the set amount of money)". This enables the authentication process to be skipped when the user of the terminal 20 transfers a small amount of money.

Advantageous Effect of Fourth Modified Example (4)

An example advantageous effect accomplished by this modified example is that a determination on whether or not to execute the display relating to the execution of the authentication based on not only the amount of money transferred in past (the money transfer amount) but also the amount of money to be transferred (the predeterminate money transfer amount).

Moreover, the user friendliness can be improved by skipping the display relating to the execution of the authentication until the money transfer amount at once exceeds the set amount of money.

Fourth Modified Example (5)

Various authentication skip conditions described in the fourth example embodiment are merely examples, and can be added, deleted and modified as appropriate.

More specifically, not as a limitation but as an example, the authentication skip condition that is "the present date and time is within a set time from the last money transfer date and time" may be changed to "the present date and time is within the set time from the last authentication date and time".

Moreover, the "last authentication date and time" in this case is not limited to the date and time at which the last authentication for money transfer is executed, and the date and time at which the authentication other than the authentication for money transfer is executed at last, such as, not as limitations but as examples, the date and time at which the authentication for the payment by IMS money is executed at last as described in the first example embodiment, the date and time at which the authentication to cancel the locking of the OS of the terminal 20 is executed at last, and the date and time at which the authentication to cancel the locking of the payment application is executed at last, may be set as the "last authentication date and time" in the above-described authentication skip condition.

Advantageous Effect of Fourth Modified Example (5)

An example advantageous effect accomplished by this modified example is that the terminal skips the display relating to the execution of the authentication regarding the money transfer by electronic money not only when it is within the set time from the date and time at which the authentication for money transfer is executed at last, but also when it is within the set time from the date and time at which the authentication other than the authentication for money transfer is executed, and thus the user friendliness can be further improved.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for processing a payment related to an electronic money, the method comprising:

receiving, by an information processing device, a code generation request from a store code reader device associated with a shop point of sale (POS) system of a shop;

obtaining, by the information processing device, first information comprising at least one authentication skip condition setting from the code generation request, wherein the at least one authentication skip condition setting comprises a setting for skipping authentication of the payment related to the electronic money for a commodity type of commodity sold at the shop;

generating, by the information processing device and based on the first information, terminal display code information for the commodity type of commodity sold at the shop that includes second information related to an authentication of a user of a user terminal, the second information related to the authentication of the user comprising authentication skip information indicating whether authentication of the payment related to the electronic money at the shop POS system is to be skipped based on the at least one authentication skip condition setting;

receiving, by the user terminal, the terminal display code information;

displaying, on the user terminal, a code screen based on the terminal display code information corresponding to the authentication skip information that includes an indication that authentication of the payment related to the electronic money at the shop POS system is to be skipped;

reading, with a code reader device associated with the shop POS system, the code screen that is displayed on the user terminal;

receiving, by the information processing device, from the shop POS system and in response to the code screen being read by the code reader device, third information generated by the user terminal, read by the code reader device of the shop POS system and that includes the indication that authentication of the payment related to the electronic money at the shop POS system is to be skipped;

determining, by the information processing device, that authentication of the payment related to the electronic money at the shop POS system is to be skipped based on the received third information;

skipping, by the information processing device, authentication of the payment related to the electronic money at the shop POS system based on determining that authentication of the payment related to the electronic money at the shop POS system is to be skipped; and processing, by the information processing device, the payment related to the electronic money.

2. The method according to claim 1, wherein the third information is different from the second information related to the authentication of the user of the user terminal.

3. The method according to claim 2, wherein the third information includes location information related to a location, and wherein the determining that authentication of the payment related to the electronic money at the shop POS system is to be skipped is performed based on the location information.

4. The method according to claim 3, wherein the location information includes shop information related to a shop at which the payment is tendered.

5. The method according to claim 4, wherein when the shop is a designated shop stored in the information processing device, the terminal display code information is generated.

6. The method according to claim 2, wherein the third information which is different from the second information related to the authentication, includes commodity information on a commodity, and wherein the determining that authentication of the payment related to the electronic money at the shop POS system is to be skipped is performed based on the commodity information.

7. The method according to claim 6, wherein the commodity information includes fourth information related to the commodity having a value that is equal to or smaller than a set amount of money.

8. The method according to claim 6, wherein the commodity is one of a plurality of commodities, and wherein the commodity information includes cost information related to a total amount of money for the plurality of commodities to be purchased by the user of the user terminal by the electronic money.

9. The method according to claim 1, wherein the authentication skip information indicates that the authentication of the payment related to the electronic money at the shop POS system is to be skipped based on the commodity type associated with a transaction being identified as a fast moving consumer commodity.

10. The method according to claim 9, wherein the authentication skip information includes fourth information indicating that the authentication of the user of the user terminal is to be skipped based on receiving the authentication skip information.

11. The method according to claim 1, wherein the second information related to the authentication of the user of the user terminal includes fifth information utilized by the user terminal to skip the authentication of the user of the user terminal.

12. The method according to claim 11, wherein the second information on the authentication of the user of the user terminal includes commodity information related to a commodity to be purchased by the user of the user terminal by the electronic money, and wherein the determining that authentication of the payment related to the electronic money at the shop POS system is to be skipped is performed based on the commodity information.

13. The method according to claim 12, wherein the commodity information includes an amount of money for the commodity.

14. The method according to claim 1, wherein the second information related to the authentication of the user of the user terminal includes location information related to a location, and wherein the determining that authentication of the payment related to the electronic money at the shop POS system is to be skipped is performed based on the location information.

15. The method according to claim 14, wherein the location information includes shop information related to a shop at which a commodity is to be purchased.

16. A non-transitory computer readable storage medium storing program instructions that are executable by a processor of an information processing device to perform a method to process a payment by an electronic money at a shop point of sale (POS) of a shop system, the method comprising:

receiving a code generation request from a store code reader device associated with the shop POS system;

obtaining first information comprising at least one authentication skip condition setting from the code generation request, wherein the at least one authentication skip condition setting comprises a setting for skipping authentication of the payment related to the electronic money for a commodity type of commodity sold at the shop;

generating, based on the first information for the commodity type of commodity sold at the shop, terminal display code information that includes second information related to an authentication of a user of a user terminal, the second information related to the authentication of the user comprising authentication skip information indicating whether authentication of the payment related to the electronic money at the shop POS system is to be skipped based on the at least one authentication skip condition setting;

receiving, from the shop POS system and in response to a code screen being read by a code reader device associated with the shop POS system, third information generated by the user terminal and read by the code reader device of the shop POS system, wherein the code screen is displayed on the user terminal and is based on the terminal display code information corresponding to the authentication skip information that includes an indication that authentication of the payment related to the electronic money at the shop POS system is to be skipped, and wherein the third information includes the indication that authentication of the payment related to the electronic money at the shop POS system is to be skipped;

determining that authentication of the payment related to the electronic money at the shop POS system is to be skipped based on the received third information;

skipping authentication of the payment related to the electronic money at the shop POS system based on determining that authentication of the payment related to the electronic money at the shop POS system is to be skipped; and processing the payment related to the electronic money.

17. An information processing device configured to process a payment by an electronic money at a shop point of sale (POS) system of a shop, the information processing device comprising:

a memory configured to store one or more computer-readable instructions; and a processor configured to:

receive a code generation request from a store code reader device associated with the shop POS system;

obtain first information comprising at least one authentication skip condition setting from the code generation request, wherein the at least one authentication skip condition setting comprises a setting for skipping authentication of the payment related to the electronic money for a commodity type of commodity sold at the shop;

generate, based on the first information, terminal display code information for the commodity type of commodity sold at the shop that includes second information related to an authentication of a user of a user terminal, the second information related to the authentication of the user comprising authentication skip information indicating whether authentication of the payment related to the electronic money at the shop POS system is to be skipped based on the at least one authentication skip condition setting;

receive, from the shop POS system and in response to a code screen being read by a code reader device associated with the shop POS system, third information generated by the user terminal and read by the code reader device of the shop POS system, wherein the code screen is displayed on the user terminal and is based on the terminal display code information corresponding to the authentication skip information that includes an indication that authentication of the payment related to the electronic money at the shop POS system is to be skipped, and wherein the third information includes the indication that authentication of the payment related to the electronic money at the shop POS system is to be skipped;

determine that authentication of the payment related to the electronic money at the shop POS system is to be skipped based on the received third information;

skip authentication of the payment related to the electronic money at the shop POS system based on determining that authentication of the payment related to the electronic money at the shop POS system is to be skipped; and process the payment related to the electronic money.

* * * * *